US012664969B2

(12) United States Patent
Vasylyev

(10) Patent No.: US 12,664,969 B2
(45) Date of Patent: Jun. 23, 2026

(54) REAL-TIME CONTEXTUALLY AWARE ARTIFICIAL INTELLIGENCE (AI) ASSISTANT SYSTEM AND A METHOD FOR PROVIDING A CONTEXTUALIZED RESPONSE TO A USER USING AI

(71) Applicant: Sergiy Vasylyev, Elk Grove, CA (US)

(72) Inventor: Sergiy Vasylyev, Elk Grove, CA (US)

( * ) Notice: Subject to any disclaimer, the term of this patent is extended or adjusted under 35 U.S.C. 154(b) by 112 days.

(21) Appl. No.: 18/738,363

(22) Filed: Jun. 10, 2024

(65) Prior Publication Data

US 2024/0412720 A1     Dec. 12, 2024

Related U.S. Application Data

(60) Provisional application No. 63/646,605, filed on May 13, 2024, provisional application No. 63/642,833, filed on May 5, 2024, provisional application No. 63/605,504, filed on Dec. 2, 2023, provisional application No. 63/521,674, filed on Jun. 17, 2023, provisional application No. 63/472,292, filed on Jun. 11, 2023.

(51) Int. Cl.
| | |
|---|---|
| *G10L 13/00* | (2006.01) |
| *G10L 13/02* | (2013.01) |
| *G10L 15/22* | (2006.01) |
| *G10L 17/22* | (2013.01) |

(52) U.S. Cl.
CPC .............. *G10L 13/02* (2013.01); *G10L 15/22* (2013.01); *G10L 17/22* (2013.01)

(58) Field of Classification Search
None
See application file for complete search history.

(56) References Cited

U.S. PATENT DOCUMENTS

| | | |
|---|---|---|
| 9,338,493 B2 | 5/2016 | van Os |
| 9,668,024 B2 | 5/2017 | Van Os |
| 9,961,516 B1 | 5/2018 | Proctor |
| 9,961,521 B2 | 5/2018 | Lee |
| 10,170,123 B2 | 1/2019 | Orr |
| 10,199,051 B2 | 2/2019 | Binder |
| 10,304,444 B2 | 5/2019 | Mathias |
| 10,475,446 B2 | 11/2019 | Gruber |

(Continued)

*Primary Examiner* — Satwant K Singh

(57) ABSTRACT

An artificial intelligence (AI) assistant system and a method for providing a contextualized response to a user using AI are disclosed. The system comprises an audio input device for receiving voice input, an audio output device for providing output, a processor, a wireless communication device, a contextual memory unit for storing conversational context data on a sliding window basis, and a non-volatile system memory unit. The processor executes instructions to receive voice input, determine user identification, update conversational context data with user identification and a tokenized representation of the voice input, process the voice input using a transformer-based language model to generate a response, update the conversational context data with a tokenized representation of the generated response, and output the response via the audio output device. The method comprises receiving voice input, determining user identification, updating conversational context data, processing voice input, and generating and outputting a conversational response.

38 Claims, 11 Drawing Sheets

(56) References Cited

U.S. PATENT DOCUMENTS

| | | | |
|---|---|---|---|
| 10,586,535 B2 | 3/2020 | Kudurshian | |
| 10,629,191 B1 | 4/2020 | Cheng | |
| 10,885,905 B2 | 1/2021 | Srinivasan | |
| 10,943,072 B1 | 3/2021 | Jaganmohan | |
| 10,984,798 B2 | 4/2021 | Schramm | |
| 11,113,479 B2 | 9/2021 | Tran | |
| 11,116,415 B2 | 9/2021 | Turner | |
| 11,170,768 B2 | 11/2021 | Woo | |
| 11,217,240 B2 | 1/2022 | Huber | |
| 11,227,600 B2 | 1/2022 | Leong | |
| 11,301,908 B2 | 4/2022 | Batcha | |
| 11,461,667 B2 | 10/2022 | Bell | |
| 11,475,268 B2 | 10/2022 | Garcia | |
| 11,488,590 B2* | 11/2022 | Cella | H04R 1/1016 |
| 11,500,672 B2 | 11/2022 | Zeitlin | |
| 11,782,271 B2 | 10/2023 | Tavangar | |
| 11,798,547 B2 | 10/2023 | Milden | |
| 11,909,737 B2 | 2/2024 | Pringle | |
| 11,928,426 B1 | 3/2024 | Gutzeit | |
| 11,960,983 B1 | 4/2024 | Gelfenbeyn | |
| 11,983,157 B2 | 5/2024 | Soon-Shiong | |
| 11,983,185 B2 | 5/2024 | Hill | |
| 11,990,139 B1 | 5/2024 | Sandrew | |
| 2019/0095775 A1 | 3/2019 | Lembersky | |
| 2021/0193176 A1 | 6/2021 | Doshi | |
| 2021/0397683 A1* | 12/2021 | Liem | H04W 4/027 |
| 2022/0093088 A1 | 3/2022 | Rangarajan Sridhar | |
| 2023/0208869 A1 | 6/2023 | Bisht | |
| 2023/0244678 A1* | 8/2023 | Hill | G06F 16/3329 |
| | | | 707/748 |
| 2023/0291740 A1* | 9/2023 | Ashby | H04L 63/102 |
| 2023/0326212 A1 | 10/2023 | Chawda | |
| 2023/0334263 A1 | 10/2023 | Konam | |
| 2023/0343044 A1 | 10/2023 | Greunke | |
| 2023/0350929 A1 | 11/2023 | Hasan | |
| 2023/0368284 A1 | 11/2023 | Sheikh | |
| 2023/0385085 A1 | 11/2023 | Singh | |
| 2024/0020538 A1 | 1/2024 | Socher | |
| 2024/0054117 A1 | 2/2024 | Emma | |
| 2024/0062877 A1 | 2/2024 | Vohra | |
| 2024/0070152 A1 | 2/2024 | Nagy | |
| 2024/0073368 A1 | 2/2024 | Malan | |
| 2024/0095460 A1 | 3/2024 | Xu | |
| 2024/0095463 A1 | 3/2024 | Leary | |
| 2024/0095491 A1 | 3/2024 | Birru | |
| 2024/0096312 A1* | 3/2024 | Gupta | G10L 15/063 |
| 2024/0112180 A1* | 4/2024 | Singh | G06Q 20/389 |
| 2024/0126794 A1 | 4/2024 | Cook | |
| 2024/0132079 A1 | 4/2024 | Medina | |
| 2024/0144565 A1 | 5/2024 | Alkalay | |
| 2024/0177172 A1 | 5/2024 | Ghoche | |
| 2025/0157473 A1* | 5/2025 | Pathak | G10L 15/26 |

* cited by examiner

REAL-TIME CONTEXTUALLY AWARE ARTIFICIAL INTELLIGENCE (AI) ASSISTANT SYSTEM AND A METHOD FOR PROVIDING A CONTEXTUALIZED RESPONSE TO A USER USING AI

CROSS-REFERENCE TO RELATED APPLICATIONS

This application claims priority from U.S. provisional application Ser. No. 63/472,292 filed Jun. 11, 2023, U.S. provisional application Ser. No. 63/521,674 filed Jun. 17, 2023, U.S. provisional application Ser. No. 63/605,504 filed Dec. 2, 2023, U.S. provisional application Ser. No. 63/642, 833 filed May 5, 2024, and U.S. provisional application Ser. No. 63/646,605 filed May 13, 2024. The foregoing applications are expressly incorporated herein by reference in their entirety.

NOTICE OF MATERIAL SUBJECT TO COPYRIGHT PROTECTION

BACKGROUND OF THE INVENTION

1. Field of the Invention

The present invention relates generally to artificial intelligence systems, more specifically to an AI assistant system with the capacity to monitor and record conversations, contextually interpret the recorded conversations and commands or requests, and respond based on the recorded conversation. The invention further relates to natural language processing, voice recognition and understanding, real-time interpretation of spoken language, and human-computer interaction.

The AI assistant system described may find applications in various fields including but not limited to personal digital assistants and intelligent agents, automotive and in-vehicle assistance systems, smartphones and mobile communication devices, home automation and smart home technologies, online multi-user conferencing and collaboration platforms, robotics and autonomous systems for personal care and medical assistance, interactive guide systems and educational technologies for groups and individuals, multiplayer gaming and interactive entertainment, customer service and technical support chatbots, accessibility technologies for the elderly and people with disabilities, and the like.

The present invention further relates to a method for providing a contextualized response to a user command, either explicit or implied, using such an AI assistant system, with potential for enhancing user experience, engagement and productivity across this wide range of application domains.

2. Description of Background Art

Artificial Intelligence (AI) has grown significantly in the past few years, including advancements in the field of natural language processing, voice recognition and understanding, and real-time interpretation of spoken language. An essential part of these advancements is AI assistant systems. They can comprehend spoken language, interact intelligently with users, and assist with various tasks. Examples of these tasks include scheduling appointments, providing news and weather updates, or answering inquiries about particular subjects.

A typical AI assistant system is often triggered by a specific 'wake' word or phrase, then starts to process the subsequent voice command from the user. However, these conventional systems often face a challenge in providing contextually accurate responses as they lack the capability to retain and use the immediate conversation history. This lack of context retention and understanding can lead to non-optimal performance and errors in the assistant's responses, leading to user dissatisfaction.

Furthermore, conventional AI assistants also face challenges when it comes to recognizing and processing voice commands in real-time, especially in an ongoing conversation scenario. Delays in processing voice inputs or context can lead to slow responses and inaccuracies.

In many communication scenarios, conventional AI assistants often lack the ability to maintain a meaningful conversation between multiple parties with low latencies which limits the utility of such systems. Therefore, there is a need in the art for an improved AI assistant system that can record, store, and process conversations in real-time and provide contextual understanding for reduced latency and improved accuracy and user experience. There is also a need for such a system to be adaptable to various scenarios, such as in-vehicle, in-person, online, or mobile communications, and enhance the interaction between multiple conversing parties.

BRIEF SUMMARY OF THE INVENTION

Certain aspects of embodiments disclosed herein by way of example are summarized in this Section. These aspects are not intended to limit the scope of any invention disclosed and/or claimed herein in any way and are presented merely to provide the reader with a brief summary of certain forms an invention disclosed and/or claimed herein might take. It should be understood that any invention disclosed and/or claimed herein may encompass a variety of aspects that may not be set forth below.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an artificial intelligence (AI) assistant system, which may include: an audio input device configured to receive voice input from one or more users; an audio output device configured to provide audio output; a processor; a wireless communication device; a contextual memory unit configured to store conversational context data on a sliding window basis; and a non-volatile system memory unit, where the processor is configured to execute instructions to: receive the voice input from the audio input device, determine user identification information based on the voice input, update the conversational context data within the contextual memory unit to include the determined user identification information and a tokenized representation of the voice input, process the voice input using a transformer-based language model to generate a conversational response, update the conversational context data within the contextual memory unit to include a tokenized representation of the generated conversational response, and output the generated conversational response to the one or more users via the audio output device. Other embodiments of this aspect include corresponding computer systems, apparatus, and computer programs recorded on one or more computer storage devices, each configured to perform the actions of the methods.

Implementations may include one or more of the following features. The contextual memory unit may be configured to store the conversational context data for a predetermined time period, and the processor may be further configured to execute instructions to dynamically adjust the predetermined time period based on at least one of a user input, a system parameter, and a contextual factor. The contextual memory unit may be configured to store the conversational context data for a predetermined time period, and the processor may be further configured to execute instructions to dynamically adjust the predetermined time period based on at least one of user preferences, system performance, and contextual relevance. The processor may be further configured to execute instructions to dynamically adjust a context window size based on at least one parameter selected from a group may include of available memory, processor speed, and estimated latency for processing user commands. The AI assistant system may include a display device, the processor may be further configured to execute instructions to generate visual content based on the conversational context data and the generated conversational response and output the generated visual content to the display device as part of the generated conversational response. The AI assistant system may include a camera configured to capture visual input, where the processor may be further configured to execute instructions to analyze the visual input captured by the camera, extract relevant visual information from the visual input, and update the conversational context data based on the extracted relevant visual information. The processor may be further configured to execute instructions to access an external knowledge base via the wireless communication device to retrieve relevant information based on the conversational context data, and utilize the retrieved relevant information in conjunction with the conversational context data stored in the contextual memory unit to generate the conversational response. The processor may be further configured to execute instructions to store user-specific information in a user profile database within the non-volatile system memory unit, retrieve the user-specific information from the user profile database based on the determined user identification information, and personalize the generated conversational response based on the retrieved user-specific information. The processor may be further configured to execute instructions to perform sentiment analysis on the voice input to determine an emotional state of the one or more users, and adapt the generated conversational response based on the determined emotional state. The processor may be further configured to execute instructions to solicit user feedback on the generated conversational response, process the solicited user feedback to generate processed feedback data, update the transformer-based language model based on the processed feedback data, and utilize an active learning algorithm to select conversational responses for which to solicit user feedback. The processor may be further configured to execute instructions to proactively generate a plurality of candidate conversational responses based on the conversational context data prior to receiving a subsequent user query or command, store the plurality of candidate conversational responses in memory, and select a conversational response from the stored plurality of candidate conversational responses based on the subsequent user query or command and the conversational context data. The processor may be further configured to execute instructions to receive a complex user request from the voice input, break down the complex user request into a plurality of manageable sub-tasks, coordinate the execution of the plurality of manageable sub-tasks, and generate a portion of the conversational response based on the execution of the plurality of manageable sub-tasks. The AI assistant system may include at least one agentic task processing unit (ATPU) configured to autonomously perform a task in a background, where the processor may be further configured to execute instructions to: detect a command based on the conversational context data, in response to detecting the command, cause the at least one ATPU to initiate performance of the task, receive a result of the task from the at least one ATPU, generate a conversational response indicating a result of the task, and output the conversational response indicating the result of the task via the audio output device. The processor may be further configured to execute instructions to: detect a command based on the conversational context data stored in the contextual memory unit; in response to detecting the command, autonomously perform a multi-step task in a background, where performing the multi-step task may include: decomposing the multi-step task into a plurality of subtasks; assigning the plurality of subtasks to a plurality of agentic task processing units; executing the plurality of subtasks across the plurality of agentic task processing units, where executing the plurality of subtasks may include: generating queries to retrieve data from at least one of the non-volatile system memory unit, the contextual memory unit, or an external data source accessed via the wireless communication device; analyzing the retrieved data using at least one of natural language processing or machine learning models; generating a plurality of results based on analyzing the retrieved data; monitoring a progress of executing the plurality of subtasks; aggregating the plurality of results from the plurality of agentic task processing units; and generating a conversational response indicating a result of the multi-step task based on the aggregated plurality of results; and output the generated conversational response via the audio output device. The AI assistant system may include an emergency shut-off switch, where the processor may be further configured to execute instructions to: detect activation of the emergency shut-off switch, and disable processing of voice input and generation of conversational responses in response to detecting the activation of the emergency shut-off switch. The processor may be further configured to execute instructions to detect activation of an emergency event, and initiate a shutdown procedure in response to detecting the activation of the emergency event. The processor may be further configured to execute instructions to assign a priority level to each user based on the determined user identification information, and, upon receiving voice input from multiple users, process the voice input based on the assigned priority levels. The processor may be further configured to execute instructions to: assign a priority level to each user based on the determined user identification information, upon receiving voice input from multiple users, determine a processing order for the received voice input based on the assigned priority levels, and process the voice input in the determined processing order, such that voice input from a user with a higher assigned priority level is processed before voice input from a user with a lower assigned priority level. The processor may be further configured to execute instructions to assign a priority level to a user based on the determined user identification information and process the voice input based on the assigned priority level. Implementations of the described techniques may include hardware, a method or process, or computer software on a computer-accessible medium.

One general aspect includes a method for providing a contextualized response to a user using artificial intelligence (AI), which may include: receiving, by an audio input device, voice input from one or more users; determining, by a processor, user identification information based on the voice input; updating, by the processor, conversational context data within a contextual memory unit to include the determined user identification information and a tokenized representation of the voice input, where the contextual memory unit is configured to store the conversational context data on a sliding window basis; processing, by the processor, the voice input using a transformer-based language model to generate a conversational response; updating, by the processor, the conversational context data within the contextual memory unit to include a tokenized representation of the generated conversational response; storing, by the processor, user-specific information in a non-volatile system memory unit; and outputting, by an audio output device, the generated conversational response to the one or more users. Other embodiments of this aspect include corresponding computer systems, apparatus, and computer programs recorded on one or more computer storage devices, each configured to perform the actions of the methods.

According to one embodiment, an artificial intelligence (AI) assistant system is provided that may include a microphone for recording conversations, a speaker for communication, and a physical memory for storing conversation data. The physical memory may comprise an audio memory unit for storing audio information, a contextual memory unit for storing processed information associated with the audio information, and a non-volatile system memory unit for storing system-level information.

In some aspects, the AI assistant system may include one or more processors configured to process the conversation and user commands using advanced language models and AI techniques, which may include tokenization, encoding, and contextual understanding. The system may also include a wireless communication device for accessing external databases and internet resources, and a multi-modal input processing unit for processing various inputs such as speech, visual, text, and gesture.

In certain embodiments, the contextual memory unit may include a main context window and one or more secondary context windows, where the main context window is immediately available to a language model of the AI assistant system, and the secondary context windows form a latent context. The AI assistant system may be configured to continuously update the contextual memory, recognize control signals, and generate appropriate responses using a transformer-based language model.

Various implementations of the AI assistant system may include features such as dynamic memory management, user hierarchy and prioritization, emergency shut-off, and long-term information management. The system may be adaptable to different environments and use cases, such as personal assistance, eldercare, customer service, or online communication platforms.

The AI assistant system may be further configured to perform autonomous agentic functions in the background, such as data analysis, complex problem-solving, content creation, or task automation. It may also be integrated with other technologies, such as augmented reality, virtual reality, the Internet of Things, or robotics, to provide a more immersive and interactive user experience.

Various implementations and refinements of the features noted above may exist in relation to various aspects of the present invention individually or in any combination. Further features, aspects and elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

DETAILED DESCRIPTION OF THE INVENTION

Figure 1:
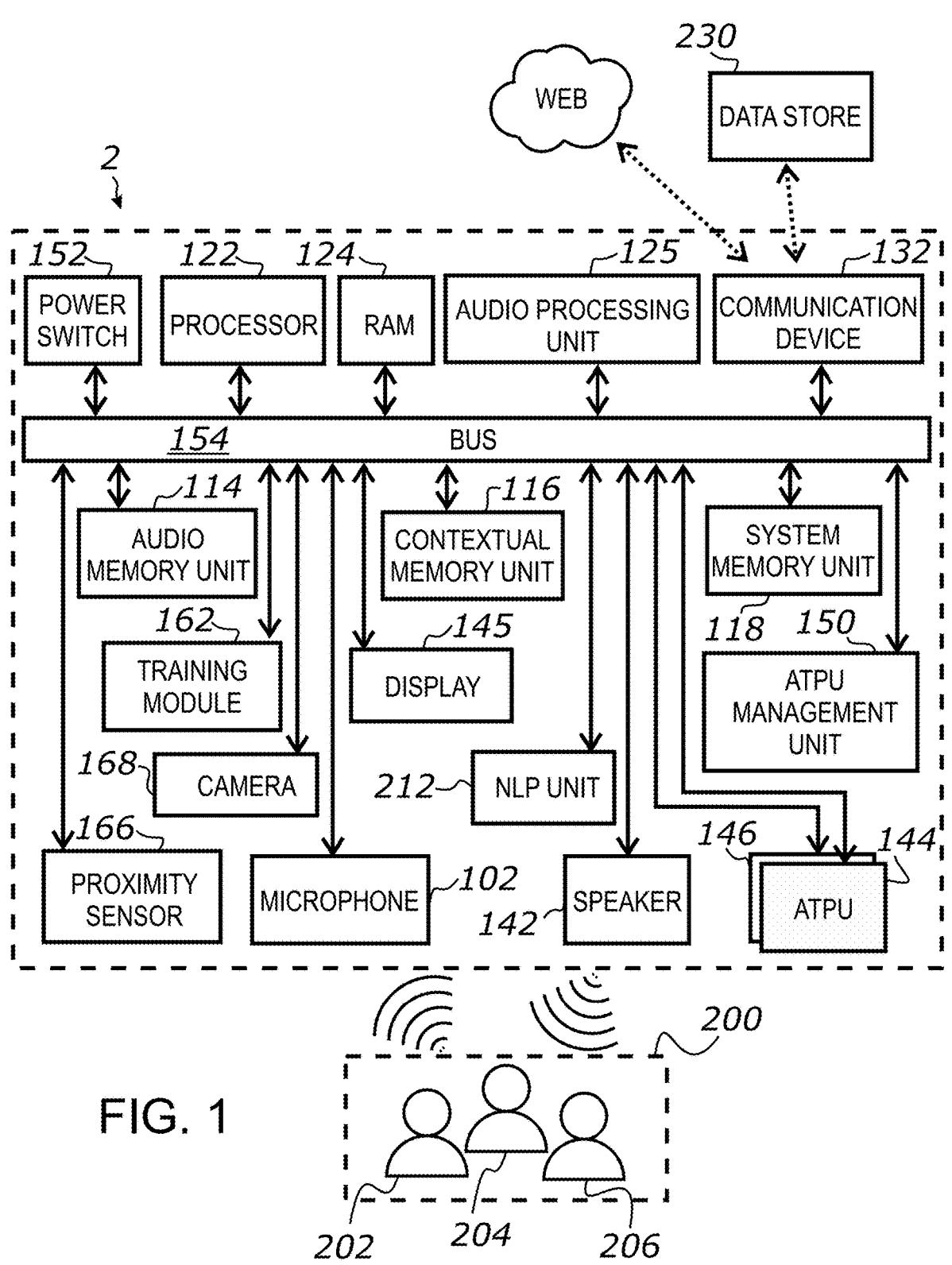
FIG. 1 is a schematic diagram showing an exemplary implementation of an AI assistant system, according to at least one embodiment of the present invention.

Referring more specifically to the drawings, for illustrative purposes the present invention is embodied in the system generally shown in the preceding figures. It will be appreciated that the system may vary as to configuration and as to details of the parts without departing from the basic concepts as disclosed herein. Furthermore, elements or features described in one embodiment of this invention, as taught herein, are not confined or limited in their application to the specific embodiment in which they are described. It should be expressly understood that elements or features represented in one embodiment as taught herein are applicable without limitation to other embodiments taught herein, and in combination with those embodiments and what is known in the art. It should be further understood that reasonable adaptations and modifications of these elements or features, as applied across different embodiments taught herein, fall within the scope of the present invention.

Various embodiments of the invention are directed to an Artificial Intelligence (AI) Assistant, which may also be hereinafter referred to as "AI Assistant" or simply "Assistant", comprise both hardware and software components working synergistically to provide a personalized, contextual conversation experience. The Assistant may be equipped with the ability to perform complex tasks like voice recognition, tokenization, encoding, decoding, and detokenization using various Natural Language Processing (NLP) models. Useful examples of such NLPs include but are not limited to advanced Transformer-Based Models (TBMs), Large Language Models (LLMs), and/or other known forms or combinations of generative AI technology. The LLMs may be trained on a large corpus of text and utilize a neural network with a transformer-based architecture, such as a Generative Pretrained Transformer (GPT) style model that uses self-attention mechanisms. The attention mechanism can be used to weigh the relevance of different words in an input when generating an output, such as predicting the next word in a sentence. The model can be trained on a large amount of text data using an unsupervised learning process during which the model learns to generate human-like text by predicting the next word in a sentence. The model may be configured as an autoregressive model which generates sentences word by word from left to right utilizing the context of the previously generated words to predict the next one. The model may also be fine-tuned on a more specific dataset and may further include humans' review and supervision following various guidelines such as safety, ethics, policy adherence, usefulness, and quality control, to further enhance the model's capacity to generate appropriate, relevant, and contextually sensitive responses.

The hardware may include a sound capturing device, such as a microphone, for recording the conversations, an audio output device, such as a speaker, for communication, a physical memory for storing relevant conversation data, one or more processors for processing the conversation and user commands, and a wireless communication device for accessing external databases and internet resources.

The software aspect of the Assistant may be grounded on a natural language processing model that is trained on a substantial amount of text data, primarily comprising a transformer-based language model. This model may be configured to enable the Assistant to generate contextually relevant responses and foster engaging and meaningful conversations.

In operation, the Assistant listens to a speech of one or more users or conversation between two or more users. The Assistant is further configured to record the speech or conversation and process the recordings in real time using advanced LLMs and AI techniques. The processing may particularly include tokenization, encoding, and contextual understanding on a continuous basis, as the conversation is ongoing.

In the tokenization process, the model used by the Assistant receives a textual representation of the conversation as input and breaks down the received text into a sequence of tokens. Each token is then converted into a high-dimensional vector using the model's learned embedding layer. This layer is configured to act as a lookup table that assigns each unique token in the model's vocabulary to a specific vector. The sequence of vectors is then fed forward through the model's layers where each layer performs a series of operations on the vectors, such as matrix multiplications and application of activation functions, and passes the results onto the next layer. In the contextual understanding process, the model uses the patterns it learned during training to update the embeddings of tokens based on their context and to progressively understand the relationships between the tokens as the vectors pass through the model's layers. As a result of this process, the model builds a contextual understanding of each token in the final layers of the model. According to one embodiment, "contextual understanding" is formed by a resulting high-dimensional vector that represents not just the token itself, but its meaning in the context of the surrounding tokens. According to one aspect, "contextual understanding" may be viewed as the model's understanding of the meaning of a word (or a series of words) in the context of the surrounding words. This contextual understanding is then used by the model to generate appropriate responses.

According to preferred embodiments, the Assistant may be configured to retain only the most recent part of the conversation and/or its context on a sliding basis. This ability ensures that the Assistant always keeps the most recent portion of the conversation in a contextualized form and is ready to promptly respond to user's commands without delays associated with processing the recorded conversation.

Furthermore, the Assistant is equipped to recognize one or more voices, which can be designated as control voices. It monitors the conversation for a control signal which could be a key phrase pronounced by the control voice, a button press, a gesture, non-verbal cues, or other recognizable commands. The control signals could be single or multifactor and may include biometric security measures. The control signal triggers the Assistant to record a subsequent voice command from the user. According to one embodiment, the Assistant provides the user with the ability to set or change the control signals that trigger the Assistant.

The Assistant's voice recognition system is configured to understand control signals from designated voices. The system's design preferably allows it to distinguish specific vocal patterns, accents, and nuances, which may enhance its recognition accuracy and response efficiency.

According to one embodiment, the AI assistant system may be configured to learn and adapt to user-specific audio commands, which may not necessarily be legible words but rather unique spoken utterances serving as audio-based shortcuts for conveying instructions. The voice recognition unit of the AI assistant system may be specifically trained on these user-specific utterances, allowing it to accurately interpret and respond to the user's personalized audio commands. The training process may involve the user speaking their desired audio command a number of times, which the AI assistant records and analyzes.

The system may then generate an acoustic model of the utterance, which captures its unique phonetic and prosodic characteristics, such as intonation, stress, and rhythm. This acoustic model may be associated with a specific command or action within the AI assistant's control framework. For example, a user may choose to use the spoken utterance "Zap!" as a shortcut for the command "Turn off the lights." The user repeats this utterance several times, allowing the AI assistant to build an accurate acoustic model. When the user subsequently speaks "Zap!," the AI assistant compares the utterance to its learned acoustic models, recognizes it as the command to turn off the lights, and executes the associated action.

The AI assistant's training on these user-specific audio commands may be an ongoing process. As the user continues to interact with the system, the AI assistant refines its acoustic models based on additional examples and user feedback, improving its recognition accuracy over time. This learning process may be advantageously used to adapt the AI assistant to the user's individual speech patterns, accents, and preferred audio shortcuts, where the user can define multiple audio shortcuts, each associated with a different command or action. The AI assistant preferably maintains a mapping between the acoustic models and their corresponding functions, allowing it to efficiently interpret and respond to the user's personalized audio commands.

According to another embodiment, the AI assistant system may be equipped with visual perception capabilities and configured to recognize and interpret user gestures as control signals. The system employs computer vision techniques, such as pose estimation and motion tracking, to analyze the user's physical movements and map them to specific commands or actions. The AI assistant's gesture recognition module may be trained on a dataset of predefined gestures, each associated with a particular function or instruction. For example, the user may train the system to recognize a raised hand gesture as a command to pause the AI assistant's current action or speech output. The user demonstrates this gesture multiple times, allowing the system to capture various angles and variations of the motion.

Using machine learning algorithms, such as convolutional neural networks (CNNs) or recurrent neural networks (RNNs), the AI assistant may extract relevant features from the training data, such as hand position, orientation, and trajectory. These features may be used to build a gesture classification model that can accurately identify the user's gestures in real-time. Another example of a gesture-based control could be a circular hand motion, which the user may assign as a command for the AI assistant to repeat its last spoken response. The user performs this gesture several times, and the AI assistant learns to recognize it using the same machine learning techniques.

During operation, the AI assistant continuously monitors the visual feed from its camera, analyzing the user's movements. When a gesture is detected, the system compares it to its trained gesture classification model to determine the corresponding command. If a match is found, the AI assistant executes the associated action, such as pausing its speech output or repeating its last response.

The gesture recognition module should preferably be designed to be flexible and adaptable, allowing users to define their own custom gestures for various controls. The user can train the AI assistant on new gestures by providing multiple examples and specifying the desired action or command. The system updates its gesture classification model accordingly, expanding its repertoire of recognized gestures.

To enhance accurate gesture recognition, the AI assistant may employ techniques such as background subtraction, motion segmentation, and depth sensing to isolate the user's movements from the surrounding environment. The system may also incorporate contextual information, such as the user's position relative to the AI assistant and the current state of interaction, to disambiguate gestures and reduce false positives. The system may also incorporate contextual information about the ongoing conversation in the process of determining control signals from user gestures or other visual information it may be configured to capture.

Upon recognition of a control signal, the Assistant records the user's command and processes it. Using advanced LLMs and AI techniques, the Assistant decodes and contextualizes the user command in light of the context of the stored conversation. This command may require the Assistant to provide information or explanations, the subject of which may be derived from the command itself, from the stored context, or both.

The Assistant may be configured to access external storage such as databases and the internet. This feature provides the Assistant with the ability to fetch required data from external sources to both contextualize the recoded portions of the conversation and fulfill user commands. Useful examples of such data include but are not limited to weather updates, stock quotes, road conditions, names or other attributes of people in an address book, latest news on a specific subject, various documents stored locally or on a cloud, and so on.

According to an aspect, the Assistant is designed to seamlessly integrate with a wide range of third-party services and APIs, enabling it to extend its capabilities and provide a more comprehensive and efficient user experience. This integration allows the Assistant to access and leverage external data sources, functionalities, and services to better understand and fulfill user requests, without requiring the user to manually navigate across multiple platforms or applications. The integration with third-party services and APIs may be achieved through a modular and extensible architecture that allows for the easy addition, removal, or modification of external integrations without disrupting the core functionality of the Assistant. The Assistant may employ a set of standardized protocols, such as REST (Representational State Transfer), SOAP (Simple Object Access Protocol), or GraphQL, to communicate with external services over a network, typically using HTTP (Hypertext Transfer Protocol) or HTTPS (HTTP Secure) as the underlying communication protocol.

To establish a connection with a third-party service, the Assistant may authenticate and authorize itself using the service's prescribed security mechanisms, such as OAuth (Open Authorization), API keys, or JSON Web Tokens (JWT), to ensure that the Assistant has the necessary permissions to access and manipulate the relevant data or functionality provided by the service, while also maintaining the security and privacy of user information. Once authenticated, the Assistant can make requests to the third-party service's API endpoints to retrieve data, trigger actions, or update information as needed to fulfill the user's request. The Assistant's leverages its natural language understanding and contextual awareness capabilities to map the user's intent to the appropriate API calls and parameters, handling any necessary data transformations or formatting along the way.

For example, if a user asks the Assistant to book a ride to the airport, the Assistant can integrate with a ride-sharing service's API, such as Uber or Lyft, to handle the request. The Assistant would first authenticate with the ride-sharing service using the user's stored credentials or an API key associated with the user's account. Then, it would extract the relevant information from the user's request, such as the pickup location, destination, and desired time of arrival, and construct the appropriate API request to initiate the booking process. This may involve making multiple API calls to retrieve available ride options, estimate fares and arrival times, and confirm the final booking details.

Throughout this process, the Assistant can engage in a natural back-and-forth conversation with the user to gather any missing information, provide updates on the booking status, and handle any changes or cancellations as needed. The Assistant can also build, as part of the conversation with the user, and use its knowledge of the user's preferences and past behavior to make intelligent decisions on their behalf, such as selecting their preferred ride type or payment method, without requiring explicit input at every step.

To enhance communication between assistant system 2 and the third-party service, the Assistant may employ various data serialization formats, such as JSON (JavaScript Object Notation) or XML (extensible Markup Language), to structure the data exchanged in API requests and responses. The Assistant may also implement robust error handling and retry mechanisms to resiliently deal with any network failures, rate limiting, or other issues that may arise during the API integration process.

In addition to making outbound requests to third-party APIs, the Assistant can also expose its own API endpoints to allow external services to push data or trigger actions within the system. This may be advantageously used to effectuate workflows and automations that can be customized to the user's specific needs and preferences. For example, a user could set up a rule that automatically saves any new photos they take on their smartphone to their preferred cloud storage service, and then notifies the Assistant to analyze the photos and generate suggested captions or album groupings.

By way of example and not limitation, let's consider a scenario where a user is planning a trip and asks the Assistant to help them find and book a suitable hotel. The Assistant can integrate with multiple travel and accommodation services, such as Expedia, Booking.com, or Airbnb, to provide a comprehensive and personalized hotel search experience. The Assistant would start by extracting the user's travel preferences and constraints from the ongoing or past conversations, such as the destination city, travel dates, budget, and desired amenities. It would then construct the appropriate API requests to search for available hotels across the integrated services, applying any additional filters or sorting criteria based on the user's preferences and past booking history. Once the Assistant receives the API responses with the matching hotel options, it can process and merge the results to remove duplicates, rank the options based on relevance and value, and present a curated list of recommendations to the user. The Assistant can highlight the key features and selling points of each option, provide price comparisons and reviews from multiple sources, and answer any follow-up questions the user may have about specific properties or policies. When the user is ready to book their preferred hotel, the Assistant can handle the entire booking process through the relevant API integration, including selecting the room type, entering the user's personal and payment details, and confirming the reservation. The system can also automatically add the booking details to the user's calendar, send a confirmation email or message, and set up any necessary reminders or notifications for the upcoming trip. It may be appreciated that this hotel search and booking process example may be generalized to other applications, roles, and tasks, enabling the Assistant to provide a convenient and conversational user experience that abstracts away the complexity of interacting with multiple third-party services. For instance, the user can simply express their needs and preferences in natural language, and trust the system to handle the rest, knowing that it has access to a wide range of options and can make informed decisions on their behalf.

Other examples of potentially useful integrations include but are not limited to calendar and scheduling services (e.g., Google Calendar, Microsoft Outlook) for managing appointments, meetings, and events; task and project management tools (e.g., Asana, Trello) for organizing and tracking work items and collaborations; online shopping and e-commerce platforms (e.g., Amazon, eBay) for product search, comparison, and purchase; social media networks (e.g., Facebook/Meta, Twitter/X, Instagram, LinkedIn, Reddit, Pinterest) for content sharing, engagement tracking, and sentiment analysis; news and media outlets (e.g., CNN, BBC) for personalized news curation and updates; weather and environmental data providers (e.g., NOAA) for real-time weather forecasts and alerts; financial and banking services (e.g., PayPal, Stripe) for secure payment processing and transaction management; and health and fitness platforms (e.g., Fitbit) for tracking and analyzing wellness data and providing personalized recommendations.

According to various embodiments, the integration functions of the AI assistant system can be implemented using several mechanisms in addition to or instead of Application Programming Interfaces (APIs). These include direct software integration, which embeds AI functionalities directly within the software or platform. Middleware solutions can be employed to act as intermediaries, managing data flow and enhancing security by handling authentication and encryption processes. A microservices architecture might be utilized, where each AI function operates as an independent service, enhancing the system's scalability and resilience. An event-driven architecture could be adopted to enable real-time data processing and responsiveness, triggering AI functionalities by specific events or changes in data. For performance-critical applications, integrating AI functionalities directly onto hardware components through dedicated processors like GPUs or custom ASICs can significantly enhance processing times and reduce latency. Furthermore, serverless computing platforms could be used to run AI functions, simplifying scale management and aligning operational costs directly with resource consumption and demand.

After contextual understanding and accessing any necessary external resources, the Assistant generates a response using its transformer-based LLM. The Assistant then vocalizes the generated response through the integrated speaker, enabling a dynamic conversation with the user. The Assistant may also be configured to have a predictive functionality to predict user commands and pre-fetch the necessary data and progenerate most-likely responses to the user(s). For example, using machine learning and AI, the Assistant could predict what a user might need before they even ask. For this purpose, the Assistant could analyze previous conversations, time of the day, user activities, etc., and offer proactive assistance.

In all, the AI Assistant, as exemplified in the subsequent examples, may be configured to create an interactive and engaging communication environment by recognizing and recording conversations, processing user commands with a deep contextual understanding, accessing necessary external resources, and generating apt responses on-the-fly. The Assistant may particularly find its usefulness in diverse scenarios such as personal assistance at home or during travel, navigation assistance in a car, conversation facilitation on a smartphone, productivity enhancement in a conference room, or engagement amplification on an online communication platform. The AI Assistant may include hardware and software components working synergistically to provide a personalized, contextual conversation experience. The software components may also be associated with respective hardware devices that may be dedicated to performing the tasks specific to those software components more efficiently.

According to one aspect, the LLM employed at least in some implementations of the Assistant may comprise a type of artificial intelligence model that is designed to generate human-like text and may be based on a form of machine learning architecture known as a Transformer, which is specifically designed for understanding and generating sequences of data, like sentences in a text. The term "large" in Large Language Model may generally refer to the number of parameters that the model can have. Parameters may be the parts of the model that are learned from the training data, essentially representing the model's understanding of the data. In the case of language models, these parameters may be configured to capture relationships between words, phrases, grammar, and other aspects of language. According to different embodiments, the LLM model may have greater than 100 million parameters, greater than 500 million parameters, greater than 1 billion parameters, greater than 10 billion parameters, greater than 100 billion parameters, greater than 500 billion parameters, and greater than 1 trillion parameters.

The LLM may be trained using a process known as unsupervised learning in which the model is trained on a large corpus of text (such as books, websites, transcripts of audio recordings, and other written material) and learns to predict the next word in a sentence given the previous words. In the process, or at least in its initial phase, the model may be fed millions, billions, or even trillions of sentences, without necessarily explicitly labeling what constitutes a correct or incorrect prediction and what is not. This training process may be configured to allow the model to learn a statistical understanding of the language, including vocabulary, grammar, and some level of semantic and pragmatic understanding. The LLM does not necessarily have to be configured to understand language in the way humans do but may also be configured to generate outputs primarily based on patterns.

According to one aspect, configuring and training the LLM model using a greater number of parameters may have certain advantages in terms of providing more accurate and comprehensive responses or generations on a larger variety of topics and in a larger variety of scenarios compared to a similar LLM configured using a smaller number of parameters. However, according to another, configuring and training the LLM model using a smaller number of parameters may have certain advantages in terms of lower processing power and memory requirements. Models having less than 100 billion, more preferably less than 75 billion, even more preferably less than 50 billion, even more preferably less than 25 billion, even more preferably less than 20 billion, even more preferably less than 15 billion, even more preferably less than 10 billion, and still even more preferably less than 1, 2, 3, or 5 billion parameters may be advantageously selected for assistant system 2 in scenarios where computational resources are limited or where energy efficiency is a priority. Smaller models may also offer faster response times and require less data for effective training, making them suitable for applications of assistant system 2 where real-time interaction and rapid processing are essential. Additionally, the reduced complexity of such models can lead to easier deployment and maintenance, especially in distributed or mobile systems employing assistant system 2. This can be especially critical for implementations of assistant system 2 configured to run substantially or completely on the hardware of a mobile device.

Furthermore, according to some embodiments, smaller LLM configurations can be selected for assistant system 2 implementations for environments with limited internet connectivity or where data privacy is a concern, as they may allow for localized processing without the need to constantly transmit data to cloud-based servers. In essence, the trade-off between model size and computational efficiency must be carefully considered to align with the specific requirements and constraints of the intended application environment for assistant system 2. The choice between a larger or smaller parameter set may depend on the specific requirements of the use case, including the desired balance between response accuracy and system resource constraints.

Useful examples of mobile devices that can incorporate assistant 2 include but are not limited to: smartphones, tablets, smartwatches, wearable devices, laptops, e-readers, portable gaming devices, personal digital assistants, smart glasses, car infotainment systems, smart earbuds, headphones, fitness trackers, VR and AR headsets, smart home devices, portable medical devices, drones, portable translators, smart keychains, intelligent prosthetics, body cameras, security cameras, dash cams, voice-activated communication devices, interactive museum guides, navigation devices, and the like.

The architecture of the LLM may employ a mechanism known as attention, allowing the model to weigh the relevance of different words in a given context when generating a prediction to capture long-range dependencies between words. Alternatively, or in addition to that, the LLM may be implemented using recurrent neural networks (RNNs) and/or long short-term memory (LSTM) networks. According to some embodiments, the LLM may be trained using a variant of stochastic gradient descent (SGD) called Adam (Adaptive Moment Estimation), which is an optimization algorithm that adjusts learning rates for each of the model's parameters, enabling more efficient training. A Transformer-based LLM may have components that distinguish it from other approaches, such as the self-attention mechanism, the removal of recurrence, and positional encoding, for example. This may provide improved performance on a wide range of NLP tasks.

The self-attention mechanism, which may also be referred to as the scaled dot-product attention, may be configured to allow the model to weigh the importance of words in a sentence based on their relevance to the context. For instance, in the sentence "The cat, which is black, jumped over the fence", the self-attention mechanism may allow the model to understand that "cat" is more related to "jumped" than "black" is. According to an aspect, this may be in contrast to models like RNNs and LSTM networks that rely on their hidden states to encode the sequence information. Furthermore, unlike RNNs and LSTMs, which generally process input sequences step-by-step in a recurrent manner, Transformers may process the entire sequence simultaneously. This parallelization of computation may provide a significant advantage and allow for more efficient use of modern hardware accelerators such as GPUs. Additionally, this design may help mitigate the issue of vanishing and exploding gradients, a common problem in deep RNNs and LSTMs that often makes them difficult to train.

According to an embodiment, Transformers do not necessarily have to be configured to process sequences in a recurrent manner or inherently understand the order of the words in a sentence. Instead, to compensate for this, positional encoding may be used to inject information about word order into the model. This may be done by adding a vector to the input embeddings of each word, which represents its position in the sequence. This may allow the model to consider the order of words when making predictions.

According to an embodiment, the AI Assistant incorporates a processor equipped with a comprehensive Natural Language Processing (NLP) model that is responsible for understanding the context of a user command and the retained part of the conversation. This contextual understanding may advantageously be used for generating an appropriate response to the user command.

The processor may be specifically configured as a dedicated language processing unit, designed to efficiently run NLP tasks. This language processing unit can be optimized for executing complex linguistic algorithms and handling the computational demands of processing natural language data in real-time. The language processing unit may include specialized hardware components such as AI accelerators, tensor processing units (TPUs), or field-programmable gate arrays (FPGAs) that are tailored for NLP workloads. These components may be specifically designed and configured to speed up the execution of tasks like tokenization, named entity recognition, sentiment analysis, and semantic parsing in a way that is advantageous for understanding the context of user commands and conversations.

The language processing unit may have its own dedicated memory subsystem, which can store and quickly access large language models, word embeddings, and other linguistic resources needed for NLP. This dedicated memory can ensure fast data retrieval and minimize latency during language processing tasks. The language processing unit may also feature parallel processing capabilities, allowing it to simultaneously handle multiple NLP tasks or process different parts of the input concurrently, e.g., to enhance the efficiency and accelerate language understanding and response generation.

Upon receiving a user command after the system has identified a control signal, the processor initiates a Tokenization process. Tokenization is a process where the input sentence from the user command, as well as the retained part of the conversation, is broken down into individual pieces known as tokens. These tokens are representative of words, phrases, or other meaningful elements in the language. This breakdown into smaller, manageable pieces allows for easier analysis and processing.

After the input has been tokenized, the processor proceeds to the Encoding stage. During encoding, each token is converted into a numeric form that the machine can understand and process efficiently. The encoded tokens help the system to recognize the structure and semantics of the command and the conversation.

Post encoding, the processor then moves on to the process of Contextual Understanding which can be an important process to the overall operation of the AI Assistant. The Contextual Understanding module may employ the power of transformer-based language models, a form of deep learning model, to make sense of the context in which the user command and the retained part of the conversation have been given.

The transformer-based language model may be configured to allow for each token to be understood not in isolation, but in relation to the other tokens in the command and the conversation. This means that the meaning of each token can vary depending on its position and relationship to other tokens. This nuanced understanding allows the system to better interpret the intentions and requirements of the user command, contributing to a more accurate and useful response.

The processor may continually update this contextual understanding in real-time as the conversation is recorded. This may ensure that the context is always current, facilitating the generation of a response that is not only accurate but also timely. The dynamic adjustment of the time interval during which the conversation is stored, allowing the AI Assistant to optimize the balance between the amount of context to retain and the processing resources available.

The AI Assistant may be configured for processing multimodal input. For example, the inputs that the AI Assistant may be trained to process can incorporate multiple forms like text, voice, and visual signals (such as facial expressions or gestures), that the system can analyze simultaneously to understand the context better.

For instance, the AI Assistant may use a camera or an image sensor for visual input, a microphone for audio input, and text parsers for text input. The acquired data may then be converted into a format that can be processed by AI algorithms. In the next step, the AI Assistant pre-processes the acquired data. This may involve transforming the data into a suitable form or scale, such as converting audio data into spectrograms or transcribing speech into text, converting images into pixel intensity arrays, and so on. Following pre-processing, the AI Assistant may extracts meaningful and discriminative features from the data. For text data, it may extract Term Frequency-Inverse Document Frequency (TF-IDF) features, or use word embeddings.

For processing images captured by the camera or image sensor, the AI Assistant may use convolutional neural networks (CNNs) to learn features. The architecture of CNNs may be specifically designed to automatically and adaptively learn spatial hierarchies of features from input images. The CNNs may be trained on a broad and diverse dataset that includes a large set of labeled images representing various objects in different settings, lighting conditions, and orientations to ensure robust recognition capabilities. During training, the CNN may be configured to learn the values of various filters and weights through backpropagation. The weights can be adjusted in the CNN to minimize the difference between the actual and predicted outputs. The training process may include various optimization or minimization algorithms. For example, an optimizer, such as Stochastic Gradient Descent (SGD) or Adam, may be used to perform this task.

In operation, CNNs may process an image through multiple layers, each designed to detect different features. The image may be conventionally inputted into the CNN as a matrix of pixel values. The layer may be configured to apply a number of filters to the input. In the context of image processing using CNNs, a filter may be defined as a relatively small matrix used to detect features such as edges, corners, or textures. Each filter can be used to produce a feature map that represents the presence of those features within the different regions of the image. After convolution, an activation function such as ReLU (rectified linear unit) may be applied to introduce non-linear properties to the system, allowing the network to learn more complex patterns. The so-called pooling layers may be used to reduce the dimensions (i.e., width and height) of the feature maps (or the input volume for the next convolutional layer) to decrease computational load, control overfitting, and retain important information. Pooling layers may be advantageously used to reduce the number of parameters and computations in the network by down-sampling the input, thus controlling overfitting and making the associated computations more manageable and enhances the efficiency of the network. In addition, pooling can be used by the model to generalize by providing an abstracted form of the representation and makes the detection of features substantially invariant to small translations of the input. For example, even if a feature shifts position slightly from one image to another, after pooling, it may appear in the same place. Max pooling, which takes the largest element from the rectified feature map, may be used for this purpose. For example, with a 2×2 max pooling filter, for each 2×2 area in the input, the highest value may be taken and the rest may be discarded, which may be effective at highlighting the most salient features in the input. Alternatively, average pooling may be used to compute the average value of the portion of the image that is covered by the kernel to smooth out the output rather than discarding the other values.

For processing images captured by the camera, according to one embodiment, the AI Assistant may use CNNs to analyze each frame individually as a static image, in accordance with the above-described techniques, ignoring temporal information (e.g., the information on how objects and features move and change over time). According to an alternative embodiment, a 3D convolution technique, being an adaptation of CNNs, can be used to process video data. Instead of 2D filters and pooling operations, the 3D convolution technique (or 3D CNNs) can be configured to use 3D filters and 3D pooling to extract features across both space and time. The third dimension in the filters may extend across the frames, enabling the network to detect motions directly by applying convolutions across the time axis as well. According to another alternative embodiment, an optical flow technique can be used alongside frame-by-frame analysis to capture motion between successive frames by calculating the motion of objects or features. This technique may be specifically configured to estimate the motion of objects between two frames of a video at different times. It may be based on the apparent motion of brightness patterns in the image, assuming that the patterns are relatively consistent between successive frames, and that their motion within the scene is smooth. According to further alternative embodiment, CNNs may be combined a recurrent neural network (RNN), a useful example of which can be Long Short-Term Memory (LSTM) networks. In this embodiment, the CNN can extract spatial features from individual frames, and the LSTM can piece together information across frames to understand temporal dynamics.

For audio, the AI Assistant can utilize Mel Frequency Cepstral Coefficients (MFCC) or apply deep learning models for feature extraction. With features from various modalities at its disposal, the AI Assistant then fuses these multi-modal features in a meaningful way. The fusion strategies may include early fusion (where features are combined before the learning process), late fusion (where learning is done separately on each modality and the results are combined), or hybrid fusion (a combination of early and late fusion). Once the data is prepared and the features are extracted, these features may be fed into a machine learning or deep learning model for training. The model can be any suitable type, such as a neural network, SVM, decision tree, etc., depending on the task and the characteristics of the data. The training may be designed to make the model capable of generating predictions based on new multi-modal input data. These predictions may then be post-processed as required, potentially converted back into a format that is comprehensible to the user. The multi-modal processing system may be integrated into the AI Assistant's framework, enabling it to utilize the processed inputs for decision-making and user interaction.

The present invention will now be described by way of example with reference to the accompanying drawings.

FIG. 1 schematically shows an embodiment of an assistant system 2 which includes several devices related to input/output, power management, processing, communication, information storage, and interoperability between different components of the system. Assistant system 2 includes a voice recording device exemplified by a microphone 102. Microphone 102 may be configured as the primary input device for assistant system 2 which is responsible for capturing the audio from a user or conversation between two or more individuals. The microphone's sensitivity and clarity should allow for the accurate recognition of different voices, distinguishing between control and non-control voices.

Assistant system 2 further includes a processor 122. This component is programmed for executing instructions and various computational tasks required for the system's operation, including but not limited to, voice recognition, memory management, model training, tokenization, encoding, contextual understanding, decoding, detokenization, performing autonomous tasks, and executing the user's command. Specifically, processor 122 may be configured to execute instructions for any or all of the functions associated with the operation of assistant system 2 and may be integrated across the system. According to some embodiments, some of processor 122's functions, in any combination, may be delegated to dedicated units within the processor or configured as separate elements or auxiliary processing units to optimize performance and efficiency of assistant system 2.

Since the processor's speed and efficiency may significantly impact the system's ability to function in real-time, it is preferred that processor 122 is sufficiently powerful and has sufficient internal memory for performing these tasks and may include multiple cores or sub-processor units that can perform some or all these tasks simultaneously (e.g., in parallel threads or processes). Alternatively, the tasks carried out by processor 122 can be distributed among multiple processors or computing devices which can be implemented as computer programs running on one or more computers situated in various locations interconnected through a network. According to different embodiments, certain above-described functions of processor 122 may be implemented in a separate unit or module. For example, assistant system 2 may incorporate a voice recognition module (not shown) which is configured for performing voice recognition functions.

Assistant system 2 further includes physical memory to store various kinds of information related to the configuration and operation of the system. At least some of that memory may be configured to retain a sliding portion of the conversation and related information for a pre-defined period.

Physical memory includes Random Access Memory (RAM) 124 which can be configured as a temporary storage medium within assistant system 2 to perform various functions. RAM 124 may be configured to hold data that is currently being processed by processor 122, as well as the instructions and intermediate results of these processing operations. The data stored in RAM 124 can be accessed in any order, hence the term "random access", which can be advantageously used to enhance the speed and efficiency of data processing in assistant system 2. It may be configured for multitasking capability to store and manage the details of all active processes. It may also be configured as a buffer or cache to speed up data transfer between different components of assistant system 2, essentially acting as an intermediary, temporarily holding data that is being transferred from a slower device to a faster device, or vice versa. RAM 124 may be configured to store the operating system of assistant system 2 when it boots up. According to an embodiment, it can also be configured to operatively store LLMs and/or their parameters. In an exemplary embodiment of assistant system 2 further incorporating a display unit (not shown), a portion of RAM 124 may be allocated to a graphics processing unit (GPU) to store the frame buffer that holds the image data that the GPU processes to send to the display.

Physical memory further includes an audio memory unit 114 which is configured to store audio information, a contextual memory unit 116 which is configured to store processed information associated with that audio, and a nonvolatile system memory unit 118 configured for storing system-level information that may need to be stored between sessions of user-assistant interactions. Memory units 114 and 116 may be configured to continuously retain the most recent segment of the conversation, thereby allowing for real-time contextual understanding. The memory stored in these memory units may be dynamically adjustable based on factors such as user input, system interpretation of the stored conversation context, available memory space, processor speed, and estimated latency time for processing user inputs.

Processor 122 may have various architectures. According to one embodiment, it may be configured similarly to Central Processing Units (CPUs) of personal computers, workstations, or server computers. According to one embodiment, it may have a GPU architecture. According to one embodiment, it may be specifically configured for processing complex tasks associated with the AI Assistant functionality (e.g., generative, LLM, and multimodal processing) and described below. According to one embodiment, processor 122 may have a dual or hybrid architecture, e.g., incorporating a CPU for general-purpose computing tasks and a dedicated neural processing unit (NPU) or AI accelerator for machine learning and AI-specific workloads. The NPU or AI accelerator may be specifically optimized for executing natural language processing (NLP), transformer-based language models, and other deep learning algorithms. The NLP- and/or NPU/AI accelerator-enabled processor units may constitute a specialized, high-performance part of processor 122, complementing the general-purpose CPU.

According to one embodiment, processor 122 incorporates highly parallel processors designed for handling complex mathematical computations. These processors may be specifically configured for training and inferencing large-scale deep learning models, such as those used in LLMs and generative models. They can significantly accelerate the processing of massive amounts of data required for tasks like natural language processing, speech recognition, and image/video analysis. According to one embodiment, processor 122 incorporates specialized application-specific integrated circuits specifically designed for accelerating machine learning workloads. These circuits may be optimized for performing matrix multiplications and convolutions, which are the core operations in deep neural networks used in LLMs and generative models. They can be configured to provide high performance and energy efficiency for tasks like natural language understanding, language translation, and image/speech synthesis.

According to one embodiment, processor 122 incorporates reconfigurable integrated circuits that can be programmed to perform specific tasks or algorithms, such as those involved in multimodal processing and real-time inference. They can be particularly useful for low-latency, high-bandwidth applications, such as real-time speech recognition, gesture recognition, or sensor fusion. According to one embodiment, processor 122 incorporates custom-designed integrated circuits tailored for specific applications or algorithms, such as those involved in LLMs, generative models, or multimodal processing. According to one embodiment, processor 122 incorporates processors inspired by the structure and function of biological neural networks, aiming to mimic the brain's ability to process information efficiently. These processors can be particularly useful for tasks that require real-time, low-power processing, such as always-on speech recognition, gesture recognition, or sensor data analysis. According to one embodiment, processor 122 incorporates multiple high-performance CPUs that include built-in AI acceleration capabilities. These CPUs can provide a balance between general-purpose computing and AI-specific acceleration, making them suitable for tasks that involve a mix of traditional computing and AI workloads.

When selecting processing units for the AI assistant, it is essential to consider factors such as performance requirements, power consumption, scalability, and cost. A heterogeneous computing approach that combines multiple types of processing units can provide the best balance of performance, efficiency, and flexibility for the diverse workloads involved in generative models, LLMs, and multimodal processing. For example, the AI assistant can use highly parallel processors or specialized application-specific integrated circuits for training and inferencing large-scale language models, reconfigurable integrated circuits for real-time multimodal processing and low-latency tasks, and processors inspired by biological neural networks for always-on, low-power tasks like continuous speech recognition or environmental sensing.

Assistant system 2 further incorporates a network interface configured to facilitate communication with external networks and resources. This network interface may include wireless communication capabilities, such as Wi-Fi, Bluetooth, cellular connectivity (e.g., 4G, 5G), and Ethernet. It enables the system to access the internet, cloud-based services, external databases, and third-party APIs. The network interface supports various protocols, including but not limited to REST, SOAP, and GraphQL, and employs security mechanisms such as OAuth, API keys, and JSON Web Tokens (JWT) to ensure secure and authenticated communication. Referring to FIG. 1, the network interface is exemplified by a wireless communication device 132 which provides the system with capabilities to access external resources, such as the Internet or cloud-based databases, which are exemplified by a data store 230. Wireless communication device 132 may be configured to fetch relevant data in response to a user's command, such as weather updates, stock quotes, road conditions, specific news topics, and other forms of up-to-date information.

Assistant system 2 further includes an audio communication device exemplified by a speaker 142. Speaker 142 may be configured as the primary output device for assistant system 2 through which it communicates its responses to the user's commands, providing real-time information and explanations based on the stored conversation context. Speaker 142 may be exemplified by any device that outputs audio signals, including but not limited to standard speakers, stereo speakers, surround sound systems, subwoofers, soundbars, earbuds, headphones, wireless Bluetooth speakers, smart speakers, in-ceiling speakers, in-wall speakers, portable speakers, PA (public address) systems, computer speakers, car audio systems, voice-activated assistants, wearable audio devices, bone conduction headphones, hearing aids, conference call speakerphones, integrated television speakers, and home theater systems.

Assistant system 2 further includes a power control unit which is exemplified by a power switch 152. Power switch 152 may be configured to power on and power off assistant system 2 and/or its components. According to one embodiment, assistant system 2 may be configured to erase the content of memory units 114 and 116 but keep the content of system memory unit 118 when power is operatively switched off by power switch 152.

According to some embodiments, assistant system 2 may be configured to operate in a low-power mode when not in use. This mode can significantly reduce power consumption by shutting down non-essential components and reducing the activity of the processor. Assistant system 2 may be configured to continuously monitor its usage state and transition to low-power mode after a predefined period of inactivity. Critical components, such as the microphone and minimal processing units, remain active to detect wake signals. To support this functionality, processor 122 may be further configured to execute instructions to wake the system from the low-power mode upon detecting a wake word in the voice input. The wake word detection may be continuously monitored by processor 122 or by low-power audio processing unit 125, which listens for predefined keywords. Upon detecting the wake word, audio processing unit 125 may signal the main processor to transition the system from low-power mode to full operational mode, enabling all functionalities and resuming user interactions.

Audio processing unit 125 in assistant system 2 may be configured to perform various additional functions to enhance audio management and interaction with the user(s), offloading processor 122 from performing some or all such functions. Besides wake word detection to wake the system from low-power mode, audio processing unit 125 may perform voice activity detection (VAD) to differentiate between human speech and background noise to ensure that only relevant audio is processed. The unit also may also be configured to handle speech-to-text conversion, converting spoken words into text format for further processing by the AI system.

Additionally, audio processing unit 125 may perform noise reduction and echo cancellation, processing incoming audio signals to reduce background noise, cancel echoes, and improving audio clarity. It may be configured to perform real-time audio stream processing to facilitate live interactions and commands. Audio processing unit 125 may be configured to recognize and process specific voice commands from users to execute predefined actions or responses, which may include biometric voice authentication and analyzing vocal characteristics to authenticate users based on their voice.

Audio processing unit 125 may be configured to support multilingual processing, allowing recognition and processing of multiple languages and enabling interaction with users in different languages. It can perform audio signal compression and decompression, compressing audio signals for storage efficiency and decompressing them for playback or further processing. The unit may be further configured to generate audio feedback or prompts in response to user commands, enhancing user interaction. Furthermore, audio processing unit 125 may be interfaced with external audio sources such as music players, podcasts, and news feeds, providing integrated audio services. It may also be configured to perform environmental sound analysis, analyzing environmental sounds to provide context-aware responses or actions, such as identifying alarms or detecting silence.

In a multi-user scenario, audio processing unit 125 may be configured to perform user identification based on the unique vocal characteristics of each user. The unit may employ biometric voice authentication techniques to analyze the incoming audio signal and extract user-specific features such as pitch, tone, and speech patterns. These features may then be compared against a pre-registered voice profile database to determine the identity of the speaking user. The voice profile database may be created during a user enrollment process, where each user provides voice samples that are processed and stored as unique voice templates. By identifying the active user, audio processing unit 125 enables assistant system 2 to provide personalized responses and services tailored to the individual user's preferences and context. This user identification functionality may be integrated with the other components of assistant system 2, such as the contextual memory unit 116, which can maintain separate conversation histories and contextual data for each identified user. Furthermore, the user identification results can be passed to processor 122, which can then utilize user-specific language models, knowledge bases, and response generation strategies to ensure that the system's conversational responses are customized and relevant to the identified user.

As the conversation progresses, the NLP model employed by assistant system 2 may continuously analyze the context and semantics of the dialogue. The system also identifies and extracts user identification data derived from the unique vocal characteristics of each user. This user identification information may then be stored in contextual memory unit 116 alongside the tokenized representation of the users' voice inputs which may be subsequently used by assistant system 2 such that the system can quickly access and utilize relevant user-specific information to generate appropriate responses in real-time and adapt its behavior and responses based on the user's preferences, previous interactions, and role within the conversation.

Assistant system 2 further includes a proximity sensor 166 which is configured for detecting that a user or other relevant objects are in proximity of the system on one or more its hardware components. Assistant system 2 further includes a camera 168, which is configured for capturing visual information, and a display 145 which is configured for displaying various visual content to the user(s). Display 145 may be exemplified by various types of devices that can be used to display visual information to a user, including but not limited to LCD (Liquid Crystal Display) screens, LED (Light Emitting Diode) displays, OLED (Organic Light Emitting Diode) screens, QLED (Quantum Dot LED) displays, E-ink displays, touchscreen interfaces, projection screens, heads-up displays (HUD), virtual reality (VR) headsets, augmented reality (AR) glasses, smart glasses, wearable displays, flexible or foldable displays, holographic displays, digital billboards, computer monitors, television screens, tablet screens, smartphone screens, in-vehicle infotainment systems, smart mirror displays, and interactive whiteboards. Assistant system 2 further incorporates one or more Agentic Task Processing Units (ATPUs), exemplified by ATPUs 144 and 146, each configured to perform autonomous agentic functions in the background. Assistant system 2 further incorporates an ATPU management unit 150 which is configured for launching agentic tasks, and managing and coordinating the activities of multiple individual ATPUs.

Assistant system 2 further includes a bus 154 which is used for communicating between various hardware components (e.g., between processor 122 and power switch 152, display 145, camera 168, microphone 102, speaker 142, wireless communication device 132, ATPUs 144 and 146, ATPU management unit 150, and memory units 114, 116, and 118). Assistant system 2 may further include any number of additional modules. For example, according to one embodiment, assistant system 2 comprises a sound localization module (not shown) which is connected to bus 154 and configured to identify a direction of the user's voice, for which processor 122 may be further configured to execute instructions to adjust speaker 142 to direct the generated conversational response towards the user.

Assistant system 2 may include various software components, executable on processor 122. One software component may be configured to monitor and record a conversation involving at least two people via the microphone, continuously retaining a most recent part of the conversation within the physical memory on a sliding basis. One software component may be configured to recognize one or more voices and designate them as control voices. One software component may be configured to train various models (e.g., AI models) implemented in assistant system 2. One software component may be configured to listen for a control signal from the control voices, said control signal comprising a key phrase or non-verbal input. One software component may be configured to respond to a detection of the control signal and record a subsequent user command. One software component may be configured to utilize a natural language processing model, said model being a transformer-based language model trained on a substantial amount of text data for generating conversational responses. One software component may be configured to process the user command through stages including Tokenization, Encoding, Contextual Understanding, Decoding, and Detokenization. One software component may be configured to retrieve the most recent part of the conversation from the physical memory and utilize it as a context for generating a response to the user command. One software component may be configured to access external databases or internet resources via the wireless communication device when necessary to generate the response. One software component may be configured to adjust dynamically the time interval for retaining the conversation in the physical memory based on user input, available memory, processor speed, and estimated latency for processing user commands. According to one embodiment, assistant system 2 may be configured to provide the user with the ability to set the 'memory depth' of the conversation for the AI assistant. This would allow the user to control how far back in the conversation the system considers when responding to commands.

Figure 2:
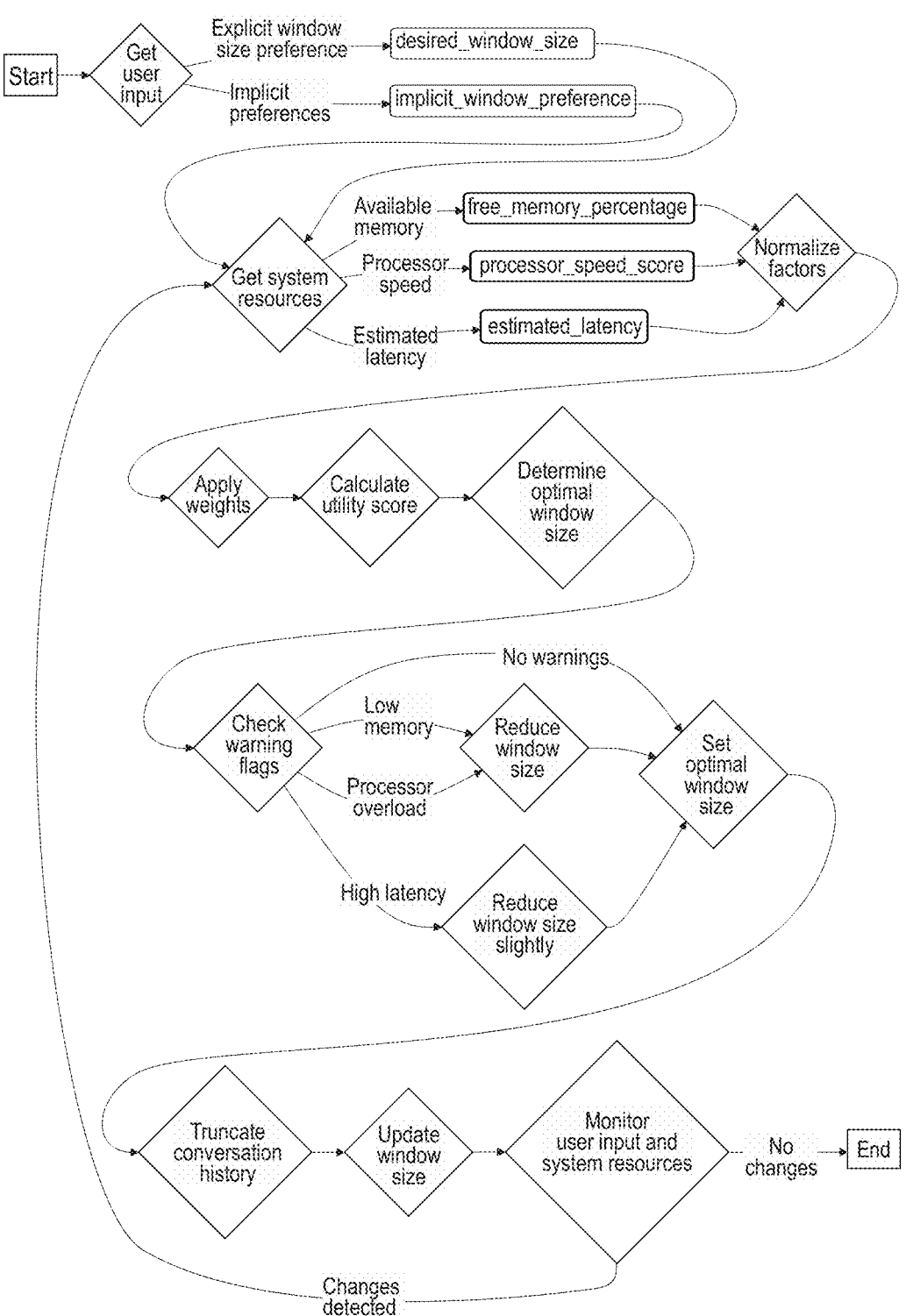
FIG. 2 is a schematic diagram showing an exemplary flowchart of steps that may be performed by an AI assistant system involving capturing, processing, and understanding a conversation with users and dynamic adjustment of a conversation memory window.

The dynamic adjustment of the conversation memory time window may be configured to utilize quantifying and combining several key factors which can be normalized and combined into an overall score or utility value that determines the optimal window size. For example, according to one embodiment, assistant system 2 may be configured to perform a series of steps involving capturing, processing, and understanding a conversation with users and dynamic adjustment of a conversation memory window. This exemplary embodiment is illustrated using a flowchart in FIG. 2. Referring to FIG. 2, assistant system 2 may utilize user input where the system provides a settings interface where the user can explicitly specify their preference for the conversation memory window size using a slider control or predefined options (e.g., short, medium, long). These preferences may be stored as a numerical value (e.g., desired_window_size) in the range, e.g., [30 seconds, 120 seconds]. Additionally, the system can monitor user behavior during conversations, such as scrolling back to review older context or requesting information from earlier in the dialogue. These actions can be tracked and analyzed using a weighted moving average algorithm to calculate an implicit user preference score (e.g., implicit_window_preference), in the range, e.g., [0.0, 1.0], where higher values indicate a desire for longer context retention.

Assistant system 2 may continuously monitor the available RAM using operating system APIs or diagnostic tools. It calculates the free memory percentage, e.g., as (free_memory/total_memory)*100. When this percentage falls below a predefined threshold (e.g., 20%), a memory scarcity flag (e.g., low_memory_warning) is set to True. Additionally, the system estimates the memory requirements of retaining different window sizes based on the average memory usage per second of conversation (e.g., memory_usage_per_second), derived from historical data. Assistant system 2 may further run a benchmark test during startup to measure the processor's speed in terms of instructions per second (IPS) or floating-point operations per second (FLOPS). This benchmark score (e.g., processor_speed_score) may be compared against predefined performance tiers (e.g., low, medium, high) to determine the processor's capability. Moreover, the system can monitor the processor 122 utilization percentage using operating system APIs. If utilization exceeds a threshold (e.g., 90%) for an extended period (e.g., 30 seconds), a processor overload flag (e.g., processor_overload_warning) is set to True.

Assistant system 2 may be further configured to consider estimated latency. For example, the system can maintain a running average of the time taken to process user commands and generate responses. This can be measured as the duration between receiving a user command and rendering the corresponding response, and can be updated after every user interaction, e.g., using an exponential moving average formula:

$$\text{estimated\_latency} = \alpha * \text{current\_interaction\_latency} + (1-\alpha) * \text{previous\_estimated\_latency}, \text{ where } a \text{ is a smoothing factor}(e.g., 0.2).$$

If the estimated latency exceeds an acceptable threshold (e.g., 2 seconds), a high latency flag (e.g., high_latency_warning) is set to True.

Assistant system 2 may employ various algorithms and mathematical models to weight and combine the above-described factors into a unified metric for determining the optimal window size. For example, the system may employ a multi-step algorithm to combine the user input, available memory, processor speed, and estimated latency factors into a single utility score that determines the optimal conversation memory window size.

In step 1, assistant system 2 may normalize the individual factors to a common scale, such as [0, 1], for example, using min-max normalization. For instance, the user's explicit window size preference (desired_window_size) may be normalized as: normalized_desired_window_size= (desired_window_size-30)/(120-30). Similarly, the implicit user preference score (implicit_window_preference), free memory percentage (free_memory_percentage), processor speed score (processor_speed_score), and estimated latency (estimated_latency) may be normalized using their respective ranges or thresholds.

In step 2, assistant system 2 may assign weights to each normalized factor based on their relative importance. These weights can be adjusted dynamically based on the current context and user behavior. For example: w_user_preference=0.4; w_memory=0.3; w_processor_speed=0.2; and w_latency=0.1. The weights may be chosen so that they sum up to 1. In this example, user preference may be given the highest importance, followed by memory availability, processor speed, and latency.

In step 3, assistant system 2 may calculate the weighted average of the normalized factors to obtain the overall utility score. For example, the calculation may be as follows:

$$utility\_score=w\_user\_preference*(normalized\_desired\_window\_size+implicit\_window\_preference)/2+$$
$$w\_memory*normalized\_free\_memory\_percentage+$$
$$w\_processor\_speed*normalized\_processor\_speed\_score+$$
$$w\_latency*(1-normalized\_estimated\_latency).$$

In the illustrated example, the user preference term is the average of the explicit and implicit preferences, and the estimated latency is subtracted from 1 to align higher latency with lower utility.

In step 4, assistant system 2 may determine the optimal window size based on the utility score using a piecewise function, e.g., according to the following example: if utility_score <0.2 then optimal_window_size=30 seconds, else if utility_score <0.5 then optimal_window_size=60 seconds, else if utility_score <0.8 then optimal_window_size=90 seconds, else: optimal_window_size=120 seconds. This function may be used to map the utility score to predefined window sizes, ensuring a minimum of 30 seconds and a maximum of 120 seconds.

In step 5, assistant system 2 may adjust the computed window size if any warning flags are active, for example: if low_memory_warning or processor_overload_warning then optimal_window_size=max (optimal_window_size-30, 30) else if high_latency_warning then optimal_window_size=max (optimal_window_size-15, 30), and so on. This step may be configured to reduce the window size by a predefined time interval (e.g., by 30 seconds) if there is a memory or processor warning, and by a predefined smaller time interval (e.g., 15 seconds) for a latency warning, while maintaining the pre-defined minimum (e.g., 30 seconds). The computed optimal_window_size may then be used to truncate the conversation history and is updated dynamically as conditions change.

According to a specific example illustrating how the dynamic adjustment of the conversation memory window may operate in practice, let's consider a scenario A in which assistant system 2 performs adaptive window shrinking during resource-intensive queries. Suppose the user is engaging in an interaction with the AI assistant that involves a complex task, such as analyzing a large dataset or generating a detailed report. The user issues a series of intricate queries that require significant processing power and memory. The respective initial conditions may be described as follows: user's explicit desired_window_size: 90 seconds, implicit user preference score: 0.7, free memory percentage: 25%, processor speed score: 0.6, and estimated latency: 1.5 seconds.

In step 1, assistant system 2 normalizes the factors (values shown are post-normalization) as follows: desired_window_size: 0.67, implicit_window_preference: 0.7, free_memory_percentage: 0.25, processor_speed_score: 0.6, and estimated_latency: 0.5. In step 2, assistant system 2 applies weights, e.g., default weights from the above-described examples. In step 3, assistant system 2 calculates utility score:

$$utility\_score=0.4*(0.67+0.7)/2+0.3*0.25+0.2*0.6+$$
$$0.1*(1-0.5)=0.5475.$$

In step 4, assistant system 2 determines optimal window size, initially setting the optimal_window_size to 90 seconds. In step 5, assistant system 2 adjusts for warning flags.

During the user's interaction, assistant system 2 detects that the free memory percentage has dropped below 20%, triggering the low_memory_warning. Consequently, the optimal_window_size is reduced by 30 seconds to 60 seconds. As the user continues issuing complex queries, the processor utilization remains high, keeping the processor_overload_warning active. The window size remains at 60 seconds to balance the need for context with the resource constraints.

Let's now consider a scenario B in which assistant system 2 expands the context window during focused, detail-oriented tasks. More specifically, consider a situation where the user is engaged in a focused task, such as writing a research paper or troubleshooting a technical issue. The user has ample computing resources available and prefers maintaining a longer context window. The initial conditions may be as follows: user's explicit desired_window_size: 120 seconds, implicit user preference score: 0.8, free memory percentage: 60%, processor speed score: 0.9, and estimated latency: 0.5 seconds.

In step 1, assistant system 2 normalizes the factors (values shown are post-normalization) as follows: desired_window_size: 1.0, implicit_window_preference: 0.8, free_memory_percentage: 0.6, processor_speed_score: 0.9, estimated_latency: 0.83. In step 2, assistant system 2 apply weights (assume the same default weights as above). In step 3, assistant system 2 calculates utility score, e.g., $$utility\_score=0.4*(1.0+0.8)/2+0.3*0.6+0.2*0.9+0.1*$$
$$(1-0.83)=0.829.$$

In step 4, assistant system 2 determines optimal window size. With a utility score of 0.829, the optimal_window_size is set to 120 seconds. In step 5, assistant system 2 adjusts for warning flags. Since there are no active warning flags, the window size remains at 120 seconds, providing the user with a longer context window to facilitate their focused work.

Let's now consider a scenario C in which assistant system 2 is balancing user preferences and resource constraints in fast-paced conversations. Imagine the user is engaged in an AI-assisted, fast-paced, interactive conversation with a customer support representative, and this conversation is monitored, analyzed, and augmented on-the-fly by assistant system 2. The user prefers a moderately long context window, but the system must adapt to the rapid back-and-forth nature of the conversation. Initial conditions: user's explicit desired_window_size: 90 seconds, implicit user preference score: 0.6, free memory percentage: 40%, processor speed score: 0.7, estimated latency: 1.2 seconds.

Step 1: normalize the factors (values shown are post-normalization): desired_window_size: 0.67, implicit_window_preference: 0.6, free_memory_percentage: 0.4, processor_speed_score: 0.7, estimated_latency: 0.6. Step 2: apply weights (assume default weights as above). Step 3: calculate utility score:

$$utility\_score=0.4*(0.67+0.6)/2+0.3*0.4+0.2*0.7+0.1* \\ (1-0.6)=0.5735.$$

Step 4: determine optimal window size. The utility score of 0.5735 corresponds to an optimal_window_size of 90 seconds. Step 5: Adjust for warning flags. As the conversation progresses, the rapid message exchange causes the estimated latency to increase, triggering the high_latency_warning. The system reduces the optimal_window_size by 15 seconds to 75 seconds. However, the user's implicit preference score increases to 0.8 as they attempt to refer back to earlier parts of the conversation. Assistant system 2 recalculates the utility score, which now reaches 0.6135, corresponding to a window size of 90 seconds. The system dynamically adjusts the window size between 75 and 90 seconds based on the changing latency and user preferences, balancing the need for context with the real-time demands of the fast-paced conversation.

It will be appreciated that these examples may be demonstrative of how the dynamic window adjustment algorithm of assistant system 2 can adapt to various scenarios, considering factors such as resource availability, user preferences, and the nature of the user's task or interaction, as the system continuously monitors and responds to changes in these factors to optimize the conversation memory window size.

In situations where resource limitations prevent the system from maintaining the desired window size, assistant system 2 can employ graceful degradation techniques to ensure a smooth user experience. According to one embodiment, assistant system 2 may be configured to prioritize the most recent and relevant portions of the conversation history. The system can apply a sliding scale of importance to the history segments, with the most recent segments receiving the highest priority. As resources become constrained, the system can trim the lower-priority segments first, preserving the more recent and relevant context. According to one embodiment, assistant system 2 may be configured to temporarily switch to a simpler, less resource-intensive context tracking method when resources are critically low. For example, the system could transition from full text storage to storing only key phrases or entities extracted from the conversation. This fallback mode would still provide some level of contextual awareness while significantly reducing the memory footprint. In extreme cases where even the fallback strategies are insufficient, assistant system 2 can gracefully degrade to a stateless mode, where it processes each user input independently without relying on the conversation history. While this mode sacrifices contextual understanding, it can ensure that the system remains responsive and functional under resource constraints.

To maximize the amount of conversation history that can be retained within the available memory, assistant system 2 can employ summarization and compression techniques. According to one embodiment, assistant system 2 is configured to use natural language processing algorithms to generate concise summaries of the conversation segments. These summaries can capture the key points, entities, and actions discussed, while abstracting away less essential details. By storing these summaries instead of the full text, the system can significantly reduce the memory footprint of the conversation history. According to one embodiment, assistant system 2 is configured to apply lossy or lossless compression algorithms, such as LZ4, to the stored conversation data. These algorithms can dramatically reduce the size of the stored text without losing any information. The compressed data can be decompressed on-the-fly as needed during processing or retrieval. The choice of compression algorithm can be optimized based on factors such as compression ratio, compression/decompression speed, and processor usage. In addition to text compression assistant system 2 can also employ more efficient data structures and encoding schemes. For example, using integer IDs or pointers to represent frequently occurring entities or phrases can reduce the storage overhead compared to storing the full strings. Similarly, using compact binary formats or serialization protocols like Protocol Buffers can minimize the memory usage of structured conversation metadata.

To minimize the impact of resource-intensive operations on the conversation memory window, assistant system 2 can employ proactive memory management techniques. According to; one embodiment, assistant system 2 continuously monitors the memory usage and preemptively frees up memory when it approaches a predefined threshold. This can be achieved by proactively summarizing, compressing, or offloading older conversation segments to secondary storage before the memory becomes critically low. Alternatively, assistant system 2 may leverage the system's idle time or background processing capabilities to perform memory optimization tasks. For example, when the user is not actively interacting with the system, assistant system 2 can use this idle time to summarize, compress, or restructure the conversation history data, thereby freeing up memory for future use.

Assistant system 2 can also employ predictive algorithms to anticipate upcoming resource-intensive operations based on patterns in the user's behavior or the conversation flow. By analyzing factors such as the user's typing speed, the complexity of their queries, or the frequency of context-switching, the system can proactively allocate additional memory or preprocess relevant conversation segments in advance, reducing the likelihood of resource bottlenecks during the actual interaction.

Processor 122 may be configured to operate on an advanced software platform that leverages a natural language processing (NLP) model. According to one embodiment, this model can be a transformer-based language model, trained on a vast corpus of text data to facilitate sophisticated conversation capabilities. According to one embodiment, one or all the software components may be run on processor 122. According to one embodiment, one or more software components may be distributed across different processors or computing devices, some of which may include remote networked servers on a cloud-based platform dedicated to performing specific tasks of system 2, especially those requiring significant computing power which may not be readily available or otherwise feasible locally (e.g., where one or more users are located).

The software components of assistant system 2 may include voice recognition capabilities. Assistant system 2 may particularly include a voice recognition unit (not shown) configured for detecting and processing spoken utterances, distinguishing different voices in a conversation and detecting control signals that trigger specific actions. The voice recognition unit may be further configured for determining that the detected spoken utterances are from a person located in a proximity to microphone 102 and not from other sources.

According to one aspect, a vocal utterance is produced when the vocal folds within the larynx vibrate as air is expelled from the lungs. The resulting sound waves are then modulated by the movements of the tongue, lips, and other parts of the vocal tract to create specific phonemes, or individual sound units, which combine to form words, sentences, and longer speech events. Accordingly, when a user communicates with assistant system 2 or when users communicate with one another using vocal utterances, these sounds can be captured by microphone 102 or similar input device. The resulting audio data is then often converted into a digital form suitable for processing by processor 122.

The recorded audio data may be stored in audio memory unit 114 in various ways. According to one embodiment, the audio data may be stored in an uncompressed audio format, useful examples of which include but are not limited to PCM (Pulse Code Modulation), WAV, and AIFF (Audio Interchange File Format). According to one embodiment, the audio data may be stored in a lossless compressed audio formats, such as FLAC (Free Lossless Audio Codec) and ALAC (Apple Lossless Audio Codec). In a further alternative, the audio data may be stored in a lossy compressed audio formats that can significantly reduce the memory needed for the storage but at the cost of some loss in audio quality. Examples of such lossy codecs include but are not limited to MP3 and AAC (Advanced Audio Coding). When a lossy technique is used, it is preferred that the amount of loss is sufficiently small to enable efficient and accurate transcribing the stored audio data.

The software components of assistant system 2 further includes a natural language processing unit 212 which implements LLM to perform tokenization, encoding, contextual understanding, decoding, and detokenization of the conversation. It can use the context from the stored conversation segment to interpret and respond to user commands intelligently. According to a preferred embodiment, the software components of assistant system 2 are configured for real-time processing, recognizing voices and processing them as the conversation is ongoing. This ability may be advantageously used to allow the assistant system to maintain an updated context for swift and efficient command processing, without undue delays.

In various implementations, assistant system 2 may be incorporated into cars, smartphones, personal robots, conference rooms, or online communication platforms, assisting in a variety of tasks from navigation and informational support to assisting in conversations and conducting productive meetings among people. Each implementation may utilize various combinations of the hardware and software components, with context-specific adaptations to serve the user's needs effectively.

In operation, assistant system 2 may be configured to implement a method for providing a contextualized response to a user command using an AI Assistant. This method may comprise multiple steps that can be performed in various orders. These steps may include but are not limited to: recording an ongoing conversation between two or more individuals, where the AI Assistant continuously retains the most recent portion of the conversation on a sliding basis in memory, the retained conversation portion constituting a context; converting the recorded conversation into a form that can be analyzed, the form being one of original audio, text, or other computationally accessible storage forms; recognizing one or more voices within the recorded conversation and designating one or more of the recognized voices as control voices; monitoring the recorded conversation for a control signal, the control signal being a key phrase pronounced by a control voice, a physical gesture, a button press, or other detectable input; upon detection of the control signal, recording a subsequent user command from a user, wherein the user command is processed and understood by the AI Assistant; retrieving the context from the memory and using it in conjunction with the processed user command to generate a contextualized response, wherein the contextualized response is influenced by the subject of the request derived from the user command, the context, or both; executing a sequence of tasks in response to the user command, the sequence including but not limited to Tokenization, Encoding, Contextual Understanding, Decoding, Detokenization, and other steps inherent to large language models (LLMs) designed for assisting humans; and accessing an external resource as necessary, the external resource being one of a database, an internet source, or other relevant data storage system, to provide information for the contextualized response, the information being one of weather updates, stock quotes, road conditions, contact details from an address book, the latest news on a specified subject or other relevant information as demanded by the user command.

Figure 3:
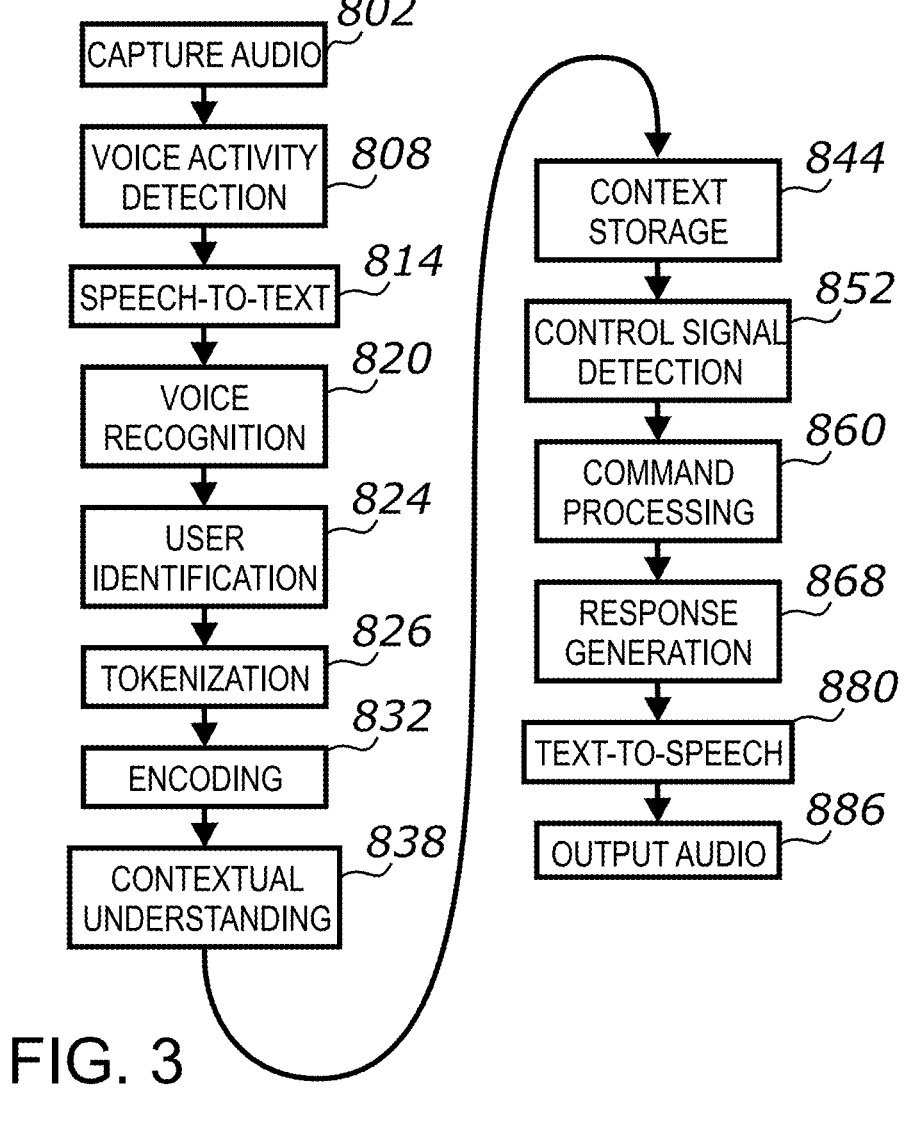
FIG. 3 is a schematic diagram showing an exemplary flowchart of steps that may be performed in a method for providing a contextualized response to a user command using an Artificial Intelligence (AI) Assistant, according to at least one embodiment of the present invention.

FIG. 3 is a flowchart which illustrates an exemplary embodiment of the method for providing a contextualized response to a user command using an AI Assistant (which can be exemplified by assistant system 2 of FIG. 1), particularly illustrating various steps involved in capturing, processing, and understanding the conversation between the users.

Referring to FIG. 3, a first step 802 is to capture audio: The microphone records the conversation between two or more people, converting their voices into an audio signal. This may be followed by a step 808: Voice Activity Detection (VAD). In this step, the AI Assistant identifies and separates human speech from background noise, ensuring only relevant audio is processed. In a step 814 "speech-to-text", the audio is converted to text format using speech-to-text technology for further processing. In a step 824 "User Identification", the AI Assistant analyzes the voice input to determine the identity of the user speaking. This may be done by comparing the unique vocal characteristics of the speaker with pre-registered voice profiles associated with each user. In a step 820 "Voice Recognition", the AI Assistant recognizes one or more voices, including designated control voices, and distinguishes between them.

In a step 826 "tokenization", the newly captured spoken utterances of the ongoing conversation are converted into words or subword tokens, to effectively process and analyze the language. In a step 832 "encoding", the tokenized portion of conversation is transformed into a numerical format that can be fed into the AI model for further analysis. In a step 838 "contextual understanding", the AI model of the AI Assistant processes the encoded conversation and generates a contextual representation of the ongoing conversation, including any control signals, commands, and relevant information. Step 838 may include multiple substeps and may also be directed to various portions of the conversation. For example, the AI Assistant may be configured to perform a contextual understanding of just the newly captured portion of the conversation before analyzing it in the overall context of the previously captured portions of the same conversation. Alternatively, the AI Assistant may be configured to perform a contextual understanding of the newly captured portion of the conversation in light of the context of the previously captured portions of the same conversation. In a further alternative, the AI Assistant may be configured to first combine the data on the previously captured portions of the same conversation with the newly captured portion of the conversation and then perform the contextual understanding of the combined conversation.

According to one embodiment, the AI Assistant utilizes advanced tokenization, encoding, and contextual understanding techniques to actively analyze and process spoken utterances "on-the-fly" during an ongoing conversation with minimal latency. Specifically, the system employs a transformer-based LLM for natural language processing, which has been trained on an extensive amount of text data to ensure high-level understanding and generation capabilities. It continuously updates the contextual understanding in real-time, which ultimately allows for more seamless and efficient command processing, comprehension, and retrieval of relevant information in response to user interactions. This feature may be contrasted to alternative implementations of AI Assistant systems that rely solely on static or pre-recorded conversation data for context-based processing which may require significant time to process stored or pre-recorded conversation data in order to establish an understanding of the context, which can result in less accurate and timely responses, or even misunderstandings.

By contrast, the AI Assistant of this embodiment continually analyzes and updates its contextual understanding while the conversation progresses, allowing it to accurately and efficiently process user commands and relay relevant information within the context of the current conversation. By actively updating the contextual understanding as each spoken utterance is processed, the AI Assistant is able to provide much faster responses and more accurate, responsive, and contextualized assistance in a wide range of conversational scenarios. A further advantage can be providing an enhanced user experience by enabling the system to rapidly adapt to the evolving context of the conversation.

Additionally, the real-time update of the contextual understanding allows the AI Assistant to offer proactive support and assistance during conversations. This can be a considerable improvement over reactive AI systems that only commence processing upon receiving a direct command. The real-time context analysis provides the AI Assistant with the necessary information to predict and anticipate user needs and act accordingly. This may further enhance the overall conversational experience for users by providing a more intuitive and genuine human-like interaction.

According to one aspect, implementing the active and continuous update of the contextual understanding in real-time as the conversation is ongoing might appear as being associated with inefficiencies compared to the reactive AI systems discussed above since it would generally require more processing volume to be performed over the course of the conversation compared to the reactive system which is idling between the commands. However, it may be appreciated that the real-time updates of the contextual understanding will typically have the contextual understanding of both the previously occurred conversation and the command almost immediately after the command is given (or when the system otherwise determines from the conversation's context that it should generate a response) and thus can provide a context-aware, intelligent response much quicker and using much less processing resources for response generation.

In a step 844 "context storage", the current state of the contextual understanding is stored in a memory unit (e.g., as exemplified by contextual memory unit 116 in FIG. 1). The user information identified in step 824 may be stored in the respective memory unit alongside the tokenized representation of the voice input, supporting the AI Assistant's ability to provide personalized and context-aware responses tailored to each individual user or otherwise considering each user's input. The content of this memory unit is continuously updated as new conversation data is processed in real-time, and older data is removed based on the sliding basis storage mechanism. As described below, contextual memory unit 116 may be segmented into multiple sections with various rules governing how to store, prioritize, and retrieve information stored in those sections.

The AI Assistant monitors the conversation and detects control signals in a step 852 "control signal detection", which, in turn, can trigger further action. Step 852 can be performed after each capture of user-spoken utterances. It may also be performed in real-time as a parallel process, while the AI Assistant processes new conversation data or the context of the previously captured portions of the conversation. Control signals may include but are not limited to key phrases, button presses, or gestures. Control signals may further include various triggers that can be intelligently derived from analyzing the context of the conversation.

When a control signal is detected, the AI Assistant preforms a step 860 "command processing" in which it either (1) records the user's subsequent voice command and processes it with the stored contextual understanding or (2) determines what the command is based on the already processed portions of the conversation, including the most recently captured portions, and particularly including the portion of the conversation immediately preceding the detection of the control signal. The AI Assistant may also be configured to request a confirmation from the users on the subject of the command. This request may take various forms, e.g., text messaging, LED illuminated button, or voice. The AI Assistant may also be configured with the capability to summarize the command or paraphrase it (e.g., in simpler terms) to confirm that the Assistant's understanding of the command is correct. For this purpose, the AI Assistant may be equipped with generative LLM models specifically trained for summarization. This functionality may be used to provide summaries of longer conversations or meetings, using natural language processing to identify key points and summarize them effectively.

Based on the command analysis and context, the AI Assistant generates a response in a step 868 "response generation". Step 868 may include several other steps that may be required for providing an intelligent and informative response. This step may particularly include the use of advanced generative AI capabilities of the AI Assistant, as well as complementary steps needed for converting the response to a human-readable form, such as decoding and detokenizes, for example. In step 868, the AI Assistant may also access external sources for information if necessary.

For example, when given a prompt or a question, step 868 may include an information retrieval system to search for relevant documents or passages from the external knowledge source. This retrieval process may be configured to find the most pertinent information that can help in generating a contextually appropriate response. In this step, the AI Assistant may first analyze the command and the stored conversation context to identify key information needs. Based on this analysis, the AI Assistant may formulate a search query to retrieve relevant information from an external knowledge base. Useful examples of the knowledge base include but are not limited to structured databases, web resources, and document collections curated for the specific domain or application, and any combination of those. The retrieval process may employ a hybrid approach combining semantic similarity matching and keyword-based retrieval. The AI Assistant may be configured to use advanced natural language processing techniques, such as word embeddings and transformer-based models, to encode the search query and the documents in the knowledge base into dense vector representations. The AI Assistant may then perform a similarity search to find the most relevant documents based on their semantic proximity to the query.

Once a predefined number of most relevant documents are retrieved from the knowledge base, the AI Assistant may perform an augmentation step. The retrieved documents may be processed and analyzed to extract pertinent information snippets, such as facts, entities, and passages that are most likely to assist in generating an informative response. The extracted information snippets may then be used to augment the original user command and the stored conversation context. The AI Assistant may employ techniques like named entity recognition, coreference resolution, and information fusion to integrate the retrieved information seamlessly into the context representation such that the resulting augmented context can includes not only the user's command and the recent conversation history but also the relevant facts and passages from the external knowledge base. The AI Assistant can use this augmented context as the input for the subsequent generation step.

In the generation step/sub-step, the AI Assistant may utilize any suitable language generation model, such as GPT (Generative Pre-trained Transformer), to produce a coherent and informative response based on the augmented context. The generation may take the augmented context as input and use an attention mechanism to attend to the different components of the context, including the user command, conversation history, and retrieved information snippets. It can then generate the response word by word, considering the context at each step to ensure coherence and relevance.

During the generation process, the AI Assistant may employ techniques like beam search and language model reranking to optimize the quality and fluency of the generated response. It may also apply post-processing steps, such as grammar correction and content filtering, to ensure the response adheres to specified constraints and is appropriate for the target audience.

If the response is generated in text format in step 868, a text-to-speech system converts the text into audible speech in a step 880 "text-to-speech". The generated response is then output through a speaker in a step 886, forming the AI Assistant's contribution to the conversation. Further details and examples of various modes of operation of the AI Assistant are provided below in reference to assistant system 2 of FIG. 1.

According to one embodiment, referring to FIG. 1, assistant system 2 may be powered on by turning power switch 152 on by one of the users in a designated user group 200. Power switch 152 energizes the other hardware components of the system and causes appropriate software components to load into the respective components. Power switch 152 may be turned on by a user directly or indirectly.

In an exemplary implementation, particularly when assistant system 2 is incorporated into a vehicle, such a personal car, power switch 152 (which may also be referred to an energization unit) may be associated with a vehicle's ignition unit configured to generate an ignition signal in response to the vehicle being turned on, for instance, when the ignition key is turned into the "on" position by the driver or when a keyless start system is activated. The ignition signal may be electrical, digital, or any other type of signal that can be reliably detected and used to trigger subsequent actions. Power switch 152 may be interposed between the vehicle ignition unit and assistant system 2 and configured to receive this ignition signal to ensure that assistant system 2 is powered up and functional when the vehicle is turned on. Energization may be accomplished by providing power directly from the vehicle's electrical system to assistant system 2, by closing a relay switch, or through other similar means. For example, the energization circuitry of power switch 152 may include a relay switch that closes in response to the ignition signal. This closure then allows power to be supplied from the vehicle's electrical system to the navigation unit, enabling the navigation unit to perform its intended functionality. This arrangement may provide the advantage of ensuring that assistant system 2 is automatically powered up and ready for use whenever the vehicle is turned on, thereby enhancing the convenience and usability of the navigation system for the driver and/or passengers.

According to one embodiment, assistant system 2, exemplified as a personal robotic assistant (robot), includes power switch 152 that is designed as a physically accessible switch for the user. This embodiment may be particularly adapted and configured for use by individuals who may require close assistance, such as the elderly or disabled persons. Power switch 152 in this embodiment may include an emergency shut-off switch configured to serve a critical safety function, allowing users to perform an emergency shut-off of the AI Assistant, or at least some of its critical functions, in situations where the user perceives a threat from the robot or encounters other types of emergencies. For example, the emergency shut-off switch may be advantageously positioned on the robot in a location that is easily reachable by the user. For example, the switch could be situated on a part of the robot that is at arm-level when the robot is in a user-following mode or in a stationary position aiding the user. The placement can be selected to ensure that the user can quickly and effortlessly access the switch without needing to maneuver around or struggle to reach it. The design of the switch is preferably such that it requires minimal force to activate, accommodating users who may have limited strength or dexterity.

Upon activation of the emergency shut-off switch, the robot is programmed to immediately cease all current operations and disable certain functions. It may be appreciated that this immediate response can be critical to ensure the safety of the user. For instance, if the robot is in motion, it will come to a halt. If the robot is performing a task involving physical interaction with the user or the environment, it will disengage from that task. According to one implementation, the emergency shut-off does not completely power down the robot; instead, it transitions the robot into a safe mode. In this mode, essential functions such as basic environmental awareness and low-power communication capabilities remain active, including, for example, the circuitry enabling communicating a distress signal or ancient information to emergency services. This design choice may be advantageously selected to ensure that the robot can still respond to reactivation commands or emergency signals post shut-off.

According to one embodiment, assistant system 2 may be configured to immediately cease or disable processing of voice input and generation of conversational responses in response to the activation of the emergency shut-off switch. According to one embodiment, assistant system 2 may be configured to immediately pause, cease or disable processing of any tasks it may be performing, including any background tasks, in response to the activation of the emergency shut-off switch.

According to one embodiment, in response to the activation of the emergency shut-off switch, assistant system 2 may be configured to immediately pause, cease, or disable any physical motion it is currently engaged in. For example, if assistant system 2 in a robotic implementation is in a user-following mode or performing a physical task when the emergency shut-off switch is activated (e.g., in situations where the user perceives a potential risk or experiences discomfort with the robot's actions), it will immediately stop moving, disengage from the task, and enter a stationary, safe mode until further user input is received or the system is reset. The system may be reset through a deliberate user action, such as pressing a designated reset button or providing a specific verbal command. This reset procedure ensures that assistant system 2 does not resume its previous actions automatically, but instead requires explicit user confirmation to return to its normal operational state. The reset mechanism may be designed to be easily accessible and intuitive for users, while still preventing accidental reactivation.

Moreover, the robot may include a user interface system that provides feedback to the user upon activation of the emergency shut-off switch. This feedback could be in the form of an auditory signal, a visual indicator, or a combination of both, informing the user that the robot has successfully entered the safe mode. Additionally, the robot is equipped with a secondary mechanism to restart its full operational capabilities after being shut off. This mechanism is preferably designed to be user-friendly and may involve a simple sequence of actions, such as pressing the power switch again or issuing a voice command, ensuring that the user can easily regain the assistance of the robot when needed.

It may be appreciated that, at least some embodiments or implementations, the inclusion of this physically accessible emergency shut-off switch in the personal robotic assistant can be a critical feature for user safety and autonomy. It may enable users, particularly those vulnerable due to age or disability, to maintain control over the robot and provides a quick means of mitigating any perceived threats or handling emergency situations, thereby enhancing the overall safety and usability of assistant system 2.

In various embodiments of assistant system 2, exemplified as a personal robotic assistant, the emergency shut-off system may be implemented in various ways that more fully leverage the power of transformer models incorporated into or utilized by the system to even further enhance user accessibility, safety, and convenience. These alternative embodiments may be designed to cater to diverse user needs and preferences, ensuring the emergency shut-off feature is universally accessible and effective.

According to one embodiment that involves the integration of a voice-activated emergency shut-off system, power switch 152 is configured to respond to a specific voice command, enabling users to initiate the emergency shut-off procedure through a spoken phrase. This voice-activated system may be advantageously selected for users who may find it difficult to physically reach or operate a manual switch due to mobility constraints or in situations where the user is not in immediate proximity to the robot. The voice command for the emergency shut-off is distinct and unlikely to be used in regular conversation, to prevent accidental activation.

According to one embodiment, the robotic assistant exemplifying assistant system 2 may incorporate a wearable emergency shut-off device, such as a bracelet or a pendant, which communicates wirelessly with the robotic assistant. This device may include a button or a similar mechanism that, when activated, sends a signal to the robot to initiate the emergency shut-off procedure. This approach allows users to have a constant, easily accessible means of controlling the robot, regardless of their physical position relative to the robot. This embodiment may be particularly configured for scenarios where the user might be in a different room or obstructed from the robot's immediate reach.

In a further embodiment, the emergency shut-off switch is designed to be sensitive to a specific gesture or a series of gestures. Utilizing advanced sensor technology, the robot can be programmed to recognize certain hand or body movements as a command to initiate the emergency shut-off. This method may be advantageously selected to add an extra layer of convenience and accessibility, especially for users who might find verbal commands or physical buttons less feasible.

According to one embodiment, the robotic assistant incorporates an automated emergency detection system which may be integrated with the robot or implemented as a separate, stand-alone system configured for communicating with the robot upon its activation. This system continuously monitors the user's behavior and the environment to detect potential emergency situations. Upon detecting signs of distress or abnormal patterns, the system autonomously activates the emergency shut-off mode. This system may be configured to proactively monitor various scenarios to enhance user safety, especially in circumstances where the user might be unable to manually or verbally initiate the shut-off due to incapacitation or other emergencies.

According to one embodiment, the emergency shut-off feature can be linked to a remote monitoring service. In this configuration, caregivers or family members can remotely activate the robot's emergency shut-off feature through a secure application. This implementation is particularly useful for users who require constant supervision and for situations where the user might be unable to activate the emergency shut-off themselves.

Each of these alternative embodiments of the emergency shut-off switch in the personal robotic assistant system offers unique advantages, catering to a broad spectrum of user needs and scenarios. These variations ensure that the critical safety feature of emergency shut-off remains accessible, effective, and adaptable to different user requirements and situations, enhancing the overall safety and functionality of the assistant system.

Referring to FIG. 1, upon assistant system 2 being energized by power switch 152, microphone 102 is set into a recording mode so it can record audio signals. System 2 monitors and records a conversation involving a group of people (e.g., user group 200) exemplified by a first user 202, a second user 204, and a third user 206. In one exemplary embodiment, user 202 may be the driver of a vehicle, and users 204 and 206 may be passengers of the vehicle being physically present in that vehicle. It should be understood, however, that user group 200 may include any number of participants which may be distributed over any number of locations. In another illustrative example, user 202 may be the moderator or organizer of a meeting, user 204 may be another meeting's participant co-located with user 202, and user 206 may be a yet another participant of the meeting but connected from a remote location via internet.

Assistant system 2 may be configured to only record audio signals that are associated with the speech of any one of the user group 200. For this purpose, the system may be pretrained to recognize the voices of those users using a training module 162. In one embodiment, a method for training assistant system 2 to recognize voices may begin with acquiring a set of audio data, herein referred to as 'Training Data', which may include spoken words, phrases, or sentences from a multitude of different speakers, under varied environmental conditions and in multiple languages. Subsequently, a preprocessing stage may be implemented wherein the Training Data is subjected to a series of transformations to isolate and enhance vocal characteristics. This preprocessing stage may include, but is not limited to, various steps performed on processor 122, such as noise reduction, audio segmentation, normalization, and feature extraction. Noise reduction can be used to eliminate any background noise or irrelevant sounds in the Training Data. Audio segmentation may involve breaking down the continuous audio data into smaller, manageable segments. Normalization may be configured to provide consistent volume levels across the Training Data, while feature extraction can be configured to identify and isolate unique elements within the audio data that assist in differentiating between various speakers' voices.

The processed Training Data may then be input to an AI model, which in an exemplary embodiment may be a deep learning model such as a Convolutional Neural Network (CNN), Recurrent Neural Network (RNN), or Long Short-Term Memory (LSTM) network. The AI model may be subjected to a learning phase where it is trained to identify unique features associated with different voices using back-propagation and gradient descent or any other suitable optimization algorithm. During the learning phase, internal parameters of the AI model may be iteratively adjusted based on differences between its current output and the expected output, as provided by labeled Training Data. The labeled Training Data may include information that associates each audio data segment with a particular speaker. Through these iterations, the AI model may be progressively refined to enhance its ability to identify unique characteristics associated with individual voices.

The trained AI model may then be validated using a distinct set of audio data, referred to as 'Validation Data'. The Validation Data, like the Training Data, may consist of spoken words, phrases, or sentences from various speakers, but the speakers and audio data in the Validation Data may be distinct from those used in the Training Data. The performance of the AI model may be assessed based on its ability to correctly identify speakers in the Validation Data.

The process may further include a fine-tuning stage, where the AI model is further refined based on the results obtained from the validation phase. This may involve further iterative adjustments to the model parameters until a predefined performance criterion or criteria are met. The performance criterion or criteria may include, but are not limited to, accuracy, precision, recall, and/or F1-score. Accuracy may be defined as the proportion of total predictions that are correct and may be calculated as (True Positives+True Negatives)/(Total number of predictions). Precision may be defined as the proportion of positive predictions that are actually correct and may be calculated as True Positives/(True Positives+False Positives). Recall (which may also be referred to as Sensitivity or True Positive Rate) may be defined as the proportion of actual positive cases which are correctly identified and may be calculated as True Positives/(True Positives+False Negatives). F1-score may be defined as the harmonic mean of Precision and Recall, ranging between 0 and 1, where 1 is the best F1-score, and may be calculated as $$2*(Precision*Recall)/(Precision+Recall).$$

Once the AI model meets the desired performance criteria, it's parameters may then be stored in system memory unit 118 for further use to identify and differentiate speakers in incoming audio data based on the unique vocal characteristics learned during the training process.

According to one embodiment, training module 162 may be configured to enhance the process of the development and continuous improvement of assistant system 2's language understanding, generation, and reasoning capabilities. The module may be configured for training the various machine learning models used by the system, including the natural language processing (NLP) models, the dialogue management models, and the contextual reasoning models.

Training module 162 may initially take as input a large corpus of text data, which may include a diverse range of conversational exchanges, domain-specific knowledge bases, and annotated datasets. This training data may be carefully curated and preprocessed to ensure high quality and relevance to the intended use cases of assistant system 2. The data sources may include publicly available dialogue datasets (e.g., the Ubuntu Dialogue Corpus, the Microsoft Research Social Media Conversation Corpus, or the Cornell Movie-Dialogs Corpus) which contain large volumes of human-to-human conversations in various domains and settings, including synthetic/artificial data sets generated by suitable generative models such as LLMs, for example. The data sources may further include domain-specific knowledge bases and ontologies, such as medical databases (e.g., UMLS, SNOMED CT), legal databases (e.g., LexisNexis, Westlaw), or technical manuals and documentation, which provide structured and unstructured information about specific topics and concepts. The data sources may further include annotated datasets, such as sentiment analysis datasets (e.g., Stanford Sentiment Treebank), named entity recognition datasets (e.g., CONLL-2003), or semantic parsing datasets (e.g., ATIS, Spider), which contain text data labeled with specific linguistic or semantic information. The data sources may further include synthetic datasets generated using data augmentation techniques, such as back-translation, paraphrasing, or noise injection, which help to increase the diversity and robustness of the training data.

Training module 162 may employ various machine learning algorithms and techniques to train the AI Assistant system's models using the input data. These algorithms may include supervised learning algorithms, such as sequence-to-sequence models (e.g., Transformer, BERT) for language understanding and generation tasks, or classification models (e.g., logistic regression, support vector machines) for sentiment analysis and intent recognition tasks. These algorithms may be configured to learn to map input text data to specific output labels or sequences, based on the annotated examples provided in the training data. Suitable algorithms may further include unsupervised learning algorithms, such as clustering models (e.g., K-means, hierarchical clustering) for identifying patterns and groupings in the text data, or topic modeling algorithms (e.g., Latent Dirichlet Allocation, Non-negative Matrix Factorization) for discovering latent themes and topics in the conversations. Such algorithms may be configured to learn to identify structure and relationships in the data without relying on explicit annotations or labels. Suitable algorithms may further include reinforcement learning algorithms, such as policy gradient methods or Q-learning, for training the dialogue management and response generation models. The reinforcement learning algorithms may be configured to learn to optimize the AI Assistant system's actions and outputs based on rewards or feedback signals, such as user satisfaction scores or task completion rates, obtained through interaction with users or simulated environments. Suitable algorithms may further include transfer learning and fine-tuning techniques, which involve pre-training the models on large-scale, general-domain datasets (e.g., Wikipedia, Common Crawl) and then fine-tuning them on smaller, task-specific datasets. This approach may be advantageously used to impart the knowledge and linguistic patterns learned from the broader data and adapt them to the specific requirements of assistant system 2.

Training module 162 may be configured to interact with other components of assistant system 2 in several ways. According to one embodiment, training module 162 may be configured to provide the trained models and their parameters to the runtime components, such as the natural language understanding (NLU) module, the dialogue management (DM) module, and the natural language generation (NLG) module, which may use these models to process user input, maintain conversation context, and generate appropriate responses. According to one embodiment, training module 162 may be configured to receive feedback and usage data from the runtime components, such as user queries, system responses, and interaction logs, which can be used to continuously update and improve the models through techniques like online learning, active learning, or reinforcement learning. This may allow assistant system 2 to adapt to new user preferences, conversation styles, and domain knowledge over time. According to one embodiment, training module 162 may be configured to communicate with contextual memory unit 116 and system memory unit 118 to store and retrieve relevant training data, model checkpoints, and configuration settings. This functionality may allow training module 162 to efficiently manage and version the different stages of the model development process.

By way of example and not limitation, let's consider a scenario where assistant system 2 is being developed for a customer support application in the telecommunications domain. Training module 162 would first collect and pre-process a large dataset of customer support conversations from various sources, such as call center transcripts, online chat logs, and email exchanges. This dataset would be annotated with relevant information, such as the customer's intent (e.g., troubleshooting, billing inquiry), the sentiment of the conversation (e.g., positive, negative), and the entities mentioned (e.g., product names, account numbers).

Training module 162 would then use this annotated dataset to train several machine learning models. Training module 162 may be configured to train an intent recognition model, using a supervised learning algorithm like a convolutional neural network (CNN), which learns to classify customer queries into predefined intent categories based on the textual features and patterns. Training module 162 may be further configured to train a sentiment analysis model, using a supervised learning algorithm like a recurrent neural network (RNN) with attention mechanism, which learns to predict the emotional tone and polarity of customer messages based on the sequence of words and their context. Training module 162 may be further configured to train a named entity recognition (NER) model, using a supervised learning algorithm like a conditional random field (CRF), which learns to identify and extract relevant entities (e.g., product names, dates, account numbers) from the customer queries based on the surrounding words and their part-of-speech tags.

Training module 162 may be further configured to train a dialogue management model using a reinforcement learning algorithm like Deep Q-Networks (DQN) which learns to select the most appropriate system action (e.g., ask for clarification, provide information, transfer to a human agent) based on the current state of the conversation and the customer's intent and sentiment. Training module 162 may be further configured to train a response generation model, using a sequence-to-sequence model like a Transformer, which learns to generate human-like responses to customer queries based on the conversation context and the selected system action.

During the initial training phase, training module 162 may use the annotated dataset to train these models offline, using techniques like cross-validation and hyperparameter tuning to optimize their performance and generalization ability. The trained models may then be deployed to the runtime environment, where they can be used by assistant system 2 to handle real-time customer interactions. As assistant system 2 continues to operate and collect new data from customer interactions, training module 162 can use this data to continuously update and refine the models. For example, it can use the new data to fine-tune the intent recognition and sentiment analysis models, adapting them to changes in customer behavior or language use. It can also use reinforcement learning techniques to optimize the dialogue management and response generation models based on user feedback and satisfaction scores. Furthermore, training module 162 may be configured to use unsupervised learning techniques to identify new patterns and trends in the customer conversations, such as emerging topics or common issues. This information can be used to update the knowledge bases and ontologies used by assistant system 2, as well as to generate insights and recommendations for a customer support team, for example.

While remaining in the "on" state, assistant system 2 configured using the pretrained AI model continuously monitors and records conversations involving user group 100 by actively listening to the incoming audio data stream from microphone 102. The incoming audio data is continuously captured and temporarily stored in audio memory unit 114.

The stored audio data in audio memory unit 114 may then be subjected to the same preprocessing stage described previously, which includes noise reduction, audio segmentation, normalization, and feature extraction. The preprocessed audio data is then fed to the AI model, which is trained to identify the speakers in the conversation based on the unique voice features extracted from the audio data. The AI model identifies and tags each segment of the conversation with the respective speaker's identifier. In addition to storing audio information in audio memory unit 114, assistant system 2 may also be configured to create a time-stamped transcript of the conversation that includes the speakers' identifiers and the corresponding spoken words for each segment. The transcript may be stored in audio memory unit 114 or a separate memory unit.

Assistant system 2 may be configured to continuously retain the most recent part of the conversation within its physical memory on a sliding basis. This sliding window approach means that once the memory buffer is filled, for every new audio data segment received, the oldest segment in the memory is removed, and the new segment is added. This method allows the system to maintain a limited, most recent part of the conversation within the system's physical memory, without exceeding its capacity. Furthermore, as new segments of the conversation are added to the memory buffer, they are processed, and the corresponding transcript may also be updated accordingly. This updated transcript may then be utilized for various purposes, such as real-time transcription, speaker identification, sentiment analysis, etc.

According to one aspect, the sliding window memory concept essentially involves keeping a "window" of a fixed size that moves or "slides" over the conversation as it progresses. For example, if the window size is set to 5 minutes, assistant system 2 would always retain the most recent 5 minutes of the conversation in its memory. As the conversation continues, older parts of the conversation "slide" out of the window (i.e., are discarded from memory) while newer parts "slide" into the window (i.e., are retained in memory). This functionality can be particularly configured such that the most relevant and recent information is always readily available for processing.

According to one embodiment, the sliding window memory functionality may be implemented on the basis of a First In, First Out (FIFO) queue of the conversation history where first blocks of information entered into the queue will be the first ones to be processed or retrieved, and will subsequently be first to be removed from the queue. This can be implemented on a token level, block level, hybrid level, or dynamic adaptation level. For example, the FIFO queue may be configured to operate at the token level where individual tokens are added and removed from the queue, allowing for very granular control over the context. The FIFO queue may be configured to operate on larger segments or blocks of tokens. In this case, groups of tokens (such as sentences, paragraphs, various logical units of text, or other, e.g., non-textual forms of input) would be managed as single entries in the queue. This approach might be more practical for maintaining coherent context over conversations or documents, as it preserves larger chunks of related information. In the hybrid approach, some aspects of the FIFO queue can operate at the token level for fine-grained control, while others manage larger segments for context coherence. Alternatively, or in addition to this, the queue may be configured to dynamically adapt its management strategy based on the task at hand. For example, in a conversation, it might prioritize recent sentences or dialogue turns, whereas in a meeting, it might focus on specific topics discussed or sections of the meeting's agenda.

Figure 4:
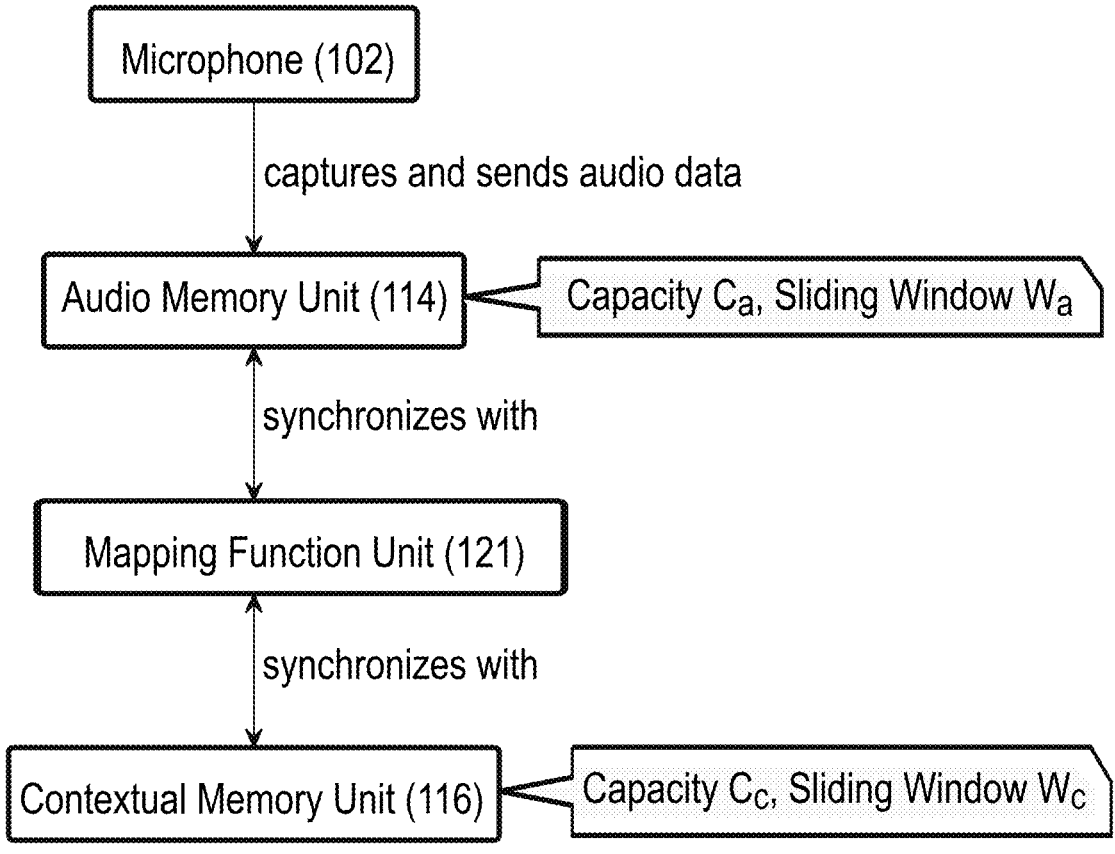
FIG. 4 is a schematic diagram showing an exemplary implementation of a sliding memory window incorporated into an AI Assistant, according to at least one embodiment of the present invention.

An exemplary implementation of the sliding memory functionality is described below in reference to FIG. 4 which shows several components of the sliding window memory mechanism, including audio memory unit 114, a mapping function unit 121, and contextual memory unit 116.

Audio memory unit 114 has a capacity of $C_a$ seconds and incorporates a sliding window with a size of $W_a$ seconds. Microphone 102 captures the audio data, which is then stored in the audio memory unit 114. The arrow from microphone 102 to the audio memory unit represents this data flow. Contextual memory unit 116 has a capacity of $C_c$ with a sliding window having a size of $W_c$ tokens and representing the active portion of the contextual data being used by the AI Assistant system. Mapping function unit 121 is configured to control the synchronization and correspondence between the audio data and the contextual data. The arrows from the Mapping function unit 121 to memory units 114 and 116 represent the synchronized updating of the active window contents as the conversation progresses and new data is captured.

The sliding window mechanism may particularly be designed to efficiently manage the conversation context in real-time, ensuring that the most relevant and recent information is readily available for processing and response generation. The mechanism may be implemented using circular buffer data structures in both the audio memory unit 114 and the contextual memory unit 116, which allow for constant-time insertion and deletion of elements at both ends of the buffer.

In audio memory unit 114, the circular buffer stores the raw audio data of the conversation, with each element representing a fixed-duration segment (e.g., 1 second, 10 seconds, 30 seconds, 1 minute, 10 minutes, 100 minutes, and so on) of the audio stream. The buffer is initialized with a predefined capacity, denoted as $C_a$, which determines the maximum length of the conversation history that can be stored in the audio memory unit. As new audio data is captured by the microphone, it is appended to the end of the buffer, and when the buffer reaches its capacity, the oldest elements are overwritten by the new data in a FIFO manner.

Similarly, in contextual memory unit 116, the circular buffer stores the processed and contextualized representation of the conversation, with each element corresponding to a fixed-length segment of the conversation (e.g., a sentence, a topic, or a fixed number of tokens). The capacity of the contextual memory buffer, denoted as $C_c$, determines the maximum length of the conversation context that can be retained for contextual understanding and response generation.

The sliding window sizes for audio memory unit 114 and contextual memory unit 116, denoted as $W_a$ and $W_c$ respectively, determine the duration or length of the conversation history that is actively used by assistant system 2 at any given time. These window sizes are dynamically adjusted based on various factors, such as the complexity of the conversation, the available system resources, or the user's preferences, and they satisfy the conditions:

$$0<W_a\le C \text{ and } 0<W_c\le C_c.$$

The audio data and the contextual representation are synchronized using a mapping function $$f:[0,C_a]\rightarrow[0,C_c],$$

which is implemented within mapping function unit 121 and which associates each audio segment with its corresponding contextual element. Mapping function unit 121 may be configured such that its mapping function $f$ takes into account the different granularities and compression rates of the two representations, ensuring that the relevant audio data can be efficiently retrieved and processed based on the current conversation context.

As the conversation progresses and new data is added to the buffers, the sliding windows advance in a synchronized manner, with the oldest elements being discarded and the newest elements being appended to the end of the buffers. Assistant system 2 continuously updates the active window contents and adjusts the window sizes based on the changing needs and constraints of the conversation.

For example, let's consider a scenario where the audio memory unit has a capacity of 60 seconds ($C_a$=60) and the contextual memory unit has a capacity of 100 tokens ($C_c$=100). The current sliding window sizes are set to 30 seconds ($W_a$=30) and 50 tokens ($W_c$=50), respectively. As the user speaks and the microphone captures new audio data, the sliding window in the audio memory unit advances, and the oldest 30 seconds of audio data are replaced by the new data. Simultaneously, the corresponding contextual elements in the contextual memory unit are updated, and the oldest 50 tokens are replaced by the newly processed and contextualized representation of the conversation.

When the user issues a query or command, assistant system 2 retrieves the relevant audio data and contextual information from the active windows in the two memory units, using the mapping function $f$ to efficiently locate and access the required segments. The system then uses this information to generate an appropriate response, taking into account the current conversation context and the user's intent. It may be appreciated that by dynamically adjusting the sliding window sizes and synchronizing the contents of the audio memory unit and the contextual memory unit in this or similar fashion, assistant system 2 can effectively capture and utilize the most relevant conversation history for real-time processing and response generation, while optimizing the use of system resources and adapting to the changing needs of the user interaction.

According to one aspect, the sliding window memory feature may be an efficient and more practical alternative method where assistant system 2 always retains a certain amount of recent conversation history in memory. Compared the case where assistant system 2 retains the entire conversation in memory, the sliding window feature may require less memory, processing power and can also result in much quicker and more relevant responses which seamlessly feed into the flow of the users' conversation and interaction with assistant system 2. The sliding window memory approach allows assistant system 2 to use a certain amount of historical context when processing new commands, potentially also allowing for more nuanced and accurate responses. This may be particularly useful for more complex conversational contexts where understanding the history of the conversation is important. The sliding window memory concept may also have potential advantages in terms of data privacy, as it inherently limits the amount of conversation history retained by the system.

According to one aspect, the sliding window memory feature may also be contrasted with alternative implementations of assistant system 2 where the system might process commands as they are received, and then disregard that information immediately after processing. A properly implemented sliding window memory feature may allow to support a more intelligent, context-aware conversation and provide more accurate and relevant responses to the users without necessarily adding delays.

According to one embodiment, implementing a sliding window memory feature may involve some form of timestamping or otherwise tracking the order of the conversation snippets stored in memory. It may also incorporate a mechanism for discarding older parts of the conversation as new parts are added to the memory. This could be accomplished with a variety of data structures and algorithms, depending on the specific requirements of the system.

Assistant system 2 further processes the captured audio stream and/or transcript in real time using a natural language processing model. The model is preferably a transformer-based language model trained on a substantial amount of text data for generating comprehensive contextual understanding.

According to one embodiment, this process may incorporate tokenization which transforms the conversation inputs into a format that can be further processed and understood by an LLM. Tokenization, in the context of this invention, refers to the process of breaking down the recorded conversation, including the user commands, into smaller parts or 'tokens'. Tokens can be individual words, phrases, sentences, or any other units of language, depending on the specifics of the language processing model used. In some implementations of this invention, a token may correspond to a word or a short phrase. The tokens serve as the basic units of meaning for further analysis and processing.

According to one embodiment, each token may be represented by individual characters (character-level tokenization). According to one embodiment, tokens may be represented by language sentences. According to one embodiment, tokens may be represented by individual words. According to one embodiment, tokens may be represented by individual subwords. The term subwords should be understood as smaller, but still meaningful, parts of the words which contain two or more characters. Techniques such as Byte Pair Encoding (BPE), SentencePiece, or WordPiece may be used for subword-level tokenization. For example, the tokenization process may include splitting words into individual characters, counting the frequency of each pair of characters (or character sequences) in the text, merging the most frequently occurring pair to create a new token, and repeating the process until a pre-defined number of tokens is reached, or the most frequent pairs are too infrequent.

After the next portion of the conversation text is tokenized, each token can be associated with an identifier, such as an index number. These identifiers serve to uniquely represent each token and allow assistant system 2 to match the tokens with their respective meanings, uses, or associations in the LLM. The LLM may be configured to use these token IDs to predict the next token in a sequence or to generate embeddings that represent the meanings of the tokens. Token IDs may also incorporate timestamps that can be used for locating tokens which were encoded at particular points in time. The timestamps may be absolute indicating the exact date and time when the token was created, down to the seconds, millisecond, microseconds or even more granular representation of time, and may be expressed, for example, in Coordinated Universal Time (UTC) format. Alternatively, the timestamps can also be relative, indicating the elapsed time since a certain event or moment, such as the start of a session or the token's creation.

It is preferred that the tokenization process is applied in real time as the conversation is ongoing and being recorded. This continuous tokenization may be advantageously used to maintain an up-to-date understanding of the conversation by assistant system 2 and keep the tokenized data ready to be accessed and used as context when a user command is given or when assistant system 2 otherwise determines that a response should be generated. According to one embodiment, the tokenized data are stored in contextual memory unit 116 on a sliding basis to keep the context of only the most recent parts of the conversation. According to an aspect, continuously updating the content of contextual memory unit 116 allows assistant system 2 to comprehend and respond to the conversation and commands in a relevant, contextual, and human-like manner, and without delays that may be associated with processing the original audio data or conversation's transcript.

According to an aspect, the predictive functionality of the AI Assistant may be advantageously utilized to provide users with highly responsive, contextually relevant, and personalized assistance. The system's ability to predict and pre-generate responses based on the conversation context and user behaviors allows it to minimize the latency between the user's request and the system's response, creating a more natural and seamless interaction experience. The proactive response generation mechanism also may also enable the AI Assistant to handle a wide range of user requests and conversation topics with flexibility and adaptability. By continuously learning and updating its prediction and response generation models, the system can effectively anticipate and address users' needs across various domains and contexts.

According to one embodiment, assistant system 2 may be configured with a proactive response generation mechanism that predicts the essence of the user's next request and pre-generates a response to minimize latency. This mechanism may utilize the system's contextual understanding capabilities, real-time conversation processing, and advanced language models to anticipate the user's needs and prepare relevant responses in advance.

The proactive response generation process may begin with the continuous monitoring and analysis of the ongoing conversation, as well as other contextual cues such as the user's location, time of day, and previous interactions with the system. Assistant system 2 may utilize its multi-modal input processing capabilities, including speech recognition, natural language processing, reasoning, and sentiment analysis, to extract key information and patterns from the conversation data.

As the conversation progresses, assistant system 2 employs its transformer-based language model to generate real-time embeddings of the conversation context. These embeddings may be high-dimensional vector representations that capture the semantic meaning and relationships between the words and phrases in the context. The system uses these embeddings as input to a deep neural network, such as a recurrent neural network (RNN) or a long short-term memory (LSTM) network, which is trained to predict the most likely next user request based on the conversation history and context. The prediction model is continuously updated and fine-tuned using reinforcement learning techniques. The system receives feedback on the accuracy of its predictions based on the actual user requests that follow. This feedback is used to adjust the model's parameters and improve its prediction accuracy over time. The model is preferably pre-trained on a large corpus of conversation data, including historical interactions between users and the assistant system, to establish a strong baseline for predicting common patterns and requests.

Once the prediction model generates a set of likely next user requests, assistant system 2 proceeds to pre-generate responses for each of these predicted requests. The response generation process leverages the same transformer-based language model and contextual embeddings used for prediction. The system feeds the predicted request embeddings, along with the conversation context embeddings, into a decoder network that generates a natural language response.

The decoder network should also be pre-trained on a vast amount of conversation data, allowing it to generate coherent, contextually relevant, and human-like responses. The pre-training process involves techniques such as masked language modeling, where the model learns to predict missing words in a sentence based on the surrounding context, and next sentence prediction, where the model learns to determine whether two sentences follow each other in a logical sequence. During the pre-generation process, assistant system 2 employs beam search techniques to generate multiple candidate responses for each predicted request. Beam search is a heuristic search algorithm that maintains a set of the most promising candidate responses at each generation step, allowing the system to explore different possible outputs and select the best one based on a scoring function. The scoring function takes into account factors such as the relevance to the predicted request, the coherence with the conversation context, and the linguistic fluency of the generated response.

The pre-generated responses are then stored in a high-speed cache memory (e.g., RAM 124), along with their corresponding predicted request embeddings and conversation context embeddings. This cache memory is designed for rapid retrieval and can be accessed with minimal latency when the user's actual request is received. As the user provides their next request through speech or text input, assistant system 2 processes the request using the same multi-modal input techniques and transformer-based language model used for prediction and pre-generation. The system generates an embedding of the actual user request and compares it with the predicted request embeddings stored in the cache memory using a similarity metric, such as cosine similarity or Euclidean distance.

If a high similarity match is found between the actual request embedding and one of the predicted request embeddings, assistant system 2 retrieves the corresponding pre-generated response from the cache memory and delivers it to the user through speech synthesis or text display. This retrieval and delivery process is optimized for speed, allowing the system to provide a near-instantaneous response to the user's request. In cases where the actual user request does not match any of the predicted requests with high similarity, assistant system 2 may default to its standard response generation process. The system generates a new response based on the actual request and the conversation context using the transformer-based language model and decoder network, without relying on the pre-generated responses in the cache memory.

The proactive response generation mechanism may be continuously running in the background, in parallel with other processes of assistant system 2 handling the ongoing conversation with the user(s), predicting and pre-generating responses for the next likely user requests as the conversation progresses. The system maintains a rolling window of predicted requests and pre-generated responses in the cache memory, discarding older entries as new ones are added to ensure efficient memory utilization.

To optimize the performance and accuracy of the proactive response generation mechanism, assistant system 2 may employ attention mechanisms in which the transformer-based language model incorporates attention mechanisms that allow the system to weigh the importance of different words and phrases in the conversation context when generating predictions and responses. This can be used to focus the system on the most relevant information and generate more accurate and contextually appropriate outputs. Assistant system 2 may further employ transfer learning techniques to adapt its pre-trained language model to specific domains or user preferences. By fine-tuning the model on a smaller dataset of conversations specific to a particular domain or user, the system can generate more personalized and relevant predictions and responses. Assistant system 2 may further employ few-shot learning techniques to quickly adapt to new conversation topics or user behaviors with limited training examples. By leveraging the knowledge and patterns learned from its pre-training on a large corpus of conversation data, assistant system 2 can generate accurate predictions and responses for novel situations with only a few examples of similar conversations. Assistant system 2 may be configured to continuously learn and improve its proactive response generation capabilities over time, regularly updating its prediction and response generation models based on new conversation data and user feedback, allowing it to adapt to changing user needs and preferences. Assistant system 2 may further incorporate uncertainty estimation techniques to quantify the confidence of its predicted requests and pre-generated responses. This may allow assistant system 2 to prioritize the delivery of high-confidence responses and to prompt the user for clarification or additional information when the confidence is low. Assistant system 2 may further employ contextual pruning techniques to filter out predicted requests and pre-generated responses that are not relevant to the current conversation context. By considering factors such as the topic, tone, and user's intent, the system can eliminate unnecessary or inappropriate responses and focus on delivering the most pertinent information to the user.

Assistant system 2 may be configured to apply the above predictive generation techniques to serve multiple users engaged in a conversation, adapting its proactive response generation mechanism to predict and pre-generate responses for each user individually or for the entire user group. The system can maintain separate contextual embeddings and prediction models for each user, allowing it to capture their unique conversation styles, preferences, and intents. As the conversation progresses, assistant system 2 continuously updates the contextual embeddings and prediction models for each user based on their respective contributions to the dialogue. The system may employ multi-task earning techniques to jointly optimize the prediction and response generation models across all users while still preserving individual user characteristics. When generating proactive responses, assistant system 2 considers not only the individual user's predicted requests but also the overall conversation context and the potential interactions between users. The system employs collaborative filtering and social recommendation techniques to identify common topics, intents, and preferences among users, enabling it to generate proactive responses that foster collaboration and facilitate a seamless multi-user conversation. Additionally, assistant system 2 may incorporate user-specific attention mechanisms to weigh the importance of each user's contributions to the conversation, ensuring that the proactive responses are balanced and relevant to all participants.

According to an aspect, by pre-fetching relevant information and pre-generating responses while the users are still speaking, assistant system 2 can significantly reduce or even eliminate any perceivable response latency, creating a seamless and natural conversation flow and allowing users to receive instant and relevant information without any awkward pauses or delays. According to different embodiments, assistant system 2 is configured to provide the response latency that is less than 3 seconds, more preferably less than 2 seconds, even more preferably less than 1.5 seconds, even more preferably less than 1 second, even more preferably less than 0.5 seconds, even more preferably less than 0.3 seconds, even more preferably less than 0.25 seconds, even more preferably less than 0.2 seconds, even less than 0.1 seconds, and, in some cases or applications, preferably even less than 0.05 seconds.

For example, imagine a group of three friends-Alice, Bob, and Charlie-having a conversation about their upcoming vacation plans. As these three users discuss potential destinations, assistant system 2 monitors the conversation and maintains separate contextual embeddings and prediction models for each user.

Alice: "I've been thinking about going to Hawaii for our vacation. What do you guys think?" Assistant system 2 processes Alice's statement and updates her contextual embeddings, predicting that she might ask about flight prices or accommodation options in Hawaii next.

Bob: "Hawaii sounds great! I've always wanted to try surfing there." The system updates Bob's contextual embeddings, predicting that he might inquire about surfing lessons or the best beaches for surfing in Hawaii.

Charlie: "I'm more interested in exploring the local culture and trying Hawaiian cuisine." Assistant system 2 updates Charlie's contextual embeddings, predicting that he might ask about cultural attractions or popular Hawaiian dishes.

Alice: "I've heard that Hawaii has some amazing hiking trails. I wonder if-". As Alice begins her statement, assistant system 2 processes the initial portion of her sentence and predicts that she is likely to ask about hiking trails in Hawaii. While Alice is still speaking, the system pre-fetches relevant information about popular hiking trails, difficulty levels, and scenic views in Hawaii, using parallel processing and accessing external tools and/or databases, if the answer cannot be readily generated based on its LLM training data set.

Alice: "—there are any easy to moderate trails with great views?" By the time Alice finishes her question, assistant system 2 has already pre-generated a response based on its prediction and pre-fetched information.

Assistant system 2: "Absolutely, Alice! One of the best easy to moderate hiking trails in Hawaii with stunning views is the Makapu'u Lighthouse Trail on Oahu. It's a 2.5-mile round trip hike that offers breathtaking views of the coastline and the historic Makapu'u Lighthouse. The trail is well-maintained and suitable for beginners. Another great option is the Manoa Falls Trail on Oahu, a 1.7-mile round trip hike through a lush rainforest that leads to a beautiful 150-foot waterfall. Let me know if you'd like more information on these trails or if you have any other questions!"

As soon as Alice finishes her question, assistant system 2 delivers its pre-generated response without any noticeable delay, providing Alice with the information she was looking for seamlessly.

Bob: "Those trails sound amazing! I'm curious about the wildlife we might encounter on these hikes. Are there any-". While Bob is speaking, assistant system 2 predicts that he is likely to inquire about the wildlife on the hiking trails. The system pre-fetches information about common bird species, plants, and animals that hikers might encounter on the trails in Hawaii.

Bob: "—specific birds or animals we should look out for?" Assistant system 2 near-instantaneously delivers its pre-generated response based on its prediction and pre-fetched information on the specific wildlife the users might see on the trail.

Charlie: "I'd love to learn more about the local Hawaiian culture. Are there any traditional events or—"

As Charlie begins his question, assistant system 2 predicts that he is likely to inquire about traditional Hawaiian events or cultural experiences. The system pre-fetches information about luaus, hula performances, and other cultural activities in Hawaii.

Charlie: "—cultural experiences we should consider attending?"

Assistant system 2 swiftly provides its pre-generated response based on its prediction and pre-fetched information:

Assistant system 2: "Definitely, Charlie! One of the most popular cultural experiences in Hawaii is attending a traditional luau". Assistant system 2 may further provide additional information that it has pre-fetched or has generated on-the-fly while outputting the initial part of the response.

It may be appreciated that this predictive functionality may be advantageously incorporated into assistant system 2 to provide seamless, context-aware assistance to multiple users simultaneously, enhancing their overall experience and engagement in the conversation.

When assistant system 2 pre-fetches information based on its predictive capabilities, but the users do not pursue the predicted topic or the pre-fetched information is not deemed necessary in the context of the ongoing conversation, the system may employ various mechanisms to manage the unused data efficiently. Assistant system 2 may use temporary storage where the pre-fetched information is initially stored in a temporary buffer or cache memory. This allows the system to quickly access and utilize the data if the conversation does take the predicted turn. The temporary storage may have a limited capacity and is designed to hold the most recently pre-fetched information. For example, the pre-fetched information may be initially stored in a dedicated partition of the contextual memory unit, which is organized as a circular buffer. This buffer may be designed to store the most recent and relevant pre-fetched data, with older or less pertinent information being automatically overwritten as new data is added.

Assistant system 2 may incorporate a relevance scoring system which assigns relevance scores to each piece of pre-fetched information based on its alignment with the current conversational context. These scores may be based on various factors, including the semantic similarity between the pre-fetched data and the current conversation context, the frequency and recency of related user queries, and the overall user preferences and interaction patterns. The relevance scores may be continuously updated as the conversation progresses. Assistant system 2 may utilize its transformer-based language model and self-attention mechanisms to accurately assess the relevance of the pre-fetched information in real-time. If the pre-fetched information remains unused for a certain period or its relevance score falls below a predefined threshold, it may be considered obsolete.

Assistant system 2 may utilize automatic purging where it periodically reviews the pre-fetched information stored in the temporary buffer and purges the obsolete or unused data. This purging process may be based on factors such as the age of the information, its relevance score, and the available storage capacity. The system's dynamic memory management module periodically reviews the pre-fetched data and removes the obsolete or low-relevance information from the contextual memory unit, e.g., to ensure optimal utilization of memory resources of assistant system 2 and maintain the efficiency of its predictive capabilities.

Assistant system 2 may further utilize adaptive prediction in which it learns from the outcomes of its predictions and the actual conversational flow. If the system consistently pre-fetches information that remains unused, it adjusts its predictive models to better align with the users' preferences and conversation patterns, helping the system refine its predictions over time and reduce the amount of unnecessary pre-fetched data. Assistant system 2 may further employ contextual prioritization. For example, in cases where the conversation takes an unexpected turn, and the pre-fetched information is no longer relevant, assistant system 2 prioritizes the processing and generation of responses based on the current conversational context. The system allocates its computational resources to handle the immediate user queries or intents, while the pre-fetched data remains in the temporary storage until it is purged.

Moreover, assistant system 2 may leverage its multi-modal input processing capabilities to further refine its predictions and adapt to the users' needs. By analyzing visual cues, such as facial expressions and gestures, alongside the spoken words, the system can more accurately anticipate the direction of the conversation and adjust its pre-fetching strategies accordingly. This multi-modal understanding can be utilized to proactively retrieve information that aligns with the users' implicit interests and intentions, even if not explicitly mentioned in the conversation.

According to various embodiments, the amount of contextual information (e.g., the number of tokens that an LLM can consider at any one time while making predictions or generating text) stored in contextual memory unit 116 may be constrained based on a number of factors or criteria, including but not limited to the capacity or availability of such memory, processor limitations, specific user settings or preferences, the complexity of the ongoing conversation, the need for real-time response speeds, and the adaptive requirements of different communication environments. Additionally, the system may employ algorithms to optimize the use of memory space, selectively retaining the most contextually significant portions of the conversation while discarding less relevant data. This approach ensures efficient utilization of resources without compromising the quality and relevance of the AI Assistant's responses, thus maintaining a balance between memory constraints and the need for comprehensive contextual understanding.

According to an aspect, the maximum amount of contextual information that can be stored in contextual memory unit 116 may be conceptualized as a "context window". The context window may be defined by various means, including, for example, the maximum desired time window of the conversation or the maximum number of tokens that can be passed to an LLM.

According to one embodiment, the time window or a maximum time window for which assistant system 2 keeps the contextual information in its contextual memory unit 116 may be set to a constant value (e.g., 1 minute, 2 minutes, 3 minutes, 5 minutes, 10 minutes, 15 minutes, 20 minutes, 30 minutes, 1 hour, 2 hours, and so on). According to different embodiments, the time window may be set to 5 minutes or less, 10 minutes or less, 15 minutes or less, 20 minutes or less, 30 minutes or less, 1 hour or less, 1.5 hours or less, 2 hours or less, and so on. According to one embodiment, the time window may be set from 1 minute to 5 minutes. According to one embodiment, the time window may be set from 2 minutes to 10 minutes. According to one embodiment, the time window may be set from 2 minutes to 15 minutes. According to one embodiment, the time window may be set from 1 minute to 20 minutes.

According to an aspect, assistant system 2 may be configured to dynamically adjust the size of the context window based on various factors such as the complexity of the conversation, the number of participants, the available system resources, or the specific requirements of the task at hand. This dynamic adjustment allows the system to optimize its memory usage and computational efficiency while maintaining a high-quality user experience.

In one embodiment, assistant system 2 continuously monitors the ongoing conversation and analyzes its complexity using various metrics. These metrics may include the number of distinct topics discussed, the rate of topic shifts, the lexical diversity of the language used, and the overall length of the conversation. Based on these complexity measures, the system dynamically resizes the context window to ensure that it captures the most relevant information without overwhelming the available memory or processing capacity. For example, if the conversation revolves around a single, focused topic with a limited vocabulary, assistant system 2 may reduce the size of the context window to avoid retaining redundant or less informative data. On the other hand, if the conversation spans multiple complex topics with frequent context switches, the system may increase the window size to ensure that it captures all the necessary contextual cues. Similarly, assistant system 2 may adapt the context window size based on the number of participants in the conversation. In a one-on-one interaction, a smaller context window may suffice to maintain a coherent and personalized dialog. However, in a multi-party conversation, such as a group discussion or a meeting, the system may need to expand the context window to accommodate the diverse perspectives and inter-dependencies among the participants' contributions.

The dynamic adjustment of the context window size may also be influenced by the available system resources, such as memory capacity, processing speed, and power constraints. Assistant system 2 continuously monitors the utilization of these resources and proactively adjusts the context window to prevent performance degradation or system instability. For instance, if the available memory runs low, the system may aggressively reduce the context window size and offload less critical information to secondary storage. Furthermore, assistant system 2 may consider the specific requirements or goals of the task at hand when determining the appropriate context window size. Some tasks, such as document summarization or context-aware question answering, may require a larger context window to capture the full scope and nuance of the input. Other tasks, like command interpretation or sentiment analysis, may operate effectively with a more focused and compact context representation.

To implement the dynamic context window adjustment, assistant system 2 employs advanced memory management techniques and adaptive algorithms. These may include incremental memory allocation and deallocation where the system dynamically resizes the context buffer by incrementally allocating or freeing memory chunks as needed. This approach may be advantageously utilized to minimize fragmentation and implement smooth, real-time adjustments of the window size. T Assistant system 2 may also be configured to employ prioritized memory retention where it assigns priority scores to different parts of the conversational context based on their estimated relevance and informativeness. When the context window needs to be reduced, the system may preferentially retain the highest-priority segments while discarding or offloading the lower-priority ones. Assistant system 2 may further employ adaptive compression and encoding where it applies different compression schemes or encoding strategies to the contextual data depending on the current window size and the characteristics of the conversation. For example, it may use a more compact representation for frequently recurring entities or patterns, while allocating more bits to novel or informative content. Assistant system 2 may even further employ machine learning models with predictive caching and prefetching to predict which parts of the context are likely to be needed in the near future based on the conversation's trajectory and the user's behavior. It can then proactively cache or prefetch this information into the context window, improving response latency and reducing the need for frequent resizing.

According to further embodiments, any other durations or ranges of the durations of the time windows outside of the above ranges may also be implemented, depending on the desired applications and modes of operation of assistant system 2. According to yet further embodiments, assistant system 2 may be configured to operate multiple sliding windows of different lengths, or any combination of multiple sliding windows. For example, assistant system 2 may be configured to retain both immediate and slightly longer-term context of the conversation and/or user commands and further configured to use both the shorter and longer context in providing intelligent responses to the users.

The time window may also be adjusted dynamically, e.g., based on the available memory, user input, network status, or contextual understanding (e.g., upon system's detection of changing the subject of the conversation, or detecting a long delay between speech, above a predefined time interval, that could suggest that user group 200 concluded the previously recorded/contextualized conversation). According to one embodiment, the sliding window for contextual memory unit 116 may be synchronized with the sliding window for audio memory unit 114. According to one embodiment, the sliding window for contextual memory unit 116 may be set independently from the settings of the sliding window for audio memory unit 114.

According to one embodiment, the context window can be initially set to a specific number of tokens. In a non-limiting example, this number can be selected based on what the underlying model (e.g., GPT model) is configured to be able to process (e.g., use as context when generating a response or continuation). Examples of the context windows include but are not limited to about 2000 tokens, about 4000 tokens, about 8000 tokens, about 16000 tokens, about 32000 tokens, about 64000 tokens, about 100000 tokens, about 128000 tokens, about 256000 tokens, about 500000 tokens, more than 1000000 tokens, or any of the ranges in-between, e.g., 8000-64000 or 64000-128000 tokens, etc.

According to different embodiments, the context window for contextual memory unit 116 can be initially set to a number of tokens which is considerably less than the context window characterizing the respective GPT model (or specifically LLM). For example, the context window for contextual memory unit 116 can be initially set to a number of tokens which is 10% less, 20% less, 30% less, 40% less, 50% less, 3 times less, 4 times less, or 5 to 10 times less than the context window characterizing the GPT model.

Selecting the initial context window for contextual memory unit 116 to be much less than the GPT's context window (e.g., in any one of the ranges of 5-30%, 10-20%, 20-30%, 30-40%, or up to 50%) may be useful, for example, for improving the accuracy of the information retrieval from the contextual memory unit 116 and ultimately enhancing the efficiency of the AI Assistant and the usefulness of its responses to the user. For instance, it was found from the analysis of several GPT systems and particularly those based on LLMs that the accuracy of specific information retrieval from a textual input into a GPT's degrades significantly as the length and internal complexity of that textual input increases, even if that length is still considerably less (e.g., at a 60-90% level) than the GPT's context window.

One essential aspect of dynamic memory management can be monitoring user input and conversation patterns. Assistant system 2 may be configured to analyze the conversation frequency, pauses, and the typical length of each dialogue segment. By understanding the conversation dynamics, the system can estimate the optimal duration for retaining conversation parts in memory, keeping only the most relevant and contextual information available for processing user commands.

Another aspect of dynamic memory management can be optimizing memory resources. Assistant system 2 may be configured to continuously assess its available memory and computing resources to determine the appropriate time interval for retaining conversation data. As memory resources fluctuate due to usage or device performance, the system can dynamically adjust the retention time interval accordingly, ensuring a balance between maintaining context and system performance. Additionally, the system can account for processor speed and estimated latency during conversation processing. By gauging the system's ability to process and contextualize information within a reasonable time frame, assistant system 2 may be configured to dynamically fine-tunes the time interval for retaining conversation data. This may accounts for the fact that the faster a conversation is processed, the less information may need to be stored in memory.

The dynamic memory management system may also receive user input to influence the time interval for retaining conversation data. For instance, users can predefine their preferences, directing assistant system 2 to preserve a shorter or longer time interval of a conversation in memory. The system can use this input to further refine the memory management process, adjusting the time interval in real time based on user preferences and requirements.

Once tokenization of the input (user command or ongoing conversation) has been completed, the next step in the operation of assistant system 2 may be encoding. The encoding step performed by processor 122 may be configured to transform the tokens from the tokenization process into vectors. These vectors may represent an abstracted form of each token that is easier to manipulate in the subsequent layers of the language model. This process may involve a learned representation of words or characters, known as embeddings, which are representations of the tokens in a high-dimensional space where the geometric distance between tokens corresponds to the semantic similarity of the tokens.

As each token produced from the tokenization step is mapped to a unique identifier (ID), the IDs are then passed through an embedding layer that turns each ID into a dense vector of fixed size. The embedding layer can be initialized randomly and then updated during training via backpropagation to reduce prediction error, or it can use pre-trained embeddings, which have been trained on a large corpus of text and are intended to capture the semantic meanings of the tokens.

These dense vectors, or embeddings, may be configured to capture the semantic context of each word. Words with similar meanings may have embeddings that are closer to each other in the vector space, while words with dissimilar meanings may have embeddings that are farther apart. The resultant embeddings may form the input to the subsequent layers of the language model.

According to an aspect, embedding may be considered a specific form of encoding that can be used in natural language processing (NLP) to represent words or tokens as dense vectors of real numbers. These vectors can be learned from the transcript or its tokenized representation data and may be designed to capture the semantic meanings of the words or tokens. For example, in a trained word embedding, the vectors for semantically similar words like "king" and "queen" could be relatively close to one another in the embedding space.

According to an aspect, embeddings can be considered as numerical representations of concepts that assistant system 2 can use to understand relationships between these concepts, as well as personalize, recommend, and search content in contextual memory unit 116. Assistant system 2 may use embeddings to understand and process complex, high-dimensional data like text, images, or sound in a more compact and meaningful way. Specifically for processing the conversation transcripts, assistant system 2 may advantageously use embeddings as a distributed representation for text that can be more efficient for analyzing the context of the conversation and providing intelligent responses compared to many other techniques.

Assistant system 2 may be configured to use embeddings to achieve significant dimensionality reduction, resulting in less memory requirements and improved performance. For example, considering that the raw text data of the conversation's transcript can be inherently high-dimensional, with each unique word potentially representing a different dimension, accumulating a relatively long conversation may result in an undesirably high number of dimensions. By using word embeddings, assistant system 2 can compress this information into a lower-dimensional space, potentially reducing the number of dimensions by one or more orders of magnitude.

Assistant system 2 may further be configured to use embeddings to efficiently capture semantic relationships between words. In the embedding space, the 'distance' between words corresponds to their semantic similarity. For example, in a well-trained LLM using word embeddings, synonyms like 'happy' and 'joyful' will be closer to each other than they are to unrelated words like 'road'. Additionally, assistant system 2 can use embeddings to capture more complex relationships through vector operations. For example, if the system takes the vector for 'king', subtracts 'man', and adds 'woman', it might get a vector that is very close to 'queen'. This feature may be advantageously used in assistant system 2 to solve word analogies in both analyzing the user's input and generating intelligent responses.

Assistant system 2 may further be configured to use embeddings to efficiently incorporate unsupervised training on large amounts of voice and/or text data. Such training may particularly include algorithms according to which the meaning of a word can be inferred by the words it commonly co-occurs with. Once trained, word embeddings can be used in a variety of modes of operation of assistant system 2 described herein. It is also noted that the use of embeddings in assistant system 2 is not restricted to text data and may be applied to processing other types of data, like images, video, sounds, music, etc.

In embodiments that utilize a transformer based LLM, the output of the encoding process may be fed into a series of self-attention mechanisms. The self-attention mechanism may be configured to generate a weighted representation of the input sequence, where the weight assigned to each token depends on its relevance to all the other tokens in the sequence. This may advantageously be used to allow the model to capture long-distance dependencies between words, making it more effective in understanding the context of the user's command and the retained conversation.

As with the previous steps, the encoding process is preferably performed in real-time as the conversation is ongoing and is being recorded, advantageously enabling assistant system 2 to keep up with the pace of the conversation and respond promptly to the user's commands. This real-time encoding, combined with tokenization, may be an important part of how assistant system 2 is able to understand and respond to commands effectively and efficiently.

One of the results of the encoding process may be encoded vectors which can be stored in contextual memory unit 116 on a sliding window basis. These encoded vectors may be used as the input to the subsequent stages of the LLM, such as the Contextual Understanding phase. According to one embodiment, the encoded vectors can also be stored more permanently, for example, to allow the same input data to be processed multiple times or to keep the results of the encoding process for a further session or conversation between the users which may occur at a later time.

Once the encoding of the next chunk of ongoing conversation has been completed, the next step in the operation of assistant system 2 performed by processor 122 may be contextual understanding. The contextual understanding step is where assistant system 2 may determine the significance of the different components of the conversation and how they relate to one another.

According to an embodiment, assistant system 2 employs advanced contextual understanding and reasoning techniques to effectively comprehend the user's intent, resolve ambiguities, and generate appropriate responses. This involves a deep analysis of the conversational context, which includes not only the explicit information provided by the user but also the implicit cues, background knowledge, and situational factors that shape the meaning and purpose of the interaction.

One key component of contextual understanding in assistant system 2 can be the use of pre-trained language models, such as those based on transformer-based architectures. These models should preferably be trained on vast amounts of diverse text data, allowing them to capture rich semantic and syntactic patterns in natural language. By fine-tuning these pre-trained models on domain-specific conversations and incorporating task-specific objectives, assistant system 2 can develop a deep understanding of the contextual nuances and relationships within the user's input.

To further enhance its contextual reasoning capabilities, assistant system 2 employs various techniques from natural language processing (NLP) and machine learning, such as Named Entity Recognition (NER), coreference resolution, sentiment analysis, knowledge graph integration, commonsense reasoning, and multi-task learning.

For example, assistant system 2 may use NER to identify and classify named entities mentioned in the conversation, such as people, organizations, locations, or products. This helps the system to establish a shared understanding of the key actors and concepts involved in the discussion. Coreference resolution may be employed to allow assistant system 2 to identify and link multiple mentions of the same entity across different parts of the conversation, enabling the system to maintain a coherent representation of the discourse and resolve ambiguities that may arise from anaphoric references or incomplete information. By detecting and interpreting the emotional tone and polarity of the user's language with sentiment analysis, assistant system 2 can better understand the user's attitudes, preferences, and intentions. This information can be used to tailor the system's responses and recommendations to the user's affective state and communication style. Assistant system 2 can integrate external knowledge graphs and ontologies to enrich its understanding of the conversational context. These knowledge bases may be configured to provide structured information about entities, their attributes, and their relationships, allowing the system to draw upon a broader range of background knowledge when interpreting the user's input and generating responses. Assistant system 2 may leverage commonsense reasoning frameworks, such as ConceptNet or ATOMIC, to make inferences and draw conclusions based on general world knowledge and typical patterns of human behavior. This may be further used by the system to fill in missing details, anticipate unstated assumptions, and provide more natural and intuitive responses. Further, by training assistant system 2 on multiple related tasks, such as language modeling, question answering, and dialogue generation, the system can develop a more holistic and transferable understanding of language and context such that it can generalize its knowledge and skills across different domains and conversation types.

In various embodiments, the AI assistant system may employ a dedicated named entity recognition (NER) module to detect and extract named entities directly or indirectly from the user's voice input. The NER module may use a combination of pre-trained deep learning models, such as bidirectional long short-term memory (BILSTM) networks with CRF layers, and rule-based approaches to identify and classify named entities into predefined categories, such as person names, organizations, locations, dates, and products. The detected named entities may be tagged with their corresponding categories and stored in contextual memory unit 116 along with the rest of the conversation history. When generating a conversational response, a dialog management module may be used to retrieve the relevant named entities from the contextual memory unit and use them to guide the response generation process. This may involve using the named entities as input to a knowledge base retrieval system to fetch relevant information or as parameters for a response template selection algorithm. For example, if the user asks, "What is the weather like in New York City today?", the NER module would detect "New York City" as a location entity, and the dialog management module would use this entity to retrieve the current weather information for that specific location and generate a response like "The weather in New York City today is mostly sunny with a high of 24° C."

According to some embodiments, assistant system 2 applies these contextual understanding and reasoning techniques in a dynamic and iterative manner. As the conversation progresses, the system continuously updates its internal representation of the context, incorporating new information and refining its interpretation based on the user's feedback and clarifications. For example, consider a scenario where the user asks assistant system 2, "What's the weather like today? Should I bring an umbrella?" To provide a helpful response, assistant system 2 first needs to recognize that "today" refers to the current date and time, which it can infer from the timestamp of the user's message. Next, it needs to resolve the implicit location reference, either by retrieving the user's current location from their device or by asking for clarification if the location is ambiguous. Using this contextual information, assistant system 2 can query a weather API or knowledge base to obtain the relevant forecast data. It can then analyze the precipitation probability and intensity to determine whether an umbrella is recommended. Finally, the system can generate a natural language response that provides the requested information and advice, such as "It looks like there's a 60% chance of light rain showers this afternoon. It might be a good idea to bring an umbrella, just in case!"

The result of the contextual understanding step in a transformer-based LLM may be represented by a set of hidden states or embeddings that encapsulate the context of the conversation. More specifically, after the Contextual Understanding phase processes the encoded input (the tokenized and encoded conversation), it may be configured to generate a corresponding set of hidden states for each token. These hidden states are high-dimensional vectors that encapsulate the meaning of each token in the context of the other tokens in the input.

Each hidden state vector can be a dense representation of the corresponding token, capturing not only the meaning of the token itself but also its relationship to the other tokens in the conversation based on the attention mechanism of the transformer model. This way, the context in which each word is used, the order of the words, and the relationships between the words are all encoded in these hidden states. Therefore, storing these hidden state vectors allows assistant system 2 to keep a compact, context-rich representation of the ongoing conversation, making it much faster and memory-efficient when generating responses to user commands, e.g., compared to the case when the system must process the original audio data stream or its transcript. This type of stored representation may be advantageously selected to allow the system to respond quickly (preferably in less than 2 seconds, even more preferably in less than 1 second, end even more preferably in less than 0.5 second) and accurately to new user commands without needing to reprocess the entire conversation from scratch.

In the process of performing contextual understanding step by processor 122, these hidden state vectors may be temporarily stored in RAM 124. Upon the completing of this step, the hidden state vectors representing contextual understanding of the user's conversation (or at least its most recent portion) may be stored in contextual memory unit 116 on a sliding window basis. According to various embodiments, these vectors may also be offloaded to more persistent storage (like a hard drive or SSD) if needed for longer-term retention.

According to an aspect of the invention, the hidden state vectors generated in the contextual understanding phase may reflect not just the encoded input tokens, but also the context in which they appear. These context-aware vectors may be configured as a higher level abstraction of the conversation compared to the raw encoded input tokens. They capture the meaning of each token in relation to the tokens around it, effectively condensing the semantic and syntactic relationships within the conversation into a more compact form. The hidden state vectors can also be more memory-efficient than the original audio data or conversation's transcript because these context-aware vectors encapsulate a richer understanding of the conversation. Therefore, they can provide the necessary context for interpreting new user commands without needing to store and reprocess the entire conversation. Moreover, depending on the implementation of assistant system 2, certain optimizations may be applied during the contextual understanding step that further reduce the size of the context vectors. For example, the model might use techniques like dimensionality reduction, quantization, or pruning to reduce the size of the context vectors without significantly compromising their ability to represent the conversation context.

According to a further aspect, the vectors from the contextual understanding step may be a more condensed and meaningful representation of the conversation, even compared to the vectors of the encoding step. They may encapsulate both the semantics of individual words (tokens) and the context in which they appear. Storing these vectors essentially allows the system to "remember" the conversation without needing to store every single word. This can be especially beneficial in scenarios where conversations are long and complex. In contrast, the vectors from the encoding step may be configured to represent individual words without context, so storing them would require preserving the entire conversation in memory, token by token, which could be more memory-intensive for longer conversations. Furthermore, these vectors would need to be reprocessed through the contextual understanding step to interpret new user commands, which could be computationally expensive. Accordingly, by storing the results of the contextual understanding step, in addition to or instead of the results of the encoding step in contextual memory unit 116, assistant system 2 would have ready access to a "summary" of the conversation so far, which can be quickly used to contextualize and respond to new user commands in a relevant, contextual, and human-like manner.

When assistant system 2 is generating an output for a word using a transformer model, it may be configured to consider not just the embedding of that word, but also the embeddings of all the other words in the input. The "attention" mechanism may be advantageously used to determine how much each word in the context should contribute to the output for the current word based on their relevance, which, in turn can be determined by the proximity of words and their semantic relationships. In this mode of operation, assistant system 2 can capture both the meaning of individual words (through the embeddings) and the relationships between words in a text sequence (through attention), allowing it to understand and generate text that is contextually relevant.

Assistant system 2 may be configured to continually update the contextual understanding of the ongoing conversation in real time as the subsequent portions of the conversation are recorded. As described above, the content of audio memory unit 114 and contextual memory unit 116 may be continuously updated on a sliding window basis as the conversation is ongoing until power switch 152 is turned off or the system detects a user's command that can be interpreted as requiring a response from assistant system 2. According to one embodiment, assistant system 2 may be configured to dynamically adjust the time interval during which the conversation is stored based on user input, available memory, processor speed, or estimated latency time for processing user commands.

In operation, assistant system 2 continuously updates the conversational context data stored in the contextual memory unit 116 to include a suitable representation of the voice input received from the user. According to one embodiment, this updating process may involve tokenizing the voice input, wherein the raw input data is broken down into smaller units such as words, subwords, or characters. The resulting tokenized representation of the voice input may then be used to update the conversational context data. As explained in other parts of this description, processing of the voice input may further involve generating hidden states or embeddings based on the tokenized input, which capture the semantic meaning and relationships between the tokens in the context of the ongoing conversation.

In some embodiments, assistant system 2 may process (e.g., using processor 122 or audio processing unit 125) the voice input directly as an audio signal without converting it into text. In these cases, the raw audio data captured by microphone 102 may be first preprocessed to remove noise and extract relevant features, such as MFCCs, pitch, and/or energy. The extracted features may then be used to generate an audio representation of the voice input, which captures the essential characteristics and temporal dynamics of the speech signal. This audio representation may take different forms. According to one embodiment, the audio representation may take the form of embeddings or hidden states generated by a deep neural network trained on speech data.

Alternatively, the audio representation may include a sequence of feature vectors that represent the time-varying properties of the audio signal, a spectrogram or other time-frequency representation that captures the spectral content of the speech over time, or a compressed representation obtained through dimensionality reduction techniques such as principal component analysis (PCA) or autoencoders. Other possible audio representations may include acoustic word embeddings, phoneme-level representations, or self-supervised representations learned from large-scale unlabeled speech data. The chosen audio representation is then used to update the conversational context data stored in contextual memory unit 116.

Similarly, as assistant system 2 continues its engagement in a conversation with the user(s) it may continuously update the conversational context data stored in contextual memory unit 116 with a suitable representation the generated conversational response, preferably matching the type of representation of the input data stored in this memory unit. According to one embodiment, it may include a tokenized representation of the generated conversational response. For example, after the transformer-based language model processes the voice input and generates a conversational response, the system tokenizes the generated response using techniques such as word-level, subword-level, or character-level tokenization. The tokenized representation of the generated response is then stored in contextual memory unit 116, along with the tokenized representation of the voice input and any other relevant contextual information. The tokenized representations in contextual memory unit 116 can be used by the transformer-based language model for subsequent processing, such as generating follow-up responses or answering user queries that rely on the conversation history. The sliding window mechanism employed by contextual memory unit 116 ensures that the most recent and relevant parts of the conversation are readily accessible for processing. In alternative embodiments, the generated conversational response may be stored in contextual memory unit 116 in other formats, such as raw text, embeddings, or compressed representations, depending on the specific requirements and design choices. In end-to-end voice processing embodiments, the generated conversational response may be stored in a processed audio representation, which may include, for example, a sequence of feature vectors that represent the time-varying properties of the generated audio data (such as natural-sounding voice output), a spectrogram or other time-frequency representation that encodes the spectral content of the generated audio data over time, acoustic word embeddings, phoneme-level representations, or any other suitable forms.

According to one embodiment, to facilitate user identification in a multi-user scenario, audio processing unit 125 extracts and analyzes various acoustic parameters from the incoming voice signal, such as formant frequencies, spectral envelope, and prosodic features like intonation and rhythm. These parameters may be combined to create a unique voiceprint for each user, which is then stored in a secure, encrypted format within system memory unit 118, RAM 124, or protected portion of contextual memory unit 116. During subsequent interactions, audio processing unit 125 compares the voiceprint of the active speaker against the stored voiceprints to determine the user's identity. This comparison process may employ advanced pattern matching algorithms and machine learning techniques, such as Gaussian Mixture Models (GMMs) and Deep Neural Networks (DNNs), to ensure accurate and robust user identification even in the presence of background noise or variations in the user's voice. Once the user is identified, assistant system 2 can retrieve the associated user profile from system memory unit 118 (or other memory units where the respective information may be stored), which contains personalized settings, preferences, and contextual information. This user profile is then utilized by the various components of assistant system 2, such as contextual memory unit 116 and processor 122, e.g., to adapt the system's behavior and responses to the specific needs and expectations of the identified user or to produce the desired outcome for the user(s), depending on the intended application.

According to an aspect, assistant system 2 is preferably designed to be highly adaptable and capable of personalization to individual users' preferences, habits, and communication styles. This adaptability and personalization may be achieved through the application of machine learning techniques, user modeling, and dynamic adjustment of the system's behavior based on ongoing interactions and feedback. According to one embodiment, assistant system 2 may be configured to learn and update its knowledge and skills over time. The system may employ continuous learning methods, such as online learning and transfer learning, to refine its language understanding, generation, and reasoning capabilities based on the data it encounters in real-world use. With online learning, assistant system 2 can update its models incrementally as new data becomes available, without requiring a complete retraining of the models from scratch. This may be particularly useful for adapting to evolving user preferences, new conversation topics, or domain-specific terminology that may emerge over time. Transfer learning can be implemented in assistant system 2 to leverage knowledge and skills acquired in one domain or task to improve its performance in related domains or tasks. For example, if assistant system 2 has learned to provide personalized movie recommendations based on a user's viewing history and preferences, it can transfer this knowledge to provide personalized book recommendations by identifying similar patterns and preferences in the user's reading history.

To further facilitate personalization, assistant system 2 maintains a detailed user model for each individual user it interacts with. This user model is represented as a structured data object that captures various aspects of the user's profile, preferences, and interaction history. The user model is initialized based on any available demographic information or explicit user input, and then continuously updated and refined as the system learns from the user's behavior and feedback over time. The system employs various machine learning techniques, such as clustering, classification, and regression, to infer user preferences and characteristics from the interaction data. For example, by analyzing the topics, sentiment, and language style of a user's conversations, assistant system 2 can identify their interests, emotional tendencies, and communication preferences. These inferred attributes are then incorporated into the user model to inform future personalization decisions.

Assistant system 2 may apply a range of adaptation strategies to leverage the user model for personalization. One exemplary strategy is personalized content selection, where the system ranks and filters the available content based on its relevance and compatibility with the user's interests and preferences. This can be achieved through collaborative filtering, content-based filtering, or hybrid approaches that combine both techniques. Collaborative filtering may identify patterns in user behavior and preferences across a large user base, and make recommendations based on the preferences of similar users. Content-based filtering may be focused on the intrinsic characteristics of the content itself, and recommends items that share similar features or attributes with the user's past preferences. By applying these techniques to the user model, assistant system 2 can generate highly targeted and relevant content recommendations that align with the individual user's tastes and needs.

Another key adaptation strategy employed by assistant system 2 can be adaptive dialogue management where the system dynamically adjusts its dialogue flow and interaction style based on the user's communication patterns and feedback, using techniques from reinforcement learning and decision theory. For example, the system can learn the optimal sequence and granularity of questions to ask the user based on their prior responses and engagement level, e.g., in order to gather the most relevant information while minimizing user frustration or fatigue. Similarly, the system can adapt its language generation to match the user's preferred tone, formality, and complexity, by selecting from a range of pre-defined linguistic styles or dynamically adjusting the parameters of its language models.

In addition to these core adaptation strategies, assistant system 2 may also employ various other techniques for personalization, such as personalized task assistance, proactive recommendations and reminders, and dynamic user interface customization. For personalized task assistance, the system may leverage the user model to infer the user's skill level, domain knowledge, and learning style, and adapt its guidance and explanations accordingly. This can involve adjusting the level of detail, providing relevant examples and analogies, or breaking down complex tasks into smaller, more manageable steps. For proactive recommendations and reminders, assistant system 2 may continuously monitor the user's context and behavior, and generate timely and relevant suggestions based on their inferred goals, interests, and schedules. This can include recommending relevant products, services, or content, reminding the user of upcoming deadlines or appointments, or suggesting actionable steps towards their stated objectives. For dynamic user interface customization, the system may adapt the visual layout, color scheme, and interaction modality of its user interface to match the user's preferences and accessibility needs, based on their explicit settings or implicit feedback.

By way of example and not limitation, let's consider a scenario where a user frequently interacts with assistant system 2 to manage their personal finance and investments. Over time, assistant system 2 observes that the user has a relatively high risk tolerance, a preference for socially responsible investments, and a keen interest in emerging technologies. Based on these insights, assistant system 2 adapts its behavior in several ways, as detailed below.

When the user asks for investment recommendations, assistant system 2 prioritizes high-growth tech stocks and ESG (environmental, social, and governance) funds that align with the user's values and risk profile. The system also provides more in-depth analysis and due diligence on these recommendations, knowing that the user appreciates detailed information to make informed decisions. In its regular market updates and news briefings, the system highlights developments in the tech sector and sustainability trends that are likely to capture the user's interest. It also curates a personalized feed of expert opinions and analysis from sources that match the user's investment philosophy and communication style.

When the user sets financial goals or budgets, assistant system 2 adapts its guidance and feedback to identify an optimal balance between encouraging the user's aspirations and providing realistic, actionable advice based on their risk tolerance and past behavior. It also proactively suggests relevant financial products or services that can help the user achieve their goals more effectively.

As the user's life circumstances or priorities change over time, assistant system 2 dynamically adjusts its recommendations and communication style to remain aligned with their evolving needs and preferences. For example, if the user starts a family and expresses a desire for more stable, long-term investments, the system gradually shifts its recommendations towards lower-risk, income-generating assets and provides more educational content on financial planning for parents.

Beyond the personal finance domain, assistant system 2's adaptability and personalization capabilities can be applied to numerous other areas, such as health and wellness, education and skill development, entertainment and content discovery, and professional productivity and collaboration. In each case, the system may be configured to incorporate and leverage its user modeling, machine learning, and dynamic adaptation techniques to provide a highly individualized and responsive user experience that meets the unique needs and preferences of each user.

According to one embodiment, assistant system 2 may be configured to synchronously store the recorded audio data, a verbatim textual representation or transcript of the recorded audio data, a tokenized representation of the transcript, and any other form of processed audio data, including its contextual representation and semantic analysis data. For example, assistant system 2 may be configured to store all such different representations of the ongoing conversation that correspond to the same time interval, such as 2 minutes, 5 minutes, 10 minutes, 20 minutes, 30 minutes, 1 hour, 2 hours, and so on. For instance, audio memory unit 114 may be configured to store audio data and a transcript of such audio data of the last 10 minutes of the conversation between users, and contextual memory unit 116 may be configured to store a tokenized representation of that transcript, as well as other forms of encoded representation of text that can be used for contextual understanding of and generating intelligent responses. The content of both memory units can be updated continuously and in real time, on a sliding window basis, as the conversation progresses.

The respective representations of the ongoing conversation may be provided with multiple timestamps. In the context of storing audio data and its transcripts and other forms of representation, timestamps may refer to the specific times at which certain words or sounds occur in the recorder audio file or stream. The timestamps may be configured to provide a link between the transcribed text, its tokenized form, and its occurrence in the audio stream. For example, in the recorded audio data, each sample can have a corresponding timestamp which refers to the point in time at which that sample occurs. One way of time stamping a given sample could involve calculating the sample index divided by the sample rate. For example, if the sample rate of the recorded audio is 44100 Hz, the 44100th sample would have a timestamp of 1 second. In the context of transcripts, timestamps refer to the times at which each word or sentence is spoken in the audio file. For example, a transcript might indicate that the word "Hello" is spoken at the 5-second mark, which could be represented as "[00:00:05] Hello" for example. Similarly, the tokenized representation of the transcript may have similar time stamps indicating the time to which a particular token corresponds in the processed portion of conversation.

According to one embodiment, the timestamps can be generated on a level of individual words. According to one embodiment, the timestamps can be generated on a level of individual phonemes (e.g., smallest units of sound that can differentiate meaning in the language being spoken in the respective conversation). According to one embodiment, the time captured by such time stamps may be counted backwards, e.g., starting from the most recent spoken utterance.

According to one embodiment, The time stamps can be stored along with each type of data representing the conversation, within the respective memory units. According to one embodiment, assistant system 2 may be configured to use the generated and stored timestamps to cross-reference the different types of conversation data representation in the system. For example, assistant system 2 may be configured to use a particular timestamp in the transcript stored in audio memory unit 114 to identify the respective location in the tokenized representation of the transcript stored in contextual memory unit 116. Conversely, assistant system 2 could use a timestamp from the contextual memory to locate the respective portion of the transcript. This can be advantageously used, for example, to identify the exact phrase or word that was spoken in the conversation based on its semantic meaning stored in the contextual memory.

For example, considering an exemplary scenario when user 202 in user group 200 quotes someone at the beginning of the conversation as saying a particular phrase, and user 204 subsequently asks a question, several minutes later, about what exactly that quote was. Assistant system 2 may recognize this questions as a command to generate a response and proceed to answering this question based on both the context of the conversation and its verbatim content. First, assistant system 2 may use a machine learning algorithm, LLM, or other methods, to identify the place in the conversation where user 204 stated that quote based on the contextual analysis of the data stored in contextual memory unit 116. It may be appreciated that some forms of contextual storage may not necessarily represent the original conversation exactly, as explained above. For example, storing context in the form of embeddings could potentially result in a loss of specific information about numeric data or precise phrases. Accordingly, assistant system 2 may utilize the stored timestamp of contextual memory unit 116 that corresponds to the time user 204 was speaking on the subject and identify the exact phrase of user 204 in audio memory unit 114 by analyzing the transcript of the conversation at or near the respective timestamp. As a result, in the described scenario, assistant system 2 can retrieve that verbatim phrase or quote, convert it into speech and provide the appropriate answer to user 204 via speaker 142.

According to one embodiment, the stored transcript of the conversation may be used as a repository containing factual knowledge base that is added to the knowledge base of the pre-trained transformer based LLM model used by assistant system 2. According to one aspect, referring to the above example, since the transcript contains raw text data that is unstructured and consists of arbitrary sequences of words, it may be challenging to retrieve the exact text of the previously spoken quote directly, considering that comparing or measure the similarity between texts in their native form is relatively difficult. In natural language, there are many ways to express the same or similar concepts. This may lead to a vocabulary mismatch and result in missing relevant documents when attempting a direct text retrieval without considering the similarity of words or phrases might have. Furthermore, direct text retrieval is usually based on simple keyword matching, which does not account for the underlying semantic relationships between words and phrases. Yet further, text data is inherently high-dimensional and natural language is complex. The meaning of words and phrases often depends on context, implicit knowledge, or idiomatic expressions. All of this adds to the complexity in comparing and retrieving the relevant text from the repository. In other words, NLP requires a method to understand and compare the semantics of plain text efficiently.

On the other hand, embeddings stored in contextual memory unit 116 may not necessarily be used to directly retrieve the exact text from the associated stored in audio memory unit 114 (which in this case may exemplify a repository). However, they can be used to find similar or relevant texts based on the query formed from user 204 question about what exactly the phrase quoted by user 202 was. Accordingly, assistant system 2 may be configured to intelligently use embeddings and contextual understanding to accomplish this task.

According to one embodiment, this process of using embeddings for quote retrieval may involve several steps. Such steps may include but are not limited to creating embeddings for the texts in the transcript, generating an embedding for the query, and then finding the text of the quote in the transcript with the most similar embeddings to the query. Such steps will be now described below in more detail, in reference to FIG. 5.

One step in this process, which is exemplified by a step 902, may involve relevant text retrieval from the repository by selecting the text from the transcript that approximately corresponds to the time when the target portion of the conversation occurred. The timestamps stored with the raw transcript and with the contextual representation (e.g., tokenized vectors) of the transcript may be used to perform the time match. Assistant system 2 may be configured to include portions of the transcript that correspond to a time window that likely encompasses the target quote. This window may include overlaps with earlier and later periods in the transcript to make sure that no relevant information is omitted.

Another step in this process, which is exemplified by a step 908, may involve performing various preprocessing steps, such as tokenization, cleaning, and normalization, in order to prepare the text for embedding. A further step in this process, which is exemplified by a step 914, may include creating embeddings for the retrieved portion of the transcript using an embedding model. The embedding model may utilize its pre-trained semantic understanding of language patterns to transform the input text into a fixed-length vector which captures the semantic meaning and relationships between words, phrases, and overall context found within the input text. According to various embodiments, the fixed-length vector may have from 100 and 1000 dimensions, from 1000 and 2000 dimensions, from 2000 and 5000 dimensions, from 5000 and 10000 dimensions, and 10000 dimensions and more (e.g., a 1536-dimensional vector).

The generated embeddings may be temporarily stored in RAM 124 for further processing. RAM 124 may be further used to store the active context (like the transcript of the current conversation), parameters of the model (e.g., LLM and/or or multi-modal processing model) being currently activated, and temporary data for processing inputs and generating outputs.

RAM 124 may be dynamically allocated and controlled by the GPT model being currently activated by assistant system 2. For example, the GPT model may be configured to identify and store core pieces of information relevant to the ongoing conversation, such as names of the conversation participants, their background information, participant's preferences or certain facts otherwise pertaining to the conversation of the user-designated mission of system 2 at any given point of time.

Assistant system 2 may be configured to generate compressed conversation histories and/or their summaries, especially for very long conversations, and store that information in RAM 124. This can be advantageously used, for example, to reduce the conversation latencies between the users and assistant system 2 and further to improve the accuracy of the factual information generated by the system, when it pertains to the previous parts of the conversation.

According to one embodiment, assistant system 2 may be configured to efficiently manage extensive data and long conversation histories by summarizing it in a recursive manner and store it in contextual memory unit 116. The GPT model may be configured to detect when the conversation history exceeds the model's input window or context window capacity and generate a summary for a subset of this data and then iteratively update this summary with information from the next subset. This process may continue until all relevant data has been considered, resulting in a compact, cumulative summary that encapsulates the essence of the entire preceding conversation storing which would have otherwise exceeded the capacity of the context window. Alternatively, e.g., to ensure an even more efficient utilization of contextual memory unit 116, the recursive summaries may be stored in RAM 124 and retrieved only in cases when the GPT model of assistant system 2 determines that access to those summaries is needed in the context of the ongoing conversation, for example.

Assistant system 2 may be further configured to exchange data, e.g., recursive summary data or various factual data, between system memory unit 118, contextual memory unit 116, and/or RAM 124. In addition to contextual memory unit 116, system memory unit 118 and RAM 124 may be configured not only as external or auxiliary memory storage units used by assistant system 2 for processes that are separate from GPT models, but also as integral parts of the GPT models' processing mechanism, including language-only and multimodal processing. The GPT model of assistant system 2 may be configured with capabilities to integrate information from each of system memory unit 118, contextual memory unit 116, and RAM 124 into its current processing, e.g., to further enhance its ability to maintain coherence over long conversations and long sequences of multimodal data and better understand context-dependent nuances.

For example, assistant system 2 may be configured to determine that it will be advantageous to copy or move certain factual data from system memory unit 118 to contextual memory unit 116 in certain scenarios. One specific example of such a scenario occurs when assistant system 2, utilizing a sophisticated GPT model, determines that the ongoing conversation has shifted to a topic for which current context windows do not have sufficient data or context (e.g., certain facts discussed in previous conversations) but system memory unit 118 does. Accordingly, the software running on processor 122 and receiving a command from the GPT model can locate the respective information in system memory unit 118 and copy or move that information or its abridged or summarized version to contextual memory unit 116. Although this newly added information will take space in contextual memory unit 116 and may result in erasing some other information (e.g., on a "sliding-window" basis described above), it may be more relevant to the ongoing conversation and providing users with enhanced experience compared to the presence of the erased information.

In a further example and another practical application scenario, the conversation's detailed content, including recursive summaries of earlier parts, may be held in RAM 124, allowing for rapid access and processing on demand. As the conversation evolves, these summaries may become vital for contextual understanding. When the ongoing conversation circles back to a previously discussed subject, assistant system 2, recognizing the need for deeper context, retrieves the relevant summary data from RAM 124 and transfers this data to contextual memory unit 116. Here, it is integrated with the current conversation's context, enabling assistant system 2 to generate a response that is not only contextually rich but also accurately reflective of the conversation's history. This dynamic exchange between RAM 124 and contextual memory unit 116 may be advantageously implemented to enhance the system's ability to adaptively manage information, ensuring that relevant historical context is always considered in real-time response generation, and enhance the overall user experience with assistant system 2.

Figure 5:
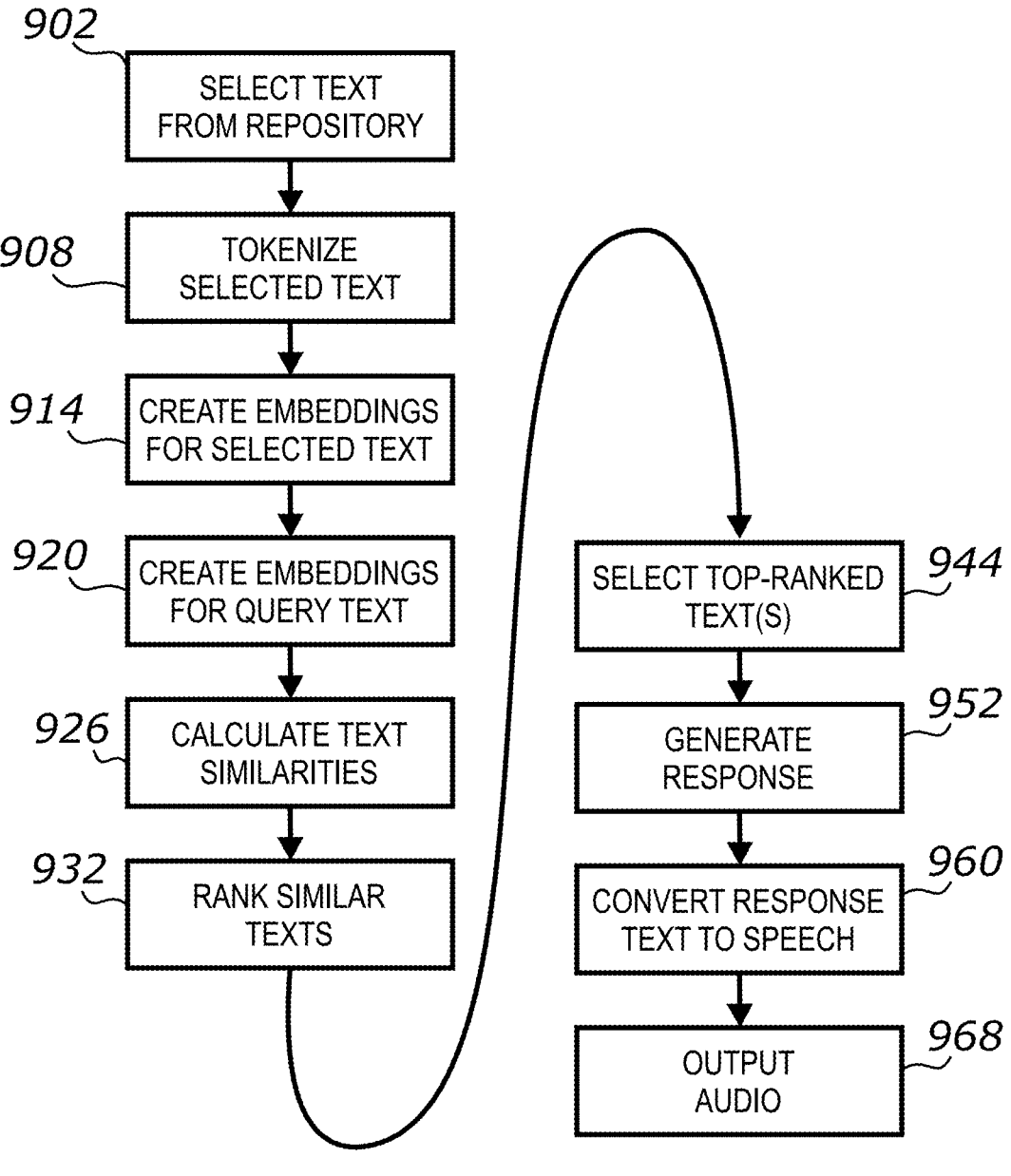
FIG. 5 is a schematic diagram showing an exemplary flowchart of steps that may be performed by an AI assistant system for retrieval of accurate information from a repository, according to at least one embodiment of the present invention.

A further step in the process schematically illustrated in FIG. 5, which is exemplified by a step 920, may include query processing in which embeddings are generated for the text of the query (e.g., a transcript of the question asked by user 204 in the respective conversation). It may be preferred that assistant system 2 uses the same embedding model for processing the query it used for processing the retrieved portion of the transcript (which serves as a reference repository text). It may be preferred that assistant system 2 generally preprocesses the query in the same manner as the retrieved portion of the transcript.

A further step in this process, exemplified by a step 926, may include finding similar texts by calculating the similarity between the query embedding and all the embeddings in the retrieved portion of the transcript. According to one embodiment, this is done using a distance function like cosine similarity. Cosine similarity is an exemplary technique that can be used to measure the similarity between two vectors and quantify how closely related two texts are by comparing their embeddings. For example, the cosine similarity between two vectors A and B may be calculated as the cosine of the angle between them:

$$\text{cosine\_similarity}(A,B) = dot\_\text{product}(A,B)/(\|A\|\|B\|),$$

where 'dot_product (A, B)' represents the dot product of the two vectors, and '$\|A\|$' and '$\|B\|$' represent the magnitudes (or lengths) of the vectors A and B, respectively. The result can be a scalar value that ranges between −1 and 1. A value of 1 would indicate that the vectors are completely similar or identical (angle of 0 degrees), a value of 0 would indicate that the vectors are orthogonal or unrelated (angle of 90 degrees), and a value of −1 would indicate that the vectors are diametrically opposite (angle of 180 degrees).

Further steps in this process may include ranking the similar texts based on their similarity to the query embedding (a step 932), selecting/returning the top most similar text to the query (a step 944), and retrieving the corresponding exact text from the retrieved portion of the transcript. In the final steps, assistant system 2 may generate a response using the exact text of the quote (a step 952), perform text to speech conversion (a step 960), and output it using speaker 142 (a step 968). If necessary, assistant system 2 may be configured to provide this output within a larger sentence and further follow-up by asking for feedback from users 202 and/or 204 on whether the returned quote was sufficiently accurate.

According to one embodiments, the technique described above by way of example may be further modified to configure assistant system 2 for searching through multiple repositories, such as recordings of previous conversations, text files, web pages, databases, etc., and retrieving accurate data from those repositories using embeddings and contextual analysis. Such repositories may be stored locally (e.g., in system memory unit 118), on an external server or a cloud (e.g., data store 230) accessible using wireless communication device 132 or searched on the web using other tools that can be called by assistant system 2 using Application Programming Interface (API), for example. For processing multiple files or data sources, the content of those files or data sources may be tokenized and processed separately, e.g., sequentially, while assigning each file or data source a unique index or ID. The calculation of the similarity between the query embedding and all the embeddings in the indexed files or sources can also be performed on individual basis, after which the files or sources may be ranked based on their similarity to the query embedding, and a certain number of top-ranking results may be produced, along with the respective IDs. Assistant system 2 may then select and output either the topmost ranking result or several of those results based on various scenarios or further considering the context in which the results are intended to be used. Assistant system 2 may also be configured to provide references to the source files or documents, based on their IDs and descriptions.

In the example illustrated in FIG. 5, certain steps can be performed in a different order, when practical. For example, step 920 can be performed before any of steps 908, 914, and even 902.

According to one embodiment, referring to the same example above, assistant system 2 may be configured to perform the calculations aimed at finding text similarities using the tokenized portion of the conversation which is stored in the contextual memory and continuously updated on a sliding time window basis. In certain scenarios, this can be more efficient in terms of processing and memory utilization compared to the above-described case where the raw transcript or its portions need to be first processed from scratch to tokenize and create the respective embeddings for performing the text similarity calculations. This may also allow to skip steps 902, 908, and 914. Furthermore, when embeddings of the query text are also already contained in the contextual memory, as part of the continuous processing of the conversation by assistant system 2, the embeddings related to the query text can also be retrieved from the contextual memory, allowing to skip step 920 as well.

Accordingly, this method may be advantageously used when assistant system 2 determines that the current conversation or query pertains to recently discussed topics or themes, as the relevant embeddings and tokenized data are already available in the contextual memory. This approach enhances the efficiency and speed of the system by minimizing the need for reprocessing and recalculating embeddings for each new query or command. Furthermore, by dynamically adjusting the extent and specificity of the context window based on real-time conversational dynamics, the assistant system 2 can effectively prioritize and process the most pertinent information. This not only optimizes the response time but also ensures that the system's responses are highly relevant and contextually nuanced. Such a method proves particularly beneficial in complex conversational scenarios, where immediacy and accuracy of response are crucial, and in environments with limited computational resources, where maximizing the efficiency of memory and processor usage is essential.

Referring further to the operation of assistant system 2, the system identifies one or more voices as control voices and continuously processes the conversation, searching for the presence of a control signal. A control signal may take a variety of forms, including a key phrase spoken by a control voice, a button press, or a certain gesture, and serves as an indication that a user command is imminent. In an illustrative example, a control signal may be a pre-defined phrase, such as "Hey, Assistant!" or simply "Assistant".

According to one embodiment, a control signal may be derived from the context of the conversation, and particularly from the most recent part of it. An illustrative example of the part of the conversation of user group 200 may be user 204 bringing a question of the current weather condition for a particular destination, which is followed by user 202, which is designated as a control voice, saying "let's ask the assistant". Assistant system 2 would then understand, based on the context of the voice input from user 204 and user 202 that a user command may follow.

According to one embodiment, the concept of the control voice (or voices, if multiple) or control signal (or signals, if multiple) can be made integral to implementations of assistant system 2 that incorporate a user hierarchy and prioritization mechanism that allows different user inputs to be given different priorities for consideration by its LLM in generating its output or performing agentic actions. This mechanism may be advantageously used to respond and adapt to user commands and preferences based on pre-defined roles, permissions, and contextual importance.

In this embodiment, each user interacting with assistant system 2 may be assigned a specific user role or level within a hierarchical structure. The user roles can be categorized into different tiers, such as primary users, secondary users, and guest users. Each tier is associated with a set of permissions and priorities that determine the level of control and influence a user has over the system's behavior. The assignments can be made static, e.g., based on pre-defined roles which are set during pre-training of the applicable models of assistant system 2. The assignments can also be made dynamic, e.g., based on the context of the interaction of users with assistant system 2, and may also reflect users' joining or leaving the ingoing interaction.

The primary users, who may be referred to as administrators or superusers, may be provided with the highest level of authority and priority. Their inputs and commands may be given the utmost importance by the LLM in shaping its responses and actions. Primary users can define system settings, set preferences, and override the inputs of lower-tier users when necessary. They can be provided with the ability to customize the LLM's behavior, knowledge base, and task priorities to align with their specific needs and objectives.

Secondary users may be provided with a lower level of priority compared to primary users but higher than guest users. They can provide inputs and issue commands to the LLM, but their influence on the system's output is subject to the constraints and preferences set by the primary users. Secondary users may have access to certain functionalities and can request the LLM to perform specific tasks or provide information. However, if there is a conflict between the inputs of a secondary user and a primary user, the LLM prioritizes the primary user's input.

Guest users may have the lowest level of priority in the user hierarchy. They can interact with the system and provide inputs, but their influence on the LLM's output is limited. Guest users may have restricted access to certain features or information and may not be able to modify system settings or preferences. Their inputs are considered by the LLM but are given lower priority compared to the inputs of primary and secondary users.

The prioritization mechanism may be implemented within the LLM's processing pipeline. For example, when receiving user inputs, the LLM first identifies the user's role and associated priority level. It then weights the user's input based on the assigned priority and considers it alongside other factors such as the current context, task objectives, and system constraints. In a further example, if a primary user issues a command that conflicts with a previous request made by a secondary user, the LLM would prioritize the primary user's command and adjust its output accordingly. Similarly, if a guest user provides an input that contradicts the preferences set by a primary user, the LLM would give higher priority to the primary user's preferences in generating its response.

The mentioned-above functionality of identifying and tagging each segment of the conversation with the respective speaker's identifier by the AI model may be employed to configure the LLM to incorporate the prioritization of user inputs. The LLM-enabled AI system may include an authentication module that verifies the identity of each user interacting with the system. Upon successful authentication, the user may be assigned a specific role (e.g., primary user, secondary user, guest user) based on predefined access controls and permissions. The user's role information may be associated with their session and passed along with each user input to the LLM.

In operation, when a user provides an input (e.g., a command, question, or statement), the input is preprocessed by assistant system 2 using LLM. This functionality may be implemented using a dedicated input handling module. During preprocessing, the input may be tokenized, and metadata tags may be added to each token to indicate the user's role and priority level, which may further be accompanied by a timestamp tag, as explained in other sections. The metadata tags can be represented as special tokens or as additional features associated with each input token.

The LLM's attention mechanism, which determines the importance and relevance of different input tokens, may be configured to incorporate priority weighting based on user roles. During the attention calculation, the LLM may assign higher attention weights to tokens associated with higher-priority user roles (e.g., primary users) and lower weights to tokens from lower-priority roles (e.g., guest users). This priority weighting may be specifically configured to enable the LLM to give more importance to inputs from higher-priority users when generating its output. As the context memory used by the LLM may be configured to maintain a context representation that captures the relevant information from previous user inputs and system responses, the context representation may be updated dynamically as new inputs are processed, taking into account the priority levels of different user inputs. Higher-priority inputs can have a greater influence on shaping the context representation, allowing them to steer the conversation and decision-making more effectively.

According to an aspect, this priority-augmented functionality may be advantageously utilized to enhance the security of assistant system 2 and its alignment with the intended guidelines. Also, various system-level inputs, such as those determining the prescribed behavior of assistant system 2 in response to use inputs or other events, may be provided with tags of higher priority to enforce the intended performance or at least significantly increase its probability. If a user subsequently provides an input that contradicts the system prompt but has a lower priority than the system prompt, assistant system 2 may be configured to generate response or perform other actions according to the system prompt rather than as instructed by the user. Similarly, the prioritization tags and respective LLM's parameter weighting may be configured to prevent lower-tier users to override the earlier or subsequent input of a higher-tier user. In other words, in cases where there are conflicting inputs or commands from users with different priority levels, the LLM implements a conflict resolution mechanism. If a higher-priority user's input contradicts or overrides a lower-priority user's input, the LLM gives precedence to the higher-priority user's input. This overriding mechanism may be advantageously configured to ensure that the LLM's behavior and decision-making align with the preferences and authority of higher-priority users.

Assistant system 2 may be configured to manage voice input from multiple users based on assigned priority levels. The system assigns a priority level to each user based on their determined user identification information, which may be stored in the non-volatile system memory unit. When the system receives voice input from multiple users simultaneously or in quick succession, it determines whether to process the voice input based on the assigned priority levels. Voice input from a user with a higher assigned priority level is processed first, while voice input from a user with a lower assigned priority level is ignored if the higher priority voice input is currently being processed. If the lower priority voice input is ignored, the system generates an audio notification for output to the user with the lower assigned priority level, informing them that their voice input will be processed after the higher priority voice input processing is completed. This notification is provided through the audio output device, ensuring that the user is aware of the status of their voice input. Once the higher priority voice input processing is finished, the system may be configured to proceed to process the lower priority voice input in the order of their assigned priority levels.

Assistant system 2 may be further designed to manage voice input from multiple users based on assigned priority levels and a dynamic priority threshold. The priority threshold may be determined based on the current processing load of the system, ensuring that the system can efficiently handle voice input during periods of high usage, or based on pre-defined rules set by a system administrator. For example, when assistant system 2 receives voice input from multiple users, it may compare each user's assigned priority level to the current priority threshold. Voice input from users with priority levels above the threshold is processed, while voice input from users with priority levels below the threshold is ignored and not processed for the purpose of generating a response. This approach may allow the system to focus its resources on high-priority users during busy periods, while still ensuring that all users' inputs are addressed when the system has sufficient processing capacity. If a user's voice input is ignored due to their priority level being below the current threshold, the system may be configured to generate an audio notification to inform the user of the situation. This notification may be output through the audio output device and explains that the user's voice input is not being processed because their priority level is currently below the threshold required for processing.

The LLM's agentic actions, such as task execution, information retrieval, or decision-making, may also be configured to use the user hierarchy and prioritization mechanism. The system may consider the user's role and priority when determining which actions to take and in what order. Actions requested by primary users may be given higher precedence and are executed before those requested by secondary or guest users. More specifically, when the LLM considers the prioritized user inputs and the context representation to generate an appropriate response or perform an agentic action during the output generation process, the LLM's decoding algorithm, such as beam search or top-k sampling, can be modified to favor outputs that align with the preferences and objectives of higher-priority users.

Assistant system 2 may include authentication and authorization mechanisms, e.g., to ensure the integrity and security of the user hierarchy. Users may be required to authenticate their identity using secure methods such as passwords, access tokens, or biometric data, including their voice. The system may be configured to verify the user's identity and assign the appropriate user role based on predefined permissions and access controls.

The user hierarchy and prioritization mechanism in assistant system 2 may be particularly configured to enhance the system's ability to adapt to different user needs and preferences while maintaining a structured and controlled environment. It may allow primary users to have greater control over the system's behavior and ensure that their inputs and objectives are given the highest priority. At the same time, it may still enable secondary and guest users to interact with the system within the boundaries set by the primary users, enabling collaboration and customization within a hierarchical framework.

Assistant system 2 may also incorporate user feedback and adapt its behavior over time based on the interactions and preferences of different user roles. For example, higher-priority users' feedback and preferences can have a stronger influence on the LLM's adaptation process, allowing them to fine-tune the system's behavior more effectively. The adaptation mechanism can involve updating the LLM's parameters, adjusting the priority weighting scheme, or modifying the knowledge base to reflect the preferences of higher-priority users.

According to one embodiment, assistant system 2 may be configured to recognize a portion of the conversation being monitored as representing a prompt or command by itself. For instance, referring to the above example, assistant system 2 may be configured to treat the phrase of user 202 "let's ask the assistant" as the command, and to proceed to the next step of executing that command.

Upon the detection of a control signal, assistant system 2 engages a recording mode, primed to capture the subsequent user command. This command can encompass a range of requests or inquiries. For instance, it may be a request for explanations, information retrieval such as weather updates, stock quotes, road conditions, names of people in an address book, or latest news on a specific subject. According to different embodiments, assistant system 2 may be configured to extract the subject of the user's request from the command itself or deduced from the retained part of the conversation, or both, depending upon the context analysis.

To process the user command, the system's processor may be programmed to employ a natural language processing model. This model, which includes a transformer-based language model, tokenizes and encodes the user command and the retained part of the conversation. By performing these actions, the system is able to understand the context of the command in relation to the recent conversation. According to one embodiment, assistant system 2 may be configured to process the command employing the same LLM model that it used for contextual understanding the previously recorded portions of conversation. According to one embodiment, assistant system 2 may be configured to process the command using a different LLM or differently trained LLM than that used for processing/contextualization of the background conversation.

According to a preferred embodiment, assistant system 2 is designed to continuously update its contextual understanding of the ongoing conversation. As the conversation progresses, processor 122 constantly refreshes the context in real-time by updating at least contextual memory unit 116. This design choice may be advantageously chosen for a rapid contextualization and processing of the user command, as it does not need to retroactively process and contextualize the conversation when the command is issued.

Contextual understanding can be a critical component of generating a response using the stored context of the conversation and previous commands involves analyzing and processing the data to identify relationships between tokens and understand the underlying intent or subject matter of the command. This process may include multiple sub-steps to achieve a detailed understanding of the conversational context, effectively comprehend user commands, and consistently deliver meaningful and relevant responses that enhance the conversational experience.

Assistant system 2 may utilize a sophisticated natural language processing model, such as a transformer-based LLM, to decode complex sentence structures and identify relationships among tokens. This model can be trained on massive amounts of text data to develop an accurate understanding of human language and to determine the various nuances present in the given context.

Assistant system 2 may be configured to store various user-specific information in system memory unit 118 (e.g., by executing the respective instructions on processor 122). For example, system memory unit 118, at least a portion of which being preferably configured as non-volatile memory, may be further configured to store user names, profiles, personalized settings, frequently used commands, interaction history, security credentials, biometric data, custom vocabulary or phrases, preferences for third-party service integrations, user-specific task automation scripts, calendar and scheduling information, contact lists, multimedia files, application usage patterns, and any other data that enhances the personalization and functionality of the AI assistant system. The user-specific information may be organized and stored in a structured user profile database within one of the memory units of assistant system 2. In one embodiment, the user profile database may be stored and maintained within non-volatile system memory unit 118. This user profile database may be designed to efficiently store and retrieve user profiles, preferences, and other personalized data based on user identification information. The database may employ various data structures, such as tables, indexes, or key-value pairs, to enable fast and scalable access to user-specific information for personalizing the AI assistant's conversational responses and functionality.

According to one embodiment, system memory unit 118 may be used to store snippets of user conversational input, like key phrases or specific terminology, and assistant system 2 may be configured to self-train itself and use that stored information to generate conversational responses based on a user-specific vocabulary and language model that is adapted to the user's preferred terminology and communication style.

Furthermore, as mentioned in other sections, assistant system 2 may utilize its contextual understanding capabilities to identify and store certain key information from the ongoing conversation in non-volatile system memory unit 118, in addition to continuously capturing the flow of the conversation into contextual memory unit 116 on a sliding window basis. To provide this functionality, processor 122 may be configured to execute instructions to generate a personalized user profile based on the conversational context data. This may involve analyzing the conversation to extract user preferences, habits, frequently used commands, interaction history, and other relevant data points. The extracted data may be then used to create and update a user profile stored in the system memory unit 118. This profile may include detailed information about the user's preferences, frequently used phrases, custom vocabulary, and interaction patterns. Using the personalized user profile, the processor may tailor the conversational responses to better suit the individual user. For example, when generating a response, assistant system 2 may reference the user profile to incorporate personalized elements, ensuring that the interaction is relevant and contextually appropriate. In a further example, if the user frequently asks about specific topics or prefers certain types of responses, the system may adjust its output to match these preferences. The personalized user profile may be advantageously implemented in assistant system 2 to provide a more engaging and effective user experience by considering the unique characteristics and preferences of each user.

As the conversation progresses, the natural language processing model employed by assistant system 2 may continuously analyze the context and semantics of the dialogue and identify and extract important pieces of information that may be relevant for future reference or that could enhance the quality of subsequent interactions. For instance, during a conversation, a user might mention their food preferences, upcoming travel plans, or a significant life event. Assistant system 2, upon recognizing the potential long-term relevance of such information through its contextual understanding mechanisms, proceeds to store these key details in system memory unit 118. This memory unit, being non-volatile, retains the information even when the system is powered off or restarted.

The process of selecting information to be stored in system memory unit 118 may involve several steps. First, the natural language processing model breaks down the conversation into smaller, meaningful segments or tokens. It then analyzes these tokens in the context of the entire conversation, assigning relevance scores based on factors such as the rarity of the information, its potential future utility, and its relationship to the users' preferences and goals. Segments that exceed a predefined relevance threshold are then marked for long-term storage. The system extracts these key pieces of information and associates them with relevant metadata, such as timestamps, user identifiers, priority, and conversation topics The extracted information may be encoded into a format suitable for storage in system memory unit 118. This encoding process may involve techniques like tokenization, embedding generation, or compression to optimize storage space and retrieval speed. The encoded information is finally stored in designated sections of system memory unit 118, with each section potentially corresponding to different categories of information or different users.

In a related embodiment, assistant system 2 may be configured to allow users to explicitly direct the system to store specific pieces of information in system memory unit 118. For instance, during a conversation, a user might say, "Assistant, please remember that I'm allergic to shellfish." Upon recognizing this command through its natural language processing capabilities, assistant system 2 would then extract the relevant information (i.e., the user's shellfish allergy) and store it in system memory unit 118 with appropriate metadata (e.g., the user's identifier, the timestamp, and perhaps a label indicating that this information was user-provided). This user-directed storage mechanism enables users to proactively supply information they deem important for future interactions, complementing the system's automated contextual information extraction and storage processes.

Assistant system 2 may be configured to efficiently retrieve and utilize the stored information in future interactions. For example, when engaging in future conversations, assistant system 2 can access and retrieve relevant information from system memory unit 118 to inform its responses and decision-making. For example, if a user mentions a restaurant they want to try, the system can check its long-term memory to see if the user has expressed any dietary preferences or restrictions in the past, allowing it to provide more personalized recommendations. Moreover, the information stored in system memory unit 118 can serve as a foundation for the system to build comprehensive user profiles over time. These profiles can encompass preferences, habits, and unique characteristics of each user, enabling assistant system 2 to offer increasingly personalized and context-aware interactions with multiple users.

It is noted that while contextual memory unit 116 focuses on capturing the immediate, short-term context of the conversation, according to at least some embodiments, system memory unit 118 may serve as a long-term repository for key information that can enhance the quality and personalization of the system's interactions over extended periods. The interplay between these two memory units may be critical for assistant system 2 to maintain a balance between adapting to the dynamic flow of the conversation and leveraging historically relevant information to provide a more personalized and effective user experience.

Assistant system 2 may also be provided with the ability to resolve linguistic ambiguities that may arise from the user's command or the stored conversation context. This can include addressing homonyms, idiomatic expressions, or other forms of ambiguous language. Assistant system 2 may be configured to use its contextual understanding capabilities to decipher the most relevant meaning in the given context and acts accordingly. In addition to understanding the syntax and semantics of the conversation, assistant system 2 can perform sentiment analysis to identify the emotional tone or intent behind certain phrases or statements. This understanding can be used to adapt system's responses to better align with the user's emotions or disposition, further enhancing the overall communicative experience. It may be preferred that assistant system 2 interprets the command given by the user within the context of the ongoing conversation. This can involve determining if the command is a direct request for information, a general inquiry, or a follow-up to a previous command or conversation topic. Accurate command interpretation is crucial for providing relevant and useful responses.

Assistant system 2 may be further configured to maintain a log of the ongoing conversation state, which may be stored in contextual memory unit 116, for example. This may includes tracking subjects, topics, and important context elements that have been introduced, discussed, or dismissed. By monitoring the conversation state, assistant system 2 can generate responses that logically follow the progression of the dialogue and remain both relevant and context-aware. When a user's command relies on stored conversation context and previous command data, assistant system 2 intelligently combines this information to form a comprehensive understanding of user intent and content. This type of data fusion may be implemented for generating accurate, contextually appropriate responses tailored to specific user queries.

According to one embodiment, upon understanding the user command and identifying the context, processor 122 decodes and detokenizes the response, which is then delivered to the users of user group 200 via speaker 142. In this way, assistant system 2 may be configured to provide a dynamic and responsive interaction, seamlessly integrating user commands into the flow of conversation and providing pertinent responses based on the most recent and relevant context.

Decoding can be an important step in the overall process of assistant system 2 operation that allows the system to intelligently generate responses through understanding the context of the conversation selecting an appropriate contextual response. The decoding process may involve the conversion of contextualized tokenized data back into human-readable text or audio, which can then be used as responses or suggestions for the user(s). Decoding may incorporate several sub-steps that work together to enable assistant system 2 to effectively communicate with the users.

The decoding may include the retrieval of the tokenized and encoded contextual information of the conversation that has been stored in contextual memory unit 116. This step may ensure that the system has access to the most relevant and up-to-date information about the ongoing conversation, enabling it to generate context-appropriate responses.

Next, assistant system 2 may utilize a transformer-based LLM to decode the tokenized and encoded data by utilizing attention mechanisms and multiple layers of neural networks. These attention mechanisms may be configured to identify the most important tokens related to the user's command or request. By allocating appropriate weights to each token, the model generates a probability distribution over the possible output tokens, which represents the likelihood of each token forming part of the desired response.

Following this, assistant system 2 employs a technique called beam search to refine the token probability distribution by selecting a fixed number of best candidate tokens at each step. This step may be configured to consider only the most likely output tokens are while minimizing the risk of generating irrelevant or incoherent responses.

Once candidate tokens have been identified, assistant system 2 proceeds to detokenize them back into their original, human-readable form. Detokenization is another critical step in the process of assistant system 2, wherein the system transforms the generated sequence of tokens back into human-readable text or audio format. This step allows users to seamlessly interact with assistant system 2 through comprehensive responses or suggestions, providing a coherent conversation experience. Detokenization involves several important aspects that contribute to the accurate conversion of tokenized data back into meaningful output.

The detokenization process may include the reconstruction of words, phrases, and sentences from the selected tokens, essentially reversing the tokenization step. Assistant system 2 should preferably be trained to ensure that the generated text retains the correct grammar, syntax, and semantic meaning to provide an intelligible and coherent response to the user's command or request.

According to one embodiment, before the detokenization process takes place, assistant system 2 has already decoded the tokenized and encoded data using various techniques such as attention mechanisms, neural networks, and beam search techniques. As a result, the system has narrowed down the most probable output tokens that are representative of the contextually relevant response or suggestion.

The detokenization process may include mapping the selected output tokens back to their corresponding words, phrases, or punctuation marks. This may be done using a pre-defined mapping, which offers an efficient conversion from tokens to text. According to one embodiment, this mapping may be established during the initial training phase of assistant system 2 and can be made readily available for use during the detokenization process.

Next, assistant system 2 may reconstruct the original text by concatenating the words, phrases, and punctuation marks in the correct order, making sure that the generated text is both coherent and contextually appropriate.

A further step includes converting the detokenized text into speech. This conversion may employ text-to-speech (TTS) technologies that generate natural-sounding human speech based on the detokenized text. The TTS process may be configured to synthesize speech with realistic tones, accents, and inflections that further enhance the human-assistant system 2 interaction experience.

Assistant system 2 further provides the final output in the form of audible speech which is then presented to the user(s) through speaker 142 as a response or suggestion respective to the previously issued command or request.

According to one embodiment, assistant system 2 may be further configured to obtain information from external sources to provide a comprehensive and accurate response to the user's command or otherwise intelligently participate in the ongoing conversation. This step may particularly be useful when the user's request or command relates to real-time or up-to-date information, or when the response requires data beyond the pre-existing knowledge stored within assistant system 2 (e.g., within its system memory unit 118 and contextual memory unit 116) or beyond what can be handled by the respective LLM.

One step in this process may involve identifying external resource requirements. One aspect of this step may be determining if external resources are required to answer the user's command. Assistant system 2 evaluates the context, the user's request, and its existing knowledge base to identify any gaps in information that may necessitate accessing external sources.

Once the need for external resources is established, assistant system 2 identifies the most appropriate sources to obtain the required information. This selection could include internet search engines, online databases, relevant APIs, or web services, among others.

Assistant system 2 further constructs a query tailored to extract the necessary information from the selected external resources. This may involve creating specific search terms, input parameters, or API requests to ensure that the retrieved data aligns with the user's command and the conversation context. With such a formulated query, assistant system 2 accesses the external resources using wireless communication device 132 to retrieve the required information. This process may involve parsing web pages, processing API responses, or querying databases, depending on the selected sources.

Once assistant system 2 retrieves the relevant information, it processes this data and integrates it into the response generation process. This can include filtering, summarizing, or analyzing the obtained data to make it compatible with the tokens, encoding, and contextual understanding stages mentioned earlier in the response generation process.

Assistant system 2 may be configured to perform validation and reliability assessment of the retrieved data to ensure that the information gathered from external resources is accurate, up-to-date, and reliable. The system may be co configured to cross-reference multiple sources, assess the credibility of the information providers, or apply other validation techniques to ensure that the response generated reflects accurate and trustworthy data. In some embodiments, assistant system 2 may incorporate feedback or learning mechanisms to improve its performance over time. This feedback can come from user interactions, allowing the system to refine its understanding, generate better responses, and become increasingly adept at participating in conversations.

The feedback or learning mechanisms to may be implemented in an active form where assistant system 2 actively solicits user feedback on the generated conversational responses. The system may employ various techniques to obtain user feedback, such as asking follow-up questions, providing rating options, or tracking user engagement. For example, after providing a conversational response, assistant system 2 may ask the user, "Was this response helpful?" or "On a scale of 1 to 5, how relevant was my answer to your question?" The system can also present multiple-choice options for the user to select the most appropriate or satisfactory response. Additionally, assistant system 2 can implicitly gather feedback by monitoring user engagement indicators, such as the user's tone of voice, facial expressions (if visual input is available), or subsequent actions (e.g., whether the user follows the AI assistant's recommendations or asks for clarification).

The user feedback collected by assistant system 2 may be processed and incorporated into the training data used to update the transformer-based language model. The feedback is first filtered and preprocessed to remove any noise, ambiguity, or irrelevant information. The processed feedback may then annotated and converted into any suitable format, such as input-output pairs or reinforcement learning rewards, depending on the specific learning algorithm employed. The annotated feedback data may be combined with the existing training dataset, for example, through direct concatenation or by assigning appropriate weights to emphasize the importance of user feedback. The augmented training dataset may then used to fine-tune the transformer-based language model using techniques like gradient descent, back-propagation, or reinforcement learning. The model's parameters, such as attention weights, word embeddings, or layer biases, may be adjusted based on the feedback signals to improve the quality and relevance of the generated conversational responses.

Assistant system 2 may employ various active learning algorithms and optimization techniques to effectively utilize user feedback for model improvement. One such approach includes uncertainty-based sampling, where the system prioritizes soliciting feedback on conversational responses for which it has low confidence or high uncertainty. This mechanism may be configured to focus assistant system 2 on the most informative and impactful feedback samples. Another approach can be diversity-based sampling configured to gather feedback on a wide range of conversational topics and styles to improve the model's generalization capabilities. The system may also employ techniques like importance weighting or curriculum learning to give higher priority to feedback on more challenging or critical conversational aspects. To optimize the model update process, assistant system 2 may use adaptive learning rates, regularization techniques (e.g., L1/L2 regularization, dropout), and early stopping to prevent overfitting and ensure stable convergence. The system may be configured to continuously monitor the model's performance on a validation set and adjusts the hyperparameters or learning strategies based on the observed metrics, such as perplexity, BLEU score, or user satisfaction ratings.

According to one embodiment, the LLM or multiple LLMs employed in assistant system 2 may be designed to generate responses that align with the values, goals, and intentions of a human user, thereby ensuring that the outputs are beneficial, understandable, and controllable. The alignment system of LLM(s) may be implemented using a multi-tiered approach. The initial alignment process may include the training of the LLM on a dataset that incorporates human values and norms. The dataset may be carefully curated and diverse, and may be designed to represent a wide spectrum of human values and cultural norms. This training process may be configured to embed a broad understanding of human values into the model, thereby creating a foundation for alignment.

Assistant system 2 may incorporate a comprehensive information management system configured for managing the long-term information stored in system memory unit 118. This system may be configured to provide the timely deletion, updating, and maintenance of stored information to ensure its relevance, accuracy, and compliance with data retention policies.

Figure 6:
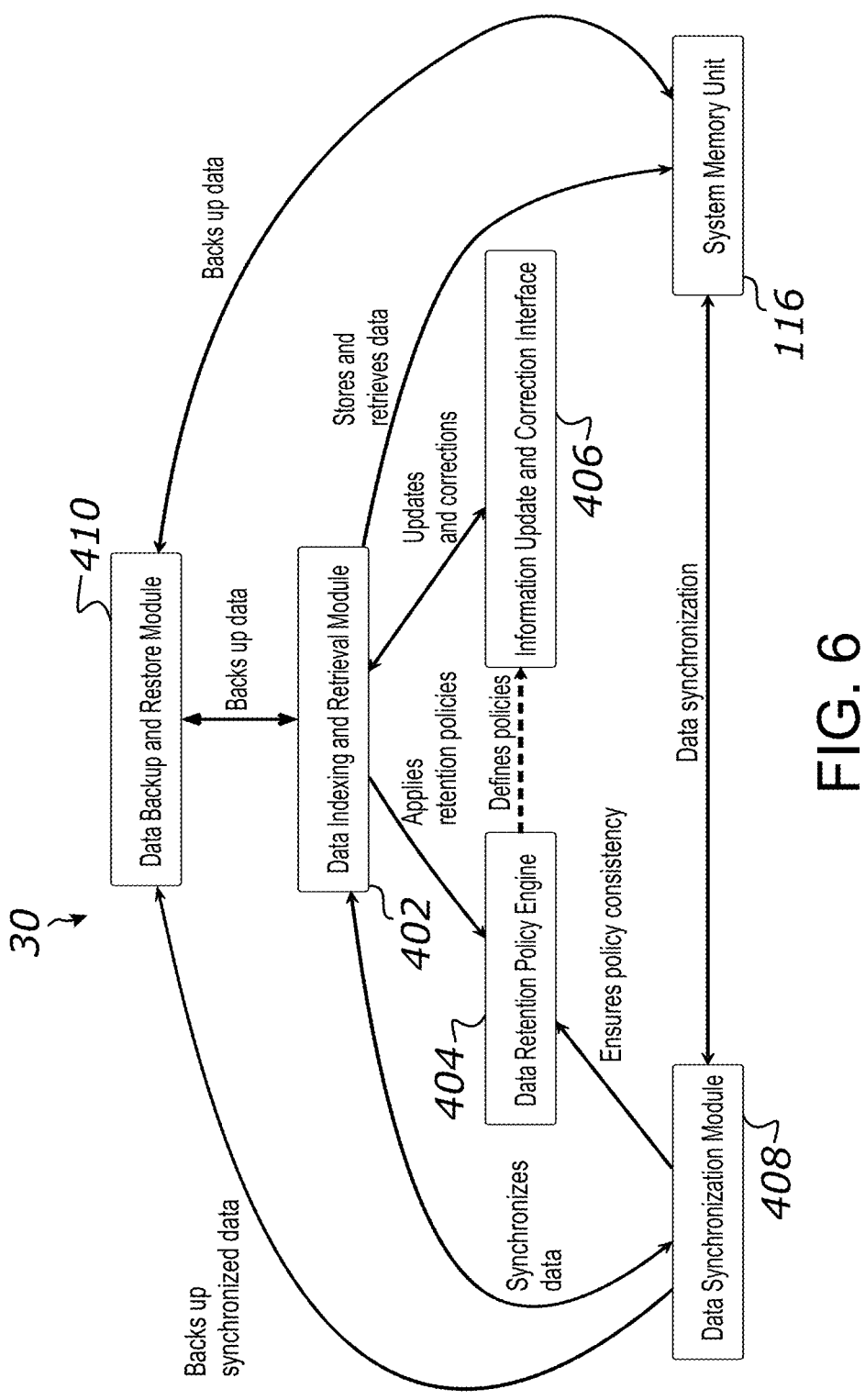
FIG. 6 is a schematic diagram depicting an embodiment of an information management system configured for managing long-term information stored in a system memory unit.

FIG. 6 schematically depicts an embodiment of an information management system 30 which consists of several key components. Information management system 30 includes a data indexing and retrieval module 402 that is designed to organize the stored information in system memory unit 118 using efficient data structures and indexing schemes. Retrieval module 402 module associates each piece of stored information with relevant metadata, such as timestamps, user identifiers, topic labels, priority tags, and source tags (e.g., whether the information was automatically extracted by the system or explicitly provided by the user). The indexing scheme may be specifically configured to enable rapid search and retrieval of information based on various criteria.

Information management system 30 further incorporates a data retention policy engine 404. This engine allows system administrators or users to define rules and policies governing the retention and expiration of stored information. These policies can be based on various factors that include but are not limited to the age of the information, its relevance to current contexts, its priority, the frequency of its usage, and any legal or regulatory requirements for data retention. For instance, an administrator might define a policy that automatically deletes any user-provided information that hasn't been accessed or referenced by the system for a period of 90 days. Or, a user might specify that their dietary preferences should be retained indefinitely, but their past shopping lists should be deleted after 30 days.

Data retention policy engine 404 may continuously scan the information stored in system memory unit 118 and apply the defined retention policies. When a piece of information meets the criteria for deletion, the engine securely erases it from the memory unit and updates the associated indexes in the data indexing and retrieval module. Data retention policy engine 404 may utilize an dedicated LLM that is specifically trained on data retention policies that may be applicable to the intended application or use case.

Information management system 30 further includes an information update and correction interface 406. This interface allows users to review, update, or correct the information that assistant system 2 has stored about them in system memory unit 118. Users can access this interface through various means, such as voice commands (e.g., "Assistant, show me what you remember about my food preferences"), a mobile app, or a web portal. Assistant system 2 may also be provided with capabilities to provide a full list or summary of the information that is stored in system memory unit 118. For example, a user can request that assistant system 2 provides all information it retains about them and specify their preferred method of response, such as via a voice interface, text, or email.

By using information update and correction interface 406, users can see or hear a structured representation of the information the system has stored about them. They can then modify this information as needed. For example, if a user's shellfish allergy has been resolved, they could find the relevant entry in their profile and delete it or mark it as no longer applicable. Alternatively, the user can issue a voice command for assistant system 2 to update this information accordingly. In response, assistant system 2 should update the information and provide the user with a status of the request (e.g., a confirmation that the information has been updated, optionally providing the user with the updated entries regarding the outstanding food allergies). It is also preferred that information management system 30 is configured to allow users to erase all data pertaining to them, e.g., by using the respective voice command or by changing the respective setting in their user profile.

Any changes made by users through information update and correction interface 406 are processed by information management system 30, which validates the changes and propagates them to system memory unit 118. Information management system 30 also logs these changes for auditing and troubleshooting purposes.

Information management system 30 further includes a data synchronization module 408 which is configured to ensure the consistency of information across multiple instances of assistant system 2, if applicable. For example, in a cloud-based deployment, multiple server instances might be running the assistant system software and servicing user requests. Each of these instances would have its own copy of the information stored in system memory unit 118. Data synchronization module 408 uses techniques such as distributed data replication and eventual consistency to ensure that changes to the stored information (whether through automated context extraction, user-directed storage, or manual updates) are propagated across all instances in a timely and reliable manner. This may help ensure that users have a consistent experience regardless of which instance of the system they interact with.

Information management system 30 further includes a data backup and restore module 410 configured to protect against data loss or corruption. This module periodically creates secure backups of the information in system memory unit 118 and stores them in a separate, durable storage location (e.g., a distributed object storage service in the cloud). In the event of a system failure or data corruption, the backup can be used to restore the stored information to a previous known-good state.

For example, in the case where a software bug in data retention policy engine 404 inadvertently deletes some important user information, data backup and restore module 410 would allow system administrators to identify the most recent backup prior to the unintended deletion and restore the system memory unit 118 from that backup, minimizing data loss.

It may be appreciated that the incorporation of information management system 30 into assistant system 2 for managing the long-term information stored in system memory unit 118 ensures that the information remains accurate, relevant, and properly maintained throughout its lifecycle. As described above, it can incorporate data retention policies, user control, data synchronization, and backup capabilities to strikes a balance between the need for persistent, contextually-relevant information and the requirements for data hygiene, user privacy, and system resilience.

It is noted that information management system 30 may leverage generative AI capabilities, e.g., LLMs, to perform any or each of its tasks, taking into account the context and semantics of the stored information. For example, when processing user-directed updates or corrections, the LLM can be used to interpret the user's intent and translate it into the appropriate modifications to the stored data structures. Furthermore, the LLM can be employed to analyze the stored information and suggest potential optimizations or enhancements, such as identifying redundant or conflicting data points, or proposing additional relevant information to capture based on the user's interaction history. If a user provides a vague or ambiguous update to their stored preferences, the LLM can use its contextual understanding to infer the user's intent and translate it into precise modifications to the stored data structures. When a user requests to review the information stored about them, the system can use an LLM to generate a natural language summary of the key points, rather than presenting a raw data dump.

Moreover, information management system 30 may be configured to use the LLM a high-level controller that coordinates the different components of the system. For instance, it may use the LLM (or LLMs, if multiple) to determine when to trigger the data retention policy engine 404 to scan for expired information, when to initiate data synchronization across multiple system instances, and when to schedule backups of the stored data. By using an LLM as a central decision-making engine, information management system 30 can operate more intelligently, adaptively, and efficiently in handling the long-term information stored in system memory unit 118. This AI-driven approach may be configured to make nuanced decisions based on the semantics and context of the data, rather than relying on rigid, predefined rules.

Information management system 30 may be configured to utilize various tools, including, for example, function calls in conjunction with LLMs to perform its various tasks related to managing the long-term information stored in system memory unit 118. This is further explained below, by way of example and not limitation.

When a new piece of information is added to system memory unit 118, either through automatic contextual extraction or user-directed storage, information management system 30 passes this information to an LLM via a function call, such as "analyze_information (information_text, metadata)". This function takes the raw text of the information and its associated metadata (e.g., timestamp, user ID, source) as input. The LLM processes this input using its pre-trained language understanding capabilities to extract the semantic meaning and context of the information, employing techniques such as named entity recognition, sentiment analysis, and topic modeling. The output of this analysis, which is a structured representation of the information's semantics, is then returned to the information management system.

Using the semantic understanding obtained from the LLM, the information management system decides how to optimally index and store the data in system memory unit 118. This decision-making process is orchestrated by a function call (e.g., "store_information (information_text, semantic_representation, metadata)"), which takes the original information text, its semantic representation from the LLM, and the associated metadata as input. The function uses the semantic representation to determine the most appropriate data structures and indexing schemes for storing the information, encodes the information and its metadata into the chosen data format, and writes it to system memory unit 118.

Information management system 30 periodically invokes data retention policy engine 404 to scan for expired or outdated information in system memory unit 118, using a function call such as "apply_retention_policies ( )". This function retrieves the defined retention policies from the system configuration and queries the stored information to find data that matches the policy criteria. For each matching piece of information, the function calls the LLM to analyze the information's relevance and decide whether it should be retained, updated, or deleted based on factors such as the information's age, priorities, usage frequency, and relation to current context. The function then updates system memory unit 118 and associated indexes accordingly.

When a user interacts with information update and correction interface 406 to review or modify their stored information, the interface sends these user requests to the information management system via function calls like "retrieve_user_information (user_id)" and "update_user_information (user_id, updated_information)". The former function queries system memory unit 118 to find all information associated with the specified user ID and passes this information to the LLM to generate a user-friendly summary or representation. If the user provides updates or corrections, the latter function is called, which passes the raw text of the updated information to the LLM to interpret the user's intent and infer the specific changes needed. The function then updates the relevant data structures in system memory unit 118 and propagates these changes to all affected indexes and downstream systems.

Periodically or triggered by certain system events, information management system 30 initiates a proactive data optimization process via a function call like "optimize_stored_information ( )". This function retrieves the stored information from system memory unit 118 and passes it to the LLM for analysis, which uses its semantic understanding capabilities to identify patterns, relationships, and potential optimizations in the data. The function receives these optimization recommendations from the LLM and applies them to the data structures and indexes in system memory unit 118, invoking additional functions to update related systems or notify users of significant changes as needed. According to one embodiment, assistant system 2 may incorporate a context-aware disambiguation software module to address potential ambiguities in user instructions. This module may utilize additional information about the user's context and history of interactions to interpret ambiguous instructions more accurately. It may use a variety of techniques, including machine learning models trained on dialogue datasets, to predict the most likely interpretation of ambiguous phrases based on the user's context. Assistant system 2 may also incorporate a predictive model configured for aligning the system responses with long-term goals and values. This predictive model may evaluate potential long-term consequences of actions suggested by the LLM, and adjust the output generation accordingly. The model may be trained to identify and prioritize suggestions that align with the user's long-term goals and values, and to deprioritize or discard suggestions that may have negative long-term effects. Assistant system 2 may also incorporate an ethical filtering software module which is trained to identify and prevent output that could be harmful, unethical, or otherwise violate predefined ethical guidelines, irrespective of the user's intentions. This module may be configured to ensure that the system's alignment with the user's intentions does not extend to facilitating harmful or unethical actions.

Example 1

Assistant system 2 is implemented within a vehicle to provide navigational guidance, entertainment, and facilitate engaging conversations for passengers. The vehicle may be equipped with a dedicated system that includes a microphone, speaker, processor, memory, wireless communication device, and other relevant hardware components to create an interactive and context-aware conversational experience. At least some of the components may be incorporated into the vehicle's dashboard or its "infotainment" system which may also include a camera and a display.

Assistant system 2 continually listens to and processes the conversation using real-time tokenization, encoding, and contextual understanding. Audio memory unit 114 which may have a capacity of 128 GB to 2 TB, constantly stores the audio information characterizing the conversation, preserving only the most recent content. Contextual memory unit 116, which may have a capacity of 1 MB to 1 GB, constantly stores and updates the conversation, preserving only the most recent content, for example, within a dynamic range of 1 minute to 24 hours, based on user preferences and system performance parameters. Additionally, users can directly instruct assistant system 2 to memorize specific information by using a designated command like "Remember this" followed by the information they want to store. This information can be saved in a separate section within contextual memory unit 116 along with user-defined tags for easy retrieval.

Upon detecting a control signal, such as a designated key phrase like "Hey Assistant," a button press, or a specific gesture, assistant system 2 proceeds to record and process the following user command. For example, the driver may request information about the nearest electric car charging station or a specific point of interest, to which the Assistant responds by retrieving relevant data, either from the stored conversation context or external resources, accessed through the vehicle's built-in 4G/5G/6G wireless communication module exemplifying wireless communication device 132.

Assistant system 2 may further provide traffic updates, such as road closures or live congestion data, helping to enhance the user's experience. In addition, it may entertain passengers by suggesting music or podcast selections based on the ongoing conversation and individual preferences, adjusting volume levels from a range of 0 dB to 60 dB to match the preferences and comfort levels of the vehicle's occupants. Assistant system 2 may further provide information on the landmarks or points of interest being driven by or located along the route. To enhance passenger safety, Assistant system 2 may feature voice commands for hands-free operation of systems like climate control and entertainment options, ensuring the driver can focus on the road.

Assistant system 2 may be further configured to pre-fetch trip-related information from its stored repository (e.g., locally stored maps or databases) or external resources as the vehicle changes its location. This can be done continuously as a background process and may not necessarily involve user requests or other forms of input. For example, assistant system 2 may generate and continuously update a list of gas stations, restaurants, parks, or other points of interest, within a certain distance from the vehicle and/or along its predicted path. It may also be configured to pre-generate advice, prompts, or questions that are related to the trip, points of interest and/or the ongoing passengers' conversation. Accordingly, when prompted or when the system otherwise determines appropriate, assistant system 2 can instantly output the respective advice, prompts, or questions, without delays that may be associated with preparing and generating them from scratch.

Assistant system 2 may further facilitate meaningful conversation between vehicle occupants, generating conversation starters or intelligent topic suggestions based on contextual understanding. By processing and storing the most recent portion of the conversation, the system can identify topics of interest, preferences, and sentiments of the passengers. Based on its vast knowledge base gained from training on extensive text data, the system generates conversation starters or topic suggestions tailored to the passengers' interests and conversational context, ensuring a more engaging and enjoyable experience.

For example, in case when the passengers were discussing a recent movie they watched together, assistant system 2, leveraging its contextual understanding, could recommend related movies or TV shows based on the discussed movie's genre, actors, or director. Alternatively, if the passengers were engaged in a conversation about an upcoming business meeting or work project, the system could offer insights or suggestions based on industry trends, news, or potential challenges.

Assistant system 2 may also proactively detect and resolve potential conversational dead ends by redirecting the conversation to a fresh topic. In such cases, the system may choose to ask open-ended questions or present thought-provoking ideas that can stimulate high-quality discussions among vehicle occupants. Additionally, the system can learn the preferences of frequent passengers over time to further tailor its conversational support. In the context of a family road trip, the system may facilitate inclusive conversations by offering topics suitable for all ages. It may suggest games or trivia questions aimed at keeping the passengers engaged and interested, alleviating boredom and enhancing the overall travel experience. By actively participating in the conversation and providing context-aware conversation starters or topic suggestions, the system could foster an environment where vehicle occupants can enjoy enriching, meaningful, and engaging interactions during their journey. Assistant system 2 may be configured to include the content of its output to the users (or its representation in any form, such as audio, text, tokens, encoded data, contextual data, vectors, etc.) into the information it stores in its memory in conjunction with the ongoing conversation between the users. In other words, the stored conversation may include responses from the systems as a part of it.

In emergency situations, assistant system 2 can proactively communicate with emergency services, sharing the vehicle's precise location-using GPS coordinates with a margin of error of less than 5 meters—and potentially critical data such as incident details gleaned from the recorded conversation. Instead of just responding to user commands, or in addition to that, assistant system 2 may also be configured to make proactive suggestions to the users based on the context of the conversation. For this purpose, assistant system 2 may include an indicator (e.g., LED) to communicate to the people that it has something to say. Furthermore, assistant system 2 may implement contextual control signal recognition where it would adapt its understanding of control signals based on the conversation's context. For example, the command "remind me" could have different implications based on the conversation, and the system should interpret it accordingly. For this purpose, it may incorporate behavioral learning where the system learns the user's common phrases, conversational habits, preferences, and adapts its responses and functionalities to suit individual user needs better.

Assistant system 2 may be further configured to provide a visual and/or audio signal indicating that it has information that may be relevant to the ongoing conversation or certain events related to the trip (e.g., emergency road closures that the system has just learned from accessing outside sources via wireless communication device 132). This may include a message on the display, an LED indicator, or short voice prompt delivered via speaker 142, e.g. "I have important information regarding your trip. Would you like to hear it?". The system can then further monitor the conversation to determine if the passengers (exemplifying users 202-204) decide to hear that information.

One or more LLMs employed in assistant system 2 may be trained to become more aligned with various aspects of the personalities of its users, taking into; account, for example, their specific ethics, moral values, religious and/or political preferences, age, and so on. This alignment may be performed initially, e.g., based on an initial questionnaire or dialog between the system and the users, and then updated continuously as assistant system 2 accumulates the history of conversations, storing the relevant information in its permanent memory, e.g., system memory unit 118.

According to one embodiment, assistant system 2 may be configured to act as a specific personality and further provide the user with the option to select which type of personality he or she prefers. For example, assistant system 2 can be configured to emulate the personality of a professional business consultant, offering concise, fact-based advice and prioritizing efficiency in communication. In a further example, in response to the user's request, assistant system 2 can be configured to respond in a more casual and friendly tone, using colloquial language and inserting humor into its responses. In a yet further example, the system can be configured to provide an option for an empathetic personality, where the provided responses will prioritize validation and emotional understanding. In addition to providing preset personalities, assistant system 2 may be configured to allow users to customize the personality traits according to their preferences and provide responses in a certain style (e.g., formal or informal), exhibiting certain attitudes (e.g., optimistic or realistic), or showing certain behaviors (e.g., proactive or reactive). This personalization can be achieved by adjusting the parameters of the base LLM employed in assistant system 2 or by implementing a layer of personality encoding on top of the base model. Assistant system 2 may also be configured to allow personality encoding to influence how the assistant interprets and responds to user input, thus shaping its 'behavior' according to the selected or customized personality. Assistant system 2 may further be configured to learn and adapt over time, refining its personality based on the user's feedback and interaction patterns. The parameters associated with such learnt behavior can be stored in non-volatile, long-term system memory unit 118 to allow for reusing such parameters in further conversations. Various preferences and parameters can be stored in system memory unit 118 and associated with specific user IDs such that when the user IDs are identified in further conversations, the respective preferences and parameters can be applied automatically to those conversations. These features can be advantageously implemented to create a more personalized and engaging user experience, as assistant system 2 assistant becomes better trained to the user's preferences and communication style.

According to one embodiment, assistant system 2 may be configured to perform various tasks which it can perform in the background and then return the result to the user(s) issuing the respective command when it is ready to do so. For example, a passenger exemplified by user 204 may request assistant system 2 to retrieve latest news on a subject. In response, assistant system 2 may use wireless communication device 132 to access external tools using an API call. Such a tool may be located on web servers and configured to browse the internet performing a search for the respective news. The response from the external tool may be processed and summarized by one of the LLMs utilized in assistant system 2 and the summary may be output to the user via speaker 142. According to one embodiment, assistant system 2 may be configured for automated task execution where, based on the context of a conversation, the system could automate certain tasks, such as sending emails, making reservations, or placing orders online. Assistant system 2 may be connected to the internet to constantly update its knowledge base and making it available to provide up-to-date responses to user queries.

For example, when assistant system 2 determines that the user wants to order food, it can assist the user with food ordering based on his or her preferences, dietary requirements, and the context of the ongoing conversation with other users (e.g., passengers) or user activity. Assistant system 2 continuously monitors the conversation and user activity to identify potential food ordering intent. This can also be triggered by explicit user commands, such as "Assistant, I want to order food," or through contextual cues, such as discussing meal plans or mentioning hunger during a long trip.

The food ordering process may be carried out through a series of steps that involve understanding the user's intent, gathering necessary information, and executing the order placement. Once the food ordering intent is recognized, assistant system 2 seeks confirmation from the user to proceed with the ordering process. It may ask, "Would you like me to assist you with placing a food order?" If the user confirms, the system moves to the next step. Assistant system 2 engages in a conversation with the user to gather their food preferences, dietary restrictions, and any specific requirements. This may involve asking questions like: "What type of cuisine would you prefer? Options include Italian, Chinese, Indian, etc.", "Do you have any dietary restrictions or allergies I should be aware of?", or "Is there a specific restaurant you'd like to order from, or shall I suggest some options?". The system uses natural language processing and machine learning techniques to understand the user's responses and build a profile of their preferences. Assistant system 2 may also search its memory for the respective user preferences. If this information is available in one of its memory units, the system may retrieve and use that information as a starting point.

Based on the user's preferences and location, assistant system 2 suggests a list of suitable restaurants or food delivery services. It may search interned or access internal or external databases for this purpose. Assistant system 2 It may provide the user with a brief overview of each option, including cuisine type, price range, and customer ratings. Once the user selects a food source (e.g., a drive-through restaurant, the system retrieves the menu and presents it to the user in an easily navigable format. It may highlight recommended dishes based on the user's preferences and popular items. Assistant system 2 guides the user through the menu, allowing them to select dishes, specify quantities, and add any customizations or special instructions. The system keeps track of the selected items and calculates the running total, including any applicable taxes or delivery charges.

In an exemplary scenario, let's consider that the user wants to order food from a popular restaurant chain called "FoodOrderingHub" while driving. FoodOrderingHub provides an online ordering API that allows third-party applications to place orders on behalf of users.

In this scenario, assistant system 2 confirms the user's intent by responding through the vehicle's audio system, e.g., by saying, "Sure, I can help you order food from FoodOrderingHub. Let's get started." Assistant system 2 checks if the user is authenticated and has a linked FoodOrderingHub account. If not, it prompts the user to provide their FoodOrderingHub credentials (e.g., username and password) or initiates an OAuth2 authentication flow to securely link the user's FoodOrderingHub account with assistant system 2. Once authenticated, a+ssistant system 2 retrieves the user's profile information, including their saved delivery address, payment methods, and order history, by making API calls to FoodOrderingHub's server using the obtained access token.

Assistant system 2 determines the user's current location using the vehicle's GPS module and reverse geocodes the coordinates using a geocoding API like Google Maps Geocoding API to obtain the user's address. It then sends a request to FoodOrderingHub's API endpoint (e.g., https://api.foodorderinghub.com/restaurants) with the user's location to retrieve a list of nearby FoodOrderingHub restaurants that deliver to the user's address. The API request is made using libraries like Python's requests or JavaScript's axios.

Assistant system 2 may be configured with one or more LLMs that includes the FoodOrderingHub's API documentation in its training data set. Alternatively, or in addition to this, assistant system 2 may be provided with the functionality of intelligently interacting with FoodOrderingHub's API by retrieving and interpreting the API documentation using such an LLM. This may the system to dynamically understand the structure and syntax of the API calls required to place a food order, even if the API specifications change over time. When assistant system 2 is first connected to FoodOrderingHub's services, it may send a request to the API documentation endpoint (e.g., https://api.foodorderinghub.com/docs) to retrieve the latest version of the API reference. The documentation may be provided in various forms that can be parsed and understood by LLMs. For example, the documentation may be provided in a structured format like OpenAPI (formerly Swagger) or RAML format for REST APIs, which can describe the available endpoints, request/response formats, and authentication requirements.

Upon receiving the API documentation, assistant system 2 employs the applicable LLM(s), to analyze and understand the natural language descriptions and code examples provided in the documentation. The LLMs should preferably be trained on a vast corpus of text data, including programming languages and API specifications, enabling them to comprehend the semantics and context of the API instructions. Assistant system 2 may utilize any of its memory units, e.g., contextual memory unit 116) for loading the API documentation for processing. Alternatively, the LLM may be provided with a separate, dedicated contextual memory unit that is used exclusively for the purpose of storing the context of API documentation or other documentation that describes rules and protocols for accessing and interacting with various external services and tools.

Assistant system 2 uses the LLMs to generate semantic summaries of the API endpoints and their functionalities, allowing it to map the user's intent to the appropriate API calls. For instance, when the user expresses their desire to place a food order, the system identifies the relevant endpoints for restaurant search, menu retrieval, order placement, and payment processing based on the LLM's understanding of the API documentation. To construct the actual API requests, the system utilizes the LLMs' language generation capabilities.

By providing the LLMs with the necessary parameters such as the user's location, selected restaurant, order items, and payment information, assistant system 2 generates the appropriate HTTP requests in the required format, including the correct URLs, headers, and request bodies as specified in the API documentation. For example, to place an order, CarAssist might generate a POST request to the/orders endpoint with a JSON payload containing the order details:

```
POST /orders HTTP/1.1
Host: api.foodorderinghub.com
Content-Type: application/json
Authorization: Bearer {access_token}
{
    "restaurant_id": "1234",
    "items": [
        {
            "menu_item_id": "5678",
            "quantity": 2,
            "customizations": ["extra_cheese", "no_onions"]
        },
        {
            "menu_item_id": "9012",
            "quantity": 1
        }
    ],
    "delivery_address": "123 Main St, Anytown, USA",
    "payment_method": "credit_card_123"
}
```

It may be appreciated that, by using LLMs to interpret the API documentation on-the-fly and generate the appropriate requests, assistant system 2 can adapt to changes in the FoodOrderingHub API without requiring manual updates to its codebase or re-training the LLM. Furthermore, if assistant system 2 encounters any errors or unexpected responses from the API, it can use the LLMs to analyze the error messages and implements solutions or troubleshooting steps autonomously from the user and without requiring user's input for troubleshooting.

Assistant system 2 presents the list of restaurants to the user through the vehicle's display unit and asks the user to select a restaurant by voice command or touch input. Once the user selects a restaurant, CarAssist retrieves the restaurant's menu by making another API call to FoodOrderingHub's menu endpoint (e.g., https://api.foodorderinghub.com/restaurants/{restaurant_id}/menu).

Assistant system 2 guides the user through the menu using a combination of voice prompts and visual displays. It asks the user to specify the desired dishes, quantities, and any customizations or special instructions. As the user makes selections, assistant system 2 dynamically updates the order summary, including the subtotal, taxes, and delivery fees, by making API calls to FoodOrderingHub's order calculation endpoint (e.g., https://api.foodorderinghub.com/orders/calculate). Once the user confirms the order, CarAssist proceeds to place the order by sending a POST request to FoodOrderingHub's order placement endpoint (e.g., https://api.foodorderinghub.com/orders). The request payload includes the user's authentication token, selected restaurant ID, order items, delivery address, and payment method. FoodOrderingHub's API processes the payment using the user's selected payment method (e.g., saved credit card or mobile wallet) and returns an order confirmation response, including an order ID and estimated delivery time.

Assistant system 2 communicates the order confirmation to the user through voice output, saying something like, "Your FoodOrderingHub order has been successfully placed. The estimated delivery time is 30 minutes, and your order ID is #ABC123." The system periodically polls FoodOrderingHub's order tracking API endpoint (e.g., https://api.foodorderinghub.com/orders/{order_id}/status) to get real-time updates on the order status. As the order progresses through different stages (e.g., preparation, out for delivery), assistant system 2 provides voice notifications to the user, keeping them informed about the status of their food order. If the user requests more detailed information, assistant system 2 can retrieve additional details from the FoodOrderingHub API, such as the delivery driver's name and contact number, and provide those to the user.

If the user chooses the pickup option instead of delivery, assistant system 2 integrated with the vehicle's navigation system guides the user to the restaurant's location. Once the order is placed and confirmed, assistant system 2 retrieves the restaurant's address from the FoodOrderingHub API and sends it to the vehicle's navigation module. The navigation system, powered by mapping technologies, calculates the optimal route from the user's current location to the restaurant, considering real-time traffic conditions and road restrictions. Assistant system 2 then provides turn-by-turn voice guidance to the user, keeping the user informed about the estimated time of arrival and any relevant updates on the order status received from the FoodOrderingHub API. As the user approaches the restaurant, the system offers parking suggestions based on available parking information and guides the user to the designated pickup area or parking spot. Once the user reaches the restaurant, assistant system 2 notifies them that they have arrived at the destination and provides any additional instructions for order pickup, such as entering the restaurant or using a specific pickup counter or drive-thru lane. By integrating with the vehicle's navigation system and leveraging location-based services, CarAssist offers a complete and convenient solution for users who prefer to pick up their food orders themselves. In the case of assistant system 2 being integrated into a driverless car, when the user chooses the pickup option, the system not only places the order through the FoodOrderingHub API but also automatically directs the autonomous vehicle to navigate to the restaurant's location.

Once the order is marked as picked up or delivered by FoodOrderingHub's API, assistant system 2 prompts the user to provide feedback on their experience. It can ask the user to rate the food quality, delivery speed, and overall satisfaction using voice commands or touch input on the vehicle's display. Assistant system 2 then submits the user's feedback and ratings to FoodOrderingHub's API endpoint (e.g., https://api.foodorderinghub.com/orders/{order_id}/feedback).

To facilitate an intelligent operation of assistant system 2 and endure a more seamless flow of information exchange, system 2 may be configured to wait for a moment when either the users are not engaged in the active conversation or none of the users is currently speaking (e.g., no active speech is detected via microphone 102). Assistant system 2 may be configured to use humor in its responses and may be further tailored to the conversation's context and user preferences, thereby making the trip more enjoyable. It may further be configured for an adaptive dialogue flow where the system adapts its dialogue style based on user's preferred communication style, historical conversations, and user feedback.

According to an aspect of this invention, by proactively monitoring the conversation, detecting the users' intent, and applying predictive generation to provide relevant information to the users, assistant system 2 may be configured to offer timely and helpful assistance without even being explicitly prompted, saving the users time and potential inconvenience.

For example, continuing the above example of in-vehicle implementation of the AI assistant, as the driver and passengers engage in conversation during their trip, assistant system 2 may continuously monitor and process their dialogue using its advanced natural language processing capabilities. By analyzing the semantic content and context of the conversation, the system may detect when the users express an intent to change or add a destination to their current trip. For instance, if the driver mentions, "I heard about this great new restaurant in the downtown area," and the passengers respond enthusiastically, assistant system 2 recognizes their potential interest in adding the restaurant as a new destination. Without being directly prompted, assistant system 2 applies its predictive generation capabilities to anticipate the users' needs and proactively gather relevant information. The system accesses real-time traffic and road condition data from external sources via its wireless communication module and API functionality. Upon detecting that there are road closures or significant traffic congestion on the route to the mentioned restaurant, assistant system 2 intervenes in the conversation by generating a natural language response: "I apologize for the interruption, but I couldn't help but overhear your interest in the new downtown restaurant. While analyzing the route, I discovered that there are road closures due to ongoing construction work on Main Street. Might I suggest an alternative route or a different restaurant nearby that avoids the affected area?" If the users respond affirmatively to the suggestion, assistant system 2 updates the conversational context to reflect the new preferred destination, recalculates the optimal route based on real-time traffic data, and proceeds to guide the users to the alternative restaurant or along the updated route.

According to one embodiment, assistant system 2 may be configured to automatically delete the recorded and contextual content of the conversation when the vehicle it turned off. For example, audio memory units 114 and contextual memory unit 116 may be of volatile memory type that requires power to maintain the stored information. Once the vehicle's engine is stopped, this would cease power to assistant system 2, including the respective memory units and cause all conversation-related recordings to be deleted for privacy.

End of Example 1

Example 2

Assistant system 2 is implemented within a smartphone where its hardware and/or software components are integrated into the user's mobile device and may be configured to work in conjunction with the device's built-in microphone, speaker, processor, memory, wireless communication capabilities, and peripherals such as wired or wireless (e.g., Bluetooth) microphones, headphones and/or speakers. In this implementation, assistant system 2 may be configured to facilitate a seamless and interactive communication experience between the smartphone user (exemplifying user 202) and the party on the other side of the line (exemplifying user 204). This implementation can aid users 202 and 204 in various scenarios including personal conversations, business calls, or on-the-spot information gathering.

For example, consider a scenario in which a user (user 202) is engaged in a phone conversation with a friend (user 204) discussing a suggested meetup location. Assistant system 2 continually records and retains the most recent segment of the conversation, dynamically adjusting the storage interval, which can range from 30 seconds up to 5 minutes based on user preference or available memory. As the discussion continues, the system processes and updates the contextual understanding of the ongoing conversation in real-time. Upon hearing a control phrase, such as "Assistant, find us a spot" by user 202, the system recognizes this input as a command and processes the user's subsequent request. Assistant system 2 then analyzes the previously stored conversation context to determine the desired parameters, e.g., the preferred distance from their current location. Suppose the context reveals the participants agreed on meeting somewhere within a 15-mile radius of their current position.

Using its built-in language model capabilities, such as tokenization, encoding, and contextual understanding, assistant system 2 searches for relevant information via internet access, which may be performed either directly (e.g., using its built-in web-browsing capability) or indirectly (e.g., using API calls to external tools specializing in finding such information). It may sift through external databases, local business listings, and user reviews to generate a list of top-rated meeting spots within the specified distance range.

Upon completion of the search, assistant system 2 presents user 202 with a list of three recommended locations to discuss with the friend. To avoid interruption of the ongoing conversation, the Assistant could provide these suggestions to the user in the form of audible or visual prompts, which user 202 can choose either to incorporate into the discussion or share only with the friend (user 204) on the other side of the line.

It may be appreciated that the illustrated smartphone implementation of assistant system 2 promotes efficient communication, timely information delivery, and enhanced user experience by assisting users in their daily lives, making conversations more productive and engaging.

End of Example 2

Example 3

Assistant system 2 is implemented as an intelligent, context-aware AI Assistant in online conferencing. In an online conferencing scenario, assistant system 2 can be seamlessly integrated into a web-based communication platform to provide real-time support, valuable insights, and dynamic context-aware assistance during video conferences, meetings, or webinars. The system's software can be embedded into widely used platforms such as Zoom, Microsoft Teams, or Webex, and can be activated upon user consent.

In this example, consider a web-based conference comprising 10 participants who are discussing a technology upgrade for their company. The participants are dispersed across four different time zones and are using different devices to join the meeting, including desktop computers, laptops, smartphones, and virtual reality/augmented reality (AR/VR) headsets or smart glasses.

When a user joins the online conference that employs assistant system 2, they may be presented with a privacy notice and consent form before they can fully participate in the meeting. The privacy notice informs the user about the types of data the AI assistant system will collect and process during the conference, such as voice and video recordings (e.g., to provide real-time transcription, sentiment analysis, and speaker identification), chat messages (e.g., to provide contextual assistance, answer questions, and generate meeting summaries), and user profile information (e.g., to personalize the meeting experience and enable features like automated introductions). The privacy notice may inform the user about their rights, such as the right to access, correct, or delete their personal data, and the right to withdraw their consent at any time. The notice should preferably provide clear instructions on how the user can exercise these rights and contact the meeting organizer or the AI Assistant system provider for any privacy-related inquiries. The consent form may be presented as a series of toggles or checkboxes, each corresponding to a specific data processing activity, or communicated verbally, with the user having an option to also verbally opt in or out. The user's consent preferences are securely transmitted to the AI Assistant system's backend and stored in a dedicated consent management database, along with a timestamp and a unique consent ID. The user's consent status may also be communicated to the meeting organizer and other participants, so they are aware of any limitations in the user's engagement with the AI Assistant system.

According to one embodiment, the AI Assistant system includes a comprehensive user consent management framework that ensures users have full control over their personal data and privacy preferences. This framework is designed to comply with relevant data protection regulations, such as the European Union's General Data Protection Regulation (GDPR) and the California Consumer Privacy Act (CCPA), and provides users with clear, concise, and timely information about their privacy rights and choices.

Throughout the online conference, the AI Assistant system may continuously check the user's consent preferences before performing any data processing activities. If the user has not consented to a specific activity, the AI Assistant system will not perform that activity for that particular user. For example, if the user has not consented to chat message analysis, the AI Assistant system will not process their chat messages or include them in the generated meeting summaries. If the user decides to withdraw their consent for a specific data processing activity during the conference, they can do so by accessing the consent management settings within the conference interface, including voice controls. The AI Assistant system will immediately stop the corresponding data processing activity and delete any related personal data that is no longer necessary. After the conference, the user can access a privacy dashboard provided by the AI Assistant system to view and manage their consent preferences across different meetings and organizations. The privacy dashboard may also be configured to allow the user to request a copy of their personal data processed by the AI Assistant system and to exercise their other privacy rights.

As the conversation begins, assistant system 2 recognizes the voices of individual participants. Assistant system 2 is configured to have two types of contextual memory. One type will have a set maximum time interval, e.g., 2 hours, for the expected maximum duration of the meeting. The other type will have an adjustable time interval, typically set to retain the most recent 5-30 minutes of the conversation in the memory. This time interval can be adjusted by the participants or the system depending on factors like meeting duration, topics under discussion, and available memory. Assistant system 2 transcribes the meeting in real-time while continuously monitoring and updating its understanding of the ongoing conversation.

To ensure efficient support, one or more control voices can be assigned to deliver control signals. These signals can be specific key phrases or unique gestures. For example, in this conference, the project leader's voice may be designated as the control voice. When the project leader says "AI Assistant," the system begins to actively listen to the command that follows the control signal.

During the meeting, the project leader (e.g., user 202) may ask for information about potential impact of the proposed technology upgrade on the company's budget. The control signal triggers the system, which retrieves the stored part of the conversation in its contextual memory and uses it as context for addressing the query. Simultaneously, it accesses internal/external databases and the intranet/internet to fetch the relevant data.

In response to the query, assistant system 2 processes the collected information on historical company budgets, price ranges of key components pertinent to the technology upgrade, and comparative market analyses. The system employs tokenization, encoding, contextual understanding, decoding, detokenization, and other relevant LLM techniques to deliver a comprehensive and accurate response in the form of a summary report, presented through voice or text, with key insights, estimated cost ranges, and potential budget impact percentages.

Assistant system 2 can also monitor the audio and visual cues of meeting attendees to track engagement and understanding of the presented information. For instance, it can identify which participants have inquiries or discussion points and then allocate appropriate speaking time to optimize meeting efficiency.

Assistant system 2 may also be trained to analyze the meeting agenda and track the progress of the meeting against this agenda. It can be configured to provide various alerts, such as a warning when the participants' conversation veers off-topic, or a reminder when there are several topics that have yet to be discussed. It may further be trained to provide a summary of the meeting at any point when the meeting is still in progress or immediately upon the conclusion of the meeting or upon a command from the project leader or meeting moderator. Assistant system 2 may be further trained to support collaborative decision making among a group of users where the system summarizes different viewpoints expressed during a discussion, suggests compromises, or helps to organize voting or consensus-building exercises. Assistant system 2 may also be configured to make proactive suggestions to the meeting participants based on the current context of the conversation and real-time processing, for example, suggesting related data, files, images, documents, or even strategy points based on the ongoing discussion. Assistant system 2 may be further configured to automatically transcribe the meeting and store the transcript for future reference and/or automated sending it to the participants upon meeting's completion.

Assistant system 2 may be configured with an intelligent conversation initiation functionality where it can initiate a conversation based on context. For example, it might ask the participants to introduce themselves at the beginning of the meeting or, acting on behalf of the meeting's host, make such introductions based on the relevant information provided to the system before the meeting. In another example, if it's the user's lunchtime, the system might ask if they would like to order food. In a yet further example, assistant system 2 may initiate an "icebreaker" communication exercise that can help the participants get to know each other and start the meeting in a fun and engaging way.

Assistant system 2 may be configured to provide on-the-fly translation between languages to support meeting participants that speak different languages. This feature can be particularly advantageous in international meetings, where language barriers might hinder effective communication, decision-making, and collaboration.

Using state-of-the-art natural language processing models, assistant system 2 can be configured to detect the primary language spoken by each participant and assign a designated language profile for them. Integration with advanced language translation models may help support a wide array of languages and dialects, ensuring accurate translations and maintaining the intended context.

During a multilingual meeting, as participants speak in their native languages, assistant system 2 continuously transcribes the conversation into text and translates the content into the preferred language of each participant. This real-time translation can be displayed through subtitled text at the bottom of the video conference screen or provided as an additional audio feed via the platform's user interface.

For instance, assistant system 2 is supporting a conference with 12 participants in which three primary languages are spoken: English, Spanish, and Japanese. When a Spanish-speaking participant addresses the group, assistant system 2 captures the audio input, processes it into text, and translates the content into both English and Japanese in real-time. English and Japanese-speaking attendees can either read the translated captions or, depending on individual preferences, listen to the AI-generated audio translation delivered through text-to-speech technology. Furthermore, assistant system 2 can also be designed to translate spoken questions, comments, or suggestions from one language to another. When a participant issues a command, the system takes into account the context of the conversation that is retained in the memory and formulates an appropriate response in the target language. Yet further, assistant system 2 may be configured to store essential terms, jargon, and phrases associated with the meeting's subject matter. This database can be utilized to ensure high translation accuracy and preservation of technical context when facilitating conversations in complex or industry-specific scenarios.

Assistant system 2 may be further implemented as an automated intelligent host or moderator for online conferences and equipped with advanced functionalities to proactively and dynamically manage conference proceedings. These functionalities can be integrated into the system's sophisticated architecture, enabling it to offer support that mimics or even extends beyond traditional moderator roles.

The intelligent moderation capabilities of assistant system 2 may also include managing the flow of conversation to ensure all participants have an equitable opportunity to contribute. By employing a combination of sound localization technology, speech recognition, and LLMs, assistant system 2 can detect which participant is speaking and the duration of their contribution. If a participant has not had the opportunity to speak, or if a dominant voice is occupying the conversation, the system may politely interject with a suggestion to invite input from quieter members of the conference.

Assistant system 2 may further implement a feature where it utilizes facial recognition and sentiment analysis technologies through using the feed from users' cameras, in combination with speech recognition and LLMs to discern the emotional responses and attentiveness of each participant. By doing so, assistant system 2 can accurately gauge the mood of the meeting and the engagement level of the participants. If the system detects signs of fatigue or loss of focus among participants, it may suggest implementing a short break or introduce interactive elements to re-engage the audience.

Assistant system 2 may be configured to provide on-demand access to relevant documents, slides, media, or other shared materials by understanding the context of the ongoing discussion during the online conference or meeting. For example, if a participant mentions a document or statistic not already presented, assistant system 2 can retrieve these materials instantly from its knowledge base (which may be exemplified by the respective portions of system memory unit 118, contextual memory unit 116, RAM 124, or external databases accessible by assistant system 2) to make them available within the conference interface without disrupting the flow of the meeting.

Assistant system 2 may be further configured to enhance the collaborative environment by detecting potential conflicts or disagreements among participants. Using language processing algorithms to identify disagreement cues, the AI Assistant can propose conflict resolution strategies or offer to initiate a separate breakout session for the involved parties to resolve their differences without affecting the main agenda of the meeting.

To facilitate a coherent and focused discussion, assistant system 2 may be configured to maintain an interactive agenda visible to all participants. For example, it can auto-generate prompts within the interface to notify the current speaker of time limits or if the topic is drifting. It can also provide gentle reminders to the human co-moderator/co-host or the speaking participant to transition to the next agenda item if the current topic has been adequately addressed. Furthermore, the AI Assistant can suggest relevant questions or points that may not have been considered yet, based on its understanding of the comprehensive meeting outline.

It may be appreciated that the integration of assistant system 2 in light of the embodiments described herein into the online conferencing platform may enable a significantly enhanced level of self-regulation and accountability among participants. The system can create a constructive environment where the meeting objectives are more likely to be met. For instance, if a participant makes a claim or presents data, the AI Assistant may offer real-time fact-checking or provide relevant historical context from previous meetings or documented sources, empowering participants to make well-informed decisions.

Moreover, assistant system 2 can be configured with the capacity to autonomously recognize and verbally highlight points of importance that have not been addressed during the discussion. This ensures that critical agenda items receive the necessary attention before the conference concludes. For example, if the subject of security measures for the new technology upgrade has been overlooked, the AI Assistant may intervene by posing a question or prompting the participants to discuss this particular aspect.

In scenarios where new participants wait to be admitted into the conference, assistant system 2 can perform preliminary screening based on predefined participant criteria (e.g., verify the user's credentials and registration for the respective meeting) or past participant behavior. Once the identity, credentials, and registration information of a participant are verified, the system can automatically grant them access or, if required, alert the moderator to authorize their admission manually.

As the conference progresses, the AI Assistant's functionality extends to answering organizational questions raised by participants. For instance, should a participant inquire about the schedule of upcoming conferences or deadlines related to the technology upgrade project, assistant system 2 could immediately supply the requested information, drawing from integrated calendar systems and project management tools. Assistant system 2 may be provided with the ability to note when scheduled breaks or time limits for certain agenda items are approaching. It can provide timely notifications to keep the conference on schedule. If the meeting is due to end within 10 minutes, the AI Assistant might notify the participants to begin concluding their discussions and prepare for the meeting's closure. In addition, the capacity for proactive suggestions can be made an integral part of assistant system 2. Depending on the context, the AI Assistant may recommend participants to review relevant earlier meeting records, reconsider unresolved issues from previous discussions, or even propose breaks based on the meeting's duration and observed participant fatigue.

Assistant system 2 described herein may include various mechanisms for detecting and blocking inappropriate user input in real-time, ensuring a safe and respectful interaction environment during online conferencing. This functionality may leverage advanced NLP techniques, transformer-based language models, and contextual memory management to effectively monitor and manage user inputs. Assistant system 2 may continuously monitors user input and processes this input using state-of-the-art NLP models, which may include tokenization, encoding, and contextual understanding components, which break down the conversation into manageable tokens, converting these tokens into a numerical form, and analyzing their context within the conversation. The system may employ a sliding memory window within contextual memory unit 116 to retain the most recent segments of the conversation, ensuring that the context is always current and relevant.

Assistant system 2 may incorporate processing units that, in turn, incorporate ethical filtering modules. These modules may be designed to detect harmful, unethical, or otherwise inappropriate content. The filtering process may utilize a combination of pattern recognition, sentiment analysis, and predefined rules that classify content based on its appropriateness. The system's language models may use attention mechanisms to weigh the relevance of different parts of the input, enabling precise identification of inappropriate content. Upon detecting potentially inappropriate content, Assistant system 2 may activate its blocking mechanism. This mechanism should preferably be integrated into the real-time processing pipeline and can immediately intercept and prevent the user input from being processed further or included in the conversation. The blocking action may be initiated by a control signal generated by the ethical filtering module, which flags the inappropriate content based on its classification criteria. Alternatively, the respective control signal may be invoked by the moderator or one or more trusted participants of the conversation, e.g., via a voice command, by sending a message to the control queue, or using a control panel that is used to operate the online conferencing meeting.

Assistant system 2 may further include features that allow for dynamic adjustment of content sensitivity based on user roles and context. Control voices and designated user profiles can set or modify the sensitivity levels of the ethical filtering module, enabling a tailored interaction experience. For instance, in professional online conferencing settings, the filtering sensitivity can be heightened to ensure strict adherence to communication standards. To handle extreme cases of inappropriate content, assistant system 2 may utilize its emergency shut-off protocol. This protocol can be triggered manually by a designated user (e.g., moderator) or automatically by the system when a severe breach of content standards is detected. Additionally, the system's predictive capabilities may be configured to anticipate potentially inappropriate inputs based on the conversation flow and context, enabling preemptive blocking before the content is fully inputted.

The blocking functionality may be integrated with the assistant's core processing units, including the processor 122, contextual memory unit 116, and audio processing unit 125. The processor 122 may be configured to handle the execution of the blocking mechanism, while the contextual memory unit 116 may be continuously updated to ensure that the context remains relevant and up-to-date. Audio processing unit 125 may be configured to aid in continuous monitoring and real-time response, offloading the respective tasks from the main processor (which may be exemplified by processor 122) of assistant system 2, ensuring that the blocking mechanism operates without noticeable delays.

It is noted that the described blocking mechanism may be adaptable to various online conferencing environments and can be scaled to different AI assistant implementations, from small team meetings to large-scale corporate conferences. The system's architecture supports updates to the ethical filtering rules and content classification criteria, allowing it to evolve and adapt to emerging content standards and user needs. Furthermore, while this content-blocking functionality is particularly described for implementations of assistant system 2 in online conferencing, it is not limited to this application and can be applied to other implementations of the system. For instance, in customer service chatbots, the system can ensure that interactions remain professional and free from inappropriate content. Similarly, in home automation systems, it can prevent inappropriate voice commands from being executed. Furthermore, in educational technologies, the AI assistant may be configured to maintain a respectful and conducive learning environment by blocking inappropriate inputs.

Assistant system 2 configured as an automated intelligent moderator may also oversee or perform various post-meeting activities. Upon the conclusion of the conference, the AI Assistant can be tasked with distributing minutes, action items, or follow-up materials to all participants. It can automate the scheduling of subsequent meetings based on participants' calendars and the urgency of outstanding agenda items.

It may be appreciated that, with the convenience of voice recognition, multi-device support, time zone flexibility, and real-time language translation and contextual and advanced-functionality support, assistant system 2 in online conferences can enhance information retrieval, presentation, and collaboration among participants, ultimately improving productivity and overall meeting experience. Through its contextual awareness and real-time adaptive functionalities, assistant system 2 can intelligently moderate discussions, address organizational needs, and enhance the overall efficiency and engagement of online conferences.

End of Example 3

Example 4

Figure 7:
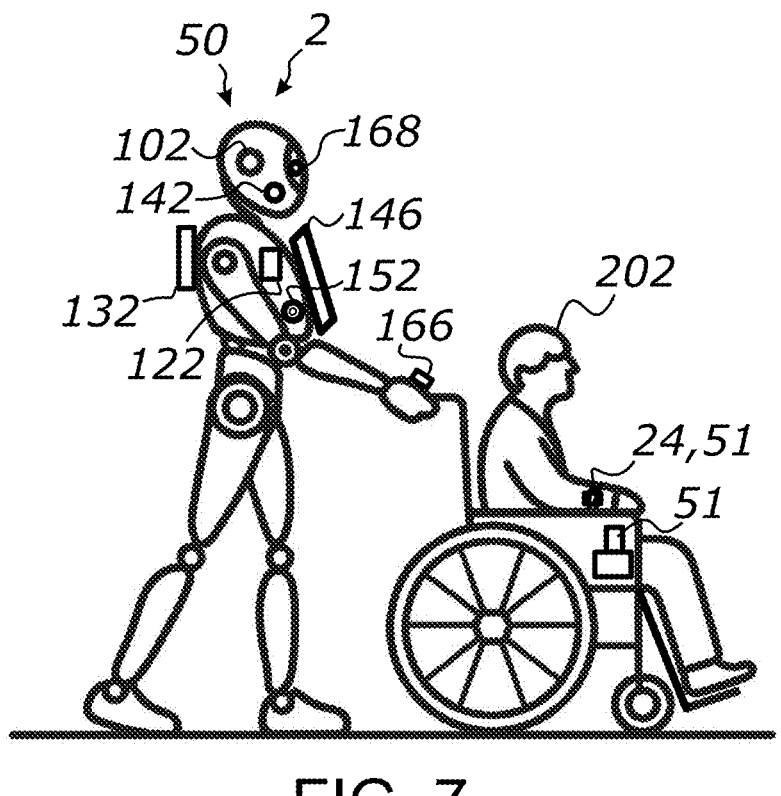
FIG. 7 is a schematic diagram depicting an AI Assistant system configured as a personal robot platform, according to at least one embodiment of the present invention.

Assistant system 2 is implemented as an intelligent, battery-powered personal robot assistant for an elderly person. In an exemplary use case, assistant system 2 is implemented within a personal robot platform 50 designed to assist an elderly person, Mr. Smith, aged 72, in his daily life at home. The personal robot platform, schematically depicted in FIG. 7 and referred to as "ElderlyCareBot", is equipped with a microphone, speaker, physical memory, processor, wireless communication device, battery, motors, optional wheels, articulated legs, tracks, and other components necessary for an integrated robotic platform to function and for integrating it with assistant system 2. According to one embodiment, ElderlyCareBot may be equipped with a set of articulated legs, mimicking human or animal locomotion, and configured to navigate uneven surfaces, climb stairs, or walk alongside the user. The robot has a compact form factor, approximately 80-150 cm in height and 40-60 cm in width, allowing it to navigate through the home independently, following Mr. Smith around the home when necessary, and adapt to Mr. Smith's environment.

The ElderlyCareBot incorporates a trained natural language processing model that enables it to generate meaningful conversations by employing the sliding conversation memory system, storing conversation context for a range of 3-5 minutes. The time interval is adjustable based on Mr. Smith's individual needs and preferences. It also includes a long-term memory (which may be exemplified by system memory unit 118) which may hold various information related to Mr. Smith's care, for example, phone numbers of Mr. Smith's physician, schedule of medications, daily reminders, etc. The platform further includes a pressure-sensitive button on its surface, which acts as the control signal for voice command triggering when pressed by Mr. Smith. The platform is also trained on a variety of voice commands and also on a variety of scenarios which can be interpreted as triggers or commands. The platform may also be configured with self-training capabilities, for example, to learn and consider Mr. Smith's daily routine, habits, etc. for adjusting its operation accordingly. It may also be configured to identify unusual patterns in Mr. Smith's activity, e.g., behavioral patterns that may suggest a potential need of external help. For example, ElderlyCareBot may be configured to recognize distress signals or signs of an emergency in the user's speech and could be programmed to take appropriate actions in response.

The ElderlyCareBot is capable of providing various services, such as reminders for medication and appointments, health monitoring, retrieving essential information, and offering companionship through seamless conversations. For instance, Mr. Smith may discuss his interest in gardening with the robot over a period of 15 minutes. During the conversation, he might ask for advice on a specific plant species or weather-appropriate planting times.

Upon pressing the control button, Mr. Smith's voice command, "Can you tell me the best time to plant roses in our region?" will be processed by the system. Assistant system 2 will access the stored context from the ongoing conversation, the internet, and any relevant databases to create a personalized response, such as, "Based on your location and local climate, the best time to plant roses is between late March and early April."

The ElderlyCareBot is also equipped to recognize and react to emergency situations. It may detect sudden changes in Mr. Smith's voice, elevated heart rate, or anomalous movement patterns using integrated sensors and initiate appropriate responses, such as calling emergency services or contacting a designated caregiver such that Mr. Smith receives prompt assistance in the event of a health crisis. The respective contact information may be stored in any of the memory units of assistant system 2 incorporated into the ElderlyCareBot. For example, it may be stored in system memory unit 118. In another example, it may be stored in contextual memory unit 116 and provided with a tag representing a sufficiently high priority to ensure that it won't be deleted or overwritten by other information that may have lower priority.

Unlike the previous in-vehicle example of assistant system 2, the system of the ElderlyCareBot may be configured to keep the conversational and/or contextual content in memory even if the robot is turned off or its main battery is depleted. For this purpose, assistant system 2 may be provided with its own battery and also use nonvolatile type of memory for audio memory unit 114 and contextual memory unit 116.

The ElderlyCareBot may be configured for multimodal input/output. For example, it may be equipped with a camera (which can be exemplified by camera 168) for capturing video and further provided with the ability to interpret the captured video to further enhance its interaction with Mr. Smith. The AI engine of the ElderlyCareBot may be trained to recognize and contextually interpret certain events that can be translated into actions useful for Mr. Smith. For example, the video processing software used in the system may be trained on a number of videos of falling objects and configured to detect Mr. Smith's fall. This detection may also be performed contextually, e.g., considering the flow and semantic content of the conversation between Mr. Smith and the ElderlyCareBot stored in contextual memory unit 116 and immediately preceding the fall event. Upon confirming the detection using this context, the ElderlyCareBot may contact emergency services before or after updating the respective contextual information in contextual memory unit 116.

According to one embodiment, the ElderlyCareBot may be configured to provide object description for visually impaired. For example, camera 168 can be utilized to recognize objects in Mr. Smith's environment. For instance, if Mr. Smith is visually impaired, the ElderlyCareBot can describe objects it sees to him. This could include reading labels on medicine bottles, describing the color and type of clothes, or identifying objects Mr. Smith is searching for. For this and related purposes requiring a comprehensive understanding of the environment, ElderlyCareBot may integrate visual input from camera 168 with other modalities, such as audio input from microphone 102 and possibly other sensors for temperature, proximity, or touch. In different embodiments, camera 168 may be incorporated into the body of the ElderlyCareBot robot or incorporated into a device wearable by Mr. Smith. According to one embodiment, ElderlyCareBot may include multiple cameras, some incorporated into it's body, some being wearable by Mr. Smith, and some being strategically distributed through the living space of Mr. Smith.

Various techniques, such as, for example, CNNs described above, may be utilized within the image recognition module of ElderlyCareBot to identify and categorize objects within the field of view of camera 168 and/or additional cameras or image sensors incorporated into or connected to the system. Object detection procedures may be implemented to discern and track various items in real-time, particularly those of relevance to the elderly user, such as medication bottles, mobility aids, personal belongings, or potentially hazardous items. To contextualize object recognition, the system may be configured to correlate visual information with audio conversations or commands. For example, if Mr. Smith inquires about his medication, the system would utilize camera 168 to scan the environment, recognize the medicine bottle, and guide Mr. Smith accordingly via voice communication or other forms of signals.

The ElderlyCareBot may further be integrated with a display (which can be exemplified by display 145) and provided with a capability to produce meaningful visual output to that display based on processing the context of ElderlyCareBot interaction with Mr. Smith and based on the environment in which this interaction occurs.

The camera integration enables the robot system to capture visual information from its surroundings, providing an extra layer of contextual data for processing and responding to Mr. Smith's needs. For example, if Mr. Smith inquires about a particular plant or object, the camera can capture an image of the item in question, allowing the system to analyze the visual input and generate an informed response based on that image. The display can serve as a visual interface for presenting various types of information to Mr. Smith, such as video tutorials, photographs of plant species to support gardening-related discussions, and visual cues or reminders for scheduled activities. The display can also be utilized for video calls with family members, healthcare professionals, or other contacts, allowing the ElderlyCareBot to facilitate and enrich Mr. Smith's social interactions.

Furthermore, the ElderlyCareBot may be configured to utilize the combination of the camera and display to offer immersive experiences tailored to Mr. Smith's interests and well-being. For instance, the robot may provide guided relaxation or physical therapy sessions by utilizing the camera to monitor Mr. Smith's posture and movements, giving real-time feedback and adjustment suggestions displayed on the screen. The ElderlyCareBot may be further configured to use the combination of integrated camera and display to adapt to various situations and cater to Mr. Smith's individual needs. For example, by observing Mr. Smith's facial expressions and body language using the camera, and combining these visual cues with audio input, the system can interpret emotional states and regulate its responses accordingly. As a result, ElderlyCareBot can provide empathetic companionship and support to Mr. Smith while addressing his daily concerns and activities more effectively.

According to various embodiments, the ElderlyCareBot may be equipped with advanced sensors and algorithms capable of interpreting the emotional state of the user. These sensors include, but are not limited to, visual (e.g., cameras), auditory (e.g., microphones), and physiological signal sensors (e.g., skin conductance, heart rate monitors). The ElderlyCareBot may be configured to process inputs from these sensors using sophisticated algorithms trained to recognize various emotional states such as stress, fear, anxiety, or distress.

In one embodiment, the ElderlyCareBot, equipped with a camera (e.g., camera 168) and a microphone (e.g., microphone 102), utilizes these components to monitor and analyze the user's emotional state continuously. Camera 168 captures visual cues such as facial expressions and body language, while microphone 102 picks up auditory signals like tone and pitch of voice, which are indicative of the user's emotional state. This data is processed by the robot's advanced algorithms models, several exemplary types of which have been described above, trained to recognize signs of distress, fear, anxiety, or other emotional states that might indicate a potential emergency or threat.

For instance, NLP models associated with or incorporated into ElderlyCareBot may be configured to analyze and interpret both verbal and non-verbal cues from Mr. Smith, as well as process speech patterns, tone, and choice of words to infer emotional states. The contextual understanding mechanisms employed by the ElderlyCareBot may be configured for interpreting the emotional tone behind Mr. Smith's statements or commands. This understanding is enhanced by the continuous updating of the contextual memory, which includes monitoring changes in Mr. Smith's tone and choice of words to further aid the inference of the emotional states. Transformer-based LLMs used by the ElderlyCareBot may be equipped with self-attention mechanisms that can weigh the importance of words in a conversation based on their relevance to the context and use those to detect subtle changes in Mr. Smith's emotional state. A multi-modal implementation of the ElderlyCareBot designed to process multiple forms of input, such as text, voice, and visual signals may be advantageously configured to assist in assessing the user's overall emotional state by combining visual cues (like facial expressions) captured by camera 168 and auditory cues (like tone of voice) captured by microphone 102. Sentiment analysis techniques embedded within the ElderlyCareBot may also be configured for the interpretation of the emotional tone or intent behind certain phrases or statements, e.g., to help detect or confirm distress or anxiety in Mr. Smith's speech. The ElderlyCareBot's ability to perform real-time contextual processing and to continually update its understanding of the user's context in real-time may be advantageously used to quickly recognize any sudden emotional shifts, potentially indicating distress or an emergency, and act upon.

When the ElderlyCareBot detects an emotional state that indicates a potential emergency or threat—for example, signs of extreme stress or fear—it automatically triggers the emergency shut-off system. This operation may be designed as per the earlier described embodiments, including a physically accessible switch, a voice-activated command, a wearable device, gesture recognition, or an automated emergency detection system. The activation of the emergency shut-off system leads to the ElderlyCareBot ceasing all its current operations and transitioning into a safe mode. In this mode, the robot maintains essential functions such as basic environmental awareness and the ability to send a distress signal or important information to emergency services or caregivers.

Moreover, the ElderlyCareBot provides feedback to the user upon activation of the emergency shut-off system. This feedback, which could be auditory, visual, or both, informs the user that the robot has recognized their distress and is taking appropriate action to ensure their safety. The system also includes a user-friendly mechanism for reactivation, allowing the user or a caregiver to easily return the ElderlyCareBot to its full operational state when deemed safe.

In some embodiments, the ElderlyCareBot may be equipped with one or more proximity sensors (which can be exemplified by proximity sensor 166) which may enhance the AI Assistant's ability to provide timely and contextually relevant assistance to elderly users. Useful examples of the proximity sensors include but are not limited to as passive infrared ("PIR") sensors, ultrasonic sensors, radio frequency identification ("RFID") sensors, Bluetooth devices, and the like. Additionally, or alternatively, the ElderlyCareBot may be configured to use camera 168 employ and/or a microphone 102 as proximity sensors, for example, by visually and/or audibly detecting that a user or other relevant objects are in proximity. The integration of proximity sensor(s), along with vision sensors, such as camera 168, and/or microphone 102, may provide the ElderlyCareBot with the ability to accurately determine the location and presence of the user or other significant items in the user's environment.

In some embodiments, the data collected from the proximity sensor(s) can be processed by the ElderlyCareBot to adapt its response accordingly. For instance, the ElderlyCareBot may adjust its output volume, response speed, or content based on the detected proximity of the user. The proximity data can further be used to automatically trigger specific actions or features of the ElderlyCareBot, such as turning on a built-in light when the user approaches, activating a fall detection mechanism, or initiating a communication with emergency services, based on the user's proximity and pre-defined settings.

The ElderlyCareBot may include a sound localization module that employs an array of microphones to identify the direction of the Mr. Smith's voice. The microphone array may be arranged in a known geometric configuration, such as a linear or circular array, with a predetermined spacing between the microphones. For example, the microphones may be evenly spaced at 90-degree intervals, with a diameter of 10 cm, to provide full 360-degree coverage.

The sound localization module processes the audio signals captured by the microphone array using beamforming techniques, such as delay-and-sum beamforming or minimum variance distortionless response (MVDR) beamforming. These techniques apply appropriate time delays and amplitude scaling to the signals from each microphone, based on the known array geometry and the expected direction of the user's voice, to constructively combine the signals from the desired direction while minimizing the contributions from other directions. The resulting enhanced signal is then analyzed using direction-of-arrival (DOA) estimation algorithms, such as the multiple signal classification (MUSIC) algorithm or the steered response power phase transform (SRP-PHAT) method, to determine the azimuth and elevation angles of the user's voice relative to the microphone array. The audio output device, such as a speaker or an array of speakers, is mounted on a motorized platform or an electronically steerable acoustic transducer that can be physically rotated or electronically steered to direct the generated conversational response towards the estimated direction of the user's voice. The sound localization module continuously updates the direction estimates based on the real-time audio input, allowing the system to track the user's movements and maintain accurate directional response delivery. The module is calibrated during the initial setup process using known sound source positions to ensure accurate direction estimation and response steering.

In an exemplary implementation, the ElderlyCareBot's audio output device may consist of a circular array of six small loudspeakers mounted on the robot's head, just below the microphone array. The loudspeakers may be independently controlled by a digital signal processor (DSP) that applies appropriate time delays and amplitude scaling to the generated conversational response signal to create a focused directional beam aimed at the estimated direction of the user's voice. The sound localization module continuously updates the direction estimates at a rate of 10 Hz, allowing the ElderlyCareBot to track the user's movements and maintain accurate directional response delivery even if the user is moving or changing positions. The module may be calibrated during the initial setup process by placing the ElderlyCareBot in a known position and having the user speak from predefined locations around the robot, with the DSP adjusting the beamforming parameters to optimize the directional response for each location.

According to one embodiment, the ElderlyCareBot is equipped with a beacon localization system to enhance its ability to locate and assist Mr. Smith in various predefined situations. This system leverages the use of small, wireless beacon devices 51 strategically placed throughout Mr. Smith's living environment, including those that can be carried by or accompanying Mr. Smith's (e.g., on his body or on a personal wheelchair, as schematically pictured in FIG. 7), allowing the ElderlyCareBot to accurately determine its position relative to these beacons and navigate to Mr. Smith's location when needed. According to some embodiments, beacon devices 51 may be based on Bluetooth Low Energy (BLE) technology, which offers low power consumption, low cost, and reliable short-range communication. Each beacon device 51 periodically broadcasts a unique identifier that can be detected by the ElderlyCareBot's built-in BLE receiver. By measuring the received signal strength indicator (RSSI) of these beacon signals, the ElderlyCareBot can estimate its distance from each beacon and triangulate its position within the living space. Wireless beacon device 51 which is designed to be carried by Mr. Smith may be incorporated into his cell phone. Alternatively, Mr. Smith's cell phone may be configured to act as a wireless beacon and interact with ElderlyCareBot and other beacon devices 51 accordingly.

To set up the beacon localization system, caregivers or family members place the beacon devices at strategic locations throughout Mr. Smith's home, such as in the bedroom, bathroom, kitchen, and living room. The beacons are configured with predefined location tags (e.g., "bedroom," "bathroom," etc.) that are associated with their unique identifiers. The ElderlyCareBot is then programmed with a map of the living environment, including the locations of the installed beacons. In predefined situations where Mr. Smith may require assistance, the ElderlyCareBot uses its beacon localization system to quickly and accurately navigate to his location. These situations can be triggered either manually by Mr. Smith or automatically based on specific events or conditions. For example, Mr. Smith may use a manual trigger and summon the ElderlyCareBot to his location by pressing a button on a wearable device, such as a smartwatch or pendant. When the button is pressed, the wearable device sends a signal to the ElderlyCareBot, which then uses its beacon localization system to navigate to Mr. Smith's location and provide assistance. In another example, an automatic Inactivity trigger may be employed. The ElderlyCareBot can be programmed to monitor Mr. Smith's activity levels using a combination of motion sensors and the beacon localization system. If Mr. Smith is detected to be inactive (e.g., not moving) for an extended period in a specific location, the ElderlyCareBot can automatically navigate to that location to check on his well-being and provide assistance if needed.

In a further example, an automatic fall detection trigger may be employed. The ElderlyCareBot can be integrated with a fall detection system that utilizes wearable sensors (e.g., accelerometers and gyroscopes) to detect sudden movements or impacts indicative of a fall. When a potential fall is detected, the system sends an alert to the Elderly-CareBot, which then uses its beacon localization system to quickly navigate to Mr. Smith's location and assess the situation. If a fall is confirmed, the ElderlyCareBot can then take appropriate actions, such as notifying emergency services or caregivers. In a yet further example, an automatic medication reminder trigger may be employed. The ElderlyCareBot can be programmed with Mr. Smith's medication schedule and use its beacon localization system to locate him when it's time to take his medications. The robot navigates to Mr. Smith's location, reminds him to take his medications, and can even guide him to the location where the medications are stored if needed.

The beacon localization system of the ElderlyCareBot may be further designed to detect the presence of mobile RF-emitting devices like cell phones and other personal electronic devices to trigger various predefined events and actions, e.g., as described above, or to control electrical loads, such as lighting, air conditioning, or security systems, in a designated space, such as Mr. Smith's home. The beacon localization system may include an RF detection unit that identifies the presence of RF-emitting devices within a specific range by capturing signals emitted from these devices, particularly including those in standby or idle modes, and a load control device interconnected with the RF detection unit. The load control device may be configured to adjust the electrical power supply to the load based on the occupancy status determined by the RF signals. Useful examples of such systems include nut are not limited to cellular phone occupancy sensing lighting control systems described in U.S. Pat. No. 11,092,938, the disclosure of which is incorporated herein by reference in its entirety.

According to one embodiment, the beacon localization system may employ a signal strength detection method in which the system monitors the strength of RF signals within a specified frequency range. Cell phones, even in standby mode, periodically transmit signals to the nearest cell tower to update their status or check for messages. By setting a threshold signal strength, the beacon localization system can identify the presence of a phone based on these emissions. According to one embodiment, the beacon localization system may employ a signature analysis method that leverages the fact that every mobile phone has a unique RF fingerprint based on its make, model, and the protocols it uses. The beacon localization system may be designed to detect and analyze these RF signatures to differentiate between different types of devices and identify active phones even when they are not engaged in active communication. According to one embodiment, the beacon localization system may employ a pseudo base station technique that is mimicking a cell tower signal to trigger or prompt phones within a certain range to respond as they would to an actual network tower. This response can confirm the presence of Mr. Smith's phone. According to one embodiment, the beacon localization system may employ a carrier wave detection technique. Cell phones periodically send carrier waves to the network to indicate their readiness to receive a call or message. By detecting these carrier waves, which occur even when the phone is not actively used, the beacon localization system can identify the presence of Mr. Smith's phone. Other techniques may also be used, e.g., detecting the harmonics generated by electronic devices, including cell phones. Harmonic frequencies are byproducts of the fundamental frequencies used in device operation and can be an indicator of a device in standby mode. A further method may involve analyzing the difference in background RF energy levels over time. An increase in RF energy in the environment could indicate the activation of a device, even if it is just to maintain a network connection.

ElderlyCareBot may be configured to detect the presence or absence of Mr. Smith or other people in the surrounding space and perform various useful functions in response to such detection. For example, it may be configured to turn lights and/or air conditioning system on (e.g., in response to the detection of Mr. Smith in the space) or off (e.g., when ElderlyCareBot determines that Mr. Smith left the space. It may also dynamically control a thermostat in Mr. Smith's house in response to such detection, dim lights in various parts of the house, and arm/disarm the alarm system in the house. ElderlyCareBot may be configured to fully utilize its learning and predictive capabilities to determine the need of performing such actions. According to one embodiment, in contrast to a conventional system that determines occupancy based on various signatures of human's presence (e.g., motion detection, etc.) ElderlyCareBot may be configured to additionally utilize reasoning and predictive learning based on past behavior of Mr. Smith to determine or confirm the determination of the need to perform such action. For instance, by monitoring Mr. Smith movements and analyzing the ongoing conversation, ElderlyCareBot may determine the intent of Mr. Smith to leave the house in a few minutes. Consequently, as ElderlyCareBot does not detect the presence of Mr. Smith in the space for a predefined period of time (e.g., 15 minutes, 30 minutes and so on), it may conclude that Mr. Smith has left the house and proceed with arming the alarm system.

ElderlyCareBot may be configured to operate physical switches on user's behalf (like light switches, thermostat dials, and appliance buttons) to control pre-built appliances, lighting, alarm audio/video systems, etc. ElderlyCareBot may incorporate manipulator arms equipped with dexterous hands capable of gripping and turning or flipping switches. These hands may include articulated fingers with a soft, non-slip surface to grasp slick knobs or toggle switches without excessive force. The robotic hands and arms may be equipped with sensors that can measure and adjust the force and torque applied, e.g., to avoid damaging the switches or the surfaces around them. To effectively interact with physical switches, tactile sensors can be embedded in the robot's fingers and palms. ElderlyCareBot may be configured to use such sensors to determine when contact has been made with a switch and how much pressure is needed to operate it without using excessive force. It may use proximity and position sensors to determine ElderlyCareBot's position relative to the switch, ensuring accurate alignment of its hands before attempting to flip or turn a switch. It may use visual sensors, such as cameras, to identify the type and position of switches. Advanced image recognition algorithms may be utilized to differentiate between switch types and determine the appropriate method to operate them (e.g., pushing, turning, flipping). ElderlyCareBot may use machine learning models trained on different types of switches and knobs to improve its accuracy and efficiency over time. By learning from each interaction, the robot can better understand the nuances of various switches' operation.

According to one embodiment, ElderlyCareBot incorporating dexterous hands may be further configured to perform other tasks that require fine motor skills and manipulation capabilities. For example, ElderlyCareBot may be configured to assist Mr. Smith with dressing tasks, such as buttoning shirts, zipping jackets, or tying shoelaces. The dexterous hands could also be used to help with grooming activities, like brushing hair or shaving. In the kitchen, the ElderlyCareBot could use its hands to open containers, prepare simple meals, or safely handle and wash utensils and dishes. Additionally, ElderlyCareBot may provide assistance with Mr. Smith's hobbies and leisure activities that require manual dexterity, such as painting, knitting, or solving puzzles. The hands could be equipped with sensors for touch, pressure, and temperature, as well as cameras for visual feedback, enabling the robot to perform tasks with precision, gentleness, and adaptability. Machine learning algorithms could be employed to continually improve the robot's dexterity and its ability to handle a wide variety of objects and tasks over time, based on its interactions with the user and the environment. ElderlyCareBot may be further configured to use its dexterous hands and advanced vision/ multimodal capabilities to operate Mr. Smith's personal computer under Mr. Smith's directions, e.g., using computer's keyboard and mouse for inputting commands and computer's monitor for visually interpreting and understanding the displayed content, enabling it to navigate applications and perform tasks as instructed.

According to one embodiment, the ElderlyCareBot is configured to interpret and understand the content displayed on an external device, such as Mr. Smith's personal computer monitor. This capability may be used to guide Mr. Smith through various tasks, such as troubleshooting the operating system, navigating unfamiliar software applications, or completing online transactions. The ElderlyCareBot uses its camera 168 to capture the visual information displayed on the external monitor. The captured images are processed using advanced computer vision techniques, such as optical character recognition (OCR), icon and button detection, or screen layout analysis, to extract relevant information and understand the current state of the software application or operating system.

The extracted information is then analyzed using a combination of rule-based reasoning, heuristic algorithms, and machine learning models to determine the appropriate actions or steps required to complete the task at hand. For example, if Mr. Smith is having trouble locating a specific setting in an unfamiliar application, the ElderlyCareBot can visually guide him through the menu structure, highlighting the relevant buttons or options to click.

The robot provides step-by-step instructions to Mr. Smith using natural language generation techniques, explaining each action in clear and concise terms. It can also use visual cues, such as pointing gestures or on-screen annotations, to draw Mr. Smith's attention to specific elements on the monitor. Throughout the process, the ElderlyCareBot maintains a context-aware understanding of the task progress, tracking Mr. Smith's interactions with the software and adjusting its guidance accordingly. It can offer proactive suggestions, anticipate potential challenges, and provide timely interventions to ensure a smooth and successful completion of the task.

In addition to guiding Mr. Smith through various tasks on his personal computer, the ElderlyCareBot can also be configured to directly control the computer on Mr. Smith's behalf or under his direction. This capability allows the robot to perform actions and navigate software applications independently, reducing the cognitive and physical burden on Mr. Smith. To enable direct control, the ElderlyCareBot establishes a secure connection with Mr. Smith's computer using wireless communication protocols, such as Wi-Fi or Bluetooth. The robot is equipped with software drivers and APIs that allow it to emulate human input devices, such as a keyboard and mouse, and interact with the operating system and applications running on the computer.

Mr. Smith can issue voice commands to the ElderlyCareBot, instructing it to perform specific actions on the computer. For example, he can say, "ElderlyCareBot, please open my email application and read my latest messages." The robot uses its natural language processing capabilities to understand the command and translates it into a series of keystrokes, mouse clicks, or touch gestures required to complete the requested action. The ElderlyCareBot's computer vision system continuously monitors the computer screen, tracking the state of the applications and providing real-time feedback to Mr. Smith. It can read out important information, such as email subject lines or notification messages, and wait for Mr. Smith's confirmation before proceeding with further actions.

In situations where Mr. Smith is unsure about how to perform a specific task, he can ask the ElderlyCareBot for assistance. The robot can then take control of the computer and demonstrate the necessary steps, while providing verbal explanations and visual cues to help Mr. Smith understand the process. Mr. Smith can observe the robot's actions and learn from them, gradually building his own digital skills and confidence. The ElderlyCareBot's direct control capability may also be advantageously used to perform tasks on Mr. Smith's behalf when he is unable or unwilling to do so himself. For example, if Mr. Smith is feeling tired or unwell, he can ask the robot to complete a task, such as filling out an online form or sending an email, without having to physically interact with the computer himself. To ensure the security and privacy of Mr. Smith's digital interactions, the ElderlyCareBot preferably implements robust authentication and authorization mechanisms. For example, it may be configured to require Mr. Smith to provide voice-based authentication or biometric verification before accessing sensitive information or performing critical actions on the computer.

In one embodiment, the ElderlyCareBot system incorporates a swarm of AI assistants that work collaboratively to provide comprehensive care and support for Mr. Smith and, optionally, his family. The swarm consists of multiple specialized AI agents, each designed to handle specific tasks or aspects of the user's well-being. These agents communicate and coordinate with each other through a decentralized, multi-agent architecture, leveraging the principles of swarm intelligence.

The swarm may include a personal care agent which is configured to assist the users with daily living activities, such as dressing, grooming, and hygiene. It uses the ElderlyCareBot's robotic body with dexterous hands and visual perception capabilities to provide gentle and precise support. The swarm may include a medication management agent configured for tracking the user's medication schedule, reminding them to take their medications on time, and ensuring the correct dosages are administered. It can also monitor the user's vital signs and alert healthcare professionals if any anomalies are detected. A physical activity agent may be used to encourage the user to engage in regular physical activity, tailored to their abilities and fitness level. It can guide the user through exercises, monitor their progress, and adapt the activity plan as needed. A nutrition and hydration agent may monitor the user's food and water intake, suggest healthy meal options based on the user's preferences and dietary restrictions, and assists with meal preparation using the ElderlyCareBot's manipulation capabilities. A social interaction agent may facilitate social connections and interactions for the user, whether through video calls with family and friends, online communities, or in-person events. It can also serve as a companionable presence, engaging in natural conversations and providing emotional support. A home safety agent may monitor the user's home environment for potential safety hazards, such as tripping obstacles, electrical risks, or gas leaks. It can alert the user and take proactive measures to mitigate risks, leveraging the ElderlyCareBot's mobility and manipulation capabilities. An emergency response agent may be invoked in case of an emergency, such as a fall or a sudden health issue, this agent quickly assesses the situation, contacts the appropriate emergency services, and provides real-time information and support until help arrives. A cognitive stimulation agent may engage the user in mentally stimu-lating activities, such as puzzles, games, and conversations, to help maintain cognitive function and prevent age-related cognitive decline.

The swarm of AI assistants of ElderlyCareBot may be configured to operate on a shared knowledge base, which includes information about the user's preferences, health status, daily routines, and home environment. The agents may continuously learn and adapt based on their interactions with the user and each other, using machine learning tech-niques to improve their performance over time. According to one embodiment, the robotic body of ElderlyCareBot may serve as the physical embodiment of the swarm, equipped with sensors, actuators, and interfaces that allow the AI assistants to perceive, interact with, and manipulate the user's environment. The robot's onboard computing resources may be allocated dynamically among the agents based on their current tasks and priorities.

In an alternative implementation, the swarm of AI assis-tants may be distributed across multiple physical devices, creating a decentralized network of intelligent agents that collaborate to support the elderly user. This distributed swarm approach may have advantages in certain applica-tions to enhance scalability, flexibility, and fault-tolerance of the ElderlyCareBot system.

The physical devices in the distributed swarm may include a central hub which is configured as a primary computing device that hosts the core AI algorithms, knowl-edge base, and coordination mechanisms for the swarm. It can be a powerful edge computing device or a cloud-based server, depending on the available resources and privacy considerations. The swarm may further include wearable devices, such as smartwatches (which is exemplified as a smart watch 24 in FIG. 7), pendants, or other wearable devices equipped with sensors for monitoring the user's vital signs, activity levels, and location. These devices may host the personal care agent, medication management agent, and physical activity agent, for example, providing real-time data and personalized support to the user.

The physical devices in the distributed swarm may further include smart home devices or a network of connected devices, such as smart speakers, cameras, thermostats, and appliances, distributed throughout the user's home. These devices may host, for example, the home safety agent, enabling comprehensive monitoring and control of the home environment. The physical devices in the swarm may further include one or more mobile robots, such as the ElderlyCare-Bot, that can navigate autonomously within the user's home. These robots may host the cognitive stimulation agent, for example. The physical devices in the swarm may further include tablets, smartphones, and other similar personal devices used by the user and their family members, e.g., hosting the social interaction agent and providing interfaces for communication, information access, and remote monitoring. A smart medication dispenser may be configured as a specialized device that hosts the medication management agent, ensuring accurate and timely dispensing of medica-tions while tracking adherence. The distributed swarm may further incorporate dedicated emergency response devices, such as panic buttons or fall detection sensors, that host the emergency response agent and can trigger immediate alerts and assistance when needed.

The agents may communicate through secure wireless protocols, such as Wi-Fi, Bluetooth, or cellular networks, exchanging data, updates, and commands in real-time. The central hub may act as the primary coordinator, managing the overall workflow and decision-making processes of the swarm. It continually aggregates and analyzes data from the various devices, updates the shared knowledge base, and orchestrates the actions of the individual agents. The hub also handles the AI model training and optimization, ensur-ing that the swarm adapts and improves over time. The distributed nature of the swarm may be advantageously used to enable dynamic task allocation and resource management. For example, if one device becomes unavailable or fails, its tasks can be immediately reassigned to other devices in the network, enhancing the resilience and availability of Elder-lyCareBot. Furthermore, the distributed swarm may be configured for the integration of third-party devices and services, such as smart home platforms, telehealth providers, or community support networks. This feature can be advan-tageously used to extend the capabilities of the ElderlyCare-Bot system and provide a more comprehensive and inte-grated care experience for the user(s).

It may be appreciated from the above description that assistant system 2 within the ElderlyCareBot may be con-figured to provide comprehensive support for elderly indi-viduals, like Mr. Smith, by offering valuable information, reminders, companionship, tasks, and emergency assistance, while competently storing and processing conversation and/ or multimodal context to create personalized responses and services. The integration of multi-modal processing, GPT models, advanced AI capabilities, and other described fea-tures, the ElderlyCareBot may further enhance the utility of the system and provide an environment—and context-aware companion capable of enhancing the quality of life and safety of elderly or disabled users like Mr. Smith.
End of Example 4

Example 5

Assistant system 2 is implemented into a user group gaming scenario where one or more users are playing a video game that incorporates one or more AI characters. One particularly useful example of the types of games where assistant system 2 can be implemented is the so-called Role-Playing Game (RPG), which is a genre of games in which players assume the roles of characters in a fictional setting and can act out these roles within a narrative, either through literal acting, or through a process of structured decision-making regarding character development.

Assistant system 2 is configured to act as an AI compan-ion or opponent in an immersive gaming experience, enhancing the overall gameplay and providing dynamic and intelligent interactions with the players. The system is integrated into the game's framework and uses advanced natural language processing and machine learning tech-niques to analyze the players' inputs, interpret their inten-tions, and respond accordingly within the context of the game world. The AI characters are designed to communicate with each other using both text input and speech capabilities provided by assistant system 2, according to the principles described in foregoing embodiments and examples.

During gameplay, assistant system 2 continuously monitors the actions and commands of the players, taking into account their individual playing styles, preferences, and strategies. It uses the stored contextual memory and real-time processing to offer personalized feedback, advice, or guidance to the players, helping them navigate the game world, make strategic decisions, or overcome challenges. The AI characters created by assistant system 2 can exhibit a wide range of behaviors and personalities, providing a more engaging and immersive gaming experience.

Assistant system 2 can generate dynamic questlines, dialogue options, and interactive responses that adapt to the players' decisions and performance, ensuring a unique and customized gaming experience for each individual. Whether acting as a cooperative teammate, a challenging opponent, or a supportive helper, assistant system 2 enhances the gameplay by providing intelligent and contextually relevant responses and interactions in real-time.

By incorporating assistant system 2 into the gaming environment, users can enjoy a more interactive and immersive experience, feeling a deeper sense of engagement and connection with the game world. The AI characters created by assistant system 2 contribute to the richness and complexity of the gameplay, elevating the overall gaming experience and providing players with new challenges and opportunities for exploration.

In a more specific example of gameplay, a group of players forms a team to complete a mission in a virtual world. The AI characters, controlled by assistant system 2, are an integral part of the team and actively participate in the game. Through the use of natural language processing and advanced conversational AI techniques, the AI characters can engage in dynamic and context-aware conversations with the human players and each other using both text and speech. During gameplay, the AI characters can exchange information, make tactical decisions, and coordinate their actions based on the game state, objectives, and the context of the ongoing conversation. This ability to communicate intelligently enhances the overall gaming experience, creating a more immersive and lifelike virtual world. The use of speech capabilities allows for more seamless and natural interactions between human players and AI characters, making the gameplay interactions feel more realistic and engaging. Furthermore, by encoding, decoding, and contextual understanding of the users and AI characters communications in real time, and with dynamically controlling the contextual memory allocation on sliding window basis, assistant system 2 can provide quick and intelligent information processing and responses, without undue lags and delays, thus enhancing the players' experience.

Additionally, the AI characters can adapt their dialogue based on the personalities and traits assigned to them. This customization allows players to experience unique character interactions and adds depth to the overall narrative of the game. The AI characters can provide information, give advice, and even engage in banter, contributing to a dynamic and evolving game environment.

In addition to enhancing the gameplay experience, assistant system 2 can also provide real-time assistance and suggestions to help players improve their skills, discover hidden treasures or secrets within the game, or unlock new achievements and levels. The AI characters created by assistant system 2 can analyze the players' decisions, provide hints or clues when they are stuck, or offer strategic advice to overcome difficult challenges, making the gaming experience more enjoyable and rewarding.

Through the integration of assistant system 2, user group gaming reaches a new level of interactivity, intelligence, and immersion. The intelligent AI characters created by assistant system 2 enhance the gameplay experience by providing contextually relevant responses, generating dynamic challenges, and offering real-time guidance and assistance. This integration creates a more immersive and engaging gaming environment, enriching the experience for players and fostering a deeper connection with the game world.

According to one embodiment, assistant system 2 in a user group gaming scenario includes an emergency shut-off system designed, e.g., for deactivating the AI companion or opponent in response to user(s)' requests. For example, this functionality of assistant system 2 may be advantageously used to prevent any inappropriate behavior from the respective AI component. In this embodiment, assistant system 2 is equipped with a protocol that allows players or moderators of the game to instantly disable AI-driven characters within the game. This protocol can be activated through specific in-game commands, physical buttons on the gaming console or controller, or voice commands. The system is programmed to recognize these commands as an immediate directive to cease all AI character interactions and activities.

Upon activation of the emergency shut-off, assistant system 2 immediately transitions the AI characters into a dormant state. This action is accompanied by a notification to the players, ensuring them that the AI component is no longer active. This feature may be essential in maintaining a safe and comfortable gaming environment, allowing players to have immediate control over the AI characters' participation in the game, especially in situations where their behavior deviates from the expected norm or rules of the game. Furthermore, to preserve the continuity of the gaming experience, assistant system 2 may be configured to automatically adjust the game dynamics in response to the deactivation of the AI component. This could involve redistributing the AI character's roles and responsibilities among the remaining active characters or adjusting the game's difficulty level, ensuring that the overall gaming experience remains uninterrupted and enjoyable, even in the absence of the AI component. Additionally, the emergency shut-off system may be designed to collect feedback from the players regarding the reason for the AI deactivation. This feedback may be used by the game developer or designated supervisor, or moderator to improve the AI characters' behavior, responses, and interactions in future gaming sessions, aligning them more closely with the intended guidelines and/or user expectations and preferences.

End of Example 5

Example 6

In this use case, assistant system 2 is implemented as an Online Multiplayer Gaming Assistant (OMGA) in a multiplayer game involving 6 players across 3 different continents. The game, named "Kingdom Conquest", can be a co-operative strategy involving players working together to defeat opponents and claim territories on a virtual map. OMGA utilizes the power of LLMs, integrating real-time voice recognition and contextually intelligent processing capabilities to manage and respond to each player's textual and voice commands. It is configured to support a variety of input and output devices the users may use, and its voice recognition software is capable of identifying at least 10 distinct voices simultaneously, enabling it to understand and interact with each of the game's players. OMGA also uses a robust contextual memory mechanism, preserving user preferences, gaming styles, and the last 20 to 60 minutes of in-game chat for improved contextual understanding.

Upon the utterance of a control phrase by a player, such as "Game Assistant," OMGA shifts into a active command reception mode, awaiting further instructions from the user. For instance, upon hearing the control phrase "Game Assistant, strategy?" from player 1, OMGA leverages its extensive knowledge of "Kingdom Conquest" mechanics, rules, and the ongoing game's context to provide a strategic suggestion to the player, like "Considering the current territorial advantage of your team, it would be best to fortify your defenses in the southern sector."

OMGA can adapt to player strategies, promoting an engaging gaming experience through reactive dialogue that aligns with the game's thematic context. For example, it generates dialogue fitting the medieval theme of "Kingdom Conquest", enhancing player immersion and interaction. OMGA can reference a stored database of over 200,000 medieval-themed phrases and select a suitable response upon detecting dialogue cues from the players, adding depth and realism to the in-game communication.

In addition, OMGA can assist players in learning and following the game rules and strategies. It could provide real-time feedback on player decisions, minimizing the beginner's learning curve and aiding experienced players in making advanced strategic decisions. It could also integrate an external-access module, allowing connection with online gaming forums, strategy guides, and databases for real-time retrieval of relevant gaming tips and player queries.

Adopting an active learning model, OMGA can recognize player patterns and preferences over time, acclimatizing to their gaming style for truly personalized assistance. This includes analyzing player actions over a set of 50-100 games, storing essential information, and updating the respective player profiles in its non-volatile, long-term system memory unit, which has a capacity ranging from 5 GB to 2 TB.

Furthermore, OMGA can provide emergency communication services, integral to dealing with unexpected network outages or real-world disturbances affecting a player. It can communicate, on the player's behalf, with the other players explaining the situation and suggesting a game pause or reschedule.

It may be appreciated that the integration of assistant system 2 as an Online Multiplayer Gaming Assistant may transform gaming experiences, delivering real-time strategic assistance, enhancing in-game dialogue, facilitating learning, and providing emergency communication support for an interactive and immersive gaming session.
End of Example 6

Example 7

Assistant system 2 is implemented within an "edutainment" system at an AI-enabled interactive children's museum. The museum contains multiple educational exhibits spread across its five primary sections: Paleontology, Astronomy, Environmental Science, Engineering, and Interactive Arts. Using advanced IoT technology and customized learning techniques, assistant system 2 is designed to captivate young minds and enthrall the visitors through engaging interactive experiences.

In this scenario, the IoT network of assistant system 2 is composed of a range of specialized devices placed strategically throughout the museum, such as smart displays, child-friendly wearable devices, and interactive kiosks. Each of these devices includes a microphone, a speaker, a powerful on-board processor with a runtime memory of 4 GB to 16 GB, a high capacity storage memory of at least 64 GB, and integrated communication capabilities (Wi-Fi and/or 4G LTE) for seamless operations. Assistant system 2 is designed to foster contextual understanding and engage in real-time with visitors, primarily children ranging from 6 to 14 years old.

As visitors journey through the museum, assistant system 2 records and processes their voices in real-time using advanced language model techniques. A configurable amount of this conversation-typically the last 5 to 15 minutes—is retained in the memory to capture the context of their exploration and interests. This memory system is designed to dynamically adapt based on the visitor's behavior, storage capacity, and device efficiency.

For instance, when children enter the Astronomy section and engage with a touch-sensitive, interactive model of the solar system, they may pose questions such as "How far is Mars from the Earth?" Upon recognizing the visitor's query, assistant system 2 retrieves the context of the recent conversation from the smart display memory and processes this information along with the question. Utilizing its Artificial Intelligence engine and online capabilities, the system accesses various databases to provide an accurate response, e.g., "The distance from Earth to Mars varies throughout the year, ranging from about 54.6 million kilometers to 401 million kilometers."

Besides answering direct questions, assistant system 2 may also be configured to proactively impart information, sharing fascinating facts about the exhibits or suggesting other activities based on the visitor's interest. For example, if kids are roaming the Paleontology wing with marked interest, the system could suggest other related areas to visit, such as the on-site archeological dig simulator. Such relevant suggestions aim to enhance the visitor's learning experience and keep them engaged with additional interactions.

Assistant system 2 in the museum can act as a virtual tour guide, providing detailed insights about exhibits and fueling children's curiosity. For example, it may explain how a dinosaur fossil was discovered, how a space telescope works, or what actions we can take to protect our environment. Moreover, it may also be programmed to provide quizzes, puzzles or games related to the exhibits to foster an immersive, experiential learning environment.

The wearable devices can be provided with the capabilities of assistant system 2 to offer personalized experiences for each child. These devices may incorporate a simple button-press control system designed for child-friendly use. Upon pressing the button, children can ask questions or record observations that can be processed by assistant system 2. As the wearable interacts with different smart displays across the museum, the child can receive custom responses and feedback based on their previous interactions and expressed interests.

The system may further be designed to recognize potential emergencies, such as a child feeling unwell, and take immediate action, such as alerting the museum staff or medical professionals. It also ensures that all data is handled with strict adherence to privacy norms and may be programmed to automatically erase stored conversation data at the end of the day or upon visitor's request. In summary, assistant system 2 implemented within an interactive museum environment can provides an enriched learning experience for children and acts as an adaptive, dynamic, and engaging companion throughout their exploration journey, encouraging curiosity and meaningful learning while ensuring a fun and memorable visit.

End of Example 7

Example 8

Assistant system 2 is implemented within a healthcare facility, such as a hospital, which serves numerous patients and staff across various departments. In this setup, multiple implementations of assistant system 2, referred to as "MediBots", are strategically placed within the hospital, including, for example, waiting areas, patient rooms, medical wings, and nursing stations. The MediBots are designed to aid both patients and hospital staff in effective communication and information accessibility. Each MediBot comprises a microphone, speaker, physical memory, processor, wireless communication device, and optional peripheral devices such as a display or touchpad.

The MediBots are configured to retain and dynamically update conversation context ranging from one minute to an hour based on the situation and available memory. The MediBot in nursing stations, for instance, may retain information on a sliding basis for around 60 minutes in light of the multifaceted discussions occurring within the station. In the case of a patient's room, the MediBot might save and update the most recent 10-30 minutes of conversation to adequately assist and engage with the patient.

To issue a command to the MediBot, a selected control signal can be used, such as a specific key phrase like "Hey, MediBot," or a selected button on the system panel. Upon detecting the control signal, the assistant system immediately prepares to process the user command that follows. For instance, in the case of a nurse issuing a command to retrieve a patient's prescription details from the hospital database, the MediBot identifies the name of the patient and the required information based on the stored conversation context. Simultaneously, it accesses the relevant patient database to fetch the necessary information, subsequently presenting the nurse with an accurate and comprehensive response.

The MediBots are also equipped with emergency functionality. They can detect notable changes in a patient's voice or recognize specified emergency phrases. Once an emergency is detected, the MediBot can signal the nearby staff instantly, summon an emergency medical team, or contact a designated emergency contact based on the specific situation.

In a patient room, the MediBot can engage with the patient, providing reminders for medication, interpreting medical information, and even entertaining the patient by sharing interesting facts or news, enhancing the patient's overall hospital stay. All these are made possible by employing real-time tokenization, encoding, contextual understanding, decoding, and detokenization techniques.

For meeting the diverse needs of the hospital, the system may constantly update its knowledge base, accessing medical databases, drug indexes, and the latest medical research findings. This way, the MediBot can provide up-to-date medical information, thereby enhancing its utility in the complex hospital environment.

Each MediBot may include an LED indicator to inform staff and patients when it has relevant information to share based on the ongoing conversation or specific scenarios. The LED can blink with distinctive patterns, each associated with a unique situation such as new lab results, medication reminders, or upcoming appointments.

The MediBot may also be trained to track the progress of medical meetings, helping to ensure that all planned topics are covered. It can even provide real-time transcriptions of these meetings for record-keeping and further analysis, storing these in its non-volatile, long-term system memory unit.

In summary, MediBots operating with assistant system 2 can provide a dynamic, context-aware, and effective support system for both the patients and medical staff, enhancing communication, information provision, and decision-making within a hospital setting, representing useful AI-driven technology targeted at improving the quality and reliability of healthcare.

Similarly to the above-described example regarding the ElderlyCareBot, MediBot may include an emergency shut-off system which may have the same or similar features and may further incorporate additional features specifically tailored for applications within a healthcare facility. MediBot may be likewise designed to immediately deactivate the MediBot in response to specific commands or situations that may require the suspension of its operations. For example, a patient or staff member can issue a voice command such as "MediBot, cease operation," or use a designated emergency button located on the MediBot or a remote control device provided to the hospital staff. Upon receiving such a command, the MediBot instantly shuts down its active processes, including conversation monitoring, data retrieval, and interaction functionalities.

This immediate deactivation may be advantageously implemented in the anticipation or mere likelihood of scenarios where continued operation of the MediBot may lead to complications, such as during sensitive medical procedures, in cases of patient discomfort, or when private or confidential information is being discussed. The system ensures that the MediBot ceases to record or process any information during these periods, thereby upholding patient privacy and staff confidentiality. To further enhance the usability of this feature, the MediBot is equipped with an intuitive interface that allows hospital staff to quickly and easily reactivate the MediBot once the need for privacy or interruption has passed. This could involve a simple reactivation command or a physical interaction with the MediBot, such as pressing the power button (e.g., as exemplified by power switch 152).

Additionally, the emergency shut-off system may be integrated with the hospital's central monitoring system, allowing for centralized control and management. Hospital administrators or designated personnel can remotely deactivate one or more MediBots as needed, ensuring that control over the MediBots' operations is maintained at all times. This centralized control may be particularly useful in emergency situations, such as power outages or system malfunctions, where an immediate response is necessary.

In the event of an emergency shut-off, the MediBot is configured to retain the most recent data in its memory temporarily. This data retention ensures that once reactivated, the MediBot can seamlessly resume its functions without losing crucial information or context, thereby maintaining the continuity of care and support.

End of Example 8

Example 9

Assistant system 2 is implemented as a part of AI-augmented customer service and reception system. More specifically, is implemented as a hotel concierge robot, "ConciergeBot", designed to provide comprehensive guest services and support within a hotel environment. The ConciergeBot is equipped with advanced AI capabilities, natural language processing, and a user-friendly interface to interact with hotel guests, mimicking interactions with a human concierge. The ConciergeBot is preferably designed with a friendly and approachable appearance, featuring a sleek and modern design that complements the hotel's aesthetic. Its voice and mannerisms are carefully crafted to provide a warm and professional demeanor, ensuring that guests feel welcomed and well-attended throughout their stay.

The ConciergeBot is integrated with the hotel's management system, allowing it to access guest information, room availability, and reservation details securely. When a guest arrives at the hotel, the ConciergeBot greets them and initiates the check-in process. Using voice recognition and natural language understanding, the robot engages in a conversation with the guest, verifying their reservation details and preferences.

During the check-in process, the ConciergeBot captures the guest's information, such as identity verification and payment details, using its built-in camera and secure payment processing capabilities. It then generates the room key and provides the guest with all the necessary information about their stay, including room number, Wi-Fi access, and hotel amenities. As the guest settles into their room, the ConciergeBot remains available to assist them throughout their stay. Guests can interact with the robot using voice commands or through the hotel's mobile app, which is seamlessly integrated with the ConciergeBot's system. The robot can provide a wide range of information and services, adapting its responses based on the guest's specific needs and preferences. For example, if a guest inquiries about local attractions, the ConciergeBot accesses its extensive knowledge base of the area, considering factors such as the guest's interests, age group, and previous conversations. It provides personalized recommendations, along with detailed information about opening hours, ticket prices, and transportation options. The robot may be further configured to assist with making reservations or arranging transportation on behalf of the guest.

The ConciergeBot is programmed to handle various other concierge-related functions within the hotel. It can provide information about hotel amenities, such as the gym, spa, or restaurant, and assist with making reservations or bookings. If a guest needs any additional services, such as laundry or room service, the ConciergeBot can process their requests and coordinate with the appropriate hotel staff to ensure prompt service delivery. To further enhance the guest experience, the ConciergeBot is equipped with multi-lingual support, enabling it to communicate with guests from different countries and linguistic backgrounds. It can detect the guest's preferred language and switch its communication mode accordingly. Throughout the guest's stay, the ConciergeBot continuously learns and adapts to their preferences and behaviors. It uses machine learning algorithms to analyze the guest's interactions, feedback, and patterns, allowing it to offer increasingly personalized and proactive assistance. For example, if a guest frequently inquires about vegetarian dining options, the ConciergeBot will proactively suggest suitable restaurants or menu items during future interactions. Additionally, guests can directly instruct the ConciergeBot to memorize specific information, such as dietary restrictions or preferred room types, using simple voice commands. This information may be stored in any of the memory units of (e.g., in system memory unit 118 or in a protected part of contextual memory unit 116) and prioritized for future interactions.

When it's time for the guest to check out, the ConciergeBot handles the process, e.g., by verifying the guest's satisfaction with their stay, processing any outstanding payments, and generating the necessary invoices and receipts. The robot also gathers feedback from the guest to continually improve its services and the overall hotel experience. End of Example 9

Similarly, Assistant system 2 may be implemented within information desk systems. For example, in malls, airports, and public buildings, a number of strategically distributed Assistant systems 2 can provide directional guidance, event information, and assistance with various customer queries.

Example 10

Assistant system 2, named "CarAssist", is integrated into the user's vehicle and is, is and the user wants to order food from a popular restaurant chain called "FoodHub" while driving. End of Example 10

According to one embodiment, assistant system 2 may be configured to dynamically adjust the sliding window size based on the complexity or intensity of the conversation, number of participants, or the level of noise in the environment. For instance, during a complex discussion, the window size could be increased to provide better context.

According to one embodiment, assistant system 2 may be configured to operate multiple sliding windows of different lengths. This could allow the system to retain both immediate and slightly longer-term context, which could be useful for different types of commands or for better processing the commands. For example, assistant system 2 may be configured to first use a shorter-term context for understanding the essence of the user's command and, if it determines that the shorter-term context insufficient for this, it may use the longer-term context. In a more specific example, assistant system 2 may have a shorter-term context stored in memory which reflects the last 5 minutes of the conversation and further have a longer-term context stored in that memory which reflects the last 30 minutes of the conversation. When the user command refers to a topic that was discussed 15 minutes ago, assistant system 2 may first search for the relevant context in the 5-minute shorter-term context memory and, if no such context is found there, it may further search for the relevant context in the 30-minute longer-term context memory.

In other words, the memory structure of assistant system 2 may be composed of multiple layers each designed to store and process information at different time frames, contextual background or levels of abstraction. This multilayer memory structure may be configured as a hierarchical memory structure designed to efficiently manage a vast amount of data, segregating it based on relevance and complexity. The hierarchy may be based on a division between short-term and long-term memory, for example. Short-term memory may be configured to retain recent inputs and be more transient, while long-term memory may be configured to store more significant or frequently accessed information over extended periods. As discussed above, there can be many levels of hierarchy. All these levels may be implemented simultaneously.

While the hierarchical memory may be made static in certain embodiments, it is preferred that it is continuously updated with new information as the conversation is ongoing or the environment is changing. This dynamic configuration may be advantageously used to allow the model to evolve its understanding and knowledge base, adapting to new data or changes in context over time.

The GPT model's architecture of assistant system 2 may be configured to filter and prioritize information based on its contextual relevance. When processing new input, assistant system 2 can assess which parts of the stored data in its memory are relevant to the current context. This selective attention ensures that the model focuses on pertinent information, enhancing its accuracy and coherence.

According to one embodiment, the GPT model may be configured to store the outputs of the neural network layers from previous processing steps and reusing them when processing new inputs. The outputs of the neural network layers may be referred to as "hidden states". According to an aspect of the GPT model's architecture of assistant system 2, a hidden state may be defined as a representation of the input data as it moves through the layers of the network. Each layer of the model processes the input data (or the output from the previous layer) and generates a new hidden state, which captures certain features or aspects of the input.

The caching mechanism implemented in assistant system 2 may be configured to store these hidden states from previous processing steps instead of discarding the output of each layer after it's used, the model saves these outputs in a cache. This cache may be an integral part of the neural network architecture of assistant system 2 and may include memory structures specifically designed to store and retrieve the hidden states. It may be configured to act like a short-term memory, holding onto important information that the model has processed in the recent past. According to one embodiment, the cache of hidden states may be stored in contextual memory unit 116.

According to one aspect, portions of the memory utilized by assistant system 2 that are outside of the main context window may be considered an additional or latent context pertaining to the interaction of the system with the user(s) and may be utilized to effectively extends the memory capabilities of the LLM, allowing it to handle more information than its immediate context window can hold. This latent context may include portions of relevant information stored in contextual memory unit 116 that are not immediately part of the respective LLM's working memory or context window.

According to one embodiment, the hierarchical memory architecture of assistant system 2 comprises multiple levels of storage, each designed to capture and retain different aspects of the conversational context over varying timescales. At the lowest level, the main context memory is implemented as a high-speed cache, such as a dedicated portion of the processor's on-chip SRAM. This memory is organized as a circular buffer, where new conversational data is continuously added while the oldest data is evicted in a first-in-first-out (FIFO) manner. The size of this main context buffer is dynamically adjusted based on factors such as the complexity of the conversation, the number of active participants, and the available system resources.

According to one embodiment, the main context memory may be surrounded or enveloped by several layers of larger but slower storage that form the latent context memory. These layers may be implemented using off-chip DRAM and non-volatile storage like SSDs. The latent context memory can be structured as a set of key-value stores, where the keys represent unique identifiers derived from the conversational data (e.g., semantic hashes, speaker IDs, timestamps) and the values contain the actual contextual information (e.g., encoded dialog segments, knowledge graph embeddings, metadata).

An indexing mechanism may be employed to efficiently map between the keys and their corresponding storage locations in the latent memory hierarchy. This index may be maintained as a multi-level tree structure, with each level corresponding to a different storage layer and granularity of access. The index tree may be kept partially resident in the main context memory for fast lookups, while the lower levels are paged in from the latent storage on-demand. As the conversation progresses and the main context buffer fills up, assistant system 2 may selectively offload contextual data to the appropriate levels of the latent memory hierarchy. This offloading process may be guided by a set of heuristics that estimate the future relevance and access patterns of different parts of the context. For example, entities or topics that are frequently mentioned or central to the discussion may be kept in the lower-latency layers, while less salient information is migrated to higher levels.

When assistant system 2 needs to retrieve or reason over past contextual information, it may first search the main context buffer. If the required data is not found there, the system may traverse the index tree to locate and fetch the relevant key-value pairs from the latent memory hierarchy. The retrieved contextual segments may then be integrated back into the main context buffer, potentially evicting other less pertinent data in the process. To optimize memory utilization and access efficiency, assistant system 2 may employ various compression, deduplication, and prefetching techniques. For instance, recurring patterns or entities in the conversation may be detected and stored as compact references rather than full copies. Likewise, the system may proactively load contextual data from the slower storage layers into the main buffer based on predictive models of the conversation's progression.

It may be appreciated by those skilled int the art that this hierarchical memory architecture can allow assistant system 2 to efficiently capture, retain, and retrieve conversational context over extended timescales while adapting to the dynamic nature of the interaction. Implementing the combination of a high-speed main context buffer and multi-layered latent storage may be advantageous, for example, for optimizing a balance between fast access to immediately relevant information and scalable retention of the full conversational history.

Figure 8:
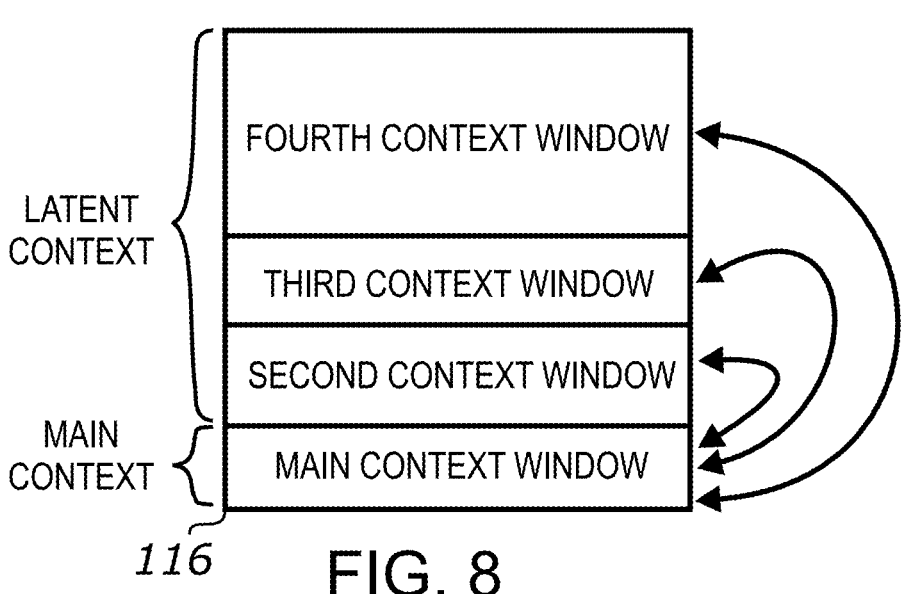
FIG. 8 is a schematic diagram showing an exemplary structure of contextual memory unit which includes a main context and a latent context, according to at least one embodiment of the present invention.

For instance, referring to FIG. 8, which schematically depicts an exemplary structure of contextual memory unit 116, contextual memory unit 116 may include a number of sections. On of the sections corresponding to the main context window forms a main context which is immediately available to the LLM. The other sections corresponding to several supplemental context windows (exemplified by the second, third, and fourth context windows) cumulatively form a latent context which is not immediately available to the LLM but can be dynamically moved in and out of the main context as needed.

Specifically, the GPT processor of assistant system 2 may be configured to determine such a need (e.g., based on the current task, user query, or its own analysis of the state of the conversation) and dynamically retrieve information from the latent context, copying it into the main context window and thus making it immediately available to the LLM. This can be done, e.g., using function calls, on the level of the GPT model (e.g., by means of the GPT-based function calls) or using the software component of assistant system 2 running by processor 122. This function call can specify what information is required from the latent context. Additionally, contextual information may be transferred back and forth between the supplemental context windows. For instance, older information or information that is deemed by assistant system 2 as being less relevant to the most recent portions of the conversation may be copied or moved from the main context window to the second context window, from the second context window to the third context window, and so on, in a cascading fashion.

While each of the main and secondary context windows may be filled on a sliding-window basis (e.g., as a FIFO queue), assistant system 2 may also be configured such that certain portions of the context windows are protected from being erased, thus forming a persistent portion of the context memory. The persistent portions of the context windows may be configured to store information (e.g., facts that are not likely to change during the conversation) that may be considered important by the GPT model even if it is not immediately relevant to the context of the ongoing conversation. Useful examples of such information that may need to be preserved include but are not limited to the names of the participants of the conversation, their preferences (e.g., food, travel, or entertainment preferences), various factual information (e.g., their birthdays or age). This information may include what was previously spoken by the participants or otherwise learned by the system (e.g., by searching external databases or web in response to the users' previous requests).

According to one embodiment, contextual memory unit 116 is configured to store conversational context data for a predetermined time period. This period can be set by system parameters or user preferences and is managed by the context management algorithm. The algorithm evaluates conversation data and retains it within the main context window for the specified duration, ensuring that relevant context is available for processing user commands. After this period, the data may be either transitioned to secondary context windows or discarded based on the system's dynamic memory management protocols. This predetermined time period can be dynamically adjusted based on factors such as the nature of the conversation, user interactions, and system performance metrics. For example, depending on the applications, this predetermined time period may be set to 5 minutes, 10 minutes, 15 minutes, 20 minutes, 25 minutes, 30 minutes, 40 minutes, 45 minutes, 1 hour, 1.5 hours, 2 hours, 2.5 hours, 3 hours, 5 hours, 8 hours, 10 hours, 12 hours, 24 hours, and so on.

According to one embodiment, the priority tags associated with user inputs may be considered when managing the multi-level context windows in assistant system 2. The main context window, which is immediately available to the LLM, and the secondary context windows, which may form the latent context, may both be affected by the priority tags.

In this embodiment, when a user input is processed and added to the context windows, its associated priority tag may also be stored alongside the input. This can be used by the system to maintain the hierarchy and prioritization of user inputs within the context windows. For the main context window, which is filled on a sliding-window basis, the priority tags may be configured to influence the order in which inputs are replaced when the window reaches its capacity. For example, inputs with higher priority tags may be protected from being erased and remain in the main context window for a longer duration. This functionality may be advantageously selected to ensure that the most important and relevant inputs, as determined by the user hierarchy, are readily available to the LLM for generating responses.

In the secondary context windows, which form the latent context, the priority tags may be used to determine which inputs are moved from the main context window to the secondary windows when the main window is full. Inputs with lower priority tags are more likely to be shifted to the secondary windows, while inputs with higher priority tags are retained in the main window. However, certain portions of the context windows, both main and secondary, may be designated as persistent memory. These persistent portions may be protected from being overwritten, regardless of the priority tags associated with the inputs. The persistent memory may be used to store critical information that remains relevant throughout the conversation, such as the names of the participants, their preferences, and important factual information.

According to one embodiment, assistant system 2 is configured with a hierarchical information retrieval process. In this process, assistant system 2 determines whether or not the information requested by a user is contained in the main context window and, if not, then sequentially search for the respective information in the secondary context windows (e.g., starting from the second context window and then proceeding to third and fourth in an ascending order), and then in system memory unit 118 and/or RAM 124. The order the search may be determined based on the method or sequence of storing information in the respective memory units or segments). If the requested information is still not found, assistant system 2 may further proceed to searching in external data store 230 or search the web (e.g., by utilizing API calls). If the requested information is still not found, assistant system 2 may generate a synthesized response based on the interpretative inferencing capabilities of its integrated LLM.

The latent context may also include relevant portions of the information stored in system memory unit 118 and/or RAM 124. Similarly, when the LLM needs information from those portions of the latent context, assistant system 2 can retrieve this information and bring it into the main context, where the LLM can process it. Additionally, in various scenarios, e.g., when the combined storage provided by the on-board memory of assistant system 2 is insufficient to store all of the relevant latent context, data store 230 may also be utilized for this purpose.

According to one embodiment, assistant system 2 may be configured to identify and store information that is or can potentially be relevant to the current conversation, but storing which in the main context window immediately available to the LLM is not necessary or practical. For example, this may include facts, experiences, preferences, etc., about the user(s) or assistant system 2 that are of less priority than the other information present in the main context window and storing which would require a size of the main context window which is either beyond what is available or what is optimal. According to different embodiments, the priority of each piece of information or user input may be determined by the LLM based on various factors, including the context of the previously stored portions of the conversation, time stamps, priority tags, user ID tags, any any their combination.

The information, either in the raw form or in a tokenized, compressed, or summarized form, may be stored in the latent memory (e.g., in portions of contextual memory unit 116 that is not immediately available to the LLM processor, in system memory unit 118, or RAM 124. This memory caching mechanism may also be advantageously used to transfer historical portions of the conversation that have been already processed by the LLM processor on a sliding-window basis, as the user(s) interaction with assistant system 2 continues. This type of storage may also be used to store the entire history of events processed by the LLM processor. The latent memory may also be configured to store and search through a large collection of documents, providing an archival storage for document or past conversation databases. Assistant system 2 may be configured to add new documents or conversation histories to this database and access existing ones, enabling it to perform comprehensive document or past conversation analysis that involves correlating information across multiple sources, documents, or conversations.

The latent memory may be indexed using various identification information, such as time stamps or their equivalents, user IDs or their equivalents, voice IDs or their equivalents, document IDs or their equivalents, event IDs or their equivalents, page numbers, paragraph numbers, column numbers, line numbers, locations (e.g., GPS coordinates, addresses, landmarks, or any their equivalents), priority tags, or any combination of those. Assistant system 2 may be configured with various software-based mechanisms to quickly search and retrieve relevant information from the latent memory, along with the respective identification information and raw representation (e.g., exact/verbatim citations or phrases). It may be appreciated that incorporating the latent memory into assistant system 2 in such a way may be advantageously used to enhance the system's ability to maintain a rich, detailed understanding of the user(s) or the context of the conversation, and provide exact information, even when the conversation spans multiple sessions, is relatively long, or involves complex topics.

The priority tags may also be used in retrieving information from the latent context when needed. When the LLM requires information that is not present in the main context window, assistant system 2 may search the secondary context windows in a hierarchical manner, starting with the secondary window containing the most recent inputs and progressively moving to older windows. Within each secondary window, inputs with higher priority tags may be considered first such that the most relevant and important information is retrieved. If the required information is not found in the secondary context windows, assistant system 2 may extend its search to the persistent memory. The persistent memory may be searched based on predefined criteria, such as the type of information required or its relevance to the current conversation topic. Accordingly, assistant system 2 may be configured to consider the priority tags in the multi-level context windows and making the most important and relevant user inputs readily available to the LLM, while also maintaining a hierarchical structure that reflects the user roles and priorities. This functionality may particularly be selected to enable the LLM to generate more accurate and contextually appropriate responses, taking into account the preferences and requirements of higher-priority users. Furthermore, the use of persistent memory allows the system to retain critical information that remains constant throughout the conversation, regardless of the priority tags. This combination of priority-based context management and persistent memory enhances the overall performance and adaptability of assistant system 2 in handling multi-user conversations with varying levels of user hierarchy.

According to one embodiment, assistant system 2 may be configured to incorporate multiple forms of input like text, voice, and visual signals (such as facial expressions or gestures, images of surrounding objects or environment), that the system can analyze simultaneously to understand the context better.

According to an aspect, assistant system 2 is equipped with advanced multimodal input processing capabilities, enabling it to understand and integrate information from various input modalities beyond just text or speech. This allows the system to achieve a more comprehensive and nuanced understanding of the user's intent and context, leading to more natural and effective interactions. The multimodal input processing in assistant system 2 encompasses a wide range of input types, useful examples of which are detailed below.

Assistant system 2 may utilize visual input where it can process visual data from sources such as cameras, images, or videos. Using computer vision techniques like object detection, facial recognition, and scene understanding, the system can extract relevant information from the visual input to enrich its contextual knowledge. For example, if the user shows the system a picture of a product they want to purchase, assistant system 2 can identify the specific item, brand, and model to provide more targeted recommendations or assistance.

In addition to speech recognition for verbal commands and conversations, assistant system 2 can analyze other types of audio input, such as environmental sounds, music, or acoustic events. By leveraging audio signal processing and machine learning techniques, the system can infer the user's location, activity, or emotional state based on the acoustic cues. For instance, if the system detects a lot of background noise and music, it might infer that the user is at a party or a public event and adapt its communication style accordingly.

Assistant system 2 may be further configured to incorporate tactile and haptic input where it can process input from touch screens, buttons, or other physical controls to interpret the user's actions and intentions. It can also gather information from haptic sensors or wearable devices to understand the user's gestures, movements, or physiological responses. This enables the system to respond to non-verbal cues and provide a more intuitive and immersive user experience.

Assistant system 2 can leverage various types of contextual metadata to further refine its understanding of the user's context. This may include information such as the user's location (e.g., GPS coordinates), device type and capabilities, network connectivity, or ambient light and temperature readings from IoT sensors. By combining this metadata with the other input modalities, the system can gain a more holistic view of the user's situation and tailor its responses accordingly.

To effectively process and integrate these diverse input modalities, assistant system 2may employ a range of techniques from multimodal machine learning and data fusion. For example, it can employ multimodal representation learning where assistant system 2 uses deep learning architectures, such as convolutional neural networks (CNNs) and recurrent neural networks (RNNs), to learn joint representations that capture the salient features and interactions among the different input modalities. These multimodal embeddings may be used to align and correlate the information from multiple sources and extract higher-level semantic concepts. Assistant system 2 may apply cross-modal attention mechanisms to selectively focus on the most relevant aspects of each input modality and model their interdependencies. For example, when processing a user's query about a specific image region, the system can use visual attention to prioritize the relevant parts of the image and textual attention to emphasize the corresponding words or phrases in the user's question.

Assistant system 2 employs various multimodal fusion strategies to combine the information from multiple input modalities at different stages of processing. These strategies can be broadly categorized into early fusion (where the raw input data is combined before feature extraction), late fusion (where the individual modality features are learned separately and then combined for decision-making), or hybrid fusion (which combines aspects of both early and late fusion). To handle the unique challenges of multimodal conversation, assistant system 2 may incorporate specialized dialogue management components that can track the state and flow of the interaction across multiple modalities. This may involve maintaining a coherent representation of the conversation context, resolving references and anaphora across modalities, and generating appropriate multimodal responses that align with the user's expectations.

By leveraging these multimodal input processing capabilities, assistant system 2 can engage in more natural and expressive interactions with users. For example, let's consider a scenario where the user is trying to assemble a piece of furniture and asks assistant system 2 for help. The user can show the system an image of the partially assembled furniture and point to a specific part they are struggling with. Assistant system 2 can analyze the image, recognize the type of furniture and the current state of assembly, and provide step-by-step visual and verbal guidance to help the user complete the task. Moreover, by monitoring the user's progress through the camera feed and the user's verbal feedback, assistant system 2 can dynamically adjust its instructions and offer encouragement or clarification as needed. If the user seems frustrated or confused, the system can detect this from their facial expressions or tone of voice and respond with empathy and reassurance.

According to one embodiment, assistant system 2 is designed to process and integrate multiple input modalities in parallel, including text, speech, visual, and gesture data, to enhance its understanding of the user's intent and context. The system may employ a hierarchical, modular architecture for multimodal input processing, which allows for the independent development, optimization, and maintenance of the individual modality-specific components, while enabling their seamless integration and interaction. At a lower level of the architecture, assistant system 2 may include a set of modality-specific processing modules, each responsible for handling a particular type of input data.

Figure 9:
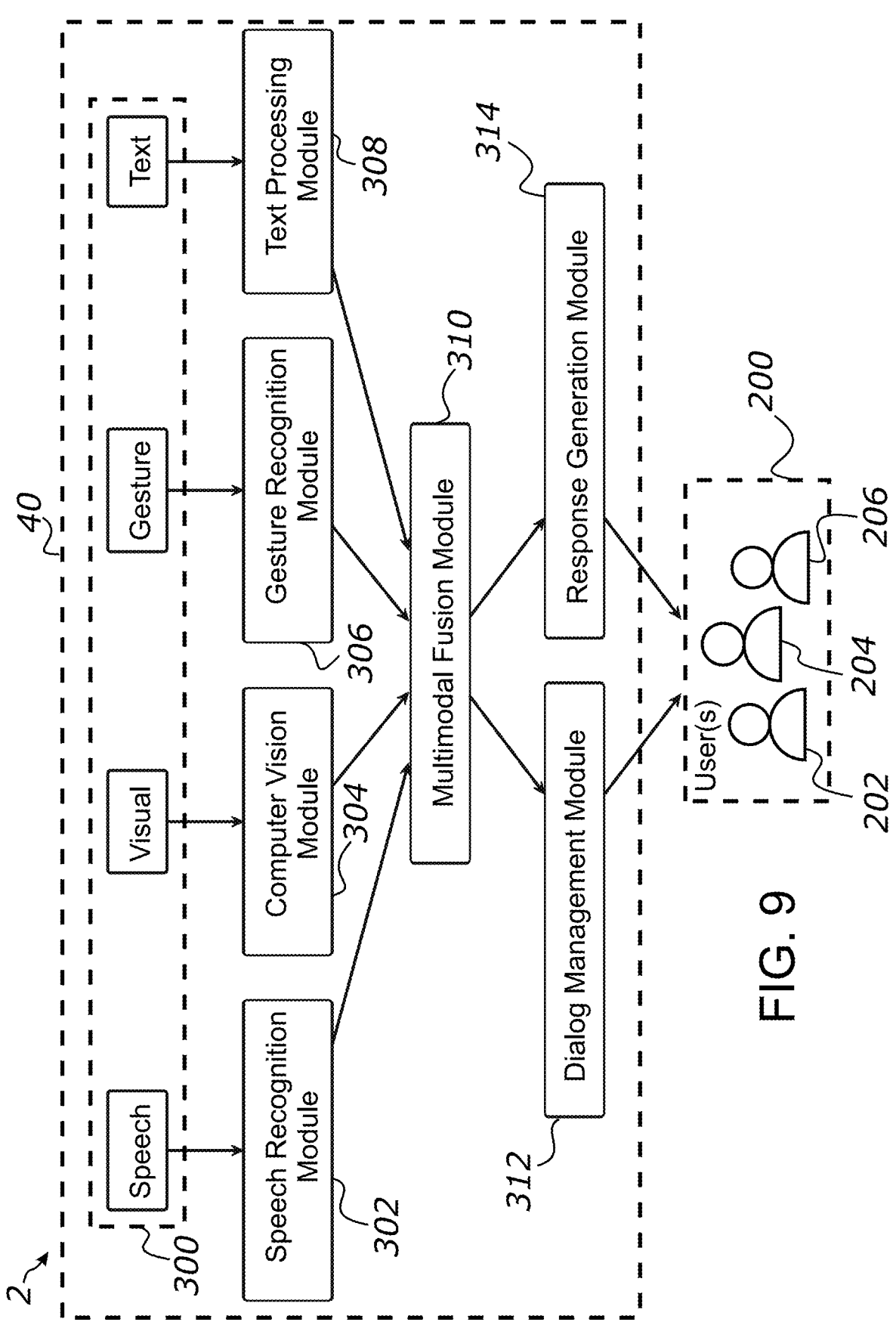
FIG. 9 is a schematic diagram showing a multimodal input processing unit of an AI Assistant system illustrating an exemplary multimodal input processing architecture, according to at least one embodiment of the present invention.

More specifically, referring to FIG. 9, which schematically depicts an exemplary useful implementation of multimodal input processing architecture, assistant system 2 may incorporate a multimodal input processing unit 40 configured to process various types of information and sensory inputs. According to one embodiment, multimodal input processing unit 40 incorporates a multimodal input unit 300 configured for receiving and capturing speech input, visual input, gesture input, and text input.

Multimodal input processing unit 40 further incorporates a speech recognition module 302 which is configured to take the raw audio data captured by microphone 102 (not shown) as input and converts it into textual transcriptions. Speech recognition module 302 may employ state-of-the-art automatic speech recognition (ASR) techniques, such as deep neural network (DNN) acoustic models and language models, which are trained on large corpora of speech data. The ASR models may be adapted to the specific domains and use cases of assistant system 2, and they are continuously updated using techniques like transfer learning and active learning to improve their accuracy and robustness.

Multimodal input processing unit 40 further incorporates a computer vision module 304 which is configured to take as input the visual data captured by cameras (e.g., camera 168 of FIG. 1) or other imaging devices and extract relevant features and semantic information. Computer vision module 304 employs various computer vision techniques, such as object detection, facial recognition, and scene understanding, which are based on deep convolutional neural networks (CNNs) and other machine learning algorithms. The computer vision models may be trained, for example, on large datasets of labeled images and videos, and they are fine-tuned for the specific tasks and domains of the assistant system 2.

Multimodal input processing unit 40 further incorporates a gesture recognition module 306. This module takes as input the data captured by various sensors, such as accelerometers, gyroscopes, and depth cameras, and interprets the user's gestures and body language. It employs techniques from signal processing, pattern recognition, and machine learning, such as hidden Markov models (HMMs), dynamic time warping (DTW), and recurrent neural networks (RNNs), to segment and classify the gesture data into meaningful categories or commands. The gesture recognition models may be trained, for example, on labeled datasets of human motion and activity, and they are adapted to the specific interaction scenarios and user preferences of the assistant system 2.

Multimodal input processing unit 40 further incorporates a text processing module which takes as input the textual data entered by the user through a keyboard, touchscreen, or other input device, and performs various natural language processing tasks, such as tokenization, part-of-speech tagging, named entity recognition, and sentiment analysis. It employs state-of-the-art NLP techniques, such as transformer-based language models (e.g., BERT, GPT), which are pre-trained on large corpora of text data and fine-tuned for the specific domains and tasks of the Assistant system 2.

Multimodal input processing unit 40 further incorporates a multimodal fusion module 310, which is configured for integrating and aligning the information extracted from the different input modalities. Multimodal fusion module 310 may employ various techniques to perform its core functions. For example, multimodal fusion module 310 may employ an early fusion technique where the module concatenates the feature vectors extracted from the different modalities at the input level and creates a single multimodal representation that is then processed by the subsequent layers of the model. Early fusion may be particularly suitable for scenarios where the different modalities are tightly coupled and synchronized, such as audio-visual speech recognition, for example.

Multimodal fusion module 310 may further employ a late fusion technique for processing the different modalities independently, up to the decision level, and then combine their outputs using techniques like weighted averaging, majority voting, or confidence-based gating. Late fusion may be suitable for scenarios where the different modalities provide complementary or redundant information, such as sentiment analysis from speech and text.

Multimodal fusion module 310 may further employ an intermediate fusion process which combines the different modalities at intermediate stages of the processing pipeline, using techniques like attention mechanisms, cross-modal attention, or multimodal embedding spaces. Intermediate fusion allows for more flexible and dynamic integration of the different modalities, adapting to their relative importance and informativeness for the specific task or context. The inputs and outputs from multimodal fusion module 310 may include textual, audio, imagery, video, sensory, and any other types of data. This multimodal information may be stored in any of the appropriate memory units of assistant system 2. For example, this information may be stored along with the other conversational context data in contextual memory unit 116. At least some of that information (e.g., the information that may require a prolonged or permanent storage) may also be stored in non-volatile system memory unit 118.

Multimodal fusion module 310 may also incorporate various techniques for handling the challenges of multi-modal input processing, such as temporal alignment, confidence estimation, conflict resolution, and others. For example, the different input modalities may have different temporal resolutions and durations, which need to be synchronized and aligned for effective fusion. Multimodal fusion module 310 may employ techniques like dynamic time warping, temporal attention, or recurrent neural networks to align the multimodal data streams. The different input modalities may also have different levels of reliability and informativeness, depending on factors like signal quality, environmental noise, or user behavior. To mitigate those, multimodal fusion module 310 may employ techniques like Bayesian inference, evidential reasoning, or uncertainty quantification to estimate the confidence scores for each modality and adjust their contributions to the fusion process accordingly.

The different input modalities may further provide conflicting or inconsistent information, which needs to be reconciled for coherent understanding and decision-making. To mitigate those, multimodal fusion module 310 may employ techniques like majority voting, weighted averaging, or rule-based reasoning to resolve the conflicts and generate a consistent multimodal interpretation.

According to one embodiment, multimodal fusion module 310 is configured to output a unified, high-level representation of the user's intent and context, which is then passed to the dialog management and response generation components of assistant system 2 for further processing and action.

To illustrate the operation of multimodal input processing, let's consider an example use case where a user is interacting with assistant system 2 in a smart home environment, and they want to adjust the lighting and temperature settings in the living room. The user can express their intent through multiple modalities:

Speech: The user can say "Hey Assistant, set the living room lights to warm white and the temperature to 72 degrees."

Gesture: The user can point to the living room area and make a dimming gesture with their hand to indicate the desired lighting level.

Text: The user can type "Living room lights to warm white, temperature to 72" on their smartphone app.

A assistant system 2 may be configured to process each input modality independently. Foir example, speech recognition module 302 may transcribe the user's spoken command into text, using acoustic and language models trained on home automation vocabulary and grammar. Computer vision module 304 may detect the user's pointing gesture and localize the living room area in the visual scene, using object detection and scene understanding models. Gesture recognition module 306 interprets the user's hand gesture as a dimming command, using models trained on a vocabulary of predefined hand gestures for lighting control. Text processing module 308 parses the user's typed command and extracts the relevant entities (living room, warm white, 72 degrees) and actions (set, adjust) using named entity recognition and semantic parsing techniques.

Multimodal fusion module 310 then integrates the information from the different modalities. For example, multimodal fusion module 310 aligns the speech and text commands based on their semantic similarity and temporal proximity, using techniques like word embedding and dynamic time warping. It further combines the pointing gesture with the speech and text commands to disambiguate the target location (living room), using techniques like attention mechanisms and spatial grounding. Multimodal fusion module 310 further fuses the dimming gesture with the speech and text commands to refine the desired lighting level (warm white), using techniques like confidence-based gating and weighted averaging.

The fused multimodal representation is then passed to a dialog management module 312, which generates the appropriate control commands for the smart home devices (e.g., "Set living room lights to warm white, 50% brightness; set living room thermostat to 72 degrees"). A response generation module 314 provides feedback to the user through multiple modalities, such as speech (e.g., "Living room lights set to warm white, and temperature set to 72 degrees"), visual (e.g., displaying the updated settings on the smartphone app), and haptic (e.g., a confirmation vibration on the user's smartwatch).

It may be appreciated that multimodal input processing also poses several challenges, such as data sparsity, computational complexity, ambiguity and uncertainty, and user variability, for example. For instance, collecting large-scale, diverse, and well-annotated datasets for training multimodal models can be time-consuming, expensive, and privacy-sensitive, especially for modalities like speech, gesture, and video. Furthermore, processing and fusing multiple high-dimensional, heterogeneous data streams in real-time requires significant computational resources and optimization techniques, such as model compression, quantization, and distributed processing. Additionally, interpreting and aligning the information from multiple noisy and ambiguous modalities can be challenging, especially in unconstrained and dynamic environments with multiple users and distractors. Yet further, different users may have different preferences, styles, and capabilities for multimodal interaction, which may require assistant system 2 to adapt and personalize its processing and generation strategies accordingly. Accordingly, the above-described architecture and multimodal input processing methods may help overcome these challenges and enable more natural and efficient human-machine interaction.

The system may be provided with the ability to develop personalized user models over time that take into account individual communication styles, preferred topics, tone of voice, or other unique characteristics, thereby improving its responses. According to one embodiment, assistant system 2 can be configured to analyze the emotional tone of the users' voices and adapt its responses accordingly. This could be used to provide more empathetic responses or to alert the user to their emotional state.

According to one embodiment, assistant system 2 may be configured to provide users with different levels of privacy control, allowing them to decide how much of their conversation history is stored, and in what form (raw audio, transcribed text, anonymized data, etc.). It may also implement enhanced privacy modes where the user can control the extent of data assistant system 2 records and remembers. For instance, assistant system 2 may be configured to be operable in an 'Incognito Mode' where assistant system 2 doesn't store or remember any conversation. It may further include a feature where it informs users about their conversation being (or about to be) recorded and asks all users to agree before enabling the recording and contextual processing of the conversation.

According to various embodiments, assistant system 2 may incorporate a comprehensive privacy management framework that gives users granular control over their conversation data and privacy settings. The user interface may includes a dedicated privacy settings menu, accessible through voice commands and/or the graphical user interface (GUI). Within this menu, users can configure their privacy preferences using a series of toggles, sliders, checkboxes, and/or voice feedback. The privacy settings may cover various aspects of data handling and storage. For example, the settings may include a conversation history retention period where users can specify how long their conversation history should be stored, ranging from "no retention" to "indefinite storage." The selected retention period may be communicated to the system's data management layer, which enforces the retention policy at the storage level. The privacy settings may further include data sharing and third-party access. For instance, users can control whether their conversation data, retrieved data, and tool use history can be shared with third-party services or used for purposes other than providing the core AI assistant functionality. They can opt-in or opt-out of data sharing on a per-service basis, with clear explanations of how their data will be used. The privacy settings may further include anonymization and pseudonymization where users can choose to have their conversation data anonymized or pseudonymized before being stored or processed. Anonymization can involve irreversibly removing all personally identifiable information (PII) from the data, while pseudonymization replaces PII with a pseudonym that can be reversed only with additional information stored separately. The user's preference may be applied by the data pre-processing pipeline before the conversation data is ingested into the system's storage. The privacy settings may further include encryption and access control, where users can specify whether their conversation data should be encrypted at rest and in transit. They can also control who has access to their data, such as restricting access to specific user roles or requiring multi-factor authentication for sensitive operations. The encryption and access control mechanisms may be enforced by the system's security layer, which integrates with the storage and communication protocols. The privacy settings selected by the user may be persistently stored in a secure, encrypted configuration database. Alternatively, or in addition to that, at least some of the privacy settings may be stored in system memory unit 118. The system's data handling components, such as the natural language processing (NLP) pipeline, the dialog management system, and the knowledge base, may be designed to respect and enforce these privacy settings throughout the data lifecycle.

When a user initiates a conversation with the AI assistant, assistant system 2 retrieves their privacy settings from the configuration database. These settings are used to configure the data processing and storage components dynamically. For example, if the user has opted for anonymization, the NLP pipeline will strip out any PII from the user's utterances before passing them to the dialog management system. Similarly, if the user has chosen to encrypt their data, the storage layer will automatically encrypt the conversation history and any associated metadata before persisting it to permanent storage. As the conversation progresses, the system continuously monitors the data flow to ensure compliance with the user's privacy preferences. If the user requests to change their privacy settings mid-conversation, the system transitions to the new configuration, applying the updated settings to both the newly generated data and any previously stored data.

To support the user's right to access, rectify, and erase their personal data, assistant system 2 may be configured to provide a set of privacy management APIs, e.g., to allow users to programmatically retrieve their conversation history, update or correct any inaccurate information, and request the deletion of their data. The APIs may be accessible through the privacy settings menu and are secured using industry-standard authentication and authorization protocols, such as OAuth 2.0 and OpenID Connect. When a user submits a data retrieval, rectification, or erasure request through the privacy management APIs, assistant system 2 first verifies their identity and permissions. Upon successful verification, the system locates the relevant data in its storage layer, applying any necessary decryption or de-pseudonymization operations. The retrieved data may then be presented to the user in a structured, machine-readable format, such as JSON or XML, along with metadata about the data lineage and processing history. If the user requests a correction or update to their data, assistant system 2 validates the submitted changes and propagates them to all relevant storage locations, ensuring data consistency and integrity. If the user requests data erasure, the system permanently deletes the specified conversation data and any associated metadata from its storage layer, following secure deletion practices to prevent data recovery.

It may be preferred that, throughout the data handling and storage processes, assistant system 2 maintains detailed audit logs and provenance records. These logs may capture all data access, modification, and deletion events, along with information about the requesting user, timestamp, and purpose of the operation. The audit logs should preferably be stored in a separate, immutable storage system, such as a blockchain-based ledger, to ensure their integrity and non-repudiation. The provenance records may track the lineage and processing history of each conversation data item, including information about the data source, any transformations or aggregations applied, and the retention period. These records enable transparency and accountability, allowing users to understand how their data has been used and supporting compliance with data protection regulations.

According to some embodiments, assistant system 2 employs advanced security measures to protect the conversation data and privacy settings from unauthorized access, tampering, or breach. These measures may include end-to-end encryption where all communication channels between the user's devices and assistant system 2 are encrypted using strong, industry-standard protocols like Transport Layer Security (TLS). The conversation data may be encrypted on the user's device before being transmitted and remains encrypted until it reaches the system's secure processing environment.

The security measures may include secure key management where the encryption keys used to protect the conversation data and privacy settings are generated, stored, and managed using a hardware security module (HSM) or a secure key management service, such as AWS Key Management Service (KMS) or Azure Key Vault. The keys may be rotated regularly, and access to them is strictly controlled based on the principle of least privilege. The security measures may further include data compartmentalization where assistant system 2 employs a micro-services architecture in which each component operates in a separate, isolated environment. The conversation data may be compartmentalized based on user identity and privacy settings, with strict access controls enforced between the components, e.g., in order to minimize the damage in case of a security breach and prevents unauthorized cross-user data access. The security measures may further include continuous monitoring and anomaly detection where assistant system 2 continuously monitors the data flows and access patterns for signs of anomalous or malicious activity, such as unauthorized access attempts, data exfiltration, or privilege escalation. It employs machine learning-based anomaly detection algorithms to identify and alert on any deviations from the expected behavior, enabling quick incident response and mitigation. Assistant system 2 may be configured to fully leverage its AI-augmented reasoning and LLM functionality to perform any or all the above functions related to the security measures.

The privacy management framework of assistant system 2 can be designed to support multiple users engaging in a conversation with the AI assistant or with each other. In a multi-user scenario, each user can have their own set of privacy preferences, which assistant system 2 recognizes and enforces individually. When multiple users are participating in a conversation, assistant system 2 maintains separate conversation histories and privacy settings for each user. This allows each user to control their own data retention, sharing, and processing preferences, independent of the other participants. During the conversation, assistant system 2 applies the privacy settings of each user to their respective contributions. For example, if User A has opted for data anonymization while User B has chosen to allow personalized processing, the system will anonymize User A's utterances before storing or analyzing them, while preserving User B's personal information in accordance with their preferences.

In situations where users are conversing with each other through assistant system 2 platform, the system may be configured to act as a secure intermediary, facilitating the communication while enforcing the privacy settings of each participant. If a user chooses to share their conversation data with another user, the system first verifies that the sharing is permitted under both users' privacy settings. If allowed, the system securely transmits the shared data to the recipient, applying any necessary encryption, anonymization, or access control measures based on the recipient's privacy preferences. To support user control and transparency in multi-user conversations, assistant system 2 provides a set of collaborative privacy management features.

For example, assistant system 2 provides users with the ability to view the list of participants in a conversation and their respective privacy settings (e.g., data retention period, sharing preferences) to the extent permitted by each participant's privacy choices. Assistant system 2 may further provides users with the ability to request and grant or revoke access to specific portions of their conversation history or privacy settings to other participants, receive notifications when their conversation data is shared with or accessed by another participant, along with information about the purpose and scope of the sharing or access, and jointly manage or update certain privacy settings for a shared conversation, such as specifying retention periods or data usage permissions that apply to all participants.

These collaborative privacy management features may be implemented through a combination of user interface elements (e.g., privacy panels, notification bars) and backend APIs that enforce the agreed-upon privacy policies and data sharing rules. To enable this, assistant system 2 may employ advanced data tagging and access control mechanisms to ensure that each user's privacy preferences are respected in multi-user conversations. Each piece of conversation data may be tagged with metadata indicating its owner, privacy settings, and any applicable sharing or usage restrictions. The system's data processing and storage components may use these tags to enforce the appropriate privacy actions, such as encrypting data before sharing, applying differential privacy techniques to protect individual participants' contributions, or filtering out restricted data from analysis or export operations.

According to an aspect of this inventions, the AI assistant system is configured to allow the user to interrupt the system's in-progress response generation or output, whether textual or voiced, e.g., in order to issue another command or provide additional contextual information. This functionality is particularly supported by the system's continuous monitoring and real-time processing capabilities, as described in the foregoing embodiments. The AI assistant system is designed to actively listen for user input, even while generating or delivering a response. Upon detecting an interruption from the user, which may be in the form of a designated wake word, a specific command, or simply the detection of the user's speech using voice activity detection techniques, the system immediately pauses its current output and transitions to processing the user's new input. The contextual information provided in the user's interrupting input is then incorporated into the AI assistant's existing contextual understanding by updating the relevant content in the contextual memory unit. This allows the system to generate a revised response that takes into account the new contextual information or command provided by the user. The AI assistant can then smoothly transition to delivering this updated response, adapting to the user's changing needs or clarifications in real-time. By supporting this interruption and updating capability, the AI assistant system enables a more natural, responsive, and user-friendly interaction that better aligns with the user's intentions and dynamically evolving context.

Moreover, contextual memory unit 116 and other subsystems can play a crucial role in maintaining a coherent and up-to-date conversation context by storing and retrieving relevant information using a sliding window mechanism and efficient indexing strategies. The AI assistant system's ability to handle interruptions and incorporate new user input into the ongoing conversation is further enhanced by the dynamic resource allocation and parallel processing capabilities of processor 122 and the optimized data storage and retrieval mechanisms implemented in the various memory units.

For example, in a useful implementation of assistant system 2 as a personal travel assistant, the system may be configured such that the user can interrupt the AI assistant's in-progress response to a previous user's request. E.g., the user interrupts an in-progress response of assistant system 2 about popular European tourist destinations by asking about London. Microphone 102 continuously captures the user's speech, converting the audio signal into digital data. The voice activity detection (VAD) module, a software component executed by processor 122, actively monitors the digital audio data in real-time to detect interruptions or new user input. The VAD module employs advanced signal processing techniques, such as energy thresholding, spectral analysis, and machine learning algorithms, to distinguish user speech from background noise and identify the onset and offset of speech segments. When the VAD module detects an interruption, it immediately sends a control signal to the speech synthesis module, another software component executed by processor 122, which is responsible for generating and outputting the assistant system 2's speech through speaker 142. Upon receiving the control signal, the speech synthesis module pauses the output, saving the current state of the response generation process in RAM 124 or contextual memory unit 116.

Simultaneously, the VAD module triggers the automatic speech recognition (ASR) module, also a part of the software executed by processor 122, to process the user's interrupting speech. The ASR module converts the speech data into text using advanced acoustic modeling, language modeling, and deep learning techniques. The resulting text is then passed to the natural language processing (NLP) unit 212 for further analysis. The NLP unit 212 comprises several subcomponents, including tokenization, encoding, and contextual understanding modules. The tokenization module splits the text into individual words, subwords, or characters, while the encoding module converts these tokens into numerical representations suitable for processing by the neural networks in the contextual understanding module.

The contextual understanding module, which utilizes transformer-based language models and retrieval-augmented generation components, analyzes the encoded user input in the context of the conversation history stored in contextual memory unit 116. This module employs attention mechanisms and self-supervised learning techniques to identify the most relevant information and generate an appropriate response. The generated response is then processed by the decoding and detokenization modules within the NLP unit 212 to convert the numerical representation back into human-readable text. The speech synthesis module receives this text and generates the corresponding speech output, which is played through speaker 142.

Throughout this process, assistant system 2 continuously listens for further interruptions or new user input, which are handled in the same manner. The described system's modular and parallel processing architecture, enabled by the close integration of hardware components (e.g., microphone 102, speaker 142, processor 122, memory units 114, 116, and 118) and software components (VAD, ASR, NLP, speech synthesis), allows for seamless and responsive interaction with the user, adapting to their changing needs and interests in real-time.

The reduced latency and efficient memory management techniques implemented in various described embodiments of assistant system 2 are critical for enabling the seamless handling of user interruptions during an in-progress response. By minimizing the time delay between receiving user input, processing it, and generating an appropriate response, the AI assistant system can provide a more natural and responsive interaction that closely mimics human conversation. One key aspect of reducing latency is the use of real-time, continuous speech capturing and processing where microphone 102 constantly streams audio data to the VAD module, which, in turn, continuously monitors the input for interruptions or new user speech without any significant delay. The VAD module's efficient algorithms, optimized for real-time performance, quickly detect interruptions and trigger the necessary actions, such as pausing the speech output and activating the ASR module.

Furthermore, the ASR, NLP, and speech synthesis modules are designed to operate with minimal latency, leveraging hardware acceleration and parallel processing capabilities of processor 122. This enables the AI assistant system to rapidly convert speech to text, analyze the input in context, generate a response, and synthesize the corresponding speech output, minimizing the delay between the user's interruption and the system's response. The sliding window mechanism employed in contextual memory unit 116 ensures that the most recent and relevant conversation history is readily accessible for processing, without the need to search through a large volume of data. This optimized data storage and retrieval approach reduces the time required to incorporate new user input into the conversation context, allowing for faster response generation. Moreover, the dynamic allocation of memory resources among the various components of the AI assistant system, such as RAM 124, contextual memory unit 116, and system memory unit 118, allows for efficient utilization of available storage and prevents any single component from becoming a bottleneck. The memory management system dynamically assigns resources based on the current needs of each module, ensuring that the most critical data is quickly accessible and that the overall system performance is maintained. Additionally, the use of advanced caching mechanisms and data compression techniques further reduces the latency associated with memory access and data transfer between different components. By storing frequently accessed data in high-speed cache memory and compressing less frequently used data, the AI assistant system can minimize the time required to retrieve and process relevant information, enabling faster response generation and seamless handling of interruptions.

Accordingly, it may be appreciated that the combination of real-time processing, parallel computing, optimized data storage and retrieval, dynamic resource allocation, and efficient memory management techniques described above may enable the AI assistant system to achieve the low latency (preferably much less than 1 second, and even more preferably, less than 0.3 seconds or even less than 0.1 seconds) and high responsiveness necessary for handling user interruptions during an in-progress response. These critical aspects of the system architecture may be advantageously utilized to create a more natural and engaging user experience, as the AI assistant can adapt and respond to the user's evolving needs and interests in real-time, without noticeable delays or disruptions.

According to one embodiment, assistant system 2 may be configured to provide simultaneous multi-user support, including multi-user contextual understanding. The system can be designed to recognize and respond to multiple users at the same time, keeping separate sliding windows for each user, which could be particularly useful in a multi-user setting (like a family or office). Also, if there are multiple users, assistant system 2 could differentiate between them based not only on their voices but also on their conversational styles, preferences, and history. The Assistant could then tailor its responses to each user individually, providing a personalized experience.

According to one embodiment, assistant system 2 may be integrated into a workplace or office environment to enhance productivity, collaboration, and efficiency. The system may be configured to connect with various enterprise software tools and hardware devices, and can be accessed through multiple interfaces, such as desktop computers, mobile devices, or dedicated hardware like smart speakers or conference room systems. Users can interact with assistant system 2 using natural language commands, either through voice or text input. In this embodiment, assistant system 2 may be equipped with specialized skills and knowledge bases relevant to the workplace setting. It can assist with tasks such as scheduling meetings, managing calendars, setting reminders, and organizing tasks and to-do lists. Assistant system 2 may be configured to leverage Retrieval Augmented Generation (RAG) to help with document management, including creating, editing, and proofreading documents, as well as providing templates and suggestions based on best practices.

In one exemplary implementation, assistant system 2 integrated into the workplace may be configured to understand and adapt to the specific context and needs of the organization. It can learn from the interactions and data within the office environment, such as company policies, project details, and employee roles and preferences. For example, when a user asks assistant system 2 to schedule a meeting, it can take into account factors like the attendees' availability, meeting room preferences, and the purpose of the meeting based on the project context. It can also suggest relevant documents or resources to be shared in the meeting invitation.

Assistant system 2 may be configured to facilitate collaboration among team members, helping with tasks like assigning action items, tracking progress, and sending reminders and updates. During meetings, assistant system 2 can take notes, transcribe discussions, and highlight key decisions and next steps. Assistant system 2 may be integrated with enterprise systems and configured to connect with tools like customer relationship management (CRM) software, human resources information systems (HRIS), and project management platforms. For instance, when a user asks assistant system 2 about the status of a sales lead, it can retrieve relevant information from the CRM system and provide an update. Similarly, it can assist with HR-related queries by accessing employee records or company policies from the HRIS.

According to some embodiments, the techniques described in Example 1 for interacting with FoodOrderingHub's API using LLMs can be applied to a wide range of other services, enabling the AI assistant to perform various tasks on behalf of the user. For example, assistant system 2 may be configured to assist users with shopping for goods by integrating with e-commerce platforms like Amazon or eBay. By retrieving and interpreting the API documentation of these platforms, the system can understand how to search for products, retrieve product information, add items to the shopping cart, and complete the checkout process. Similarly, assistant system 2 can help users book travel services, such as flights, hotels, or rental cars, by interacting with the APIs of travel booking websites like Expedia or Booking.com. The LLMs may be advantageously used to enable assistant system 2 to comprehend the API specifications and generate the necessary requests to search for available options, retrieve pricing and availability information, and make reservations based on the user's preferences. Beyond shopping and travel, assistant system 2 can also assist with other types of services, such as scheduling appointments with healthcare providers through medical booking platforms, ordering tickets for events or entertainment through ticketing APIs, or even managing the user's smart home devices by communicating with IoT platforms. Assistant system 2 may extensively leverage the power of LLMs, as described in the foregoing embodiments and examples to dynamically interpret and interact with various service APIs, to assist users in streamlining and automating a wide range of tasks.

According to some embodiments, in addition to being configured to perform tasks on behalf of the user using APIs, assistant system 2 may be configured to do the same using other techniques. According to one embodiment, assistant system 2 can use web scraping techniques to extract information from websites that do not provide an API. For example, it may employ libraries like BeautifulSoup or Scrapy, CarAssist to parse the HTML structure of web pages, identify relevant data elements, and extract the desired information. For example, assistant system 2 could scrape a restaurant's website to retrieve menu items, prices, and special offers, or scrape a news website to gather articles on a specific topic of interest to the user.

According to one embodiment, assistant system 2 may incorporate or be configured to use software robots to automate repetitive and rule-based tasks typically performed by humans. For instance, assistant system 2 provided with the multi-modal processing capabilities can be integrated with robotic process automation like UiPath or Automation Anywhere to automate tasks that involve interacting with graphical user interfaces (GUIs) of desktop or web applications. For instance, assistant system 2 could use such robotic process automation to fill out forms, click buttons, or navigate through menus to complete a task like booking a hotel room or purchasing a product online. The system may further utilize computer vision techniques to interpret and interact with visual information, such as images or videos. By integrating with computer vision libraries like OpenCV or TensorFlow, the can analyze visual data to extract relevant insights or perform actions based on the content. For example, it may analyze an image of a product taken by the user's smartphone camera, identify the product, and automatically search for reviews, prices, or similar items online.

Assistant system 2 may be further configured to interact with services or devices that provide a natural language interface, such as chatbots or voice assistants. By leveraging its natural language processing capabilities, assistant system 2 can communicate with these interfaces using human-like conversation, understanding their responses and providing the necessary information to complete a task. For example, assistant system 2 could interact with an ordering chatbot to order goods and services, with a customer support chatbot to troubleshoot an issue, or with a voice-controlled smart home device to adjust the thermostat or turn on the lights.

Assistant system 2 may be further configured to automate tasks by parsing and understanding the content of emails or text messages. Using techniques like regular expressions, natural language processing, and machine learning, the system can extract relevant information from incoming messages and take appropriate actions. For instance, the system could parse a user's email inbox to identify travel itineraries, automatically add them to the user's calendar, and provide reminders or suggestions based on the itinerary details.

Assistant system 2 may be further configured to use pre-trained machine learning models or develop its own models to automate tasks that involve pattern recognition, prediction, or decision-making. By feeding relevant data into these models, the system may be configured to make intelligent recommendations or take actions based on the model's outputs. For instance, assistant system 2 may use a machine learning model trained on the user's historical shopping data to predict and suggest products the user might be interested in, or use a model trained on traffic patterns to optimize the user's daily commute.

According to one embodiment, assistant system 2 may be configured with advanced capabilities to actively participate in online communication platforms that have live streaming capabilities, where it can autonomously recognize and evaluate written or spoken questions and opinions from a large number of participants. This embodiment may particularly find utility in scenarios where there are numerous participants and limited voice access, such as in a popular science stream on YouTube, for example. In this embodiment, assistant system 2 may employ natural language processing techniques and machine learning algorithms to analyze the written or spoken input from participants in real-time. It may be configured to autonomously and automatically identify and select the most relevant and pertinent questions and opinions based on the stated topic of the discussion or the content being presented by the live streamer, lecturer, content-creator, or moderator.

Once assistant system 2 has selected the most relevant written questions and opinions, it can voice them out using text-to-speech synthesis at the command of the live streamer or moderator. This allows the moderator to efficiently address the key concerns and inquiries of the participants without manually going through each written input. Furthermore, assistant system 2 can enhance the voicing of the selected questions and opinions by generating corresponding images and videos to accompany the spoken output. These visuals can be created based on the content of the question or opinion itself, as well as the answer provided by the live streamer or moderator. The generated images and videos serve to enrich the overall discussion and improve the engagement and understanding of the participants.

According to one embodiment, the identified relevant spoken questions and opinions may be stored in audio memory unit 114 or contextual memory unit 116, and buffered for asking later, e.g., during the scheduled Q&A session or when directed by the moderator. For this purpose, assistant system 2 may employ advanced audio processing techniques, such as voice activity detection, speaker diarization, and audio classification, to analyze the spoken input from participants in real-time. It may be configured to automatically identify and select the most relevant and pertinent questions and opinions based on acoustic features, such as prosody, intonation, and speaker enthusiasm, as well as the semantic content of the spoken input, which can be inferred using machine learning models trained on the specific domain of the discussion. Once assistant system 2 receives the command to output the stored questions, it can voice them out, optionally in the order of relevance as determined by the system. This may allow the moderator to efficiently address the key concerns and inquiries of the participants without manually going through each spoken input.

The buffered questions may be played back in their original audio form, preserving the voice and intonation of the participant who asked the question. Alternatively, assistant system 2 may slightly rephrase the question for clarity or conciseness while maintaining the original meaning and intent, and generate a new audio version using speech synthesis techniques. The rephrased version can be generated in the same voice as the original question, mimicking the participant's voice characteristics, or in a different voice selected for its clarity and intelligibility. Furthermore, if the original question was asked in a different language than the one primarily used in the discussion, assistant system 2 may provide a translated version of the question in the target language. The translation can be performed using machine translation models specifically trained on the domain of the discussion, and the translated question can be generated as a spoken output using a text-to-speech system or a cross-lingual voice conversion model.

Assistant system 2 may be configured to provide valuable insights and suggestions throughout the discussion. It can analyze the current stage of the search, formulate conclusions, and generate creative proposals for further exploration. These contributions are based on its understanding of the problem space, the data matrices, and the ongoing conversation. By actively participating in the brainstorming or problem-solving process, assistant system 2 can help in identifying potential solutions, exploring novel ideas, and guiding the discussion towards the desired goal. Moreover, assistant system 2 can adapt its contributions based on the feedback and input from the live streamer/moderator and other participants. It can learn from the evolving discussion and adjust its suggestions and analysis accordingly, facilitating a dynamic and productive collaboration between the human participants and the AI system.

According to an aspect of the invention, the types of actions and tasks that can be performed by assistant system 2 may be quite diverse and their execution can be organized in a variety of ways. Assistant system 2's agentic functionality may be configured to autonomously perform complex tasks in the background, adapt to the user's context and preferences, and provide meaningful, actionable results without requiring constant user oversight or intervention.

According to one embodiment, assistant system 2 may incorporate an advanced Agentic Task Processing Unit (ATPU), which may be exemplified by ATPU 144 of FIG. 1, that enables it to perform autonomous agentic functions in the background. According to one embodiment, assistant system 2 may incorporate multiple ATPUs, each configured to perform tasks independently from another. According to one embodiment, assistant system 2 may incorporate an ATPU management unit (not shown) configured to control such multiple ATPUs such that they can work collaboratively on complex tasks by breaking them down into smaller subtasks, distributing the workload among the available ATPUs, and coordinating the flow of data and results between them. The ATPU management unit may employ advanced scheduling algorithms and load balancing techniques to optimize the utilization of the ATPUs, minimize idle time, and ensure that high-priority tasks are processed promptly. It also monitors the performance and health of each ATPU, dynamically adjusting the task allocation and resource assignment based on factors such as the current workload, the complexity of the tasks, and the available system resources. Furthermore, the ATPU management unit facilitates communication and synchronization between the ATPUs, enabling them to share intermediate results, exchange relevant information, and collaborate on solving intricate problems that require a multi-faceted approach. By leveraging the power of multiple ATPUs and coordinating their efforts through the ATPU management unit, assistant system 2 can perform even the most demanding and complex tasks with enhanced efficiency, scalability, and resilience.

Figure 10:
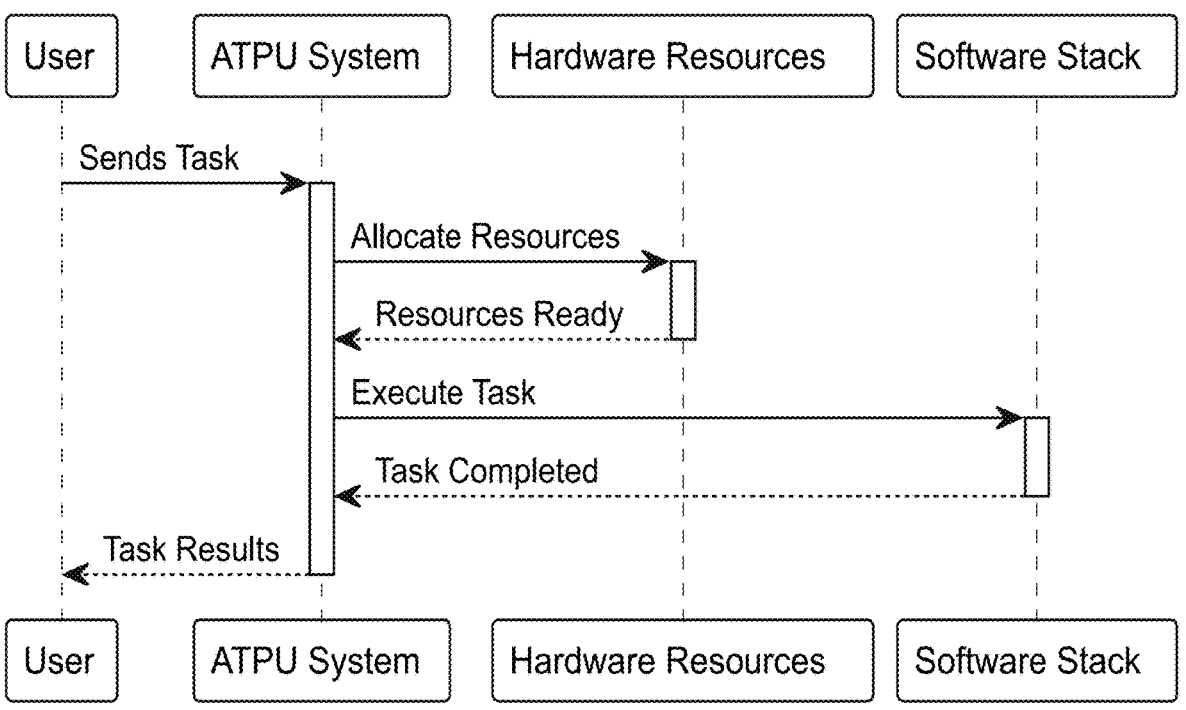
FIG. 10 is a schematic ATPU interaction flow diagram depicting a process and interactions within an Agentic Task Processing Unit (ATPU) of an AI assistant, according to at least one embodiment of the present invention.
Figure 11:
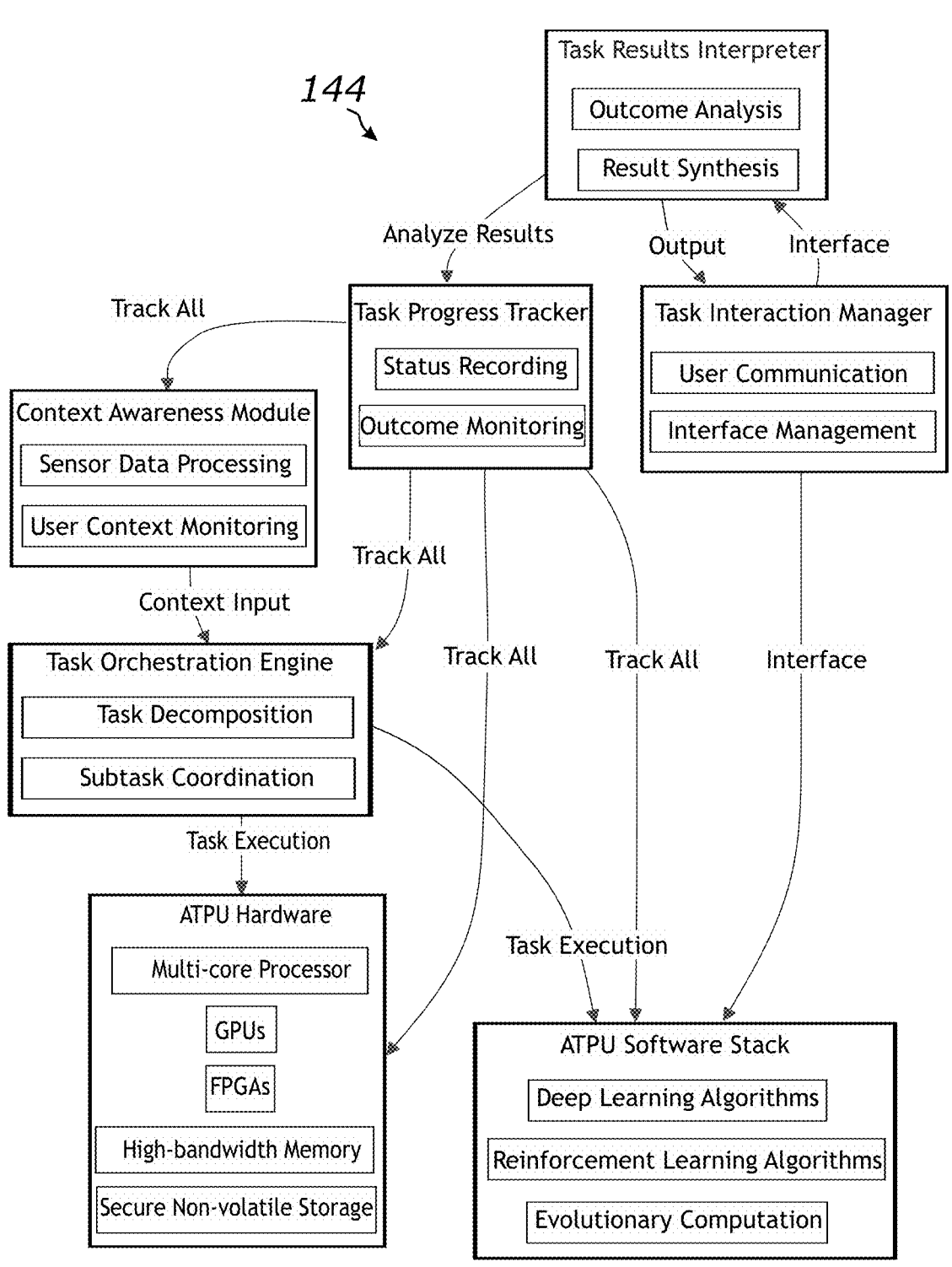
FIG. 11 is a schematic graph diagram illustrating a complex structure and interactions within an ATPU of an AI assistant, according to at least one embodiment of the present invention.

FIG. 10 schematically depicts exemplary processes and interactions within an individual ATPU, according to one embodiment. The ATPU may be configured as a specialized subsystem comprising dedicated hardware and software components that work together to execute complex, multistep tasks without continuous user interaction. FIG. 11 schematically depicts an exemplary structure of ATPU 144 and further depicts interactions within ATPU 144, according to one embodiment.

The hardware of ATPU 144 may include a separate, high-performance, multi-core processor optimized for parallel processing and task-specific accelerators (e.g., GPUs for 3D rendering or FPGAs for data analysis). It may also include a large, high-bandwidth memory subsystem to store and process large datasets, as well as a secure, non-volatile storage for long-term data retention. The software stack of ATPU 144 may be built on a foundation of advanced AI and machine learning algorithms, including deep learning, reinforcement learning, and evolutionary computation. These algorithms may be particularly configured to enable ATPU 144 to learn from data, adapt to new situations, and optimize its performance over time.

The ATPU's may incorporate a Task Orchestration Engine (TOE) that decomposes complex, high-level tasks into smaller, manageable subtasks and coordinates their execution across the various hardware and software components. The TOE may employ a combination of rule-based and learning-based approaches to determine the optimal decomposition and allocation of subtasks based on the available resources and the specific requirements of each task. The TOE may be supported by a Context Awareness Module (CAM) that continuously monitors the user's context, preferences, and goals, as well as the broader environment in which the task is being performed. The CAM may use, without limitations, the multi-modal input processing capabilities of assistant system 2 described above. These multi-modal input processing capabilities may be used to gather and interpret data from various sources (e.g., sensors, user input, online databases) and maintain an up-to-date representation of the task context. Based on this contextual understanding, the TOE may dynamically adapt the task execution plan, prioritize subtasks, reallocate resources, or adjust parameters as needed to ensure optimal performance and alignment with the user's objectives. The TOE may also employ advanced scheduling and load balancing techniques to maximize resource utilization and minimize latency.

In operation, throughout the task execution process, the ATPU maintains a detailed Task Progress Tracker (TPT) that records the status and outcomes of each subtask, as well as any relevant intermediate results or data artifacts. The TPT provides a unified view of the task progress and enables the ATPU to resume interrupted tasks, recover from failures, or backtrack and explore alternative solutions if needed.

To ensure effective communication and coordination with the user, the ATPU may incorporate a Task Interaction Manager (TIM) that generates periodic progress updates, notifications, or requests for user input or confirmation when necessary. The TIM employs natural language generation techniques to present information in a clear, concise, and context-appropriate manner, adapting its communication style to the user's preferences and the task domain. In addition, the TIM may provide a user-friendly interface for the user to monitor ongoing tasks, modify task parameters, or provide additional guidance or feedback as needed. This interface may support multiple modalities (e.g., voice, text, graphics) and can be accessed through various devices (e.g., smartphone, smartwatch, smart speaker) for convenient interaction.

The ATPU may further include a Task Results Interpreter (TRI) that analyzes and synthesizes the outcomes of the various subtasks to generate a coherent, actionable result for the user. The TRI may employ advanced reasoning, inference, and decision-making techniques to draw meaningful conclusions, provide recommendations, or suggest next steps based on the task objectives and the user's context. The TRI may also incorporate explainable AI principles to provide transparent, interpretable rationales for its conclusions or recommendations, enabling the user to understand and trust the ATPU's outputs. Additionally, the TRI continuously learns from user feedback and task outcomes to refine its interpretations and improve its performance over time.

According to one embodiment, assistant system 2 incorporates mechanisms to prioritize tasks based on their urgency or importance. This prioritization functionality may be managed by the system's ATPUs, exemplified by ATPUs

144 and 146, and under the coordination of ATPU management unit 150. For example, when a user assigns a high-priority tag to a specific task via voice input received by microphone 102, processor 122 is configured to execute instructions to process this voice input using the transformer-based language model for contextual understanding. The high-priority tag may then be associated with the task's representation within contextual memory unit 116.

ATPU management unit 150 configured to continuously monitor the priority tags of pending tasks stored in contextual memory unit 116. Upon identifying a high-priority task, ATPU management unit 150 dynamically reallocates processing resources, such as those of ATPUs 144 and 146, to expedite the completion of the high-priority task. This reallocation may involve temporarily suspending or slowing down the execution of lower-priority or routine tasks. Throughout the task prioritization and execution process, assistant system 2 leverages its voice recognition capabilities to interpret user commands, its contextual understanding to appropriately categorize and tag tasks, and its dialog management to provide users with updates on task progress via speaker 142. The wireless communication device 132 may be utilized by assistant system 2 to access any necessary external information or services to complete the prioritized tasks. The non-volatile system memory unit 118 may be configured to retain the task prioritization preferences across usage sessions, allowing assistant system 2 to maintain a consistent task management approach tailored to the user's needs.

Figure 12:
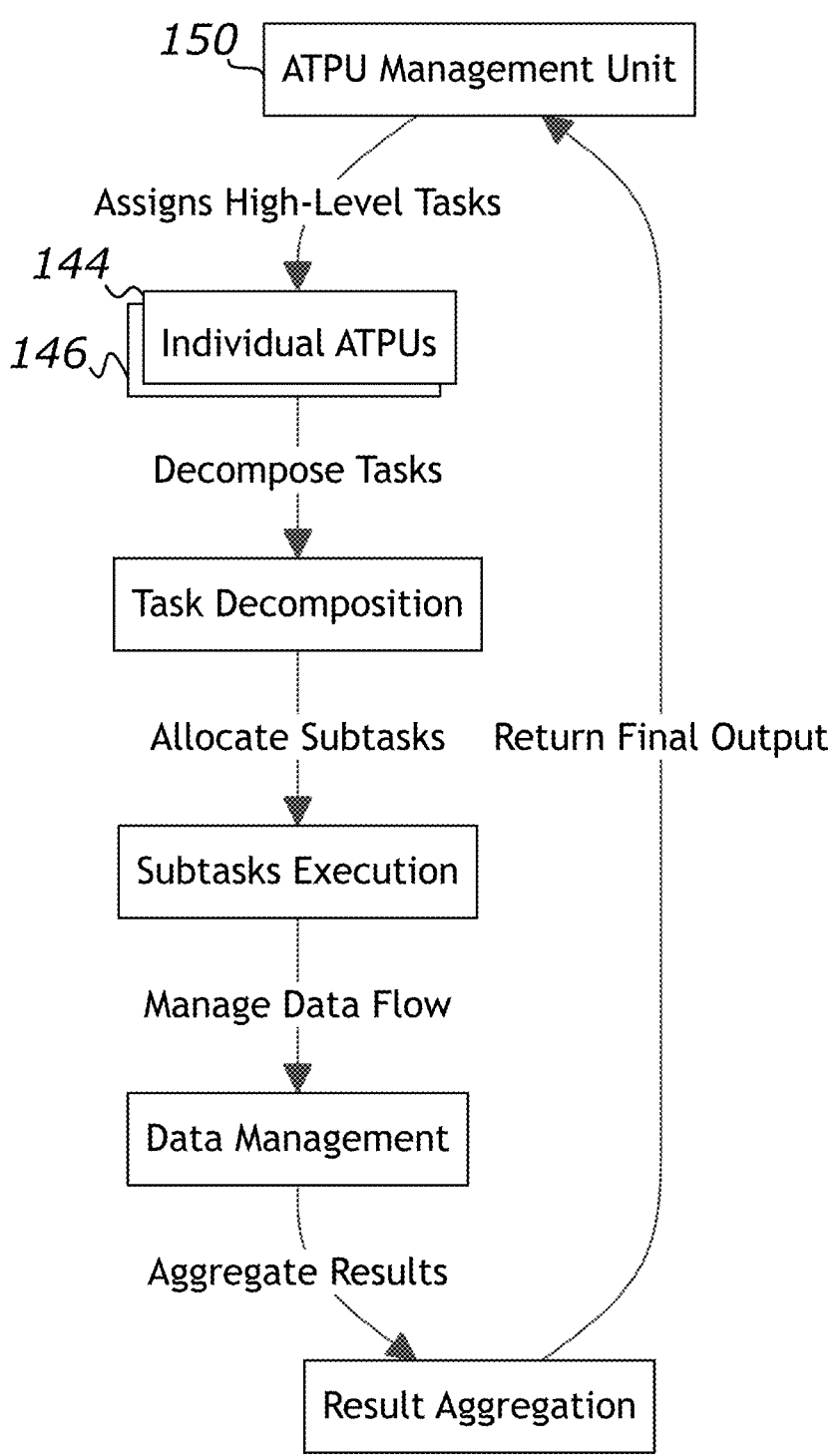
FIG. 12 is a schematic diagram illustrating a hierarchical structure of an Agentic Task Processing Unit management system in an AI assistant, according to at least one embodiment of the present invention

According to one embodiment, the ATPU management in assistant system 2 may be implemented on a hierarchical basis. In this hierarchical structure schematically illustrated in FIG. 12, ATPU management unit 150 sits at the top level and is configured for overseeing and coordinating the activities of multiple individual ATPUs. ATPU management unit 150 assigns high-level tasks to the individual ATPUs based on their capabilities, current workload, and the overall system priorities.

Upon receiving a high-level task from ATPU management unit 150, each individual ATPU is responsible for breaking down the task into smaller, more manageable subtasks. The ATPUs may employ their own internal task decomposition mechanisms, which may involve a combination of rule-based and learning-based approaches, to determine the optimal way to divide the high-level task into subtasks. This decomposition process takes into account factors such as the logical dependencies between different parts of the task, the available resources within the ATPU, and the expected computational complexity of each subtask.

Once the high-level task is decomposed into subtasks, the individual ATPU assigns these subtasks to its internal processing units or specialized accelerators, such as neural processing units (NPUs) or graphics processing units (GPUs). These processing units may be optimized for specific types of operations, such as matrix computations, data parallel processing, or signal processing, and can efficiently execute the subtasks allocated to them. The individual ATPUs also manage the flow of data and intermediate results between their internal processing units. They ensure that the necessary inputs are provided to each subtask, and the outputs are collected and aggregated as needed to produce the final result for the high-level task. The ATPUs may employ various data management techniques, such as caching, prefetching, and data compression, to minimize data movement overheads and optimize the utilization of memory bandwidth.

As the subtasks are being executed, the individual ATPUs continuously monitor their progress and adapt to any changes in the task requirements or the available resources. They may employ dynamic scheduling and load balancing techniques to redistribute the subtasks among the processing units, ensuring that the workload is evenly distributed and the overall performance is optimized.

Once all the subtasks are completed, the individual ATPUs aggregate the results and produce the final output for the high-level task assigned by ATPU management unit 150. They may also perform post-processing operations, such as data formatting, compression, or encryption, before sending the results back to ATPU management unit 150. ATPU management unit 150, in turn, collects the results from the individual ATPUs and integrates them to provide a comprehensive solution for the original complex task. It may also perform additional post-processing, such as results validation, error handling, or data visualization, before presenting the final output to the user or other components of assistant system 2.

It may be appreciated that by adopting this hierarchical approach to ATPU management, assistant system 2 can efficiently handle complex and diverse tasks by leveraging the specialized capabilities of multiple ATPUs. The ATPU management unit provides high-level coordination and resource allocation, while the individual ATPUs focus on decomposing tasks, executing subtasks, and managing their internal resources. This hierarchical structure may be advantageous for assistant system 2 to scale its processing capabilities, adapt to changing task requirements, and deliver high-performance, reliable, and efficient results for a wide range of applications.

The background processing with advanced agentic functionalities that leverages the capabilities of ATPUs 144 and 146 and is coordinated by the ATPU management unit 150 may be advantageously utilized to process user commands in the background and prepare responses without immediate user prompts and without necessarily outputting the results as soon as the results are generated or become otherwise available. This may be particular useful for implementations or uses of assistant system 2 in which these units are designed to autonomously handle tasks such as data analysis, content creation, and complex problem-solving, thus enhancing the system's overall efficiency and responsiveness.

For example, upon receiving a user command to perform such a task via microphone 102, assistant system 2 engages in background processing using its NLP- and/or TPU-enabled processor units. These units tokenize, encode, and contextually understand the command, then generate a preliminary response using transformer-based language models, accessing external data sources, if necessary. This response may be temporarily stored in a buffer, ensuring it is readily available for delivery at the optimal moment. Assistant system 2 may continuously monitor and analyzes spoken utterances during an ongoing conversation, employing sophisticated voice activity detection (VAD) algorithms to identify natural pauses and breaks in the dialogue. This real-time analysis may be coupled with the system's deep contextual understanding, facilitated by the contextual memory unit 116 and LLM(s). Assistant system 2 may also use this stored context to gauge the relevance and appropriateness of the buffered response.

To determine the optimal moment for presenting its response, assistant system 2 may evaluate various factors such as the length of pauses, the conversational flow, and the importance of the information to be conveyed. It preferably avoids interrupting active exchanges unless the buffered response is deemed critical or time-sensitive, in which case assistant system 2 can proceed with outputting the response as soon as it is generated.

The decision-making process may involve assessing the conversational dynamics and prioritizing user engagement and experience. In one embodiment, processor 122 continuously monitors the conversation for pauses, gaps, or other natural breaking points that indicate an opportune moment to interject with the prepared response. This may involve analyzing various prosodic features of the speech input, such as intonation, rhythm, and stress patterns, to identify suitable junctures in the conversation flow. Additionally, the system may leverage its contextual understanding of the conversation, derived from the data stored in contextual memory unit 116, to semantically parse the discourse and determine when a particular topic or exchange has concluded, making it an appropriate time to present the generated response.

In one embodiment, assistant system 2 employs a predictive model to anticipate the likelihood of a user command or query based on the real-time analysis of the conversation content and context. If the model determines that a user is likely to issue a command or ask a question that falls within the domain of the AI assistant's knowledge base, the system may preemptively generate a relevant response and buffer it in RAM 124 or another suitable storage medium. This buffered response can then be quickly retrieved and output via speaker 142 when the user actually issues the anticipated command or query, thereby reducing the perceived response latency and improving the overall user experience. Assistant system 2 may also be configured to pre-generate multiple candidate responses according to various scenarios determined from the conversational context data and likewise store them in RAM 124 for the subsequent output of one or more of these candidate responses to the user(s) based on reasoning and determining which of those stored candidate responses are relevant or optimal in the most recently updated context of the conversation.

According to some embodiments, processor 122 is specifically configured to execute instructions to prioritize urgent or time-sensitive information in the generated conversational response based on the conversational context data. The processor may be further configured to execute instructions to detect user confusion or frustration based on the voice input and generate a clarifying or empathetic conversational response, particularly prioritizing it over other generations and/or queued responses.

In a further embodiment, assistant system 2 may be configured to generate and store multiple potential responses based on its analysis of the conversation context and the anticipated user needs. These responses may be ranked and prioritized based on their relevance, specificity, and alignment with the current conversation topic. As the conversation progresses and new speech input is received, the system dynamically updates the ranking and content of the buffered responses to ensure that the most appropriate and timely response is ready to be presented when a suitable opportunity arises.

For example, in a multi-user setting where users 202, 204, and 206 are engaged in a discussion, assistant system 2 may wait for a pause in the conversation, a direct cue from a control voice, or indirect ques obtained from analyzing the semantic context of the conversation before introducing its response via speaker 142. This system's configuration to seamlessly integrate its input at appropriate times may enhance the conversation without causing disruption. Furthermore, the AI assistant's predictive functionality may be configured to anticipate potential user queries based on the ongoing discussion and previously stored interactions.

According to one embodiment, assistant system 2 is configured to respond to user requests for status updates on specific tasks through voice commands. For example, the user may initiate the request by issuing a voice command, which is captured by microphone 102 and processed by processor 122. Assistant system 2 leverages its voice recognition capabilities to interpret the user's command, which may include identifying the specific task or tasks for which the status update is requested. For example, a user may ask, "What is the status of my email follow-up task?" or "Provide an update on all my current tasks."

Upon recognizing the user command, assistant system 2 accesses the TPT within the ATPU. The TPT may be configured to maintain and constantly update comprehensive information on the status, progress, and outcomes of each task being performed. This information may include details such as completion percentages, intermediate results, encountered issues, and expected completion times., Assistant system 2 can use the TIM to generate a response based on the retrieved data. The TIM should preferably employ advanced natural language generation techniques to formulate a clear and contextually relevant status update. For instance, if the user inquires about a specific task, the TIM constructs a response that includes the current state of the task, any pending actions, and the estimated time to completion. The response might be phrased as, "The email follow-up task is 60% complete. I have sent follow-up emails to three out of five contacts, and I expect to finish the task by 3 PM today."

In scenarios where the user requests updates on multiple tasks, assistant system 2 compiles a summary report of all relevant tasks tracked by the TPT. The TIM then structures the report to provide a succinct yet comprehensive overview. For example, the response to a query such as "Update me on all my tasks" could be, "You have three ongoing tasks. The email follow-up task is 60% complete and expected to finish by 3 PM. The report generation task is 40% complete, with an estimated completion time of 5 PM. The data analysis task is in progress and currently at 30%, with no issues reported so far."

To enhance user interaction, assistant system 2 can further allow users to request more detailed information about specific aspects of a task. For example, a user may ask, "What issues have been encountered with the data analysis task?" In response, the TIM provides a detailed explanation, such as, "The data analysis task encountered a data inconsistency issue in dataset A, which has been resolved. The task is now proceeding with the next phase of analysis."

Assistant system 2 being configured to dynamically adjust its responses based on real-time data from the TPT may be advantageously utilized to enable the functionality where users receive accurate and up-to-date information periodically, upon task completion, upon reaching significant progress or milestone, or upon user's request. This functionality may be particularly beneficial in high-paced environments where users need timely updates to make informed decisions. Additionally, providing assistant system 2 with continuous learning capabilities may be advantageously utilized to improve the accuracy and relevance of its status updates over time, adapting to user preferences and task-specific nuances.

According to another embodiment, assistant system 2 integrates multimodal input processing to enhance the status update functionality. Users can interact with assistant system 2 not only through voice commands but also through text or gestures. For instance, a user may type a query in a chat interface or use a gesture or a visual cue (which can be captured by camera 168 and processed by computer vision techniques) to trigger a status update request. The multimodal processing unit processes these inputs and generates the corresponding status updates using the same TPT and TIM mechanisms described above.

According to one embodiment, assistant system 2 is equipped with functionality to stop, pause, or cancel task execution based on user commands. These commands are processed through the same voice recognition and processing capabilities previously described. When a user issues a command such as "Pause the email follow-up task," "Stop the data analysis task," or "Cancel the report generation task," microphone 102 captures the voice input, and processor 122 processes the command to identify the specific task and the requested action.

Upon recognizing a stop, pause, or cancel command, assistant system 2 interfaces with the TPT and the ATPU to update the task status accordingly. The ATPU executes the required control operations on the task. When a user requests to pause a task, the ATPU temporarily halts the task's execution and saves the current state of the task within the TPT. This saved state should preferably include all relevant data, intermediate results, and the exact point of execution at which the task was paused. The TIM then confirms the action to the user by generating a response such as, "The email follow-up task has been paused." When a user issues a stop command, the ATPU terminates the task's execution and updates the TPT to reflect that the task has been stopped. Unlike a paused task, a stopped task does not retain its state for resumption. The TIM then notifies the user, "The data analysis task has been stopped." Upon receiving a cancel command, the ATPU halts the task execution and removes any associated data from the TPT. This action ensures that no further resources are allocated to the canceled task, and all progress is discarded. The TIM confirms the cancellation to the user by stating, "The report generation task has been canceled."

In one exemplary scenario, a user may be working on multiple tasks and realizes they need to temporarily pause one task to focus on another. The user issues the command, "Pause the email follow-up task." Assistant system 2 processes this command, pausing the task and saving its current state. The user then receives confirmation: "The email follow-up task has been paused." Later, the user can resume the task by saying, "Resume the email follow-up task," and assistant system 2 retrieves the saved state from the TPT and continues the task from where it was paused.

In a further exemplary scenario, during a data analysis task, the user decides that the task's results are no longer needed. The user says, "Stop the data analysis task." Assistant system 2 processes this command and stops the task, updating the TPT to indicate that the task has been terminated. The TIM then informs the user, "The data analysis task has been stopped."

In a yet further exemplary scenario, the user starts a report generation task but later determines that the report is no longer required. The user issues the command, "Cancel the report generation task." Assistant system 2 processes the command, cancels the task, and deletes any associated data from the TPT. The TIM confirms the action: "The report generation task has been canceled." In a yet further exemplary scenario of a dynamic work environment, the user might need to manage several tasks concurrently. For instance, the user could say, "Pause the email follow-up task and stop the data analysis task." Assistant system 2 processes both commands simultaneously, pausing the email follow-up task and stopping the data analysis task, and provides the user with respective confirmations for each action.

According to one embodiment, assistant system 2 includes a comprehensive logging mechanism within the TPT to maintain detailed records of current, completed, and canceled tasks. This log may be designed to provide users with a clear and organized overview of their task history, facilitating effective task management and review. The TPT continuously updates and stores information about each task's status, including timestamps for when tasks are started, paused, stopped, canceled, or completed. For current tasks, the log includes ongoing progress updates, intermediate results, and any issues encountered. For completed tasks, the log retains final outcomes, completion times, and any relevant data or reports generated. Canceled tasks are also recorded, noting the reasons for cancellation if provided, and the state of the task at the time of cancellation. Users can access this log through voice commands, such as "Show me the log of my tasks," to receive a summary or detailed view of their task history. The TIM can generate natural language summaries of this log, presenting the information in a clear and user-friendly manner. For example, the TIM might respond with, "You have three current tasks: the email follow-up task is paused, the data analysis task is ongoing and 50% complete, and the report generation task has been canceled. Additionally, you completed two tasks today: meeting scheduling and document review."

Example 11

An embodiment of assistant system 2, called "Vacation-Mate" is specialized in travel planning and configured for agentic functionality by autonomously planning a family vacation tailored to the user's preferences and budget.

User: "Assistant, I want to plan a family vacation for this summer. We enjoy outdoor activities and exploring new cities. Can you help me find some good options within my budget of $5,000?"

VacationMate: "Certainly! I'll start working on finding the best family vacation options based on your preferences and budget. Please give me some time to research and compile a list of recommendations. I'll notify you as soon as I have the results ready."

Behind the scenes, assistant system 2's Agentic Task Processing Unit (ATPU) begins the complex process of planning the family vacation. The Task Orchestration Engine (TOE) decomposes the high-level task into various subtasks.

In the illustrated example, VacationMate may begin with gathering more information about the user's preferences, such as preferred dates, departure location, family size, and ages of family members. VacationMate may scan check its contextual memory unit to see if it has any previously stored information about the user's travel preferences, such as preferred airlines, accommodation types, or destinations. If relevant information is found, VacationMate retrieves it to inform the current task being orchestrated by TOE.

VacationMate processes the user's response using its natural language understanding and speech recognition modules to extract the relevant information. VacationMate may also engage in a follow-up conversation with the user, leveraging its multi-modal input processing capabilities to gather additional information. For example: VacationMate: "To help me plan the best vacation for your family, could you please provide some more details? What are your preferred travel dates, departure location, family size, and the ages of your family members?" User: "We'd like to travel in the last two weeks of July, departing from New York City. There are four of us: two adults and two children, ages 8 and 12."

VacationMate proceeds to researching popular family vacation destinations that offer outdoor activities and city exploration. VacationMate may access external databases and APIs to gather information on popular family vacation destinations. These databases should preferably contain extensive information on destinations, including user reviews, ratings, and categorization of available activities. VacationMate may further use web scraping techniques to gather additional information from travel blogs, forums, and websites. It analyzes the content of these sources to identify destinations frequently mentioned in the context of family vacations, outdoor activities, and city exploration. Vacation-Mate's language model may be pre-trained on a vast corpus of text data, including travel-related information. This pre-existing knowledge helps the system identify popular destinations and activities based on their frequency and context within the training data. VacationMate may further employ collaborative filtering techniques to identify destinations popular among users with similar preferences. By analyzing the travel patterns and ratings of users who have searched for or booked family vacations with outdoor and city activities, VacationMate can identify top destinations that align with the current user's interests. VacationMate may further integrate geospatial data from sources like Google Maps and OpenStreetMap to identify destinations with a high concentration of outdoor activities (e.g., hiking trails, beaches, parks) and city attractions (e.g., museums, restaurants, landmarks) within close proximity. This analysis can be used to ensure that the recommended destinations offer a balance of both types of activities.

VacationMate further analyzes user's past travel data (if available) to identify trends and preferences. If the user has previously booked travel through a linked travel platform, VacationMate may access the user's booking history (with permission) to identify additional preferences, such as preferred cabin class for flights or room types for accommodations.

VacationMate may further check flight, accommodation, and activity prices for the identified destinations. It may further compare prices and availability across multiple travel platforms and providers, generate sample itineraries for each destination, considering factors like travel time, activity durations, and family-friendly schedules, estimate total costs for each option, including flights, accommodations, activities, and additional expenses, and rank the options based on their alignment with the user's preferences, budget, and other relevant factors.

As the ATPU works on these subtasks, a Context Awareness Module (CAM) incorporated into VacationMate continuously monitors relevant factors, such as changes in flight prices, weather forecasts for the destinations, or any relevant travel advisories. The TOE uses this contextual information to adapt the task execution, such as re-prioritizing destinations or adjusting itineraries. VacationMate further incorporates Task Progress Tracker (TPT) configured to record the progress and status of each subtask. If any issues or uncertainties arise, a Task Interaction Manager (TIM) may be used to prompt the user for additional input or confirmation. For example:

VacationMate: "I found a great deal on flights to Orlando, but it would require departing on a Thursday instead of a Friday. Would you be open to a Thursday departure to save on flight costs?"

User: "Yes, a Thursday departure would work for us."

After processing all the subtasks and analyzing the results, a Task Results Interpreter (TRI), also incorporated into VacationMate, generates a ranked list of the top 3 family vacation recommendations, along with detailed itineraries, cost breakdowns, and rationales for each option. The TRI presents this information to the user in a clear, organized format:

VacationMate: "I've completed the research and analysis for your family vacation. Here are my top 3 recommendations:

Orlando, Florida: 7-day trip with visits to theme parks, outdoor adventures, and city attractions. Estimated cost: $4,850.

San Diego, California: 6-day trip featuring beach activities, zoo visits, and exploring the city. Estimated cost: $4,600.

Denver, Colorado: 7-day trip with hiking, visits to nearby mountain towns, and city cultural experiences. Estimated cost: $4,400.

I've considered your preferences for outdoor activities, city exploration, and budget constraints in generating these recommendations. Let me know if you'd like more details on any of these options or if you'd like me to make any adjustments to the plans."

End of Example 11

It should be understood that minimizing latency can be crucial for the AI assistant system to provide a seamless, natural, and efficient interaction experience in many real-world scenarios. Whether the AI assistant is engaging in a one-on-one conversation, facilitating a multi-user discussion, or proactively offering assistance based on the context, users may expect quick and relevant responses. It was determined through studies and experimentation that, in practical situations, such as customer support, virtual meetings, or hands-free interactions while driving, even small delays in the AI assistant's responses can lead to user frustration, reduced productivity, reduced user satisfaction with the product, or safety concerns. By consistently reducing latency across various aspects of its functionality, including conversation processing, command handling, information retrieval, and proactive assistance, as described in foregoing embodiment, the AI assistant can deliver a more human-like, responsive, and reliable interaction experience. This, in turn, may enhance user satisfaction, trust, and adoption of the AI assistant technology in diverse real-world applications.

According to an aspect of the present invention, the definitions and measures of latency, as well as its mitigations strategies may differ in various applications scenarios. For example, let's consider a conversation recording and processing latency scenario in which latency may be defined as the time taken by the AI assistant system to record, process, and understand the conversation between users. This may include the time taken for capturing the audio data through the microphone, converting the audio data into a suitable format for processing, applying noise reduction and speech enhancement techniques, performing voice activity detection and speaker diarization, generating the textual transcription of the speech using automatic speech recognition (ASR), conducting natural language understanding (NLU) tasks such as tokenization, named entity recognition, and sentiment analysis, and updating the conversation context in the sliding window memory. Minimizing this latency may be important for the AI assistant to provide real-time, contextually relevant responses to user commands. The foregoing disclosure describes various techniques to reduce this latency, such as parallel processing, efficient memory management, and model optimization, for example.

In a user command processing latency scenario, latency may refer to the time taken by the AI assistant system to process and respond to a user command after the command has been issued. This may include the time taken for detecting the designated wake word or control phrase, capturing and processing the user command audio, interpreting the user command using natural language understanding techniques, retrieving relevant information from the conversation context stored in the sliding window memory, generating an appropriate response using natural language generation (NLG) models, converting the generated response into speech using text-to-speech (TTS) synthesis, and playing back the synthesized speech response through the speaker. Minimizing this command processing latency is essential for the AI assistant to provide a seamless, natural interaction experience. The foregoing disclosure discusses various methods to reduce this latency, such as using efficient ASR and TTS models, optimizing NLU and NLG pipelines, and leveraging hardware acceleration.

In an information retrieval latency scenario, the latency may pertain to the time taken by the AI assistant system to retrieve relevant information from external sources or long-term memory in response to a user command or query. This may include the time taken for generating appropriate search queries based on the user command and conversation context, querying external databases, knowledge bases, or web services through APIs, parsing and filtering the retrieved information to extract relevant snippets, conducting information fusion and summarization to generate a concise, coherent response, and storing and indexing the retrieved information in long-term memory for future reference. Minimizing this information retrieval latency is vital for the AI assistant to provide timely, informative responses to user queries. The above disclosure outlines several techniques to reduce this latency, such as efficient query generation, parallel API requests, and intelligent caching mechanisms.

In a proactive response generation latency scenario, latency may refer to the time taken by the AI assistant system to generate proactive responses or suggestions based on the ongoing conversation context, without explicit user commands. This may include the time taken for continuously analyzing the conversation context to identify potential user needs or intents, generating candidate responses or suggestions using language models and knowledge bases, ranking and filtering the candidate responses based on relevance, coherence, and user preferences, and presenting the top-ranked proactive response to the user at an appropriate time. Minimizing this proactive response generation latency may be important for the AI assistant to provide timely, context-aware assistance and enhance the overall user experience. The above disclosure details various methods to reduce this latency, such as efficient candidate generation algorithms, real-time context analysis, and user behavior modeling.

In a multi-user interaction latency scenario, latency may be refer to the time taken by the AI assistant system to process and respond to multiple users engaged in a conversation, while considering their individual preferences and privacy settings. This may include the time taken form maintaining separate conversation contexts and memory windows for each user, applying user-specific privacy filters and data access controls during information retrieval and sharing, generating personalized responses for each user based on their individual context and preferences, coordinating turn-taking and managing interruptions or overlapping speech from multiple users, and other functions. Minimizing multi-user interaction latency may be important for the AI assistant to provide a smooth, personalized experience in collaborative or group conversation settings. The above disclosure discusses various techniques to reduce this latency, such as parallel context management, efficient privacy-preserving algorithms, and dynamic turn-taking models.

According to one practical implementation of the AI assistant, an effective total response latency may be defined as the time interval measured in seconds between the moment a user issues a voice command and the moment the AI assistant begins outputting its response via speaker 142. In this context, the latency measurement captures the end-to-end processing time of a user's voice command, encompassing all the intermediate steps required to generate and deliver an appropriate response. Depending on the nature of the user's command, this may include time taken by the AI assistant to execute various steps and begin responding to the user via the speaker. In one example, example, it may include voice command detection time (e.g., the time taken to detect the designated wake word or control phrase that indicates the start of a user command), voice command capture time (e.g., the time taken to record and buffer the user's voice command audio after the wake word detection), voice command processing time (e.g., the time taken to convert the captured voice command audio into a textual representation using automatic speech recognition (ASR) techniques), natural language understanding (NLU) time (e.g., the time taken to interpret the user's intent, extract relevant entities, and resolve any ambiguities or references using NLU algorithms), conversation context retrieval time (e.g., the time taken to fetch relevant conversation history and contextual information from the sliding window memory mechanism), response generation time (e.g., the time taken to generate an appropriate response to the user's command using natural language generation (NLG) models, considering the conversation context and the user's intent), text-to-speech (TTS) synthesis time (e.g., the time taken to convert the generated response text into a speech waveform using TTS algorithms), and audio playback initiation time (e.g., the time taken to initialize the audio playback pipeline and start outputting the synthesized speech response via speaker 142).

By measuring the effective total response latency as the total time elapsed from the end of the user's voice command to the beginning of the AI assistant's spoken response, one can perform a comprehensive assessment of the system's responsiveness from the user's perspective. This latency definition may be particularly relevant for evaluating the performance and usability of the AI assistant in real-time, conversational scenarios where users expect quick and natural interactions. Minimizing this effective total (end-to-end) response latency can have a particular practical importance for maintaining user engagement, trust, and satisfaction with the AI assistant. The above-disclosed embodiments and examples describe various techniques and optimizations employed by the invention to reduce this latency, such as, for example, efficient wake word detection and voice command segmentation algorithms, parallel processing pipelines for ASR, NLU, and NLG tasks, optimized sliding window memory mechanism for fast context retrieval, domain-specific language models and knowledge bases for accurate and fast response generation, hardware acceleration and resource management techniques for TTS synthesis and audio playback.

These mechanisms can work in conjunction with the other techniques described in foregoing embodiments and examples to further optimize the system's performance and minimize the effective total response latency. For example, the proactive response generation may be advantageously utilized for this purpose, as the AI assistant system continuously analyzes the conversation context and user behavior to anticipate potential user needs or queries, and pre-generates responses to these predicted queries in the background, allowing for faster response delivery when the user actually issues a related command. Caching and prefetching may be leveraged such that the AI assistant system maintains a cache of frequently accessed data, such as common user commands, popular knowledge base entries, or recently retrieved information, and prefetches relevant data based on the current conversation context, reducing the latency associated with on-demand information retrieval. The dynamic resource allocation in which the AI assistant system dynamically allocates computational resources, such as CPU, GPU, or memory, to different processing tasks based on their priority and urgency may ensure that critical tasks, such as wake word detection or response generation, have sufficient resources to execute quickly, minimizing latency. The disclosed techniques like model compression, pruning, and quantization may be used to reduce the size and complexity of the machine learning models used for ASR, NLU, NLG, and TTS tasks, considering that smaller and more efficient models can generally process data faster, leading to lower latency.

Edge computing and distributed processing can be leveraged such that the AI assistant system distributes its processing tasks across multiple devices or nodes, such as edge servers or the user's own devices. By processing data closer to the source and reducing the need for network communication, edge computing can significantly reduce the overall latency. Adaptive sampling and precision may be advantageously utilized such that the system dynamically adjusts the sampling rate and precision of the audio input and output based on the current context and user requirements. For example, it may use lower sampling rates or precision during non-critical phases of the conversation to reduce processing overhead and latency. The AI assistant system can employ asynchronous and event-driven processing paradigms to decouple different tasks and allow them to execute independently. This may reduce response times by eliminating the need for sequential execution and allowing the system to handle multiple user commands or events concurrently. The system can further use advanced scheduling algorithms and load balancing techniques to optimize the allocation and execution of different processing tasks across available resources, where the latency can be minimized by promptly executing high-priority tasks and evenly distributing the overall system load. Network optimization and protocol enhancements can be implemented such that the AI assistant system employs various network optimization techniques, such as data compression, packet prioritization, or low-latency protocols, to reduce the latency associated with data transmission between different components or devices.

For social media integration, assistant system 2 may incorporate a social media integration module that enables the system to access and retrieve user social media data from various social media platforms. The module may use the appropriate APIs and authentication protocols to securely connect to the user's social media accounts and fetch relevant data, such as user profiles, posts, comments, likes, and interactions. The retrieved social media data may be processed and analyzed by processor 122 to extract useful information, such as user interests, preferences, opinions, and social connections. This information may then be used to enhance the contextual understanding of the user's conversations and to generate more personalized and relevant conversational responses. For example, if the user mentions a recent vacation they took, the social media integration module can retrieve related posts and photos from the user's social media accounts and use this information to generate a response like, "It looks like you had a great time in Hawaii based on your recent posts! What was your favorite part of the trip?"

According to one embodiment, assistant system 2 may be configured to work in conjunction with Augmented Reality (AR) or Virtual Reality (VR) devices (e.g., headsets, smart glasses, and the like) to provide contextual, real-time information or assistance based on the user's virtual environment. According to one embodiment, assistant system 2 may be integrated with Internet of Things (IoT) devices where it can be used to control smart home devices based on conversation context or user commands. Assistant system 2 may be further provided with sleep and wake functionality. For example, the system can have a sleep mode where it listens less actively, and a wake-up command that brings it back to full activity.

While some of the foregoing embodiments related to processing users' voice input have been described in the context of converting such user input to text, this invention is not limited to this and can be applied to cases where the user input is processed directly in its audio, visual, or combined audio/visual form, e.g., by utilizing the advanced multi-modal capabilities of the AI assistant system. Camera 168 may be used to complement the audio input with visual inputs (e.g., individual still images, series of still images, and moving images or video), creating an independent communication channel or a combined communication channel with multiple types of input.

For example, according to at least some embodiments, the AI assistant system may include advanced techniques for processing audio signals directly without converting them to text. These techniques may involve extracting relevant features from the audio signal, such as Mel-frequency cepstral coefficients (MFCCs), spectral features, and temporal patterns. Noise reduction algorithms and signal enhancement methods are applied to improve the clarity and quality of the audio input. The system's CNNs may be adapted for analyzing audio spectrograms and RNNs designed to handle sequential audio data.

These models may be specifically pre-trained on large datasets of spoken commands and fine-tuned for specific applications within the AI assistant system. The AI assistant system may be configured to interpret and execute user commands based purely on audio features, ensuring real-time, accurate, and contextually relevant responses without the need for text conversion. It may fully utilize any of the above-described elements, structures and techniques to manipulate and interpret audio signals. For example, the AI assistant system may use its contextual memory unit 116 and system memory unit 118 to store and manipulate audio information in a similar fashion. For instance, according to preferred embodiments, the AI assistant system may be configured to retain only the most recent part of the conversation and/or its contextual memory unit 116 on a sliding basis such that the system always keeps the most recent portion of the conversation in a contextualized form and is ready to promptly respond to user's commands without delays associated with processing the recorded conversation. It may be appreciated that the above-described functionality of AI assistant system regarding maintaining conversation context and understanding user intent based on the audio input inherently supports a somewhat simplified functionality in which the system extracts meaningful information and context directly from the audio data using techniques like audio embeddings or acoustic models.

According to an aspect, audio-based processing embodiments may be beneficial for further reducing latency and improving responsiveness by eliminating the need for speech-to-text conversion. According to another aspect, audio-based processing embodiments may be advantageous for better handling of non-verbal cues, emotions, and acoustic events in the user's voice input. Properly implemented audio-based processing may also provide robustness to noise, accents, or other variations in the user's speech. In some application scenarios, it may also be more efficient use of computational resources by processing audio data directly, including more natural integration with other audio-based functionality, such as speaker identification or audio event detection.

In one embodiment, the AI assistant system may employ a fully end-to-end audio processing pipeline that operates directly on the user's voice input without explicit conversion to text. This audio-only processing pipeline may utilize state-of-the-art generative models, such as WaveNet, SampleRNN, or GANSynth, which can learn to generate realistic audio outputs based on input audio sequences. The user's voice input, captured through the microphone 102, may be first preprocessed to remove noise, normalize volume, and extract relevant acoustic features. These features may include MFCCs, pitch, or other spectral or temporal characteristics that capture the essential information in the audio signal. The preprocessed audio features may then fed into a hierarchical generative model, such as a stacked conditional autoencoder or a variational autoencoder (VAE), which learns to encode the input audio into a compact latent representation. This latent representation captures the underlying structure and semantics of the audio data such that the model can generate meaningful responses based on the user's voice input. The latent audio representation may be processed by a sequence-to-sequence model, such as a transformer or RNN with attention mechanis m, which learns to map the input audio sequence to a corresponding output audio sequence. This model should preferably be trained on large datasets of conversational audio data, enabling it to generate contextually relevant and coherent responses based on the user's voice input.

To generate the output audio response, the AI assistant system may employ a conditional generative adversarial network (cGAN) or a similar generative model. The cGAN can consist of a generator network that takes the latent audio representation and a random noise vector as input and generates an output audio waveform. The generator should normally be trained to produce realistic and diverse audio responses that match the conditioning input. The generated audio response may then be processed by a discriminator network, which learns to distinguish between real and generated audio samples. The discriminator provides feedback to the generator, allowing it to improve the quality and naturalness of the generated audio over time. This adversarial training process should preferably be configured to enable the AI assistant system to generate high-fidelity audio responses that closely resemble human speech.

To ensure that the generated audio response is contextually relevant and aligns with the user's intent, the AI assistant system may incorporate an audio-based context understanding module. This module can use techniques like audio embeddings, acoustic topic modeling, or audio-based sentiment analysis to extract meaningful information from the conversation history and guide the response generation process. In operation, the audio-based context understanding module maintains a sliding window memory of the recent conversation audio, similar to the text-based context tracking described in the original specification. It continuously updates the conversation context representation based on the incoming audio data, allowing the AI assistant to maintain a coherent and contextually relevant dialogue.

During the response generation process, the AI assistant system may use the audio-based conversation context to condition the generative model, ensuring that the generated audio response is consistent with the ongoing dialogue and the user's intent. The system may also employ reinforcement learning techniques to fine-tune the response generation based on user feedback and engagement metrics. Once the audio response is generated, it may be post-processed to enhance its clarity, naturalness, and expressiveness. This may involve techniques like audio style transfer, prosody modeling, or emotional speech synthesis, which can imbue the generated speech with appropriate intonation, emphasis, and emotional cues based on the conversation context.

Finally, the generated audio response may be played back to the user through the audio communication device, such as speaker 142. The AI assistant system continuously monitors the user's voice input and generates responses in real-time, enabling a seamless and natural audio-based conversation without the need for explicit text conversion.

In another embodiment, the AI assistant system combines audio-based processing with visual and text-based input to enable multi-modal context understanding and response generation. In this embodiment, the user's voice input is processed using the audio-only pipeline described above, while simultaneously analyzing any available visual data (e.g., facial expressions, gestures) and textual information (e.g., chat messages, captions) to enhance the context understanding. The visual data is processed using computer vision techniques, such as convolutional neural networks (CNNs) or recurrent neural networks (RNNs), to extract relevant features and interpret the user's non-verbal cues. The textual data is processed using natural language processing (NLP) techniques, such as word embeddings, transformers, or language models, to extract semantic information and intent.

The audio, visual, and textual features are then fused using multi-modal embedding techniques, such as cross-modal attention or tensor fusion, to create a unified representation of the user's input. This multi-modal representation captures the complementary information from different modalities and provides a richer context for understanding the user's intent and generating appropriate responses. The multi-modal context representation is used to condition the generative models in the audio processing pipeline, allowing the AI assistant to generate responses that are not only contextually relevant but also aligned with the user's visual and textual cues. For example, if the user's facial expression indicates confusion, the AI assistant system can generate a more detailed or clarifying audio response to address the user's needs.

Furthermore, the AI assistant system can use the multi-modal context to generate visual or textual outputs in addition to the audio response. For instance, it can generate relevant images, videos, or text snippets that complement the audio response and provide additional information or assistance to the user. The visual and/or textual information may be displayed to the user using display 145 or any other suitable device. It may be appreciated that the integration of audio, visual, and textual modalities in the AI assistant system may enable a more comprehensive and natural interaction experience, allowing users to communicate with the assistant using their preferred modalities or a combination thereof. The system can seamlessly switch between or combine different input and output modalities based on the user's preferences and the conversation context, further enhancing user experience, e.g., compared to text-only communication.

This may be further illustrated in reference to the exemplary implementation of the AI assistant system 2 as the ElderlyCareBot described in the above examples. According to one embodiment, the ElderlyCareBot may incorporate an audio-only processing pipeline to directly understand and respond to the elderly user's voice input without explicit text conversion. This approach may be particularly beneficial for elderly users who prefer a more natural, conversation-like interaction with the robot.

The ElderlyCareBot may be equipped with a high-quality microphone array that captures the user's voice input from various directions and distances. The microphone array may employ beamforming techniques, such as delay-and-sum or minimum variance distortionless response (MVDR), to enhance the signal-to-noise ratio and focus on the user's speech while suppressing background noise. The captured audio signal may undergo preprocessing to remove any remaining noise, echo, or reverberation using techniques like spectral subtraction, adaptive filtering, or deep learning-based denoising autoencoders. The preprocessed audio may then be segmented into short overlapping frames (e.g., 20-40 ms) for further analysis. The audio frames are then passed through a feature extraction module that computes relevant acoustic features, such as MFCCs, pitch, energy, or spectral flux. These features may be configured to capture the essential characteristics of the speech signal and provide a compact representation for subsequent processing.

The extracted features may be fed into a DNN based acoustic model, such as a CNN or an LSTM network. The acoustic model is trained on a large dataset of elderly speech samples, capturing the unique acoustic properties, intonation patterns, and linguistic variations specific to the elderly population. The acoustic model outputs a sequence of phoneme or senone probabilities, representing the likelihood of each speech sound at each time step. These probabilities are then passed through a decoder module, which incorporates a language model and a pronunciation lexicon to map the phoneme sequences to words or phrases. The language model used in the decoder is specifically tailored to the elderly user's language patterns, vocabulary, and common expressions. It is trained on a large corpus of elderly speech transcripts and incorporates techniques like word embeddings, n-grams, or RNNs to capture the linguistic context and predict the most likely word sequences.

The decoded word sequences are then processed by a NLU module, which extracts the intent, entities, and sentiments from the user's speech. The NLU module employs techniques such as NER, part-of-speech (POS) tagging, dependency parsing, and sentiment analysis to comprehend the semantic meaning behind the user's words. The extracted intent and entities are passed to a dialog management module, which maintains a context-aware conversation history and determines the most appropriate response based on the user's input and the current state of the interaction. The dialog manager uses techniques like finite-state machines, frame-based dialog, or reinforcement learning to guide the conversation flow and generate relevant responses.

The generated response is then processed by a natural language generation (NLG) module, which converts the abstract dialog actions into human-like, conversational utterances. The NLG module employs techniques such as template-based generation, rule-based grammars, or neural language models to generate coherent and natural-sounding responses. The generated utterances may be passed through a speech synthesis module, which converts the text into audible speech using techniques like concatenative synthesis, parametric synthesis, or neural TTS models. The synthesized speech is specifically tailored to resemble the voice and speaking style of an empathetic caregiver, providing a comforting and familiar presence for the elderly user.

The synthesized speech output is then played back to the user through the ElderlyCareBot's high-quality speakers (e.g., speaker 142), which employ audio enhancement techniques like equalization, dynamic range compression, or spatial audio to ensure clear and intelligible speech delivery. Throughout the interaction, the ElderlyCareBot's audio-only processing pipeline operates in real-time, continuously analyzing the user's speech input and generating appropriate responses without any perceptible delay. The robot also employs active listening techniques, such as backchanneling (e.g., "mhm," "uh-huh"), to provide verbal cues and maintain an engaging conversation flow.

To further enhance the naturalness and effectiveness of the audio-only interaction, the ElderlyCareBot may incorporate additional features. For instance, it may incorporate emotion recognition where the robot analyzes the acoustic properties of the user's speech, such as pitch, energy, and spectral features, to detect the user's emotional state (e.g., happy, sad, anxious). This information may be used to adapt the robot's responses and provide emotional support when needed. It may further incorporate speaker diarization techniques in multi-user scenarios, where the robot employs such techniques to identify and track different speakers based on their unique voice characteristics, such that the robot can maintain separate conversation contexts for each user and address them individually. The ElderlyCareBot may incorporate contextual understanding where the robot uses its audio-based context tracking mechanism to maintain a coherent conversation history and resolve any ambiguities or references in the user's speech. It may use techniques like coreference resolution and discourse analysis to understand the broader context of the conversation. The ElderlyCareBot may incorporate personalization where it learns and adapts to the elderly user's individual preferences, habits, and speech patterns over time. It may employ machine learning techniques to update its acoustic models, language models, and dialog strategies based on the user's feedback and interaction history, providing a personalized and tailored assistance experience.

In addition to the audio-only processing pipeline, the ElderlyCareBot can also leverage multi-modal information to enhance its understanding and decision-making capabilities. The robot is equipped with cameras and sensors that capture visual data, such as the user's facial expressions, gestures, and body language, as well as environmental information, such as object recognition and scene understanding. The visual data is processed using CNNs or RNNs, to extract relevant features and interpret the user's nonverbal cues. For example, the robot can detect the user's smile or frown to gauge their emotional state, or recognize pointing gestures to understand references to objects in the environment. The environmental data may be processed using object detection and recognition algorithms, such as YOLO (You Only Look Once) or Mask R-CNN, to identify and locate relevant objects in the user's surroundings. This information can be used to provide context-aware assistance, such as guiding the user to locate misplaced items or providing information about objects of interest.

The audio and visual data streams may be fused using multi-modal embedding techniques, such as cross-modal attention or tensor fusion, to create a unified representation of the user's input. This multi-modal representation may be configured to capture the complementary information from different modalities and provides a more comprehensive understanding of the user's intent and needs.

The multi-modal information may be incorporated into the ElderlyCareBot's decision-making and response generation processes. For example, if the user asks for assistance with a specific task, such as preparing a meal, the robot can use its visual understanding of the kitchen environment to provide step-by-step guidance and locate the necessary ingredients or utensils, and even show the locations my marking them (or showing directions to them, e.g., using arrows) on its display screen viewable by the user. Furthermore, the multi-modal information can be used to enhance the robot's proactive assistance capabilities. By analyzing the user's visual cues and environmental context, the ElderlyCareBot can anticipate the user's needs and offer timely support or suggestions. For instance, if the robot detects that the user is having difficulty standing up from a chair, it can proactively approach and offer physical assistance or suggest a rest break.

To ensure the robustness and reliability of the ElderlyCareBot's audio-only and multi-modal processing capabilities, the system may incorporate various techniques for handling challenges such as speech recognition errors, ambiguous user input, or unexpected situations. These techniques may particularly include confidence scoring, error handling and recovery, contextual disambiguation, fallback strategies, and continuous learning and adaptation. The ElderlyCareBot robot may be configured to assign confidence scores to its speech recognition and language understanding outputs, indicating the level of certainty in its interpretations. If the confidence score falls below a predefined threshold, the robot can seek clarification from the user or provide alternative suggestions. For recovering from speech recognition errors or misinterpretations, the ElderlyCareBot can use techniques like rephrasing, asking for confirmation, or providing visual cues to resolve any confusion and maintain a smooth conversation flow. In cases where the user's input is ambiguous or incomplete, the robot can use its contextual understanding to disambiguate the meaning based on the conversation history, the user's preferences, or the environmental context. It can ask follow-up questions or provide relevant options to clarify the user's intent. If the robot encounters a situation that it cannot handle or understand, it employs fallback strategies to provide a safe and helpful response, such as offering to connect the user with a human caregiver, providing general suggestions or recommendations, or gracefully changing the topic of conversation. The ElderlyCareBot's continuous learning mechanisms may be configured to improve its performance and adapt to the user's changing needs over time using techniques like reinforcement learning, online learning, or transfer learning to update its models and strategies based on the user's feedback, interaction history, and evolving preferences.

According to an aspect, assistant system 2 is designed to seamlessly integrate with a wide range of third-party services and APIs, enabling it to extend its capabilities and provide a more comprehensive and efficient user experience. This integration may be configured to allows assistant system 2 to access and leverage external data sources, functionalities, and services to better understand and fulfill user requests, without requiring the user to manually navigate across multiple platforms or applications. The integration with third-party services and APIs may be implemented through a modular and extensible architecture that allows for the easy addition, removal, or modification of external integrations without disrupting the core functionality of assistant system 2. The system may employ a set of standardized protocols, such as REST, SOAP, or GraphQL, to communicate with external services over a network, typically using HTTP or HTTPS as the underlying communication protocol.

To establish a connection with a third-party service, assistant system 2 may be configured to authenticate and authorize itself using the service's prescribed security mechanisms, such as OAuth, API keys, or JWT, so that assistant system 2 has the necessary permissions to access and manipulate the relevant data or functionality provided by the service, while also maintaining the security and privacy of user information. Once authenticated, assistant system 2 can make requests to the third-party service's API endpoints to retrieve data, trigger actions, or update information as needed to fulfill the user's request. Assistant system 2 leverages its natural language understanding and contextual awareness capabilities to map the user's intent to the appropriate API calls and parameters, handling any necessary data transformations or formatting along the way. For example, if a user asks assistant system 2 to schedule a meeting, the system can integrate with the user's preferred calendar service, such as Google Calendar or Microsoft Outlook, to check availability, create a new event, and send invitations to the specified attendees. Similarly, if a user requests information about a particular stock, assistant system 2 can connect to a financial data provider's API, such as Yahoo Finance, for example, to retrieve real-time stock quotes and market data.

According to different embodiments, assistant system 2 may be configured to automate a wide range of tasks across various domains, including but not limited to: calendar management (e.g., scheduling meetings, setting reminders, and managing appointments), email handling (e.g., composing, sending, and organizing emails based on user instructions), task and project management (e.g., creating, assigning, and tracking tasks or projects using various online tools), information retrieval (e.g., fetching data from various sources, such as weather services, news outlets, or knowledge bases, to answer user queries, performing product research, gathering news on user-defined topic, etc.), e-commerce (e.g., assisting users with online shopping, price comparisons, and order tracking by integrating with e-commerce platforms), travel booking (e.g., helping users plan and book trips by connecting with online travel services like Expedia, Booking.com, or Airbnb), financial management (e.g., providing users with financial insights, budget tracking, and investment advice by integrating with banking apps, payment gateways, or financial planning tools), and the like.

Wireless communication device 132 enables assistant system 2 to securely connect with these external services over the internet, while the contextual memory unit 116 and the non-volatile system memory unit 118 allow the system to store and access the necessary authentication credentials, user preferences, and integration-specific data across usage sessions.

According to one embodiment, assistant system 2 utilizes its user input predictive capabilities and incorporates them into predictive task management capabilities to anticipate user needs and proactively suggest or initiate tasks. This functionality may be particularly enhanced by the system's ability to learn from user behavior and identify patterns over time. The predictive task management process may begin with data collection and analysis. As users interact with assistant system 2, the system logs various data points, such as the types of tasks requested, the timing and frequency of these requests, and the context in which they occur. This data is stored in the non-volatile system memory unit 118 and is continuously updated to reflect the most recent user behavior.

Processor 122 is configured to execute machine learning algorithms that analyze this collected data to identify patterns and correlations. For example, assistant system 2 may detect that a user frequently schedules team meetings on Monday mornings or that they tend to request financial reports near the end of each quarter. These patterns may then be used to build predictive models that can anticipate future user needs based on factors such as the current time, date, or context. When the predictive models identify a high likelihood of a particular task being needed, assistant system 2 may proactively initiate the task or suggest it to the user. For instance, if the system predicts that the user is likely to schedule a team meeting on a Monday morning, it can automatically prepare a draft agenda based on previous meeting agendas, send out invitations to the usual attendees, and reserve a suitable conference room.

The proactive suggestions may be communicated to the user via speaker 142, text messaging, email, web interface, a mobile phone application, and the like. The user can choose to accept, modify, or reject the suggested task using voice commands captured by microphone 102. If the user accepts the suggestion, assistant system 2 proceeds with executing the task using its natural language processing, dialog management, and integration capabilities. To ensure that the predictive task management functionality remains accurate and relevant, assistant system 2 may continuously refine its predictive models based on user feedback and ongoing behavior. If a user frequently rejects or modifies a suggested task, the system adjusts its models to better align with the user's preferences.

ATPUs 144 and 146, under the coordination of ATPU management unit 150 may break down complex tasks into smaller sub-tasks, allocate resources, and monitor progress, as described above, to ensure that the tasks are completed efficiently and effectively. Throughout the predictive task management process, assistant system 2 may fully utilize its contextual understanding capabilities to consider factors such as the user's current location, schedule, and priorities. This context may be maintained in the contextual memory unit 116 and is used to inform the system's predictions and suggestions.

According to one embodiment, assistant system 2 may include enhanced collaboration and multi-user support features and may be configured to facilitate cooperation and communication among multiple users. For example, assistant system 2 may be configured to manage shared tasks, mediate discussions, summarize meeting points, and coordinate group activities, while also handling permissions and roles within collaborative environments.

When multiple users interact with assistant system 2 simultaneously, the system uses its voice recognition capabilities, supported by microphone 102 and processor 122, to identify and differentiate between individual users. Each user's voice input is associated with their unique user profile, which is stored in the non-volatile system memory unit 118. These user profiles contain information about the user's roles, permissions, and preferences within the collaborative environment. As users engage in discussions or collaborate on tasks, assistant system 2 processes their voice inputs using its natural language processing and contextual understanding capabilities. The system maintains a shared context for the collaborative session in the contextual memory unit 116, which includes information about the topic of discussion, the participants involved, and the progress made on shared tasks.

Assistant system 2 may use this shared context to facilitate and mediate the collaboration process. For example, if a user asks a question related to a specific topic, the system can provide relevant information or insights based on the contributions of other users in the session. If a discussion veers off-topic or becomes unproductive, the system can gently guide the conversation back on track by reminding users of the main objectives or suggesting alternative discussion points. Throughout the collaborative session, assistant system 2 automatically summarizes key points, action items, and decisions using its language generation capabilities. These summaries are communicated to the users via speaker 142 and can also be sent to them through other channels, such as email or messaging platforms, using the wireless communication device 132 and the system's integration capabilities.

For managing shared tasks, assistant system 2 may use its task management and delegation features to assign responsibilities, set deadlines, and track progress. The system may consider factors such as user roles, permissions, and workload to ensure that tasks are distributed fairly and efficiently. Users can update their progress or request assistance using voice commands, and the system provides regular updates and reminders to keep everyone on track. For handling permissions and roles, assistant system 2 may use the information stored in the user profiles to enforce access controls and maintain the appropriate level of confidentiality. For example, if a user tries to access or modify a resource they are not authorized to, the system politely informs them of the restriction and suggests alternative actions if appropriate. To further enhance the collaboration experience, assistant system 2 can integrate with various external tools and platforms commonly used for group work, such as project management software, shared document editors, or video conferencing systems.

According to one embodiment, assistant system 2 is configured to interact with other AI assistants, which may or may not have the same capabilities or functionality as assistant system 2. This interaction is facilitated through a combination of the system's natural language processing, contextual understanding, and integration capabilities. To enable communication with other AI assistants, assistant system 2 includes a set of standardized protocols and APIs that allow for the exchange of information and commands between different systems. These protocols, such as REST, SOAP, or GraphQL, provide a common language and structure for the AI assistants to understand and respond to each other's requests.

When a user interacts with assistant system 2 and requests information or an action that involves another AI assistant, the system first uses its natural language processing capabilities to understand the user's intent. This involves analyzing the user's voice input, which is captured by microphone 102 and processed by processor 122 using the transformer-based language model. Once the user's intent is understood, assistant system 2 determines whether the requested information or action can be provided by itself or if it requires the involvement of another AI assistant. This determination is made based on the system's knowledge of its own capabilities and those of the other AI assistants it can communicate with, which is stored in the non-volatile system memory unit 118.

If assistant system 2 determines that input or actions of another AI assistant are required, it initiates a communication session with that assistant using the appropriate protocol. This may involve voice-based communication (using the system's microphone 102 and speaker 142), visual communication (e.g., using camera 168, display 145, gestures), API, or any other suitable methods. The system sends a request to the other AI assistant, which includes information about the user's intent, any relevant context from the conversation, and the specific information or action required. The contextual information shared between the AI assistants is managed by the contextual memory unit 116 of assistant system 2. This unit maintains a record of the conversation context, including the user's requests, the responses provided by both assistant system 2 and the other AI assistants, and any relevant background information. This shared context ensures that the AI assistants have a common understanding of the conversation and can provide consistent and coherent responses to the user.

When the other AI assistant receives the request from assistant system 2, it may process the request using its own natural language processing and contextual understanding capabilities. It may then generate a response, which may include the requested information, a confirmation of the action taken, or a request for additional clarification or information. The response from the other AI assistant may be sent back to assistant system 2, which can then integrate the response into its own conversational context. Assistant system 2 uses its language generation capabilities to present the response to the user in a natural and coherent manner, using speaker 142.

Throughout the interaction process, assistant system 2 monitors the quality and relevance of the responses provided by the other AI assistants. If a response is deemed unsatisfactory or irrelevant, assistant system 2 can intervene and provide additional clarification or guidance to the other AI assistant. This monitoring and intervention capability helps to ensure that the user receives accurate and helpful information, even when multiple AI assistants are involved. ATPUs 144 and 146, under the coordination of ATPU management unit 150 may be used to manage the interaction between assistant system 2 and other AI assistants. They may be configured to handle the routing of requests and responses, monitor the performance and availability of the other AI assistants, and allocate resources to ensure that the interaction is efficient and responsive.

In scenarios where assistant system 2 is configured to operate within a swarm of AI assistants that work collaboratively to support the user, the AI assistants may be collectively configured to distribute tasks, share knowledge, and coordinate their actions to provide a more efficient and comprehensive user experience. Within the swarm, each AI assistant, including assistant system 2, may be assigned a specific role or specialization. For example, the user may direct some assistants to focus on task management, while others may be directed to perform information retrieval or communication. These roles may be determined based on the unique capabilities and functionality of each assistant, which are stored in a shared knowledge base accessible to all members of the swarm.

According to one embodiment, assistant system 2 may be configured to act as a central hub or coordinator within the swarm, facilitating communication and collaboration among the various AI assistants. When a user interacts with assistant system 2 and makes a request, the system first analyzes the request using its natural language processing and contextual understanding capabilities to determine which assistants in the swarm are best suited to handle the task. Once the relevant assistants are identified, assistant system 2 dispatches the request to them using a decentralized communication protocol, such as a publish-subscribe messaging system or a peer-to-peer network. This protocol allows for efficient and fault-tolerant communication among the assistants, ensuring that requests are handled promptly and reliably.

As the assistants work on the task, they share updates and results with each other through the decentralized communication protocol. Assistant system 2 monitors the progress of the task and coordinates the efforts of the assistants to ensure that the task is completed efficiently and effectively. In addition to task coordination, assistant system 2 may also facilitate knowledge sharing among the assistants in the swarm. When an AI assistant learns new information or acquires a new skill, it can share this knowledge with the other assistants through a distributed knowledge base. Assistant system 2 manages this knowledge base, ensuring that the information is properly indexed and accessible to all members of the swarm.

The swarm architecture may be configured such that the AI assistants can collaborate on complex tasks that require multiple skills or areas of expertise. In such cases, assistant system 2 may decompose the task into smaller sub-tasks and assign them to the appropriate assistants based on their specializations (e.g., using the TOE incorporated into its ATPU). The assistants then can work together, sharing information and results, to complete the overall task.

In order to enhance the security and privacy of user data within the swarm, assistant system 2 may implement a distributed trust and reputation system. Each assistant in the swarm may be assigned a trust score based on its performance, reliability, and user feedback. Assistant system 2 may use these trust scores to determine which assistants are authorized to access sensitive user data and to participate in critical tasks. The swarm architecture may also be configured to provide for the dynamic addition or removal of AI assistants based on the user's needs and preferences. For instance, if a user requires a specific skill or expertise that is not currently available within the swarm, assistant system 2 can recruit new assistants with the required capabilities from a global pool of AI assistants. Similarly, if an assistant is no longer needed or is not performing satisfactorily, it can be removed from the swarm.

Further details of a structure and different modes of operation of an AI assistant system and a method for providing a contextualized response to a user command using such AI Assistant as well as their possible variations and uses will be apparent from the foregoing description of preferred embodiments and accompanying drawing figures. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

It should be further expressly understood that the specific values and ranges of minimum and maximum values set forth in the foregoing embodiments are provided for illustrative purposes and are meant to encompass not only the explicitly stated values and ranges but also any values and sub-ranges therein. This disclosure includes any and all increments within the stated ranges and any combination of sub-ranges, even if not explicitly delineated. The invention may also be practiced with variations in the specific values and ranges as understood by those skilled in the art, without departing from the scope and spirit of the invention as claimed.

What is claimed is:

1. An artificial intelligence (AI) assistant system, comprising:

an audio input device configured to receive voice input from one or more users;

an audio output device configured to provide audio output;

a processor;

a wireless communication device;

a contextual memory unit configured to store conversational context data on a sliding window basis; and a non-volatile system memory unit, wherein the processor is configured to execute instructions to:

receive the voice input from the audio input device, determine user identification information based on the voice input, update the conversational context data within the contextual memory unit to include the determined user identification information and a tokenized representation of the voice input, process the voice input using a transformer-based language model to generate a conversational response, update the conversational context data within the contextual memory unit to include a tokenized representation of the generated conversational response, and output the generated conversational response to the one or more users via the audio output device.

2. The AI assistant system of claim 1, wherein the contextual memory unit is configured to store the conversational context data for a predetermined time period, and wherein the processor is further configured to execute instructions to dynamically adjust the predetermined time period based on at least one of a user input, a system parameter, and a contextual factor.

3. The AI assistant system of claim 1, wherein the contextual memory unit is configured to store the conversational context data for a predetermined time period, and wherein the processor is further configured to execute instructions to dynamically adjust the predetermined time period based on at least one of user preferences, system performance, and contextual relevance.

4. The AI assistant system of claim 1, wherein the processor is further configured to execute instructions to dynamically adjust a context window size based on at least one parameter selected from a group consisting of available memory, processor speed, and estimated latency for processing user commands.

5. The AI assistant system of claim 1, further comprising a display device, wherein the processor is further configured to execute instructions to generate visual content based on the conversational context data and the generated conversational response, and output the generated visual content to the display device as part of the generated conversational response.

6. The AI assistant system of claim 1, further comprising a camera configured to capture visual input, wherein the processor is further configured to execute instructions to analyze the visual input captured by the camera, extract relevant visual information from the visual input, and update the conversational context data based on the extracted relevant visual information.

7. The AI assistant system of claim 1, wherein the processor is further configured to execute instructions to access an external knowledge base via the wireless communication device to retrieve relevant information based on the conversational context data, and utilize the retrieved relevant information in conjunction with the conversational context data stored in the contextual memory unit to generate the conversational response.

8. The AI assistant system of claim 1, wherein the processor is further configured to execute instructions to store user-specific information in a user profile database within the non-volatile system memory unit, retrieve the user-specific information from the user profile database based on the determined user identification information, and personalize the generated conversational response based on the retrieved user-specific information.

9. The AI assistant system of claim 1, wherein the processor is further configured to execute instructions to perform sentiment analysis on the voice input to determine an emotional state of the one or more users, and adapt the generated conversational response based on the determined emotional state.

10. The AI assistant system of claim 1, wherein the processor is further configured to execute instructions to solicit user feedback on the generated conversational response, process the solicited user feedback to generate processed feedback data, update the transformer-based language model based on the processed feedback data, and utilize an active learning algorithm to select conversational responses for which to solicit user feedback.

11. The AI assistant system of claim 1, wherein the processor is further configured to execute instructions to proactively generate a plurality of candidate conversational responses based on the conversational context data prior to receiving a subsequent user query or command, store the plurality of candidate conversational responses in memory, and select a conversational response from the stored plurality of candidate conversational responses based on the subsequent user query or command and the conversational context data.

12. The AI assistant system of claim 1, wherein the processor is further configured to execute instructions to receive a complex user request from the voice input, break down the complex user request into a plurality of manageable sub-tasks, coordinate the execution of the plurality of manageable sub-tasks; and generate a portion of the conversational response based on the execution of the plurality of manageable sub-tasks.

13. The AI assistant system of claim 1, further comprising at least one agentic task processing unit (ATPU) configured to autonomously perform a task in a background, wherein the processor is further configured to execute instructions to: detect a command based on the conversational context data, in response to detecting the command, cause the at least one ATPU to initiate performance of the task, receive a result of the task from the at least one ATPU, generate a conversational response indicating a result of the task, and output the conversational response indicating the result of the task via the audio output device.

14. The AI assistant system of claim 1, wherein the processor is further configured to execute instructions to:
   detect a command based on the conversational context data stored in the contextual memory unit;
   in response to detecting the command, autonomously perform a multi-step task in a background,
   wherein performing the multi-step task comprises:
      decomposing the multi-step task into a plurality of subtasks;
      assigning the plurality of subtasks to a plurality of agentic task processing units;
      executing the plurality of subtasks across the plurality of agentic task processing units, wherein executing the plurality of subtasks comprises:
      generating queries to retrieve data from at least one of the non-volatile system memory unit, the contextual memory unit, or an external data source accessed via the wireless communication device;
      analyzing the retrieved data using at least one of natural language processing or machine learning models;
      generating a plurality of results based on analyzing the retrieved data;
      monitoring a progress of executing the plurality of subtasks;
      aggregating the plurality of results from the plurality of agentic task processing units; and
      generating a conversational response indicating a result of the multi-step task based on the aggregated plurality of results; and
   output the generated conversational response via the audio output device.

15. The AI assistant system of claim 1, further comprising an emergency shut-off switch, wherein the processor is further configured to execute instructions to: detect activation of the emergency shut-off switch, and disable processing of voice input and generation of conversational responses in response to detecting the activation of the emergency shut-off switch.

16. The AI assistant system of claim 1, wherein the processor is further configured to execute instructions to: detect activation of an emergency event, and initiate a shutdown procedure in response to detecting the activation of the emergency event.

17. The AI assistant system of claim 1, wherein the processor is further configured to execute instructions to: assign a priority level to each user based on the determined user identification information, upon receiving voice input from multiple users, process the voice input based on the assigned priority levels.

18. The AI assistant system of claim 1, wherein the processor is further configured to execute instructions to: assign a priority level to each user based on the determined user identification information, upon receiving voice input from multiple users, determine a processing order for the received voice input based on the assigned priority levels, and process the voice input in the determined processing order, such that voice input from a user with a higher assigned priority level is processed before voice input from a user with a lower assigned priority level.

19. The AI assistant system of claim 1, wherein the processor is further configured to execute instructions to: assign a priority level to a user based on the determined user identification information, and process the voice input based on the assigned priority level.

20. A method for providing a contextualized response to a user using artificial intelligence (AI), the method comprising:

receiving, by an audio input device, voice input from one or more users;

determining, by a processor, user identification information based on the voice input;

updating, by the processor, conversational context data within a contextual memory unit to include the determined user identification information and a tokenized representation of the voice input, wherein the contextual memory unit is configured to store the conversational context data on a sliding window basis;

processing, by the processor, the voice input using a transformer-based language model to generate a conversational response;

updating, by the processor, the conversational context data within the contextual memory unit to include a tokenized representation of the generated conversational response;

storing, by the processor, user-specific information in a non-volatile system memory unit; and outputting, by an audio output device, the generated conversational response to the one or more users.

21. The method of claim 20, wherein the contextual memory unit is configured to store the conversational context data for a predetermined time period, and wherein the predetermined time period is dynamically adjusted, by the processor, based on at least one of a user input, a system parameter, and a contextual factor.

22. The method of claim 20, wherein the contextual memory unit is configured to store the conversational context data for a predetermined time period, and wherein the processor is further configured to execute instructions to dynamically adjust the predetermined time period based on at least one of user preferences, system performance, and contextual relevance.

23. The method of claim 20, further comprising dynamically adjusting, by the processor, a context window size based on at least one parameter selected from a group consisting of available memory, processor speed, and estimated latency for processing user commands.

24. The method of claim 20, further comprising generating, by the processor, visual content based on the conversational context data and the generated conversational response, and outputting, by a display device, the generated visual content as part of the generated conversational response.

25. The method of claim 20, further comprising capturing visual input by a camera, analyzing the visual input captured by the camera, extracting relevant visual information from the visual input, and updating the conversational context data based on the extracted relevant visual information.

26. The method of claim 20, further comprising accessing an external knowledge base using a wireless communication device to retrieve relevant information based on the conversational context data, and combining the retrieved relevant information with the conversational context data stored in the contextual memory unit to generate the conversational response.

27. The method of claim 20, further comprising retrieving the user-specific information from a user profile database within the non-volatile system memory unit based on the determined user identification information, and personalizing the generated conversational response based on the retrieved user-specific information.

28. The method of claim 20, further comprising performing sentiment analysis on the voice input to determine an emotional state of the one or more users, and adapting the generated conversational response based on the determined emotional state.

29. The method of claim 20, further comprising soliciting user feedback on the generated conversational response, processing the solicited user feedback to generate processed feedback data, updating the transformer-based language model based on the processed feedback data, and using an active learning algorithm to select conversational responses for which to solicit user feedback.

30. The method of claim 20, further comprising proactively generating a plurality of candidate conversational responses based on the conversational context data prior to receiving a subsequent user query or command, storing the plurality of candidate conversational responses in memory, and selecting a conversational response from the stored plurality of candidate conversational responses based on the subsequent user query or command and the conversational context data.

31. The method of claim 20, further comprising receiving a complex user request from the voice input, breaking down the complex user request into a plurality of sub-tasks, coordinating execution of the plurality of sub-tasks, and generating a portion of the conversational response based on the execution of the plurality of sub-tasks.

32. The method of claim 20, further comprising detecting a command based on the conversational context data, in response to detecting the command, causing at least one agentic task processing unit (ATPU) to autonomously perform a task in a background, receiving a result of the task from the at least one ATPU, generating a conversational response indicating the result of the task, and outputting the conversational response indicating the result of the task via the audio output device.

33. The method of claim 20, further comprising:

detecting a command based on the conversational context data stored in the contextual memory unit;

in response to detecting the command, autonomously performing a multi-step task in a background, wherein performing the multi-step task comprises:

decomposing the multi-step task into a plurality of subtasks;

assigning the plurality of subtasks to a plurality of agentic task processing units;

executing the plurality of subtasks across the plurality of agentic task processing units, wherein executing the plurality of subtasks comprises:

generating queries to retrieve data from at least one of the non-volatile system memory unit, the contextual memory unit, or an external data source accessed via a wireless communication device;

analyzing the retrieved data using at least one of natural language processing or machine learning models; and generating a plurality of results based on analyzing the retrieved data;

monitoring a progress of executing the plurality of sub-tasks;

aggregating the plurality of results from the plurality of agentic task processing units; and generating a conversational response indicating a result of the multi-step task based on the aggregated plurality of results; and outputting the generated conversational response via the audio output device.

34. The method of claim 20, further comprising detecting activation of an emergency shut-off switch, and initiating a shutdown procedure in response to detecting the activation of the emergency shut-off switch.

35. The method of claim 20, further comprising detecting activation of an emergency event, and disabling processing of at least one of the voice input and generation of conversational responses in response to detecting the activation of the emergency event.

36. The method of claim 20, further comprising assigning a priority level to each user based on the determined user identification information, and processing the voice input based on the assigned priority levels in response to receiving voice input from multiple users.

37. The method of claim 20, further comprising assigning a priority level to each user based on the determined user identification information, upon receiving voice input from multiple users, determining a processing order for the voice input based on the assigned priority levels, and processing the voice input in the determined processing order, such that voice input from a user with a higher assigned priority level is processed before voice input from a user with a lower assigned priority level.

38. The method of claim 20, further comprising assigning a priority level to a user based on the determined user identification information, and processing the voice input based on the assigned priority level.

\* \* \* \* \*